(12) United States Patent
So et al.

(10) Patent No.: US 11,745,585 B2
(45) Date of Patent: Sep. 5, 2023

(54) VEHICLE INFOTAINMENT APPARATUS USING WIDGET AND OPERATION METHOD THEREOF

(71) Applicant: THINKWARE CORPORATION, Seongnam-Si (KR)

(72) Inventors: Junghan So, Seongnam-Si (KR); Wonjun Heo, Seongnam-Si (KR); Daeun Kim, Seongnam-Si (KR); Seokwon Choi, Seongnam-Si (KR); Taekyun Kim, Seongnam-Si (KR); Younjoo Shin, Seongnam-Si (KR)

(73) Assignee: THINKWARE CORPORATION, Seongnam-si (KR)

( * ) Notice: Subject to any disclaimer, the term of this patent is extended or adjusted under 35 U.S.C. 154(b) by 266 days.

(21) Appl. No.: 17/218,877

(22) Filed: Mar. 31, 2021

(65) Prior Publication Data

US 2021/0323406 A1   Oct. 21, 2021

(30) Foreign Application Priority Data

Apr. 20, 2020 (KR) .................. 10-2020-0047646
Dec. 1, 2020 (KR) .................. 10-2020-0165735

(51) Int. Cl.
| | |
|---|---|
| B60K 35/00 | (2006.01) |
| G06F 9/451 | (2018.01) |
| G06F 3/0486 | (2013.01) |
| G06F 3/04883 | (2022.01) |

(52) U.S. Cl.
CPC ............ *B60K 35/00* (2013.01); *G06F 3/0486* (2013.01); *G06F 3/04883* (2013.01); *G06F 9/451* (2018.02); *B60K 2370/115* (2019.05); *B60K 2370/119* (2019.05); *B60K 2370/1438* (2019.05); *B60K 2370/1468* (2019.05); *B60K 2370/152* (2019.05); *B60K 2370/164* (2019.05); *B60K 2370/52* (2019.05)

(58) Field of Classification Search
None
See application file for complete search history.

(56) References Cited

U.S. PATENT DOCUMENTS

| | | | |
|---|---|---|---|
| 8,453,056 B2* | 5/2013 | Gupta | G06F 9/451 |
| | | | 715/718 |
| 11,301,345 B2* | 4/2022 | Strode | G06F 11/3051 |
| 2004/0135812 A1* | 7/2004 | Tai | G06F 9/451 |
| | | | 715/779 |
| 2004/0268261 A1* | 12/2004 | Elliott | G06F 3/0488 |

(Continued)

FOREIGN PATENT DOCUMENTS

| | | |
|---|---|---|
| KR | 20060064523 A | 6/2006 |
| KR | 201000126718 A | 12/2010 |

(Continued)

*Primary Examiner* — Haimei Jiang
(74) *Attorney, Agent, or Firm* — Hayes Soloway PC

(57) ABSTRACT

Disclosed are a vehicle infotainment apparatus using a widget and a method of operating the same. According to various embodiments, some UIs of functions on execution in a background can be displayed as a background widget within an area that is always accessible in a screen of the infotainment device, thereby enabling to provide its user with simpler manipulation functions and necessary information.

20 Claims, 80 Drawing Sheets

(56) References Cited

U.S. PATENT DOCUMENTS

| | | | |
|---|---|---|---|
| 2005/0183017 A1* | 8/2005 | Cain | H04N 21/8113 |
| | | | 725/40 |
| 2006/0123353 A1* | 6/2006 | Matthews | G06F 3/0481 |
| | | | 715/779 |
| 2006/0161847 A1* | 7/2006 | Holecek | G06F 3/0481 |
| | | | 715/838 |
| 2008/0155455 A1 | 6/2008 | Balasubramanian et al. | |
| 2008/0307350 A1 | 12/2008 | Sabatelli et al. | |
| 2010/0269043 A1* | 10/2010 | Elliott | G06F 3/0484 |
| | | | 715/779 |
| 2011/0173556 A1 | 7/2011 | Czerwinski et al. | |
| 2012/0185794 A1 | 7/2012 | Qin et al. | |
| 2012/0185798 A1* | 7/2012 | Louch | G06F 3/0481 |
| | | | 715/796 |
| 2013/0139061 A1* | 5/2013 | Strode | G06F 3/165 |
| | | | 715/727 |
| 2015/0293683 A1 | 10/2015 | Horsman et al. | |

FOREIGN PATENT DOCUMENTS

| | | |
|---|---|---|
| KR | 20120092485 A | 6/2012 |
| KR | 20130031111 A | 3/2013 |

\* cited by examiner

VEHICLE INFOTAINMENT APPARATUS USING WIDGET AND OPERATION METHOD THEREOF

CROSS REFERENCE TO RELATED APPLICATION

This application claims priority from Republic of Korea Patent Applications No. 10-2020-0047646 filed on Apr. 20, 2020 and No. 10-2020-0165735 filed on Dec. 1, 2020, which are hereby incorporated by reference in their entirety.

BACKGROUND

Field of the Disclosure

The present disclosure relates to a vehicle infotainment apparatus using a widget and a method of operation thereof.

Description of the Background

A vehicle infotainment apparatus utilizes a combination of automobile technology and IT technology for implementing both the information function and the entertainment function within a vehicle. Recently, the state of the art vehicle infotainment apparatus has developed to provide its user with not only a media (e.g., music, video, etc.) playback function but also even a platform for utilizing Internet environment or some application programs. Rapid developments in the technology and user trends for the vehicle infotainment apparatus lead to increasing needs for the user convenience for various other sub-tasks in addition to routing guidance under the driving environment. Further, as more development is made on ADAS (Advanced Driver Assistance System) technology in vehicle navigation systems, more various information is intended to be provided to a driver for his/her more convenient and safe driving.

SUMMARY

An infotainment apparatus according to various embodiments may include at least one processor implemented to execute computer readable instructions included in a memory, the at least one processor being configured to, while any one of a navigation function and a plurality of other functions is being executed in a foreground and at least one other function in addition to the function being executed in the foreground is executed in a background, display in a widget form an interface associated with the function being executed in the background on an area that can be accessed at all times, keeping an active state together with the foreground execution screen.

An operating method according to various embodiments may include, while any one of a navigation function and a plurality of other functions is being executed in a foreground and at least one other function in addition to the function being executed in the foreground is executed in a background, displaying in a widget form an interface associated with the function being executed in the background on an area that can be accessed at all times, keeping an active state together with the foreground execution screen.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
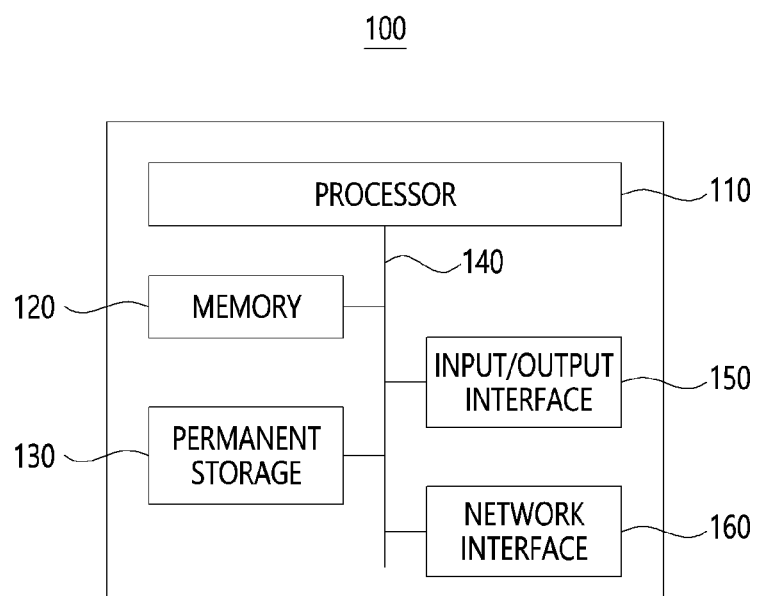
FIG. 1 illustrates an internal configuration of an infotainment apparatus according to various embodiments.

Hereinafter, various embodiments of the present document will be described with reference to the accompanying drawings.

Various embodiments of the present disclosure and terms used therein are not intended to limit the technology described therein to the specific embodiments as disclosed hereinafter, and should be understood to include various changes, equivalents, and/or substitutes of the corresponding embodiments. In conjunction with the description of the drawings, like reference numerals may be used for like elements. Singular expressions may include plural expressions unless the context clearly indicates otherwise. Throughout the present disclosure, expressions such as "A or B", "at least one of A and/or B", "A, B or C" or "at least one of A, B and/or C" may include all possible combinations of those items listed together. Expressions such as "first", "second", and so on may modify the corresponding elements regardless of their order or importance, and are only used to distinguish one element from other elements, without limiting the corresponding elements. When any (e.g., first) first is referred to as being "coupled (either functionally or communicatively)" or "connected" to/with another (e.g., second) element, the 'first' element may be directly connected to the 'second' element or may be indirectly connected through another element (e.g., a third element).

The term "module" used throughout the disclosure may include a unit configured of hardware, software, firmware, or a combination thereof and may be used interchangeably with terms such as, for example, logic, logic blocks, parts, or circuits. Such a module may include an integrally configured single component or a minimum unit or its part to perform one or more functions. For example, the module may be configured as an application-specific integrated circuit (ASIC).

FIG. 1 illustrates an internal configuration of a vehicle infotainment apparatus according to various embodiments.

Figure 2:
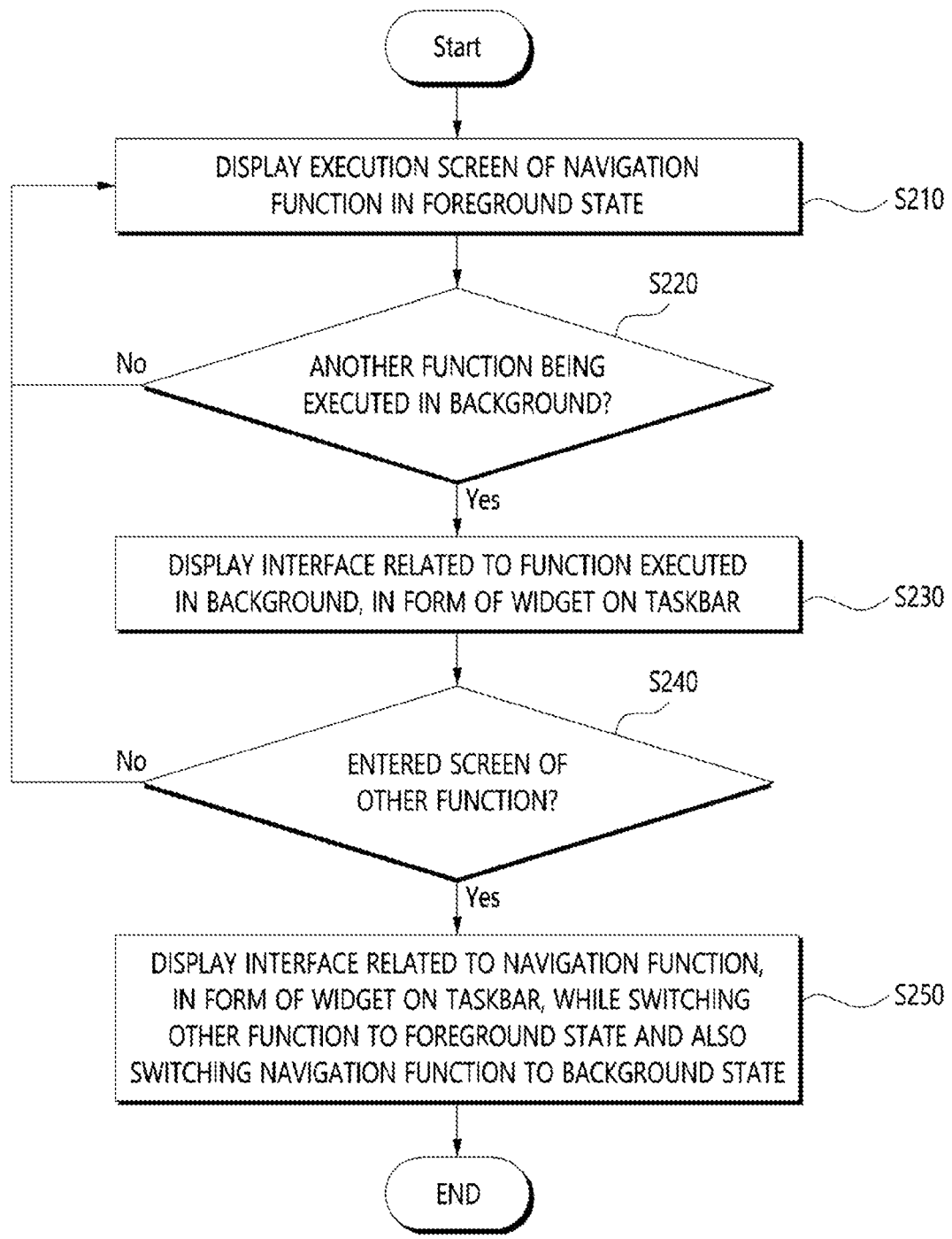
FIG. 2 illustrates an operating method of an infotainment apparatus according to various embodiments.

As shown in FIG. 1, the vehicle infotainment apparatus 100 may include a processor 110, a memory 120, a permanent storage 130, a bus 140, an input/output interface 150 and a network interface 160, as elements for executing the operating method according to FIG. 2.

The processor 110 may include or be part of any device capable of processing a sequence of instructions. The processor 110 may include, for example, a computer processor, a processor in a mobile device or other electronic device, and/or a digital processor. The processor 110 may be connected to the memory 120 through the bus 140.

The memory 120 may include a volatile memory, a permanent memory, a virtual memory or other memory/memories for storing information used or output by the infotainment apparatus 100. The memory 120 may include, for example, a random access memory (RAM) and/or a dynamic RAM (DRAM). The memory 120 may be used to store arbitrary information such as state information of the infotainment apparatus 100. The memory 120 may be used to store a set of instructions for the infotainment apparatus 100, including instructions for controlling the operation of the infotainment apparatus, for example. The infotainment apparatus 100 may include one or more processors 110 as required or circumstance demand.

The bus 140 may include a communication infrastructure that enables interaction between various components of the infotainment apparatus 100. The bus 140 may carry data between components of the infotainment apparatus 100, for example, between the processor 110 and the memory 120. The bus 140 may include a wireless and/or wired communication medium between components of the infotainment apparatus 100 and may include parallel, serial, and/or other topology of arrangements.

The permanent storage 130 may include components such as a memory or other permanent storage device as used by the infotainment apparatus 100 to store data for a predetermined extended time duration (e.g., as compared to the memory 120). The permanent storage 130 may include a non-volatile main memory as used by the processor 110 in the infotainment apparatus 100. The permanent storage 130 may include, for example, a flash memory, a hard disk, an optical disk, or any other computer-readable medium.

The input/output interface 150 may include interfaces for touch, display, voice command input, keyboard, or other input/output devices. Various inputs related to configuration commands and/or infotainment operations may be received through the input/output interface 150.

Network interface 160 may include one or more interfaces to networks such as local area network (LAN) or Internet. The network interface 160 may include interfaces for wired or wireless connections. Configuration commands may be received through the network interface 160. Further, information related to the infotainment operation may be received or transmitted through the network interface 160.

In addition, in another embodiments, the infotainment apparatus 100 may include more components than the components as in FIG. 1. Here, it should be noted however, that some or most of those prior art components may be refrained to clearly show. For example, the infotainment apparatus 100 may be implemented to include at least some of the input/output devices connected to the input/output interface 150 described above, or may further include a transceiver, a Global Positioning System (GPS) module, a camera, various sensors, other elements such as a database.

FIG. 2 illustrates an operating method of an infotainment apparatus according to various embodiments.

The processor 110 may perform steps S210 to S250 included in the infotainment operation method of FIG. 2. For example, the processor 110 may be implemented to execute instructions according to the program codes of the operating system (OS) included in the memory 120 and at least one program code, wherein the least one program code may correspond to codes of a program implemented to execute the infotainment operation method.

The infotainment operation method according to various embodiments may not occur in the order as illustrated in FIG. 2, and some of those steps may be omitted. Otherwise, an additional process or step may be further included.

In step S210, the processor 110 may display an execution screen of the navigation function as an activated screen, when the navigation function is executed in the foreground state. For example, the vehicle infotainment apparatus 100 may include a navigation function for route guidance, an air conditioning control function for controlling a vehicle air conditioner, a hands-free call function, a media playback function for playing media contents such as music or video, and so on. The processor 110 may execute the navigation function in the foreground to display it on a screen according to a user request.

In step S220, the processor 110 may determine whether it is executing other functions in addition to the navigation function, for example, one or more of an air conditioning control function, a hands-free call function, or a media playback function in the background, in a situation that the navigation function is running in the foreground.

In step S230, the processor 110 may display, when another function is running in the background, an interface related to a function running in the background, in the form of a widget. The processor 110 may use a predetermined specific area on the screen of the infotainment apparatus 100 to display a UI item including at least one UI related to the function running in the background, in the form of a widget (hereinafter, referred to as a 'background widget'). The processor 110 may utilize a partial area of the screen of the infotainment apparatus 100, for example, any one of a lowermost area, an uppermost area, a left area, and a right area as the background widget. As an example, the processor 110 may display the background widget on a certain area, which is accessible at all times maintaining an activated state on the screen of the infotainment apparatus 100, for example, on a taskbar, if such available.

The processor 110 may maintain the execution screen of the navigation function in the foreground state, when there is no other function running in the background.

In step S240, the processor 110 may determine whether to enter the screen of another function from the execution screen of the navigation function. In other words, the processor 110 may determine whether a function running on the foreground is switched from the navigation function to the other function.

In step S250, when the processor 110 enters the screen of another function, that is, when the function running on the foreground is switched to the other function, it may display the interface related to the navigation function in the form of a widget, while simultaneously switching the corresponding function to the foreground state and switching the navigation function to the background state. Likewise, the processor 110 may display a UI item including at least one UI related to the navigation function, on an area that is accessible at all times maintaining an activated state on the screen of the infotainment apparatus 100, for example, on a taskbar.

Accordingly, the processor 110 may provide a set of simple manipulation functions and information by means of displaying some UIs of functions running in the background as the background widget in the area that is accessible at all times within the screen of the infotainment apparatus 100.

FIGS. 3 to 6 each illustrate actual exemplary screens of an infotainment apparatus according to various embodiments.

Figure 3:
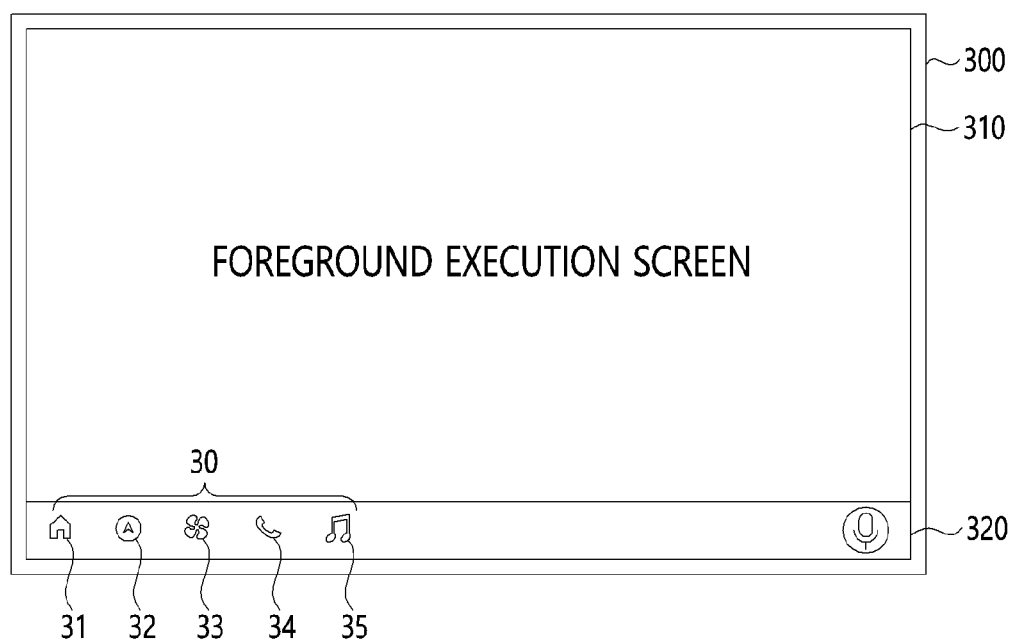
FIGS. 3 to 17 each illustrate examples of specific UIs in an infotainment apparatus according to various embodiments.

Referring now to FIG. 3, it is seen that the screen 300 of the infotainment apparatus may be configured of an execution screen 310 for a foreground function (hereinafter, referred to as a 'foreground execution screen'), and particularly, inclusive of a taskbar 320 as an example of a screen area that is accessible at all times while maintaining an activated state together with the foreground execution screen 310.

The processor 110 may configure an icon list 30 (hereinafter, referred to as a 'favorite list') of the work functions frequently used by a driver of the vehicle as a quick menu, that is, a short cut icon, arranging the favorite list on the display bar 320. The favorites list 30 may include a home button 31 indicating an icon for a function to move to a home screen, a navigation button 32 indicating an icon for a navigation function, an air conditioning button 33 indicating an icon for an air conditioning control function, and a call button 34 indicating an icon for a hands-free call function icon, a media button 35 indicating an icon for a media playback function icon, and the like.

Some of the functions included in the favorites list 30 may be configured by default, and icons of other functions other than the default functions may be set by means of the driver's selection. For example, the home button 31 and the navigation button 32 of the favorites list 30, may be established by default, while one or more of the air conditioning button 33, the call button 34 and the media button 35 may be optionally set as task functions frequently used by the driver.

These icons included in the favorites list 30 may be arranged on basis of a predetermined schedule (e.g., in order of their names or recent executions, etc.), and as another example, may be arranged in the order established as a favorite function (in other words, in order added to the taskbar), the order of recent execution, or the order specified directly by the driver.

Further, the maximum number of the icons included in the favorites list 30 may be specified by default, or may be directly set by the driver.

FIG. 3 illustrates a situation in which a certain task function, for example, a route guidance screen, that is, an execution screen of the navigation function, is displayed on the foreground execution screen 310, and the screen 300 on which there is no function running on the background.

Figure 4:
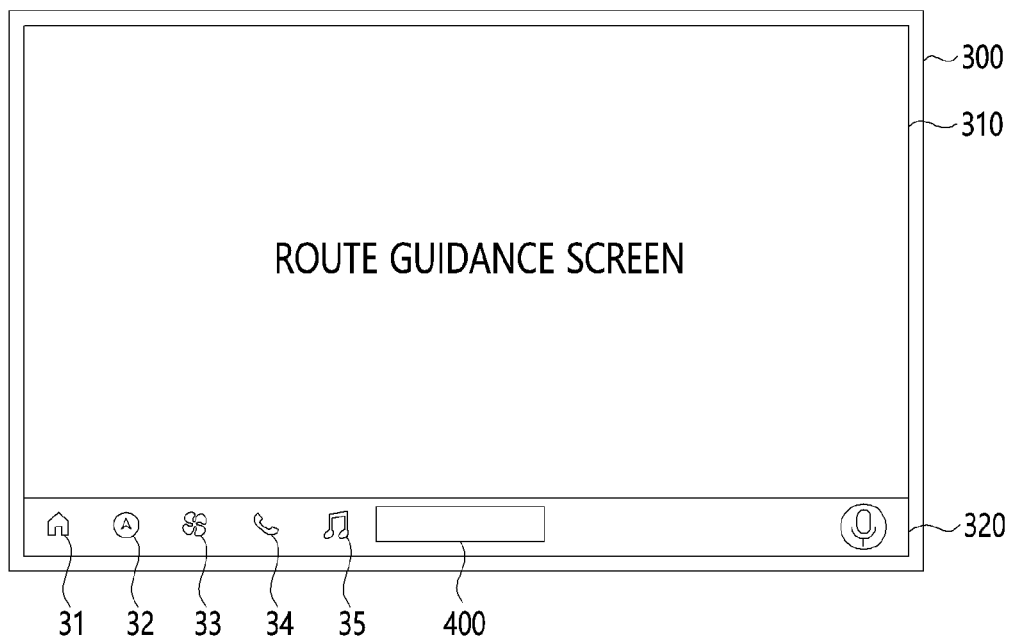

FIG. 4 illustrates the screen 300 in case where in a situation that the route guidance screen, that is, an execution screen of the navigation function, is displayed on the foreground execution screen 310, a media playback function is running on the background. Here, a background widget 400 of the media playback function may be displayed on the taskbar 320, and then, the background widget 400 may be displayed in a position adjacent to the media button 35, for example, to the right of the media button 35.

Figure 5:
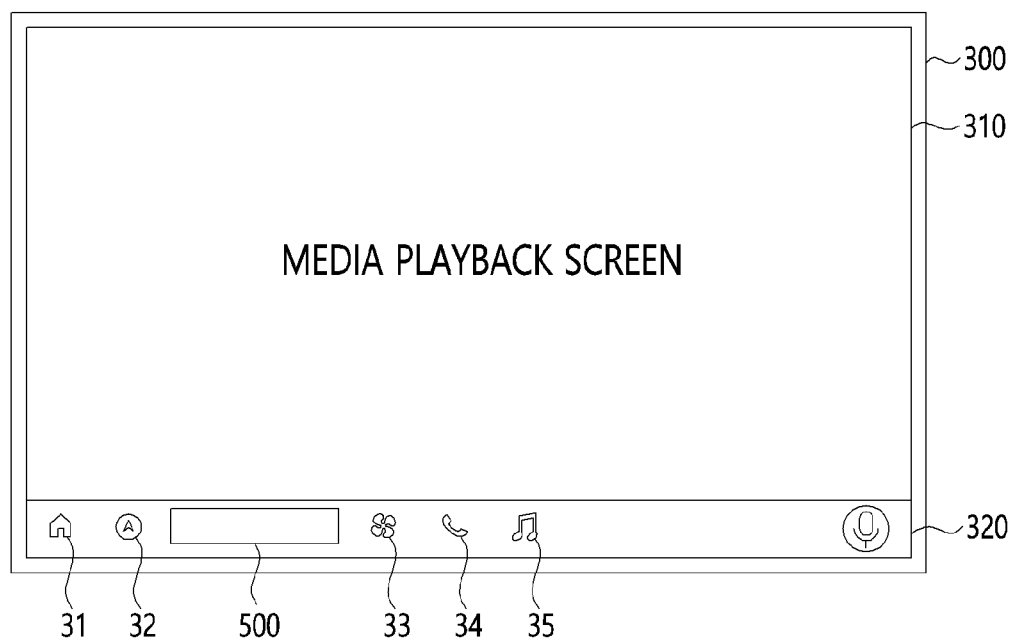
Figure 6:
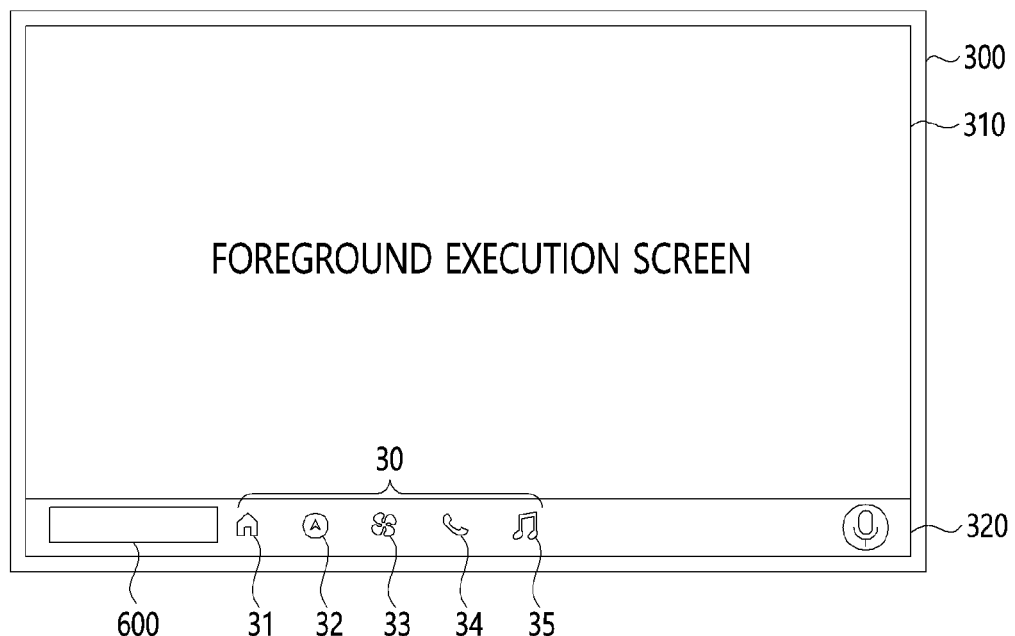

FIG. 5 illustrates the screen 300 in case where the navigation function is being executed in the background while an execution screen of the media play function, that is, a media playback screen is displayed on the foreground execution screen 310. A background widget 500 of the navigation function may be displayed on the taskbar 320, and at this time, the background widget 500 may be displayed in a position adjacent to the navigation button 32, for example, to the right of the navigation button 32. As shown in FIG. 5, as the background widget 500 of the navigation function is displayed on the right side of the navigation button 32, those icons such as air conditioning button 33, call button 34, media button 35, etc., may be automatically shifted as shown in FIG. 5.

Accordingly, it is seen that the background widgets 400 and 500 of any functions running on the background may be displayed at a location adjacent to the icon of the corresponding function.

Although these background widgets 400 and 500 are shown above as being displayed in a position adjacent to the icon of the function running in the background, the arrangement as disclosed is not limited thereto and the positions of the background widgets 400 and 500 may be changed as occasions demand. For example, referring then to FIG. 6, the background widget 600 may be displayed fixed to a predetermined specific position (e.g., either left side or right side) within the taskbar 320.

Furthermore, it is noted that when there is no function running on the background, the favorites list 30 may be disposed on the left side of the taskbar 320 as shown in FIG. 3, while when there is any function running on the background, they may be suitably arranged in the order of the background widget 600 and the favorites list 30 on the left side of the taskbar 320.

In other words, it is noted that the location of the widget is not determined according to the function executed in the background, but the background widget 600 may be suitably displayed at a fixed position of the taskbar 320 regardless of the function executed in the background.

Although the foregoing describes an example that only one function is operating in the background, the disclosed invention is not limited thereto. For instance, when there are two or more functions operating in the background, all the background widgets for each function may be displayed altogether on the taskbar 320. In another example, a predetermined number of background widgets may be displayed on the taskbar 320 according to the priority preset for each function. For example, if the priority is preset in the order of an air conditioning control function, a hands-free call function, and a media playback function, then only one background widget may be displayed at one time according to the priority. Further, even when both the hands-free call function and the media playback function are running in the background, only the hands-free call function widget may be displayed as desired, while the media playback function widget may be hidden from the screen. When two or more background widgets are displayed at the same time, those background widgets may be displayed in order of the priority preset for each function.

The infotainment apparatus according to various embodiments of the disclosure provides a good user experience that enables the user to easily and conveniently perform other tasks, by rendering driving information at all times of driving, so as not for the driver to lose one's concentration on driving. In addition, it can provide an infotainment apparatus that enables the driver to quickly get back concentration on the driving itself, even if the driver looks away from the driving for details of any other tasks, thereby providing more safety and a more pleasant entertainment experience for the driver.

Hereinafter, a detailed description is made to distinguish between a situation in which other function is being executed in the background while a navigation function is already running in the foreground and a situation in which the user is going to enter a screen for another function during route guidance of the navigation function. In particular, when a media playback is being performed, a function to search for a media list may be additionally provided, and its detailed entry screen may provide the driver with an intuitive and easy UI for the list searching during driving.

Figure 7:
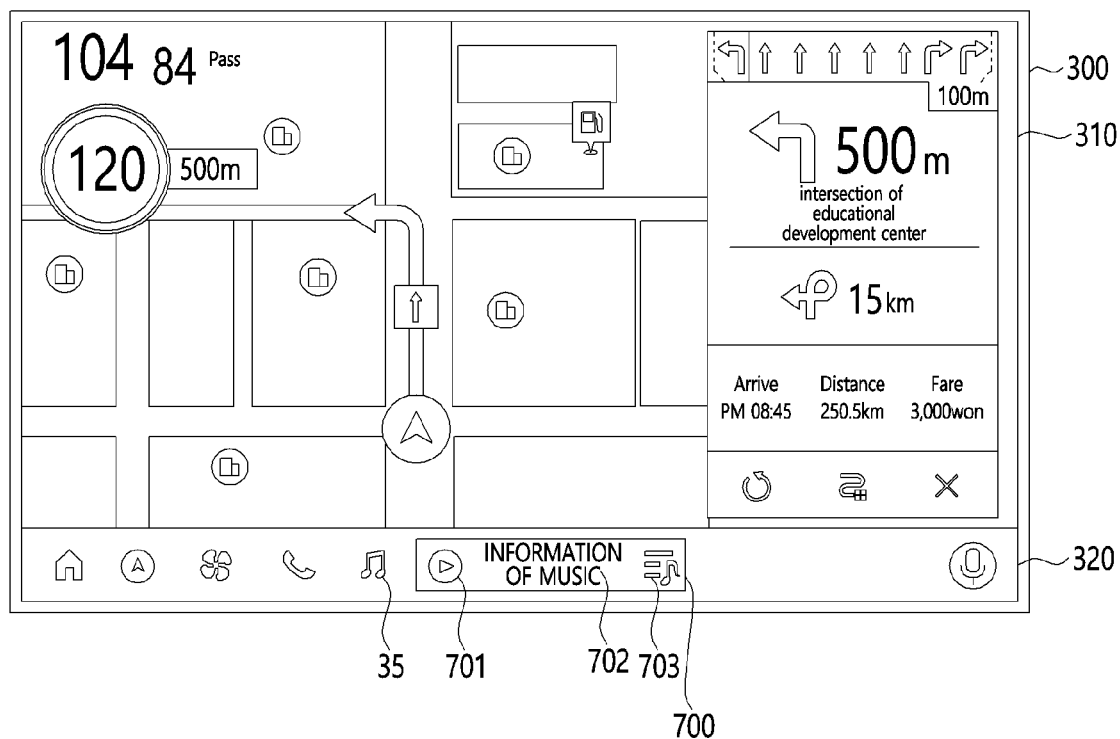

FIG. 7 illustrates the screen 300 for a situation in which music is being played on the background while the route guidance screen of the navigation function is activated on the foreground execution screen 310.

Referring now to FIG. 7, it is seen that a widget, that is, a background widget 700 displaying thereon information and operating buttons for executing a media playback function in a simplified form is provided on the task bar 320 during the route guidance. The background widget 700 for the media playback function may be displayed at a position adjacent to the media button 35 in the taskbar 320, for example, to the right of the media button 35.

As an example, the background widget 700 of the media playback function may include a progress bar 701, information of selected music content (e.g., music title, album title, artist name) 702 of the music being played, etc. Further, when the media playback function is of a function capable of retrieve song list information, a search button 703 for use in searching a media list may be further included in the background widget 700.

Figure 8:
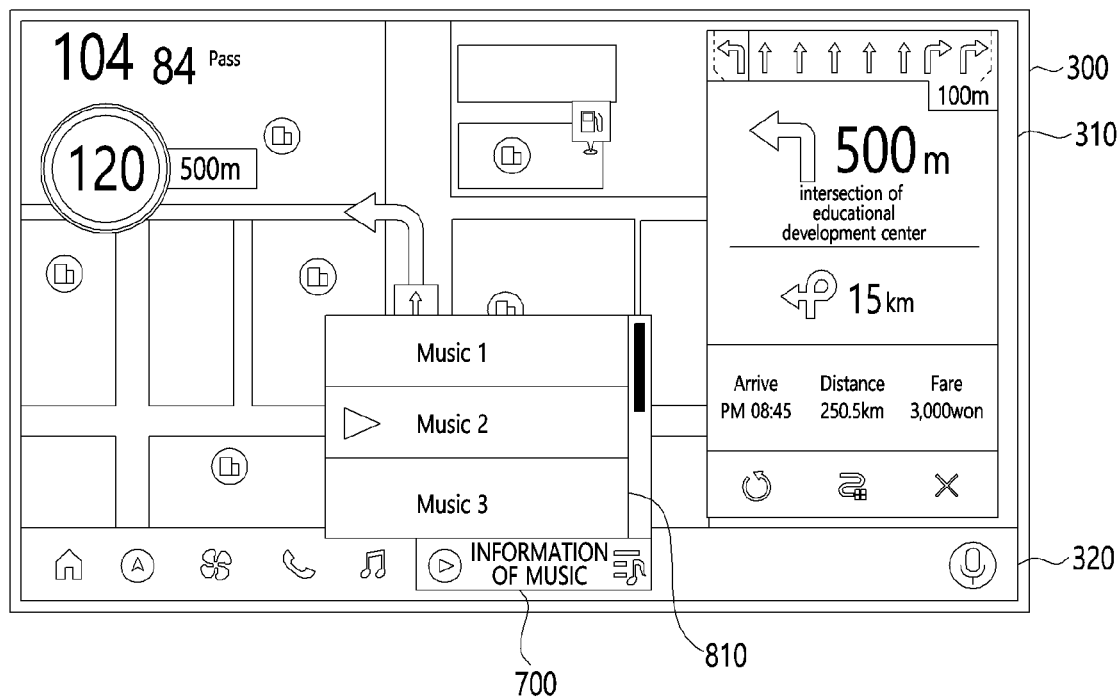

When the driver selects the search button 703 within the background widget 700, the processor 110 may provide, in an open or unfolded state, an interface screen 810 (hereinafter, referred to as a 'list search screen') for searching a media list on the screen 300, as shown in FIG. 8. Here, the list search screen 810 may be displayed at a location adjacent to the background widget 700, for example, just above the background widget 700.

Figure 9:
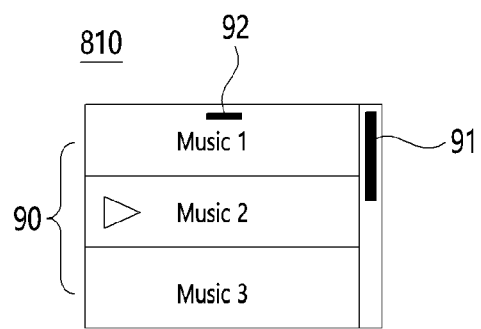

Referring to FIG. 9, the list search screen 810 may include a playlist 90 indicating the currently played music, and further include a scroll bar, by which a music title indicated in the playlist 90 may be searched by dragging up and down and an adjustment bar 92 capable of adjusting the size of the list search screen 810. This list search screen 810 may be applied in a form of which size can be controlled by means of the adjustment bar 92 at the top of the screen.

Figure 10:
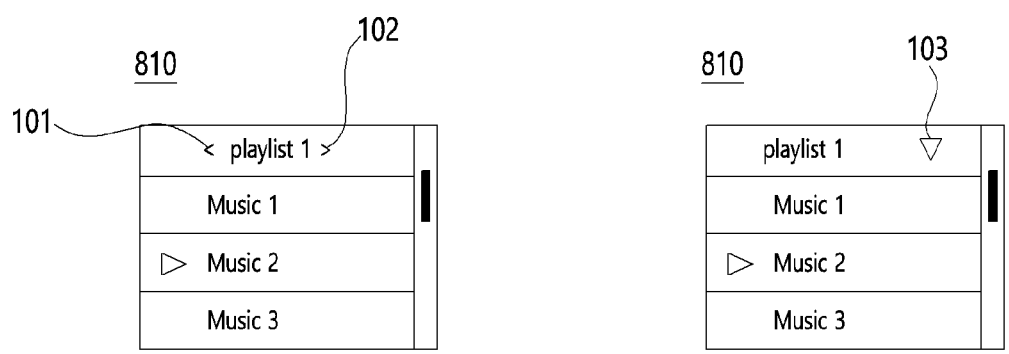

The list search screen 810 may also be applied in a more functional form that enables searching for other playlists in addition to the playlist 90 inclusive of the currently played music. For example, as shown in FIG. 10, the left and right search buttons 101 and 102 for searching the playlist left and right, or the entire search button 103 for searching the entire playlist may be further disposed within the list search screen 810, where appropriate.

Figure 11:
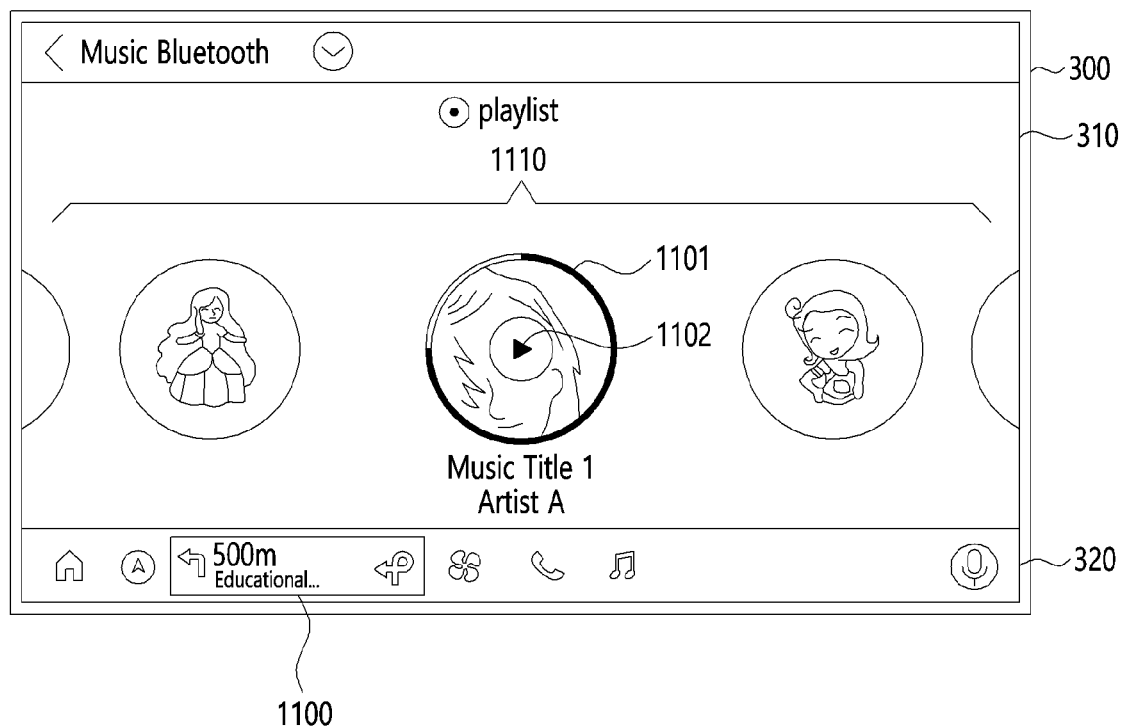

FIG. 11 illustrates a screen 300 for a situation in which the foreground execution screen 310 is switched to a media playback screen as it enters another function, for example, the media playback function, from the route guidance in operating. It is then possible for the user to enter the screen 300 of FIG. 11 at once by either selecting the background widget 700 for the media playback function or selecting the media button 35 in the favorites list 30, from the screen 300 of FIGS. 7 and 8.

Referring to FIG. 11, when the navigation function is switched to the background state, the processor 110 may provide a widget, that is, a background widget 1100 in which key guide information of the navigation function is simply displayed in the taskbar 320. The background widget 1100 for the navigation function may be displayed in a position adjacent to the navigation button 32 within the task bar 320, for example, to the right of the navigation button 32. For example, the next directional information and the next-after-next directional information may be displayed as route guidance information on the background widget 1100 of the navigation function.

The processor 110 may provide a search function in a form of a cover flow UI, as an interface that enable the user to quickly and intuitively search for a favorite song while turning left or right the playlist 1110 including the currently played music within the media playback screen, which is the foreground execution screen 310, viewing the song-related image. For each song included in the playlist 1110, an icon configured of a certain image associated with the song may be displayed according to a given alignment criterion.

When entering the media playback screen, the currently playing song may be focused and displayed in the center as a default of its initial screen, and a playing gauge of the currently playing song may be displayed on the progress bar 1101. A touching onto the progress bar 1101 enables a playing position of the song to be moved to a position corresponding to the touched point, and a play button 1102 for controlling playback and pausing of a selected media content may be disposed at the center of an icon representing the currently playing song.

Figure 12:
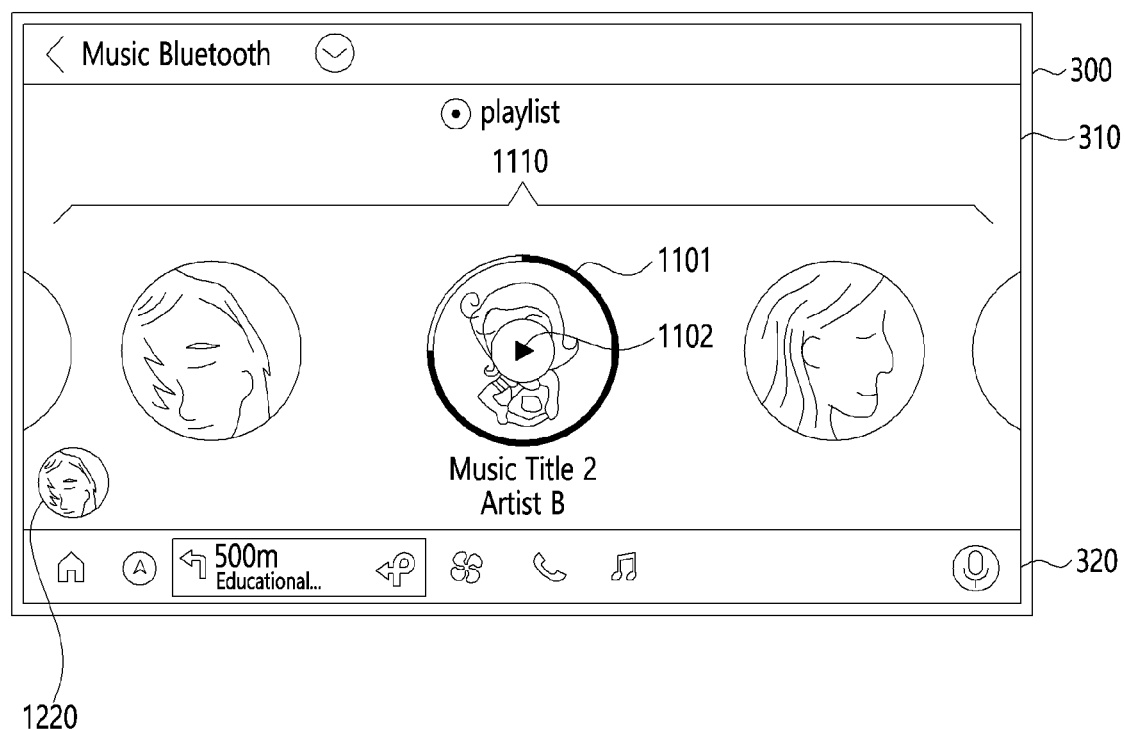

When the cover flow of the playlist 1110 is passed from left to right based on the currently playing song, searching for a song may be made as the item focused in the center is changed to the song indicated in the corresponding direction, as shown in FIG. 12. When a song other than the currently playing song is focused in the center item as the song is searched for, information on the currently playing song may be minimized to a predetermined location, for example, in the form of a separate icon 1220 at the bottom left position. While searching for a favorite song, information on the currently playing song may be displayed through the icon 1220, and when the icon 1220 is selected, it is possible to provide a function of quickly moving the focusing back to the currently playing song, as illustrated in FIG. 11. When the currently played song is focused back on the center position, the icon 1220 may be hidden.

Figure 13:
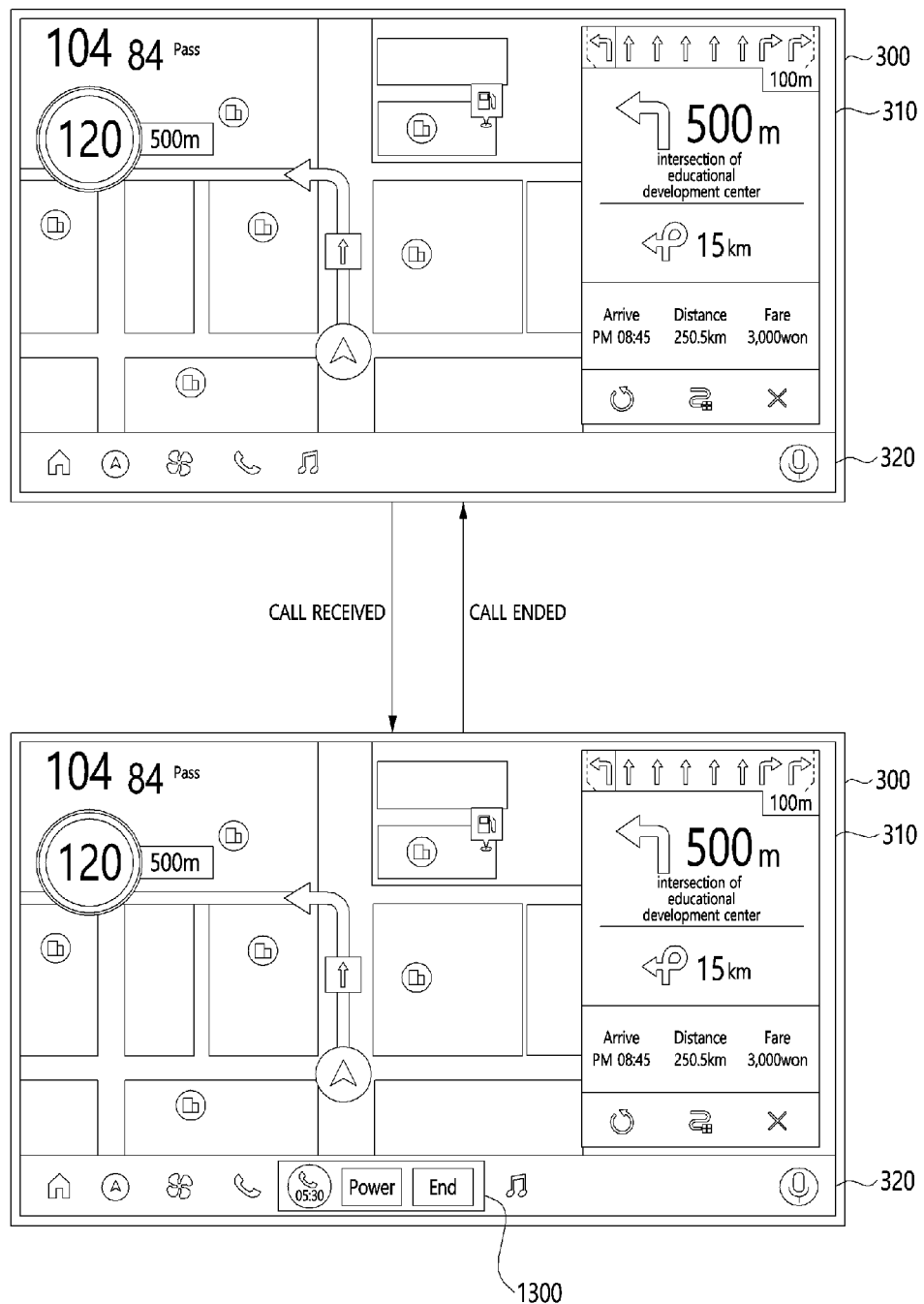

FIG. 13 illustrates a screen 300 for a situation in which a hands-free call function is executed in the background while the route guidance screen of the navigation function is activated in the foreground execution screen 310. When the driver receives an incoming call with the navigation function being executed in the foreground, the hands-free call function is executed in the background as the call is received, and then, a widget 1300 of the hands-free call function may be displayed on the taskbar 320. The widget 1300 of the hands-free call function may include a call reception button, a call end button, a calling time, information on a calling party, etc. and some or all of the information may be displayed on the taskbar 320 in the form of a toast notification. The widget 1300 of the hands-free call function may be kept so long as the call is performed, and then disappear from the task bar 320 at the time of the call being ended.

Figure 14:
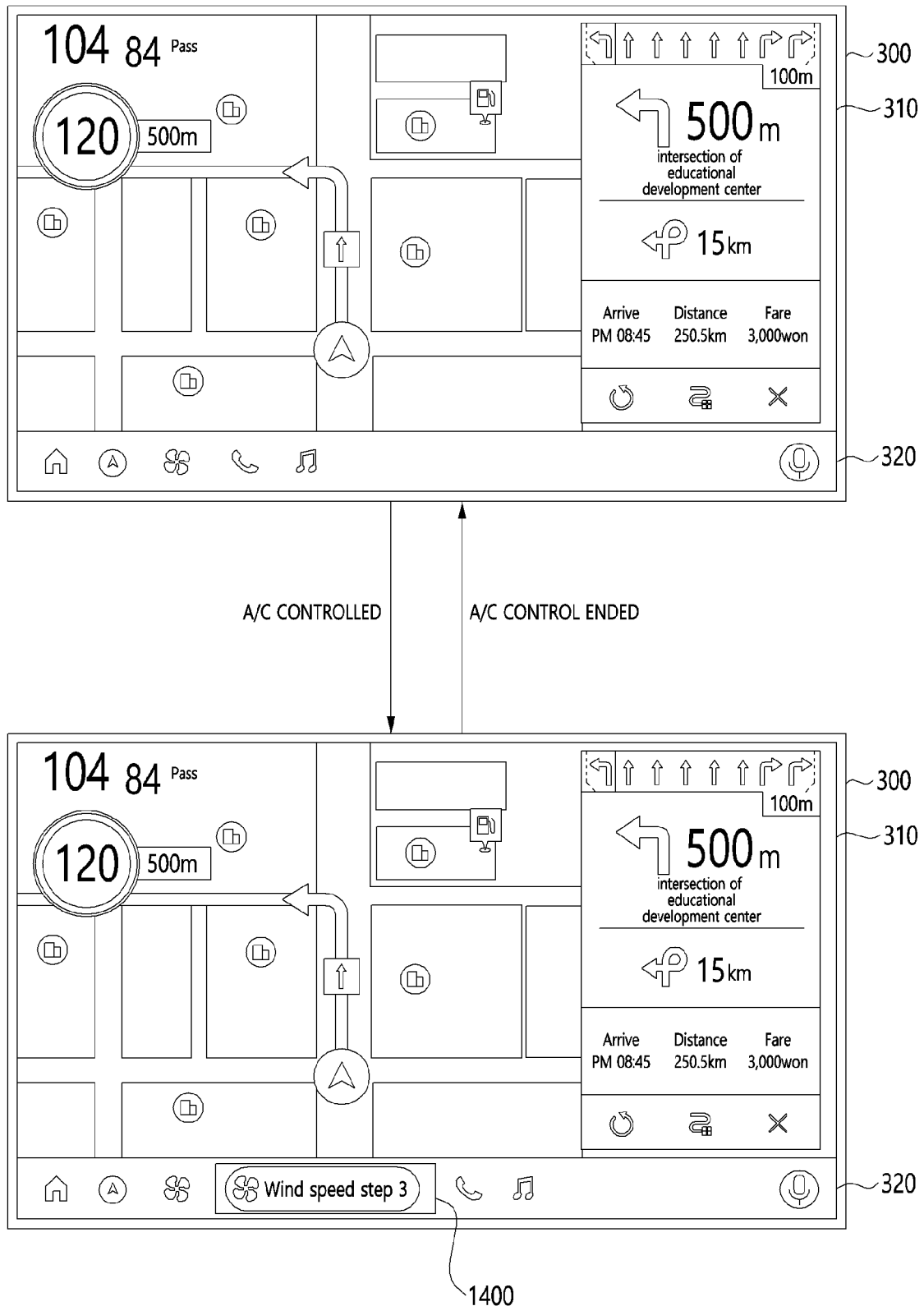

FIG. 14 shows another screen 300 for a situation in which an air conditioning control function is executed in the background while the route guidance screen of the navigation function is activated on the foreground execution screen 310. When the driver controls air conditioning, for example, adjusting ventilation speed with the navigation function being running in the foreground, a widget 1400 for the air conditioning control function may be displayed on the task bar 320 as the air conditioning control function is executed in the background. Alternatively, some or all of the corresponding information may be displayed on the taskbar 320 in the form of a toast notification. The widget 1400 for the air conditioning control function according to the driver's air conditioning manipulation may include details of air conditioning operation. The widget 1400 of the air conditioning control function may be kept for a predetermined time from the time when the driver's manipulation is completed, and then disappear from the task bar 320 when the predetermined time duration elapses.

The infotainment UIs according to various embodiments are based on the following research activities. First, the most frequently used tasks by drivers on driving may be listening to music, which is a media playback function, and it may be followed by an air conditioning control function and a hands-free call function. Secondly, one of the reasons why a driver manipulates such an electronic device (e.g., smartphone, navigation terminal, etc.) on driving may be most likely browsing the music favorites list, which ranks high among the drivers' actions, but an investigation reveals that it might be more dangerous behavior to those drivers than manipulate navigation or send text messages. Thirdly, according to many studies, it is well known that a human brain has a faster reaction speed to perceive images than read texts.

Based on the above rationale, it is possible to display the tasks frequently used by the driver in the form of a widget that provides simplified information and functions by creating a background widget so as not to interfere with driving, and in particular, provide an interface that allows quick recognition and reaction within the infotainment screen for a media search action, which is of an activity to interfere with driving of a vehicle.

The infotainment apparatus according to various embodiments can provide functions frequently used by the driver including the navigation function, as a shortcut icon (quick menu) that can be easily accessed at all times, and implement an interface in the form of the shortcut icon being changed to a background widget as the screen changes over. In the case of the background widget of the media playback function, a playback progress bar 701, song information 702, and a search button 703 may be provided in the form of a widget, and when the search button 703 is selected, the list search screen 810 may be provided on the current screen without changing the screen.

The infotainment apparatus according to various embodiments can adopt a format capable of providing a plurality of notifications at the exact time when an event occurs, while minimizing visual information related to ADAS notifications, thereby ensuring the safety of the driver and taking all the technical accuracy.

When an ADAS event is detected, the processor 110 may output a visual notification (visual information) together with a sound notification (audible information) related to the detected event, wherein the visual notification may include an icon and a text to identify the type of the detected event.

When a plurality of ADAS events are detected within a predetermined time, the processor 110 may output multiple event notifications in duplicate, but the latest notification may display both the icon and the text, while the previous notification may display only the icon.

Figure 15:
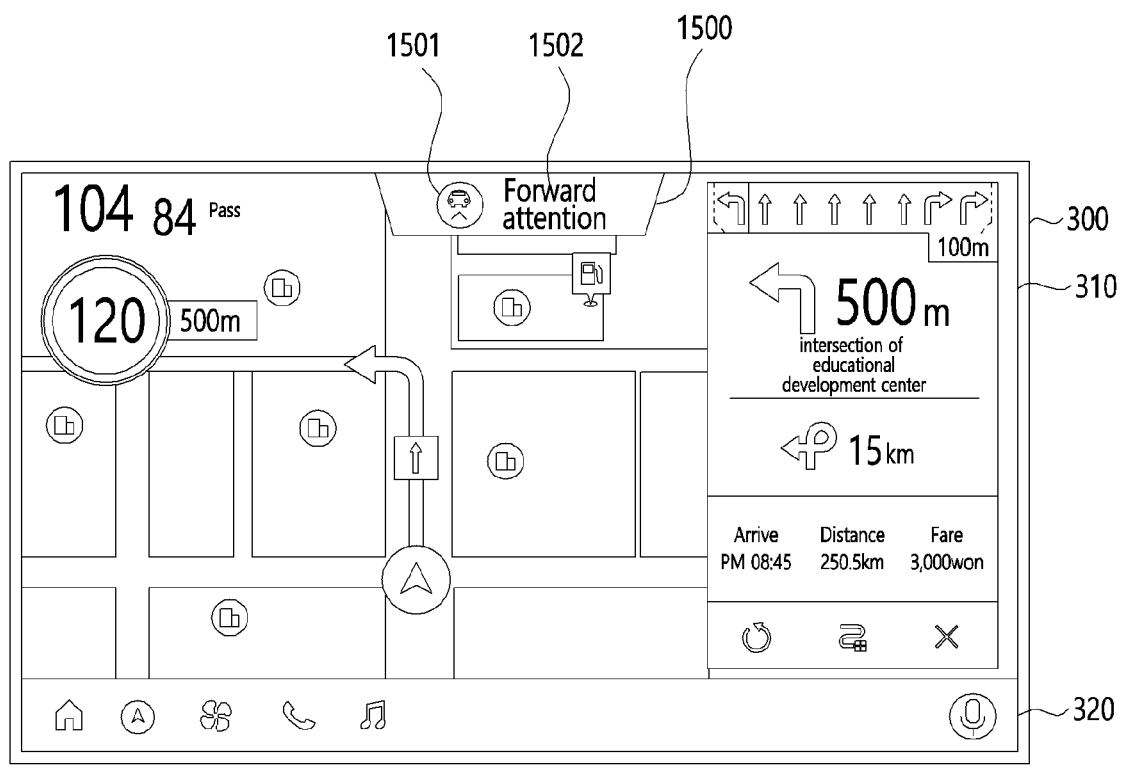

FIG. 15 shows a screen 300 for a route guidance screen of the navigation function displayed on the foreground execution screen 310 when there is no function operating on the background. That is, FIG. 15 illustrates an exemplary screen in case where a forward attention situation is detected as an example of an ADAS event, when one event has occurred.

Referring now to FIG. 15, when a forward attention event is detected as one of the ADAS events, the processor 110 may notify the forward attention event at a predetermined position of the foreground execution screen 310, for example, at the top of the screen. The forward attention event notification 1500 may include an icon 1501 and a text 1502 indicating presence of the forward attention event.

Figure 16:
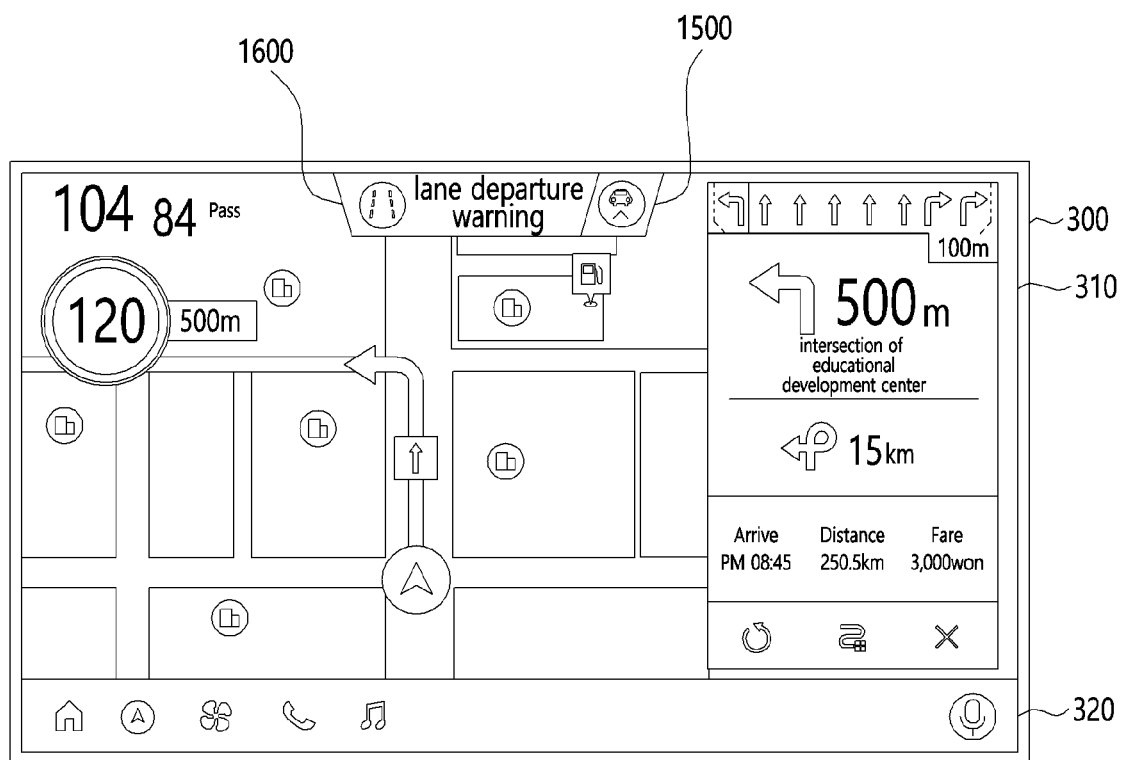

When the processor 110 detects another event, for example, a lane departure event following the forward attention event, it is possible to display the lane departure event notification 1600 together with the previous event, that is, the forward attention event notification 1500, as shown in FIG. 16.

Figure 17:
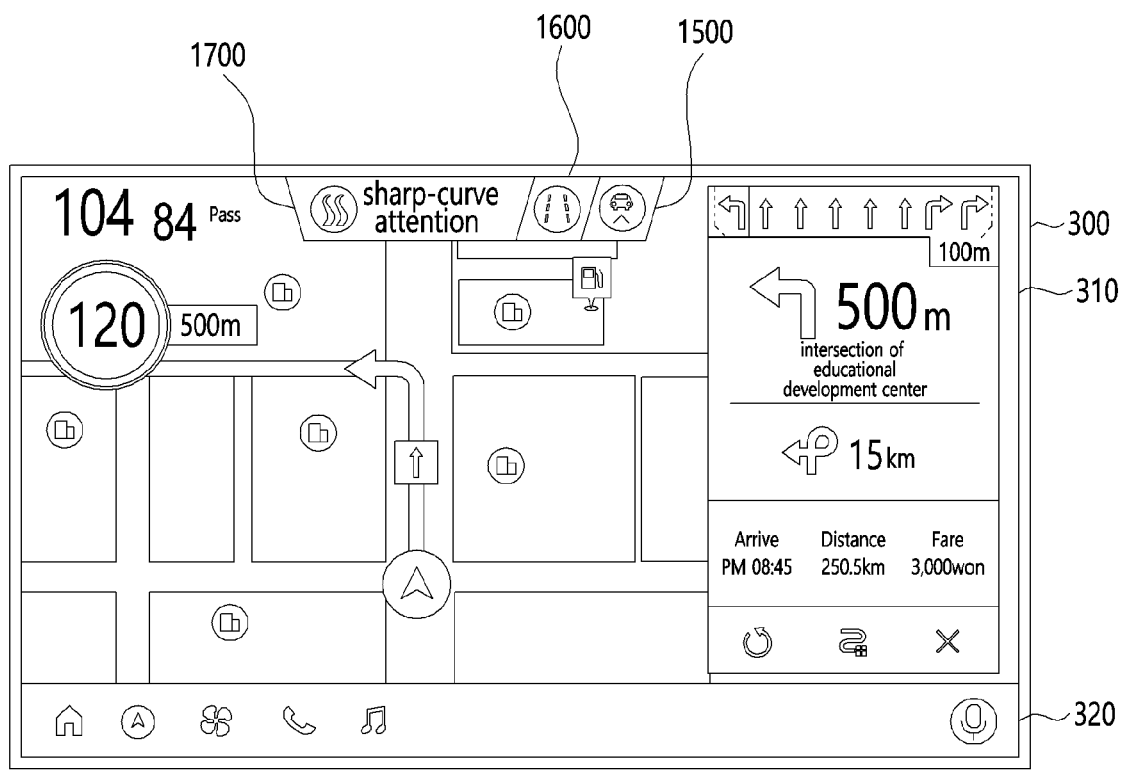

When the processor 110 detects another event following the lane departure event, for example, a sharp curve event, it may display the sharp curve event notification 1700 together with the previous event, that is, the lane departure event notification 1600 and the forward attention event notification 1500, as shown in FIG. 17.

The processor 110 may display the forward attention event notification 1500, the lane departure event notification 1600 and the sharp curve event notification 1700, in an overlapping manner, when the forward attention event, the lane departure event and the sharp curve event are detected in succession within a predetermined period of time. On this occasion, the latest event notification is displayed on the front according to the order in which ADAS events have been detected, and the previously detected event notification is pushed aside in a predetermined direction, for example, to the right side.

The most recent event notification may be displayed on the leftmost and the most front, and may be displayed as highlighted, for example, the darkest or brightest colored icon and text, while the previously detected event notifications may be only displayed in the form of icon being pushed aside to the right side and blurred sequentially. As an example, the most recent event notification, that is, the sharp curve event notification 1700 may be displayed with both an icon and a text indicating the sharp curve event, while its preceding event notifications, that is, the forward attention event notification 1500 and the lane departure event notification 1600 may be only displayed with their respective icons.

Although it is described that the ADAS event notification is displayed in a fixed position, it is not limited thereto, and the display position of the ADAS event notification may be changed as appropriate. For example, the ADAS event notification may be displayed in a position on the screen 300 where it does not overlap with route information or directional information displayed on the route guidance screen, for example, in an opposite area substantially not overlapping the left turn route displayed on the screen 300 during a left-turn route guidance.

The number of ADAS events occurring simultaneously or within a certain time during driving may be limited to not exceeding a maximum of three, but the number may vary depending on the circumstance, as appropriate.

The infotainment apparatus according to various embodiments can provide visual information together with auditory information for an ADAS event, and thus, displaying a minimized icon as visual information enables the driver's gaze to be deprived of attention owing to such a small icon, so that the driver can drive more focusing on the auditory information while keeping the forward attention more. Even if multiple ADAS events occur, all notifications may be displayed on one screen, so that the driver can accurately recognize which event occurred and remember a type of the event just by catching a glimpse of the route guidance screen.

The UI of the infotainment apparatus according to various embodiments may be used as a UI of navigation software regardless of the hardware types in use.

Figure 18:
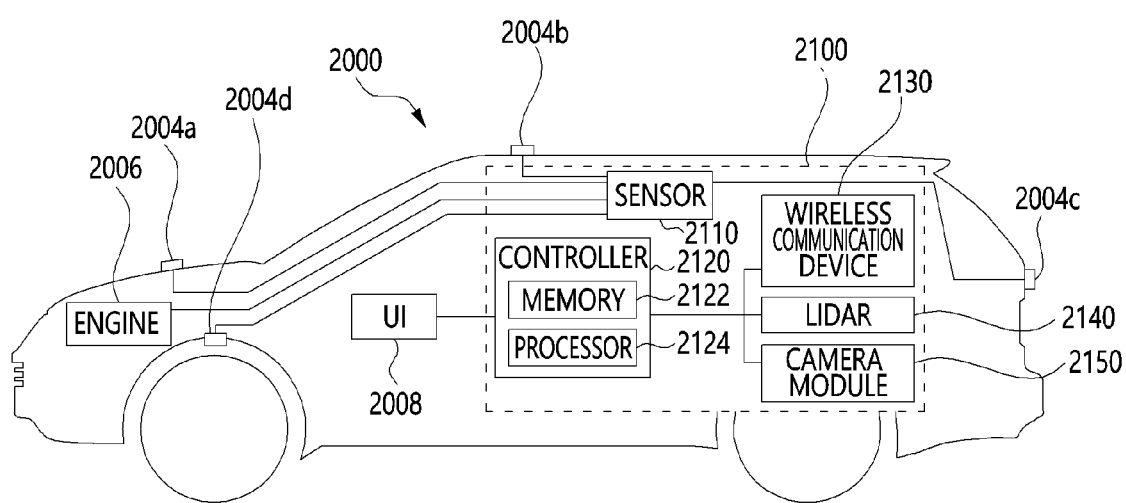
FIG. 18 illustrates an example of a vehicle equipped with a controller according to various embodiments.
Figure 19:
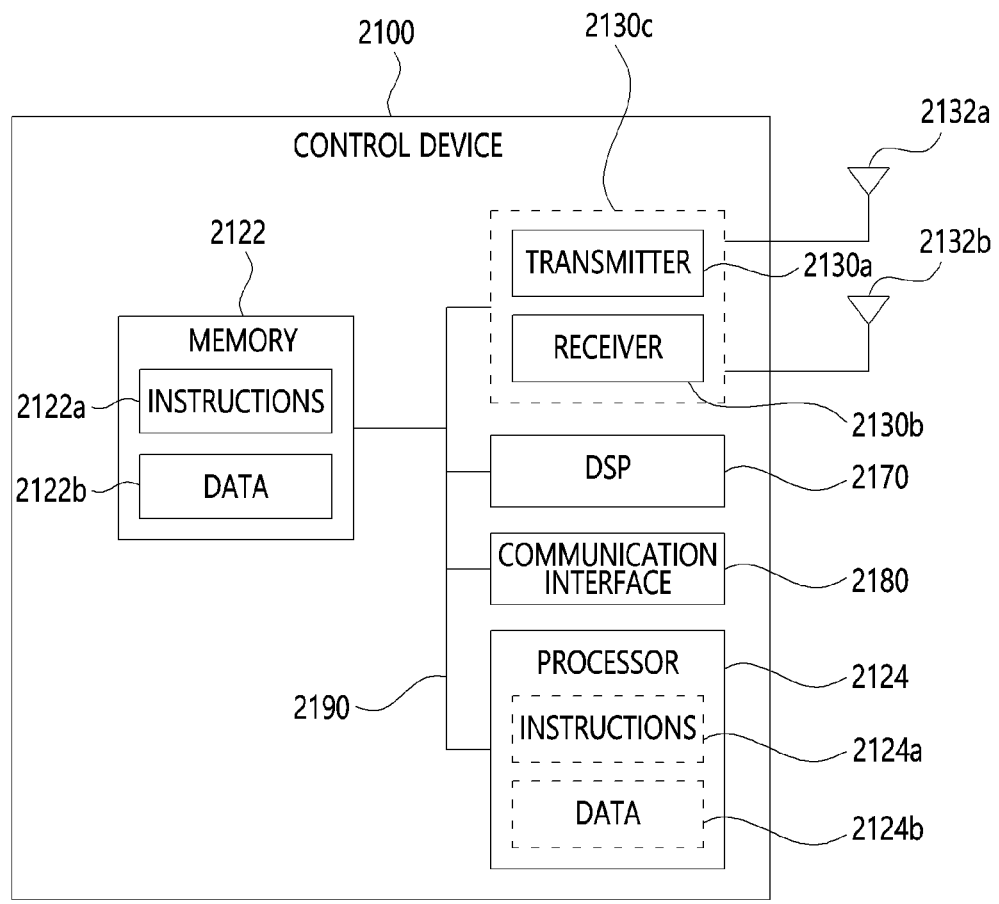
FIG. 19 illustrates a block diagram for a configuration of the controller of FIG. 18.

FIG. 18 illustrates a schematic diagram of a vehicle equipped with a control device according to various embodiments, and FIG. 19 illustrates a block diagram of the control device as shown in FIG. 18.

Referring now to FIGS. 18 and 19, the control device 2100 according to various embodiments, for example, corresponding to the infotainment apparatus 100 of FIG. 1, may be mounted onto a vehicle, wherein the vehicle may be an autonomous vehicle 2000.

In this embodiment, the control device 2100 may include a controller 2120 having a memory 2122 (e.g., corresponding to the memory 120 and/or the permanent storage 130 of FIG. 1), a processor 2124 (e.g., corresponding to the processor of FIG. 1), a sensor 2110, a wireless communication device 2130 (e.g., corresponding to the network interface 160 of FIG. 1), a LIDAR 2140, and a camera module 2150.

In this embodiment, the controller 2120 may be configured at the time of manufacturing by the manufacturer of the vehicle or may be additionally configured to perform a function of autonomous driving after manufacture. Alternatively, a part of the configuration for implementing any additional functions execution may be continuously added to the original one through an upgrade of the controller 2120 originally configured during its manufacturing.

The controller 2120 may transfer a control signal to the sensor 2110, an engine 2006, the user interface 2008, the wireless communication device 2130, the LIDAR 2140, and the camera module 2150 that may be included in other components in the vehicle. Further, although not shown, the control signal may be transmitted to an accelerator, a braking system, a steering device, or a navigation apparatus, all of which are related to driving of the vehicle.

In this embodiment, the controller 2120 may control the engine 2006, for example, in such a manner that the autonomous vehicle 2000 detects a speed limit of the road on which the vehicle is running and prevents its driving speed from exceeding the speed limit or the engine 2006 is controlled to accelerate the driving speed of the autonomous vehicle 2000 within a range that does not exceed the speed limit. Further, as sensing modules 2004a, 2004b, 2004c, and 2004d additionally detect the environment outside the vehicle and transmit it to the sensor 2110, the controller 2120 may receive the detected signal and generate a control signal to control the engine 2006 or the steering device (not shown) for controlling the driving of the vehicle 2000.

The controller 2120 may control the engine 2006 or the braking system to decelerate the driving speed when there is another vehicle or any obstacle in front of the vehicle, and control a trajectory, a driving route, and a steering angle in addition to the driving speed. Further, the controller 2120 may generate a set of control signals necessary for safety driving according to information identified of other external environmental elements such as e.g., a driving lane of the vehicle, a driving signal, etc., to generally control driving of the vehicle.

In addition to generating its own control signal, the controller 2120 may perform communication with an adjacent vehicle or a central server to transmit a command for controlling peripheral devices from the received information, thereby controlling the driving of the vehicle.

Further, it may be difficult for the controller 2120 to accurately recognize the adjacent vehicle or the lane when the position of the camera module 2150 or the angle of view is sometimes changed, and thus, the controller 2120 may generate a control signal to control to perform a calibration of the camera module 2150 for avoiding such an undesirable situation. Accordingly, in this embodiment, the controller 2120 may generate a calibration control signal to the camera module 2150, so that the normal mounted position, direction, and view angle of the camera module 2150 can be consistently maintained even if the mounted position of the camera module 2150 is unexpectedly changed due to e.g., vibrations or shock generated according to the movement of the autonomous vehicle 2000. When information such as e.g., the initial mounted position, direction, and view angle as stored in advance of the camera module 2120 gets different, by at least a certain threshold value, from those of the camera module 2120 as measured while the autonomous vehicle 2000 is driving, the controller 2120 may generate the calibration control signal.

In this embodiment, the controller 2120 may include the memory 2122 and the processor 2124. The processor 2124 is responsible to execute software stored in the memory 2122, according to a set of control signals from the controller 2120. More specifically, the controller 2120 may store data and instructions for performing the infotainment operation methods according to various embodiments in the memory 2122, wherein the instructions may be executed by the processor 2124 to implement one or more operation methods disclosed herein.

Further, the data and instructions in the memory 2122 may be stored in a non-volatile recording medium executable by the processor 2124. The memory 2122 may store software and data via one or more internal and external devices as appropriate. The memory 2122 may include a random access memory (RAM), read-only memory (ROM), a hard disk, a memory 2122 connected to a dongle, or the like.

The memory 2122 may store one or more of an operating system (OS), a user application, and/or executable instructions. The memory 2122 may further store application data and arrangement data structures.

The processor 2124 may be of a microprocessor, or a suitable electronic processor such as a controller, a microcontroller or a state machine.

The processor 2124 may be implemented as a combination of computing devices, and the computing device may be of a digital signal processor, a microprocessor, or a suitable combination thereof.

Furthermore, in the present embodiment, the control device 2100 may be responsible for monitoring internal and external features of the autonomous vehicle 2000 with at least one sensor 2110 and detecting its state.

The sensor 2110 may include at least one sensing module 2004, and the sensing module 2004 may be implemented to be disposed at a specific position of the autonomous vehicle 2000 depending upon the purpose of sensing. More specifically, it may be disposed at a lower end, a rear end, a front end, an upper end, or a side end of the autonomous vehicle 2000 as occasions demand, and further, may be disposed at any internal parts of the vehicle or in its tires.

Therefore, the sensing module 2004 may detect internal information related to driving of the vehicle such as, e.g., engine 2006, tires, steering angle, speed, weight of the vehicle and so on. Further, the at least one sensing module 2004 may include an acceleration sensor 2110, a gyroscope, an image sensor 2110, a RADAR, an ultrasonic sensor, a LiDAR sensor and the like, and may detect motion information of the autonomous vehicle 2000.

The sensing module 2004 may receive as external information specific data on external environment conditions such as e.g., road condition information, surrounding vehicle information, weather and the like, in the place where the autonomous vehicle 2000 is located, and may detect various vehicle parameters according to the specific data. The detected information may be temporarily or in long-term stored in the memory 2122, depending on its purpose of use.

In this embodiment, the sensor 2110 may be adapted to integrate various information from one or more of the sensing modules 2004 for collecting various information generated inside and outside the autonomous vehicle 2000.

The control device 2100 may further include a wireless communication device 2130.

The wireless communication device 2130 may be further configured to implement wireless communication between the autonomous vehicles 2000, so that, for example, the autonomous vehicle 2000 can communicate with the driver's mobile phone, another wireless communication device 2130, another vehicle, a central station (e.g., a traffic control center), a server, and/or the like. The wireless communication device 2130 may be further configured to transmit and receive radio signals according to a predetermined wireless communication protocol. The wireless communication protocol may include Wi-Fi, Bluetooth, Long-Term Evolution (LTE), Code Division Multiple Access (CDMA), Wideband Code Division Multiple Access (W-CDMA), Global Systems for Mobile Communications (GSM), and the communication protocol is not limited thereto.

Further, in this embodiment, the autonomous vehicle 2000 may be configured to implement vehicle-to-vehicle communication through the wireless communication device 2130. That is, the wireless communication device 2130 may communicate with another vehicle and other vehicles on the road through vehicle-to-vehicle (V2V) communication. The autonomous vehicle 2000 may transmit and receive information such as e.g., a warning on driving, traffic information and the like through V2V communication, and may request information from other vehicles or receive such a request from other vehicle. For example, the wireless communication device 2130 may perform the V2V communication via a dedicated short-range communication (DSRC) device or a Celluar-V2V (C-V2V) device. Further, communication (Vehicle to Everything communication: V2X) between the vehicle and other object (e.g., a certain electronic device carried by pedestrians) in addition to communication between those vehicles may be implemented through the wireless communication device 2130.

Further, the control device 2100 may include a LIDAR device 2140. The LIDAR device 2140 may use data detected through the LIDAR sensor to detect objects around the autonomous vehicle 2000 during its operation. The LIDAR device 2140 may transmit the detected information to the controller 2120, so that the controller 2120 can control the autonomous vehicle 2000 according to the detected information. For example, the controller 2120 may command the engine 2006 of the vehicle to decrease the speed, when there is found a vehicle traveling at a lower speed ahead of the autonomous vehicle 2000 from the detected information. Further, the vehicle may be commanded to reduce its entering speed to a curved road, depending on the curvature of the curved road.

The control device 2100 may further include a camera module 2150 and the controller 2120 may extract object information from an external image captured by the camera module 2150 to cause the controller 2120 to process the information.

Further, the control device 2100 may further include imaging devices to recognize the external environment. In addition to the LIDAR 2140, a RADAR, a GPS device, an odometer, and any other computer-vision devices may be further used, and one or more of those devices may be selected or operated either alone or in combination as necessary to enable higher precision of detection.

The autonomous vehicle 2000 may further include a user interface 2008 for inputting of a user to the control device 2100. The user interface 2008 may allow the user to input information by means of any appropriate interaction. For example, it may be implemented as a touch screen, a keypad, menu operation buttons or the like. The user interface 2008 may transmit the input or instructions to the controller 2120, and the controller 2120 may perform a certain vehicle control operation in response to the input or instructions.

Further, the user interface 2008 may be adapted to communicate with the autonomous vehicle 2000 via the wireless communication device 2130 with a device disposed outside the vehicle 2000. For example, the user interface 2008 may be operable in association with a mobile phone of the driver, a tablet computer, or other computer device.

Moreover, although in this embodiment the autonomous vehicle 2000 has been described as including the engine 2006, it would be also possible for the vehicle to have any other types of propulsion systems. For example, the vehicle may be driven by electric energy, hydrogen energy, or a hybrid system in combination of these energy sources. Accordingly, the controller 2120 may further include a propulsion mechanism for a specific propulsion system of the autonomous vehicle 2000, and provide components of the propulsion mechanism with control signals therefor.

Hereinafter, referring then to FIG. 18, a specific configuration of the control device 2100 for performing the infotainment operation method according to various embodiments will be described in more detail.

The control device 2100 may include a processor 2124. The processor 2124 may be of a general-purpose single-chip or multi-chip microprocessor, a dedicated microprocessor, a microcontroller, a programmable gate array, or the like. The processor may also be referred to as a central processing unit (CPU). Further, in this embodiment, the processor 2124 may be formed of multiple processors.

The control device 2100 may further include a memory 2122. The memory 2122 may be of any type of electronic component capable of storing electronic information. The memory 2122 may include a combination of a plurality memories 2122, in addition to a single memory.

Data 2122b and instructions 2122a for use in performing the infotainment operation method according to various embodiments may be stored in the memory 2122. When the processor 2124 executes the instructions 2122a, all or part of the instructions 2122a and the data 2122b required for execution of the instruction may be loaded 2124a and 2124b into the processor 2124.

The control device 2100 may further include a transmitter 2130a, a receiver 2130b, or a transceiver 2130c for allowing transmission and reception of signals. One or more antennas 2132a and 2132b may be electrically connected to the transmitter 2130a, the receiver 2130b or the transceiver 2130c, respectively, and may further include one or more antennas.

The control device 2100 may further include a digital signal processor (DSP) 2170, through which a digital signal can be quickly processed as required in the vehicle.

The control device 2100 may further include a communication interface 2180, and the communication interface 2180 may include one or more ports and/or communication modules for connecting other devices to the control device 2100. The communication interface 2180 may serve to enable a user and the control device 2100 to interact with each other.

Various components in the control device 2100 may be connected together by at least one bus 2190, and the bus 2190 may further include a power bus, a control signal bus, a status signal bus, a data bus, and the like. Under control of the processor 2124, those components may mutually transmit necessary information to each other through the bus 2190 to perform a desired function.

Figure 20A:
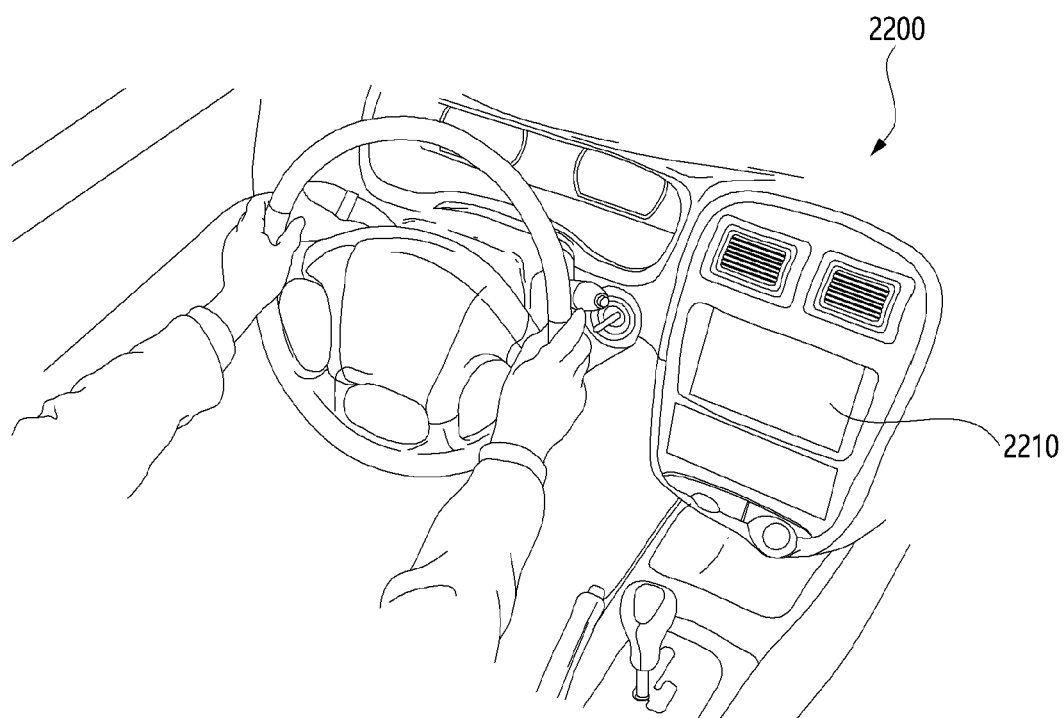
FIG. 20a illustrates an example of a certain environment equipped with an electronic device according to various embodiments.

FIG. 20a illustrates an example of an environment incorporating an electronic device according to various embodiments, in which environment the autonomous vehicle may include at least one of the vehicle infotainment apparatus 100 or the control device 2100, as illustrated through FIGS. 1 to 19.

Referring now to FIG. 20a, the environment 2200 may include an electronic device 2210 (e.g., the infotainment apparatus 100 or the control device 2100). In various embodiments, the electronic device 2210 may be disposed in the environment 2200 to provide various information to a user within the environment 2200. In various embodiments, the electronic device 2210 may be a device capable of being temporarily installed in a vehicle but having some degree of mobility. For example, the electronic device 2210 may be any one of a smartphone, a tablet computer, a personal computer, and/or a laptop computer that can be connected by wire or wirelessly through a connector embedded in the vehicle, or a computer program product having a universal serial bus (USB) port. In various embodiments, the electronic device 2210 may be a fixed device embedded in the vehicle.

In various embodiments, the electronic device 2210 may be of a device capable of providing an in-vehicle infotainment (IVI) service. In various embodiments, the electronic device 2210 may be referred to as an IVI device or an IVI system throughout the present document in terms of providing such an IVI service. In various embodiments, the electronic device 2210 may be referred to as a head unit or a main unit throughout this document in terms of being embedded in the vehicle (e.g., environment 2200). In various embodiments, the electronic device 2210 may be configured to control a plurality of components in the environment 2200.

In various embodiments, the electronic device 2210 may control an element related to controlling a wind speed of an air conditioner (or heater) in the environment 2200 or an element related to setting a wind direction of the air conditioner (or heater) in the environment 2200. For example, the electronic device 2210 may change the wind speed or wind direction through the elements based on input data received by the electronic device 2210.

In various embodiments, the electronic device 2210 may control at least one display within the environment 2200. For example, the electronic device 2210 may control a display screen (or a user interface) for a navigation service through the at least one display. For another example, the electronic device 2210 may display the user interface for playing contents such as e.g., music, video or the like on the at least one display.

In various embodiments, the electronic device 2210 may control a device related to a communication function in the environment 2200. For example, the electronic device 2210 may send an emergency call or an outgoing call through the device, or receive an incoming call through the device.

In various embodiments, the electronic device 2210 may control an audio device related to an audio function within the environment 2200. For example, the electronic device 2210 may control to provide music from a loudspeaker.

In various embodiments, the electronic device 2210 may control one or more sensor devices embedded in the environment 2200. For example, the electronic device 2210 may control to activate a front camera or a rear camera according to a driving situation of the vehicle. For another example, the electronic device 2210 may control the operation of a plurality of sensors for an advanced driver assistance system (ADAS).

Figure 20B:
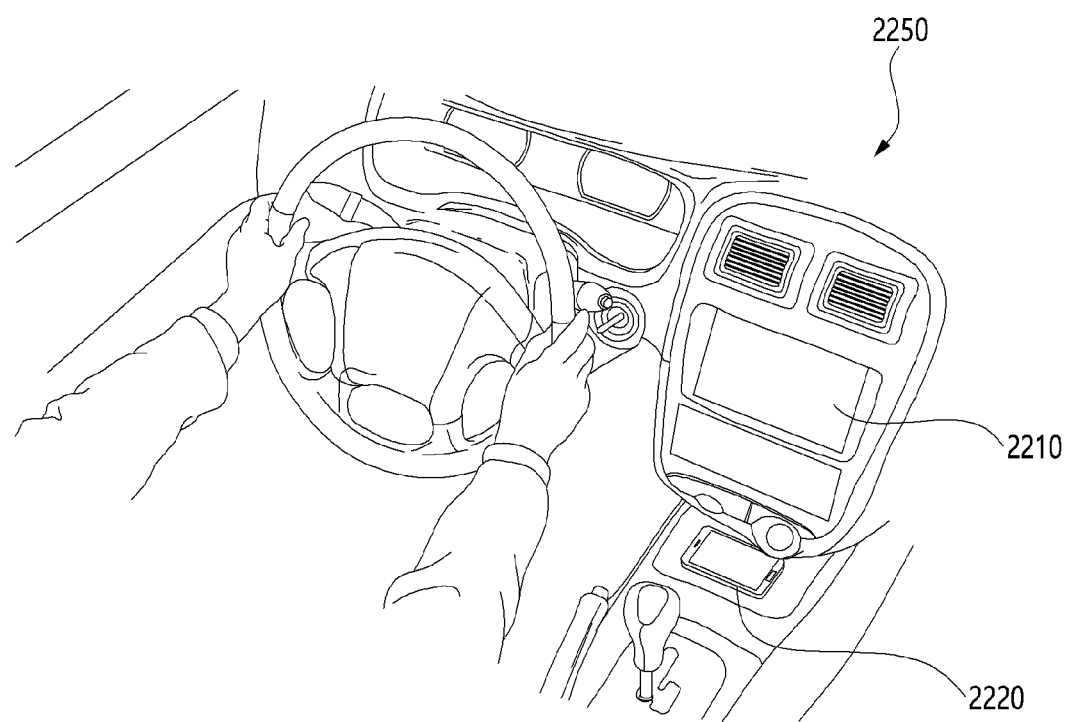
FIG. 20b illustrates another example of the environment including an electronic device according to various embodiments.

FIG. 20b illustrates another example of the environment incorporating an electronic device according to various embodiments. This environment may include at least one of the infotainment apparatus 100 or the control device 2100 as illustrated through FIGS. 1 to 19.

Referring now to FIG. 20b, the environment 2250 may include an electronic device 2210 and another electronic device 2220. In various embodiments, the electronic device 2210 may correspond to the electronic device 2210 defined through the description of FIG. 20a. In various embodiments, the electronic device 2220 may be a device connected to the electronic device 2210 as above described. In various embodiments, the electronic device 2220 may be of a mobile device, including at least one of a smartphone, a tablet computer, a personal computer (PC), a laptop computer, and a computer program product with a universal serial bus (USB) port.

In various embodiments, the electronic device 2210 may display a screen on at least one display of the electronic device 2210 based on data received from the electronic device 2220.

In some embodiments, the data transmitted from the electronic device 2220 to the electronic device 2210 may be display data generated by the electronic device 2220. In an embodiment, the display data may be data for displaying a screen corresponding to a screen displayed on the display of the electronic device 2220 on the at least one display of the electronic device 2210. For example, the display data may be data for supporting mirroring from the electronic device 2220 to the electronic device 2210. In another embodiment, the display data may be data for displaying a screen distinct from a screen displayed on the display of the electronic device 2220 on the at least one display of the electronic device 2210. In other words, the display data may be data for supporting casting from the electronic device 2220 to the electronic device 2210, although it is not limited thereto.

In an embodiment, the electronic device 2220 may obtain information on the at least one display of the electronic device 2210, such as e.g., aspect ratio, screen size, etc. of the display, and generate the display data based on the obtained information to transmit the generated display data to the electronic device 2210. The electronic device 2210 may receive the display data from the electronic device 2220, and based on the received display data, display a screen on the at least one display, without making conversion to suit with the aspect ratio of the at least one display or the screen size of the at least one display, but it is not limited thereto.

In another embodiment, the electronic device 2220 may generate the display data without information about the at least one display of the electronic device 2210 and transmit the display data to the electronic device 2210. The electronic device 2210 may convert the received display data based on information about the at least one display of the electronic device 2210, and display a screen on the at least one display based on the converted display data, but it is not limited thereto.

In some other embodiments, the data transmitted from the electronic device 2220 to the electronic device 2210 may be data for execution of a virtual machine operating in the electronic device 2210. For example, the data may include a status of the memory of the electronic device 2220 related to the virtual machine, a status of the processor of the electronic device 2220 related to the virtual machine, a status of the input device of the electronic device 2220 related to the virtual machine, and a status of the display of the electronic device 2220 related to the virtual machine, or a combination thereof. In other words, the data may be migrated from the electronic device 2220 to the electronic device 2210. The electronic device 2210 may receive the migrated data and then execute the virtual machine based on the migrated data to display a screen on the at least one display of the electronic device 2210, although it is not limited thereto.

As described in FIGS. 20a and 20b, the electronic device 2210 may independently provide an intended service within the vehicle (e.g., the environment 2200) in no association with any other external electronic device(s), and provide such a service within the vehicle (e.g., the environment 2250) based on association with such an external electronic device (e.g., the electronic device 2220). Accordingly, it should be noted, in this document, that execution of an application (or a program) by the electronic device 2210 or the processor of the electronic device 2210 (for example, the processor 2230 of FIG. 21) may imply the electronic device 2210 directly executing the application installed in the electronic device 2210, as well as the electronic device 2210 accessing to the external electronic device to execute the application installed in the external electronic device, and the electronic device 2210 receiving information on the application installed in and executed by the external electronic device.

Figure 21:
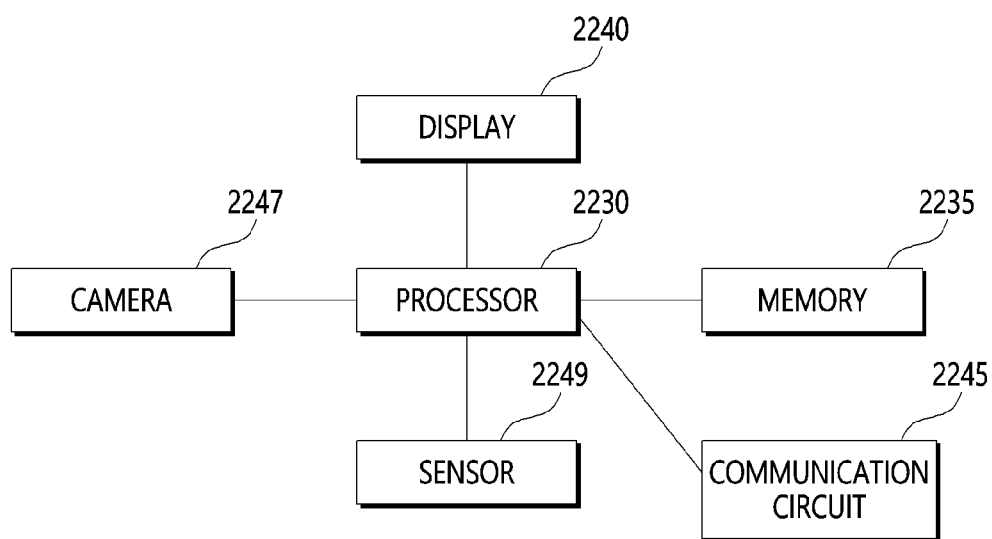
FIG. 21 illustrates a simplified block diagram of an electronic device according to various embodiments.

FIG. 21 illustrates a schematic block diagram of an electronic device according to various embodiments. This schematic block diagram may indicate a functional configuration of the electronic device 2210 under the environment 2200 of FIG. 20a or the electronic device 2210 in the environment 2250 of FIG. 20b.

Referring now to FIG. 21, the electronic device 2210 may include a processor 2230, a memory 2235, a display 2240, a communication circuit 2245, a camera 2247, and/or a sensor 2249.

The processor 2230 may be configured to control an overall operation of the electronic device 2210 and may execute a variety of applications to provide an advertisement service, an Internet service, a game service, a multimedia service, and a navigation service. In various embodiments, the processor 2230 may include a single processor core or multiple processor cores. For example, the processor 2230 may include a multi-core such as e.g., a dual-core, a quad-core, a hexa-core and the like. According to various embodiments, the processor 2230 may further include a cache memory disposed inside or outside of it.

The processor 2230 may receive instructions from other components of the electronic device 2210, analyze the received instructions, and perform arithmetic operations or process data according to the analyzed instructions.

The processor 2230 may process data or signals generated or output by an application. For example, the processor 2230 may request instructions, data, or signals from the memory 2235 to execute or control the application. The processor 2230 may write (or store) or update the instructions, data, or signals to the memory 2235 to execute or control the application.

The processor 2230 may analyze messages, data, instructions or signals received from the memory 2235, the display 2240, the communication circuit 2245, the camera 2247, and/or the sensor 2249, to process them. Further, the processor 2230 may generate new messages, data, instructions, or signals based on the received messages, data, instructions or signals. The processor 2230 may provide the processed or generated messages, data, instructions or signals to the memory 2235, the display 2240, the communication circuit 2245, the camera 2247 or the sensor 2249.

All or part of the processor 2230 may be electrically or operably coupled with or connected to any other component(s) within the electronic device 2210, such as e.g., the memory 2235, the display 2240, the communication circuit 2245, the camera 2247, the sensor 2249 and/or the like.

According to various embodiments, the processor 2230 may configured with one or more processors. For example, the processor 2230 may include an application processor (AP) for controlling a higher layer of program such as e.g., an application program, a graphics processing unit (GPU) for configuring a screen displayed on the display 2240 and controlling the screen, an image signal processor for controlling the camera 2247, a sensor hub for controlling the sensor 2249, a communication processor (CP) to perform communication control, and so on.

The memory 2235 may store instructions for controlling the electronic device 2210, control instruction codes, control data, or user data. For example, the memory 2235 may include at least one application, an operating system (OS), a middleware, and/or a device driver.

The memory 2235 may include one or more of a volatile memory or a non-volatile memory. The volatile memory may include a dynamic random access memory (DRAM), a static RAM (SRAM), a synchronous DRAM (SDRAM), phase-change RAM (PRAM), magnetic RAM (MRAM), resistive RAM (RRAM), ferroelectric RAM (FeRAM), and so on. The nonvolatile memory may include a read-only memory (ROM), a programmable ROM (PROM), an electrically programmable ROM (EPROM), an electrically erasable programmable ROM (EEPROM), a flash memory, or the like.

The memory 2235 may include a non-volatile medium such as e.g., a hard disk drive (HDD), a solid-state disk (SSD), an embedded multimedia card (eMMC), a universal flash storage (UFS), and so on.

The display 2240 may output contents, data, or signals. In various embodiments, the display 2240 may display a set of image signals processed by the processor 2230. For example, the display 2240 may display a captured or still image. For another example, the display 2240 may display a moving picture or a camera preview image. As another example, the display 2240 may display a graphical user interface (GUI) so that a user may interact with the electronic device 2210.

The display 2240 may be configured with a liquid crystal display (LCD) or an organic light emitting diode (OLED) as circumstances demand.

According to various embodiments, the display 2240 may be configured with an integral touch screen, being coupled with a sensor capable of receiving a touch input or the like.

The communication circuit 2245 may be used to establish a communication path between the electronic device 2210 and another electronic device such as, for example, an external electronic device (e.g., an electronic device 2220) or any electronic device embedded in a vehicle. The communication circuit 2245 may support specific protocols capable of connecting to the other electronic device by wire or wirelessly. For example, the communication circuit 2245 may include a module (or circuit) for at least one of Bluetooth communication technique, Bluetooth low energy (BLE) communication technique, wireless fidelity (Wi-Fi) communication technique, cellular (or mobile) communication technique, or wired communication technique. For another example, the communication circuit 2245 may include HDMI, USB interface, SD card interface, or audio interface operating in association with a connecting terminal such as a high definition multimedia interface (HDMI) connector, a universal serial bus (USB) connector, an SD card connector, or an audio connector (e.g., a headphone connector).

The communication circuit 2245 may transfer information or data received through the communication path from the other electronic device, to the processor 2230. The communication circuit 2245 may transmit the information or data received from the processor 2230 to the other electronic device via the communication path.

The camera 2247 may capture a still image or a moving image. In various embodiments, the camera 2247 may include at least one or more lenses (e.g., a lens assembly), an image sensor, a flash, an image stabilizer, or a buffer memory. For example, the one or more lenses may collect light emitted from a subject for capturing an image.

According to various embodiments, the camera 2247 may include a plurality of lens assemblies. For example, the plurality of lens assemblies may have the same lens properties (e.g., angle of view, focal length, autofocus, f-number, or optical zoom). For example, at least one of the plurality of lens assemblies may have a lens property that is distinct from another at least one of the plurality of lens assemblies. For example, at least one of the plurality of lens assemblies may be configured for a wide-angle lens, while the other at least one of the plurality of lens assemblies may be configured for a telephoto lens.

In various embodiments, the flash may emit a light source used to enhance light emitted from a subject. For example, the flash may include one or more light emitting diodes (e.g., a red-green-blue (RGB) LED, a white LED, an infrared (IR) LED or an ultraviolet (UV) LED), or a xenon lamp.

In various embodiments, the image sensor may convert light transmitted from the subject through the one or more lenses into an electrical signal, so as to obtain an image corresponding to the subject (e.g., image related to the vehicle including the electronic device 2210). In one embodiment, the image sensor may include an image sensor selected from image sensors with different attributes, such as e.g., an RGB sensor, a black and white (BW) sensor, an IR sensor, or a UV sensor; a plurality of image sensors with the same attribute; or a plurality of image sensors having different properties. Each image sensor included in the image sensors may be implemented with, e.g., a charge coupled device (CCD) sensor or a complementary metal oxide semiconductor (CMOS) sensor.

In various embodiments, the image stabilizer may move or control the one or more lens or the image sensor in a specific direction (for example, its read-out timing can be adjusted), in order to at least partially compensate for any negative effect (e.g., image shaking) caused by the movement on the captured image, in response to the movement of the camera 2247 or the electronic device 2210. In one embodiment, the image stabilizer may be implemented with an optical image stabilizer, wherein a gyro sensor (e.g., sensor 2249) or an acceleration sensor (e.g., sensor 2249) disposed inside or outside of the electronic device 2210 or the camera 2247 can be used to detect its movement.

In various embodiments, the buffer memory may at least temporarily store at least part of the image acquired through the image sensor, for a subsequent image processing operation. For example, when a delay in acquisition of an image due to a shutter or a high-speed acquisition of a multiplicity of images is executed, the acquired original image (e.g., image of high resolution) may be stored in the buffer memory and a duplicate image (e.g., image of low resolution) corresponding to the original image may be previewed on the display 2240. When a specified condition is satisfied (e.g., for a user input or a system command) following the preview, at least part of the original image stored in the buffer memory may be acquired and processed by the image signal processor. In an embodiment, the buffer memory may be configured with at least a part of the memory 2235 or a separate memory that is independently operated from the memory 2235.

The sensor 2249 may generate an electrical signal or data value corresponding to an operating condition (e.g., power or temperature) of the inside of the electronic device 2210, or an external environmental condition of the electronic device 2210 (e.g., under the environment 2200 or the environment 2250). For example, the sensor 2249 may include a gesture sensor, a gyro sensor, an atmospheric pressure sensor, a magnetic sensor, an acceleration sensor, a grip sensor, a proximity sensor, a color sensor, an IR (infrared) sensor, a biometric sensor, a temperature sensor, a humidity sensor, or an illuminance sensor.

In various embodiments, at least one of the communication circuit 2245, the camera 2247 or the sensor 2249 may be disposed outside the electronic device 2210. For example, at least one of the communication circuit 2245, the camera 2247 or the sensor 2249 may be a component disposed within the environment 2210 rather than a component in the electronic device 2210, but it is not limited thereto.

In various embodiments, the processor 2230, while executing a first application and a second application, may display an execution screen of the first application within a first partial area and display a widget of the second application including a first executable element and a second executable element, and a first executable object to indicate the first application, within a second partial area, the first partial area and the second partial area adjacent to the first partial area forming a display area of the display; based on receiving a first user input for the first executable element of the widget of the second application, while displaying the execution screen of the first application within the first partial area and displaying the widget of the second application and the first executable object within the second partial area, display an execution screen of the second application switched from the execution screen of the first application within the first partial area and display within the second partial area a widget of the first application switched from the first executable object and the second executable element to indicate the second application, being switched from the widget of the second application; and based on receiving a second user input for the second executable element of the widget of the second application, while displaying the execution screen of the first application within the first partial area and displaying the widget of the second application and the first executable object within the second partial area, display at least one visual item available through the second executable element within an area extending from the widget of the second application, in an overlapping manner, on the execution screen of the first application displayed within the first partial area.

In various embodiments, the processor 2230 may be configured to display the execution screen of the first application within the first partial area and display the widget of the second application and the first executable object within the second partial area, with no user input being received, while executing the first application and the second application.

In various embodiments, the first user input may be a single tap input for the first executable element, and the second user input may be a single tap input for the second executable element, the processor 2230:

based on receiving a third user input dragging the widget of the second application in a first direction, while displaying the execution screen of the first application within the first partial area and displaying the widget of the second application and the first executable object within the second partial area, may display an extended widget of the second application switched from the widget of the second application within the second partial area; and based on receiving a fourth user input dragging the widget of the first application in the first direction, while displaying the execution screen of the second application within the first partial area and displaying the widget of the first application and the second executable object within the second partial area, may display an extended widget of the first application switched from the widget of the first application within the second partial area;

wherein the display position of the first executable object may be moved in the first direction according to switching from the widget of the second application to the extended widget of the second application, when the widget of the second application is switched to the extended widget of the second application through the third user input, while the direction from the widget of the second application to the first executable object is the first direction, and the display position of the first executable object may be maintained independently of switching from the widget of the second application to the extended widget of the second application, when the widget of the second application is switched to the extended widget of the second application through the third user input, while the direction from the widget of the second application to the first executable object is a second direction opposite to the first direction;

wherein the display position of the second executable object may be moved in the first direction according to switching from the widget of the first application to the extended widget of the first application, when the widget of the first application is switched to the extended widget of the first application through the fourth user input, while the direction from the widget of the first application to the second executable object is the first direction, and the display position of the second executable object may be maintained independently of switching from the widget of the first application to the extended widget of the first application, when the widget of the first application is switched to the extended widget of the first application through the fourth user input, while the direction from the widget of the first application to the second executable object is the second direction.

In some embodiments, the processor 2230 may be configured to:

display a reduced widget of the second application switched from the widget of the second application within the second partial area, based on receiving a fifth user input dragging the widget of the second application in the first direction, while displaying the execution screen of the first application within the first partial area and displaying the widget of the second application and the first executable object within the second partial area; and display a reduced widget of the first application switched from the widget of the first application within the second partial area, based on receiving a sixth user input dragging the widget of the first application in the second direction, while displaying the execution screen of the second application within the first partial area and displaying the widget of the first application and the second executable object within the second partial area;

wherein the display position of the first executable object may be moved in the second direction according to switching from the widget of the second application to the reduced widget of the second application, when the widget of the second application is switched to the reduced widget of the second application through the fifth user input, in a state that the direction from the widget of the second application to the first executable object is the first direction, and the display position of the first executable object may be maintained independently of switching from the widget of the second application to the reduced widget of the second application, when the widget of the second application is switched to the reduced widget of the second application through the fifth user input, in a state that the direction from the widget of the second application to the first executable object is the second direction;

wherein the display position of the second executable object may be moved in the second direction according to switching from the widget of the first application to the reduced widget of the first application, when the widget of the first application is switched to the reduced widget of the first application through the sixth user input, in a state that the direction from the widget of the first application to the second executable object is the first direction, and the display position of the second executable object may be maintained independently of switching from the widget of the first application to the reduced widget of the first application, when the widget of the first application is switched to the reduced widget of the first application through the sixth user input, in a state that the direction from the widget of the first application to the second executable object is the second direction.

In various embodiments, the widget of the second application and the first executable object may be displayed in the second partial area together with a third executable object to indicate a third application, and the processor 2230 may be configured to maintain displaying of the execution screen of the first application within the first partial area, execute the third application, and display a widget of the third application switched from the third executable object together with the widget of the second application and the first executable object within the second partial area, based on receiving a third user input dragging the third executable object in the first direction, while displaying the execution screen of the first application within the first partial area and displaying the widget of the second application and the first executable object together with the third executable object within the second partial area.

In various embodiments, the processor 2230 may be configured to display a third executable object to indicate a function distinct from the functions available through the first application and the second application within the second partial area together with the widget of the second application and the first executable object, based on receiving a third user input for another area within the second partial area distinct from the display area of the widget of the second application and the display area of the first executable object, and execute the function indicated by the third executable object, based on receiving a fourth user input for the third executable object.

In some embodiments, the processor 2230 may be configured to switch the execution screen of the first application displayed within the first partial area to the execution screen of the function, in response to execution of the function indicated by the third executable object.

In some embodiments, the processor 2230 may be configured to switch the third executable object displayed within the second partial area to a widget for indicating the execution state of the function, in response to execution of the function indicated by the third executable object.

In some embodiments, the function may be a function that has been most recently provided through the electronic device, among a plurality of functions that are available with the electronic device and distinguished from the functions available through the first application and the second application.

In some other embodiments, the function may be a function that has been most frequently provided through the electronic device, among a plurality of functions that are available with the electronic device and distinguished from the functions available through the first application and the second application.

In some embodiments, the processor 2230 may be configured to switch the third executable object to a fourth executable object to indicate another function distinct from the functions available through the first application and the second application, based on receiving a fifth user input for the third executable object, and execute the other function indicated by the fourth executable object, based on receiving a sixth user input for the fourth executable object, wherein the fourth user input may be a single tap input to the third executable object, and the fifth user input may be an input to drag the third executable object in a designated direction.

In some embodiments, the processor 2230 may be configured to execute the function of the first application indicated by a fifth user input, based on receiving the fifth user input for the other area within the second partial area distinguished from the display area of the widget of the second application and the display area of the first executable object, and change the state of the execution screen of the first application displayed within the first partial area, based on the execution of the function of the first application, wherein the attribute of the fifth user input may be distinguished from the attribute of the third user input.

In some embodiments, the processor 2230 may be configured to execute the function of the second application indicated by a fifth user input, based on receiving the fifth user input for the other area within the second partial area distinct from the display area of the widget of the second application and the display area of the first executable object, and change the state of the widget of the second application displayed within the second partial area, based on the execution of the function of the second application.

In some embodiments, the processor 2230 may be configured to display a handwriting input field in an overlapping manner on the execution screen of the first application displayed in the first partial area, based on receiving a fifth user input for the other area within the second partial area distinguished from the display area of the widget of the second application and the display area of the first executable object, and recognize a character indicated by a path of at least one drag input, based on receiving the at least one drag input initiated from the handwriting input field, wherein the attribute of the fifth user input may be distinct from the attribute of the third user input.

In an embodiment, the handwriting input field may be extended from at least a part of the other area within the second partial area, and a part of the execution screen of the first application disposed underneath the handwriting input field may be translucent for its visibility.

In one embodiment, the processor 2230 may be configured to display, based on the fifth user input, a plurality of executable objects, for respectively indicating each of a plurality of applications including the first application and the second application, which are displayed in an overlapping manner on the execution screen of the first application displayed in the first partial area, together with the handwriting input field; recognize the character indicated by the path of the at least one drag input, based on receiving the at least one drag input initiated from the handwriting input field after receiving a sixth user input for the sixth user input to select an executable object among the plurality of executable objects; and execute an application indicated by the executable object selected by the sixth user input and a function corresponding to the recognized character.

In one embodiment, the processor 2230 may be configured to recognize the path of the at least one drag input passing by a part of the execution screen of the first application beyond the handwriting input field, as a part of the character instead of the user input for the first application, while the at least one drag input initiated from the handwriting input field is received. For example, the processor 2230 may be configured to display a part of the path of the at least one drag input on the execution screen of the first application displayed within the first partial area.

In various embodiments, the processor 2230 may be configured to:

display a third executable object for guiding a recommended function within another area of the second partial area distinguished from the display area of the widget of the second application and the display area of the first executable object, while displaying the execution screen of the first application within the first partial area and displaying the widget of the second application and the first execution within the second partial area; and execute the recommended function, based on receiving a third user input for the third executable object, while displaying the execution screen of the first application within the first partial area and displaying the third executable object together with the widget of the second application and the first executable object within the second partial area;

wherein the recommended function may be identified from a model that is related to the electronic device and configured to predict a future execution pattern of the electronic device, based on past execution heuristics including a past execution history of the electronic device.

In some embodiments, the processor 2230 may be configured to display a fourth executable object for guiding another recommended function distinct from the aforementioned recommended function, based on receiving the fourth user input for the third executable object, while displaying the execution screen of the first application within the first partial area and displaying the third executable object together with the widget of the second application and the first execution within the second partial area; and execute the other recommended function, based on receiving a fifth third user input for the fourth executable object; wherein the attribute of the fourth user input may be distinct from the attribute of the third user input.

In some embodiments, the processor 2230 may be configured to maintain displaying of the third executable object, based on receiving a fourth user input for the third executable object, while displaying the execution screen of the first application in the first partial area and displaying the third executable object together with the widget of the second application and the first executable object within the second partial area; display a plurality of executable objects for respectively guiding a plurality of other recommended functions distinct from the aforementioned recommended function, within an area extended from the third executable object, in an overlapping manner on the execution screen of the first application displayed within the first partial area; and execute a recommended function guided by the executable object selected by the fifth user input, based on receiving a fifth user input for selecting the third executable object and an executable object of the plurality of executable objects; wherein the attribute of the fourth user input may be distinct from the attribute of the third user input.

In various embodiments, the processor 2230 may be configured to display a reduced execution screen of the first application and a reduced execution screen of the second application within the first partial area and display the first executable object and the second executable object switched from the widget of the second application within the second partial area, based on receiving the third user input dropped at the first partial area after dragging the widget of the second application, while displaying the execution screen of the first application within the first partial area and displaying the widget of the second application and the first executable object within the second partial area; wherein the attribute of the third user input may be distinct from the attribute of the second user input.

In some embodiments, the arrangement of the reduced execution screen of the first application and the reduced execution screen of the second application displayed within the first partial area may be determined based on the position of the widget of the second application dropped by the third user input.

In various embodiments, the processor 2230 may be configured to receive the third user input dropped at the first partial area after dragging both the first executable object and the second executable object, while displaying the first executable object and the second executable within the second partial area without displaying any execution screen within the first partial area; execute the first application and the second application, based on receiving the third user input; and display the reduced execution screen of the first application and the reduced execution screen of the second application within the first partial area, in response to the execution of the first application and the second application; wherein the first executable object and the second executable object displayed within the second partial area may be maintained independently of the receipt of the third user input.

In some embodiments, the processor 2230 may be configured to:

extend a display area of a reduced execution screen of the first application and reduce a display area of a reduced execution screen of the second application, based on receiving the fourth user input for moving in a first direction a boundary between the reduced execution screen of the first application and the reduced execution screen of the second application displayed within the first partial area, while displaying the reduced execution screen of the first application and the reduced execution screen of the second application within the first partial area, and displaying the first executable object and the second executable object within the second partial area; and reduce the display area of the reduced execution screen of the first application and extend the display area of the reduced execution screen of the second application, based on receiving the fifth user input for moving, in a second direction opposite to the first direction, the boundary between the reduced execution screen of the first application and the reduced execution screen of the second application displayed within the first partial area, while displaying the reduced execution screen of the first application and the reduced execution screen of the second application within the first partial area and displaying the first executable object and the second executable object within the second partial area.

In an embodiment, the arrangement of at least one of a plurality of visual objects within the reduced execution screen of the first application may be changed according to the extension of the display area of the reduced execution screen of the first application caused by the fourth user input and according to the reduction of the display area of the reduced execution screen of the first application caused by the fifth user input, and the arrangement of at least one of a plurality of visual objects within the reduced execution screen of the second application may be changed according to the reduction of the display area of the reduced execution screen of the second application caused by the fourth user input and according to the extension of the display area of the reduced execution screen of the second application caused by the fifth user input.

In some embodiments, the processor 2230 may be configured to:

receive the fourth user input for the reduced execution screen of the first application, while displaying the reduced execution screen of the first application and the reduced execution screen of the second application within the first partial area;

display the execution screen of the first application switched from the reduced execution screen of the first application and the reduced execution of the second application within the first partial area, based on receiving the fourth user input;

display the widget of the second application switched from the first executable object and the second executable object within the second partial area;

receive the fifth user input for the reduced execution screen of the second application, while displaying the reduced execution screen of the first application and the reduced execution screen of the second application within the first partial area;

display the execution screen of the second application switched from the reduced execution screen of the first application and the reduced execution of the second application within the first partial area, based on receiving the fourth user input; and display the widget of the first application switched from the first executable object and the second executable object within the second partial area.

In some embodiments, the arrangement of the reduced execution screen of the first application and the reduced execution screen of the second application within the first partial area of the first application may be determined based on a dragged path of the third user input.

In various embodiments, the processor 2230 may be configured to:

receive the third user input dropping in the first partial area after dragging both the first executable object and the second executable object, while displaying the execution screen of the third application in the first partial area and displaying the first executable object, the second executable object, and a third executable object for indicating the third application within the second partial area;

execute the first application and the second application, based on receiving the third user input;

display within the first partial area the reduced execution screen of the first application and the reduced execution screen of the second application switched from the execution screen of the third application, in response to the execution of the first application and the second application; and display in the first partial area the widget of the third application switched from the first executable object, the second application and the third executable object.

In some embodiments, the arrangement of the reduced execution screen of the first application and the reduced execution screen of the second application, switched from the execution screen of the third application, in the first partial area, may be determined based on the dragged path of the third user input.

In various embodiments, the processor 2230 may be configured to:

identify an event designated from the passenger seat of the vehicle, while displaying the execution screen of the first application within the first partial screen and displaying the widget of the second application and the first executable object within the second partial area; and based on the identification, move at least one of the widget of the second application and the first executable object within the second partial area displayed closer to the driver's seat of the vehicle than the passenger seat of the vehicle;

wherein at least one of the moved widget of the second application or the moved first executable object may be displayed closer to the passenger seat of the vehicle than the driver's seat of the vehicle within the second partial area.

In some embodiments, the processor 2230 may be configured to identify the designated event by identifying a hovering input or a gesture input over the display area while identifying that both hands are in contact with the steering wheel of the vehicle.

In some embodiments, the processor 2230 may be configured to identify at least one of a change in the weight of the user sitting in the passenger seat of the vehicle or a change in tension of the seat belt worn by the user sitting in the passenger seat of the vehicle in order to identify the designated event.

In some embodiments, the processor 2230 may be configured to identify the designated event by identifying that the position where the user's hand has entered the display area is closer to the passenger seat of the vehicle than to the driver's seat of the vehicle, wherein identifying that the position where the user's hand has entered the display area is closer to the passenger seat of the vehicle than to the driver's seat of the vehicle may be executed before contacting the display area by the user's fingers.

In some embodiments, the processor 2230 may be configured to, based on the identification, move at least one executable element within the execution screen of the first application within the first partial area displayed closer to the driver's seat of the vehicle than to the passenger seat of the vehicle, wherein the moved at least executable element may be displayed within the first partial area, closer to the passenger seat of the vehicle than to the driver's seat of the vehicle.

In various embodiments, the processor 2230 may be configured to:

identifying a hovering input resulting from a user's hand spaced from the second partial area and positioned above the second partial area, while displaying the execution screen of the first application in the first partial area and displaying the widget of the second application and the first executable object within the second partial area, with the vehicle travelling; and based on identifying the hovering input, extend the second partial area, extend the widget of the second application and the first executable object within the second partial area, and extend the first executable element and the second executable element of the widget of the second application.

In some embodiments, the size of the first partial area may be maintained independently of the extension of the second partial area, and a part of the extended second partial area may overlap the first partial area on which the execution screen of the first application is displayed.

In some embodiments, the processor 2230 may be configured to reduce the first partial area and reduce the execution screen of the first application within the first partial area, based on identifying the hovering input.

In some embodiments, the second partial area may be extended to a dimension corresponding to the speed of the vehicle travelling, based on identifying the hovering input, each of the widget of the second application and the first executable object may be extended to the dimension corresponding to the speed, based on identifying the hovering input, and each of the first executable element and the second executable element may be extended to the dimension corresponding to the speed, based on identifying the hovering input.

In various embodiments, the processor 2230 may be configured to:

identify the hovering input resulting from a user's hand spaced from the first partial area and positioned above the first partial area, while displaying the execution screen of the first application in the first partial area and displaying the widget of the second application and the first executable object within the second partial area, with the vehicle travelling; and based on identifying the hovering input, extend at least one executable element within the execution screen of the first application displayed in the first partial area.

In various embodiments, the processor 2230 may be configured to:

identify the hovering input resulting from a user's hand spaced from the display area and positioned above the display area, while displaying the execution screen of the first application in the first partial area and displaying the widget of the second application and the first executable object within the second partial area, with the vehicle travelling;

based on identifying the hovering input when the speed of the vehicle travelling is greater than or equal to a predetermined speed, display a notification message for informing that the control of the execution screen of the first application and the widget of the second application through the user input is restricted, in an overlapping manner on the execution screen of the first application; and stop displaying the notification message, based on identifying that a specified time has elapsed from the timing point of displaying the notification message.

In various embodiments, the processor 2230 may be configured to:

display the execution screen of the first application within the first partial area and display the first executable object and the second executable object within the second partial area, while executing the first application among the first application and the second application;

receive a signal distinct from functions supported by the first application and related to functions supported by the second application, through at least one communication circuit of the electronic device, while displaying the execution screen of the first application within the first partial area and displaying the first executable object and the second executable object within the second partial area;

based on receiving the signal, execute the second application, and display the notification of the received signal, in an overlapping manner, on the execution screen of the first application displayed within the first partial area, using the executed second application; and based on identifying that the first application is a designated application, stop displaying the notification message in response to receiving a user input for the notification, maintain displaying the execution screen of the first application within the first partial area, and display the widget of the second application switched from the first executable object and the second executable object within the second partial area;

wherein the widget of the second application switched from the second executable object may include information related to the notification.

In some embodiments, the processor 2230 may be configured to, based on identifying that the first application is not a designated application, stop displaying the notification in response to receiving a user input for the notification, switch the execution screen of the first application displayed within the first partial area to the execution screen of the second application, and switch the first executable object displayed within the second partial area to the widget of the first application, wherein the execution screen of the second application may include information related to the notification.

In various embodiments, the processor 2230 may be configured to:

display the execution screen of the first application within the first partial area and display the first executable object and the second executable object within the second partial area, while executing the first application among the first application and the second application;

receive a signal distinct from functions supported by the first application and related to functions supported by the second application, through at least one communication circuit of the electronic device, while displaying the execution screen of the first application within the first partial area and displaying the first executable object and the second executable object within the second partial area;

based on receiving the signal, execute the second application;

based on identifying that the first application is a designated application, maintain displaying the execution screen of the first application within the first partial area in response to the execution of the second application, and switch the second executable object displayed within the second partial area to the widget of the second application; and based on identifying that the first application is not the designated application, switch the execution screen of the first application displayed within the second partial area to the execution screen of the second application in response to the execution of the second application, and switch the first executable object displayed within the second partial area to the widget of the first application;

wherein each of the widget of the second application switched from the second executable object and the execution screen of the second application switched from the execution screen of the first application may include information related to the signal.

In various embodiments, the processor 2230 may be configured to:

receive a third user input while displaying the execution screen of the first application within the first partial area and displaying the widget of the second application and the first executable object within the second partial area;

based on receiving the third user input, switch the execution screen of the first application displayed within the first partial area to a reduced execution screen of the first application and a reduced execution screen of the second application, and switch the widget of the second application displayed within the second partial area to the second executable object;

based on receiving a fourth user input for selecting the reduced execution screen of the first application of the reduced execution screen of the first application and the reduced execution screen of the second application, being displayed within the first partial area, switch the reduced execution screen of the first application and the reduced execution screen of the second application, displayed within the first partial area, to the execution screen of the first application, and switch the second executable object displayed within the second partial area to the widget of the second application; and based on receiving a fifth user input for selecting the reduced execution screen of the second application of the reduced execution screen of the first application and the reduced execution screen of the second application, being displayed within the first partial area, switch the reduced execution screen of the first application and the reduced execution screen of the second application, displayed within the first partial area, to the execution screen of the second application, and switch the first executable object displayed within the second partial area to the widget of the first application;

wherein the attribute of the third user input may be distinct from the attribute of each of the first user input and the second user input.

In some embodiments, the third user input may be a hovering input having a designated pattern caused by the user's hand spaced apart from the display area and positioned over the display area.

In some embodiments, the third user input may be of an eye-gaze input looking at the display area for a specified time duration, while displaying the execution screen of the first application within the first partial area and displaying the widget of the second application and the first executable object within the second partial area, wherein the eye-gaze input may be identified based on an image acquired with at least one camera of the electronic device or another electronic device within the vehicle operatively coupled to the electronic device.

In an embodiment, the fourth user input may be an eye-gaze input looking at the reduced execution screen of the first application of the reduced execution screen of the first application and the reduced execution screen of the second application, being displayed within the first partial area, for a predetermined time duration, and the fifth user input may be an eye-gaze input looking at the reduced execution screen of the second application of the reduced execution screen of the first application and the reduced execution screen of the second application, being displayed within the first partial area, for a predetermined time duration.

In some embodiments, the third user input may be an input to a physical input means equipped in a steering wheel in the vehicle, while displaying the execution screen of the first application within the first partial area and displaying the widget of the second application and the first executable object within the second partial area, wherein the physical input means may include at least one of a rotatable structure or a physical button.

In some embodiments, the third user input may be a gesture input having a designated pattern caused by a user sitting in a driver's seat of the vehicle or a passenger seat of the vehicle, wherein the gesture input may be identified based on an image acquired through at least one camera of the electronic device or another electronic device in the vehicle operatively coupled with the electronic device.

In various embodiments, the processor 2230 may be configured to:

receive a third user input, while displaying the execution screen of the first application in the first partial area, displaying the first executable object and the second executable object within the second partial area, and displaying the reduced execution screen of the second application on another display of the electronic device, distinct from the electronic device; and based on receiving the third user input, switch the execution screen of the first application displayed within the first partial area to the execution screen of the second application, and switch the reduced execution screen of the second application displayed on the other display to the reduced execution screen of the first application;

wherein the attribute of the third user input may be distinct from the attribute of each of the first user input and the second user input.

In various embodiments, the processor 2230 may be configured to:

establish a connection between the electronic device and a first other electronic device positioned within the vehicle, using at least one communication circuit of the electronic device;

establish a connection between the electronic device and a second other electronic device positioned within the vehicle, using the at least one communication circuit;

display the execution screen of the first application within the first partial area and display the first executable object and the widget of the second application within the second partial area, based on data received from the first other electronic device through the connection between the electronic device and the first other electronic device;

based on the data, transmit information on the execution screen of the first application displayed within the first partial area and information on the widget of the second application displayed within the second partial area, to the second other electronic device through the connection between the electronic device and the second other electronic device, while displaying the execution screen of the first application within the first partial area and displaying the first executable object and the widget of the second application within the second partial area;

receive information on at least one user input for changing at least one of the state of the execution screen of the first application displayed within the first partial area or the state of the widget of the second application displayed within the second partial area, from the second other electronic device that received the information on the execution screen of the first application and the information on the widget of the second application, through the connection between the electronic device and the second other electronic device;

transfer the information on the at least one user input to the first other electronic device, through the connection between the first other electronic device and the electronic device;

receive another data for at least one of the state of the execution screen of the first application or the state of the widget of the second application, changed according to the at least one user input, through the connection between the first other electronic device and the electronic device from the first other electronic device; and based on the other data, display at least one of the changed state of the execution screen of the first application or the changed state of the widget of the second application.

In some embodiments, the processor 2230 may be configured to:

receive a signal for notifying that at least one of the first application or the second application is controlled by a user of the second other electronic device through a connection between the second other electronic device and the electronic device from the second other electronic device, while the second other electronic device receiving the information on the execution screen of the first application and the information on the widget of the second application is receiving at least one user input; and based on receiving of the signal, display information for notifying that at least one of the first application or the second application is controlled by the user of the second other electronic device, in an overlapping manner, on the execution screen of the first application displayed within the first partial area.

In various embodiments, the processor 2230 may be configured to:

display the execution screen of the first application within a third partial area and display the widget of the second application and the first executable object within a fourth partial area, the third partial area and the fourth partial area forming another display of the electronic device distinct from the display, the fourth partial area being located adjacent to the third partial area on the other display, while displaying the execution screen of the first application within the first partial area and displaying the widget of the second application and the first executable within the second partial area;

based on receiving a third user input for the execution screen of the first application displayed within the third partial area, execute a function indicated by the third user input, provide a result of execution of the function, and provide a result of execution of the function within the execution screen of the first application displayed within the third partial area; and based on receiving a fourth user input for the widget of the second application displayed within the fourth partial area, execute another function indicated by the fourth user input, provide a result of the execution of the other function within the widget of the second application displayed within the second partial area, and provide a result of the execution of the other function within the widget of the second application displayed within the fourth partial area.

In various embodiments, the processor 2230 may be configured to:

move at least one executable element within the execution screen of the first application to an area receiving a first hovering input, based on identifying that the first hovering input caused by the user's hand spaced from the first partial area and positioned above the first partial area is maintained for a specified time duration, while displaying the execution screen of the first application within the first partial area and displaying the widget of the second application and the first executable object within the second partial area; and move the widget of the second application to an area receiving a second hovering input, based on identifying that the second hovering input caused by the user's hand spaced from the second partial area and positioned above the second partial area is maintained for a specified time duration, while displaying the execution screen of the first application within the first partial area and displaying the widget of the second application and the first executable object within the second partial area.

In various embodiments, the processor 2230 may be configured to:

extend at least one executable element within the execution screen of the first application positioned within the area receiving the first hovering input, based on identifying that the first hovering input caused by the user's hand spaced from the first partial area and positioned above the first partial area is maintained for a specified time duration, while displaying the execution screen of the first application within the first partial area and displaying the widget of the second application and the first executable object within the second partial area; and extend the widget of the second application, based on identifying that the second hovering input caused by the user's hand spaced from the display area of the widget of the second application and positioned above the display area of the widget of the second application is maintained for a specified time duration, while displaying the execution screen of the first application within the first partial area and displaying the widget of the second application and the first executable object within the second partial area.

In various embodiments, the processor 2230 may be further configured to: monitor whether to receive an eye-gaze input looking at the display area for a specified time duration, while displaying the execution screen of the first application within the first partial area; based on monitoring that the eye-gaze input is not received, display event information within the execution screen of the first application, using a predetermined timing or time period; and based on monitoring that the eye-gaze input is received, display the event information within the execution screen of the first application, using another predetermined timing or time period distinct from the above predetermined timing or time period.

In various embodiments, the first application may be an application for providing a navigation service, and the processor 2230 may be configured to: receive a user input for setting a destination, while displaying the execution screen of the first application within the first partial area; identify whether or not the destination set by the user input is a destination initially set in the electronic device; display the event information within the execution screen of the first application using a predetermined timing or time period; based on identifying that the destination is not a destination initially set in the electronic device; and display the event information within the execution screen of the first application using another predetermined timing or time period distinct from the above predetermined timing or time period.

Figure 22:
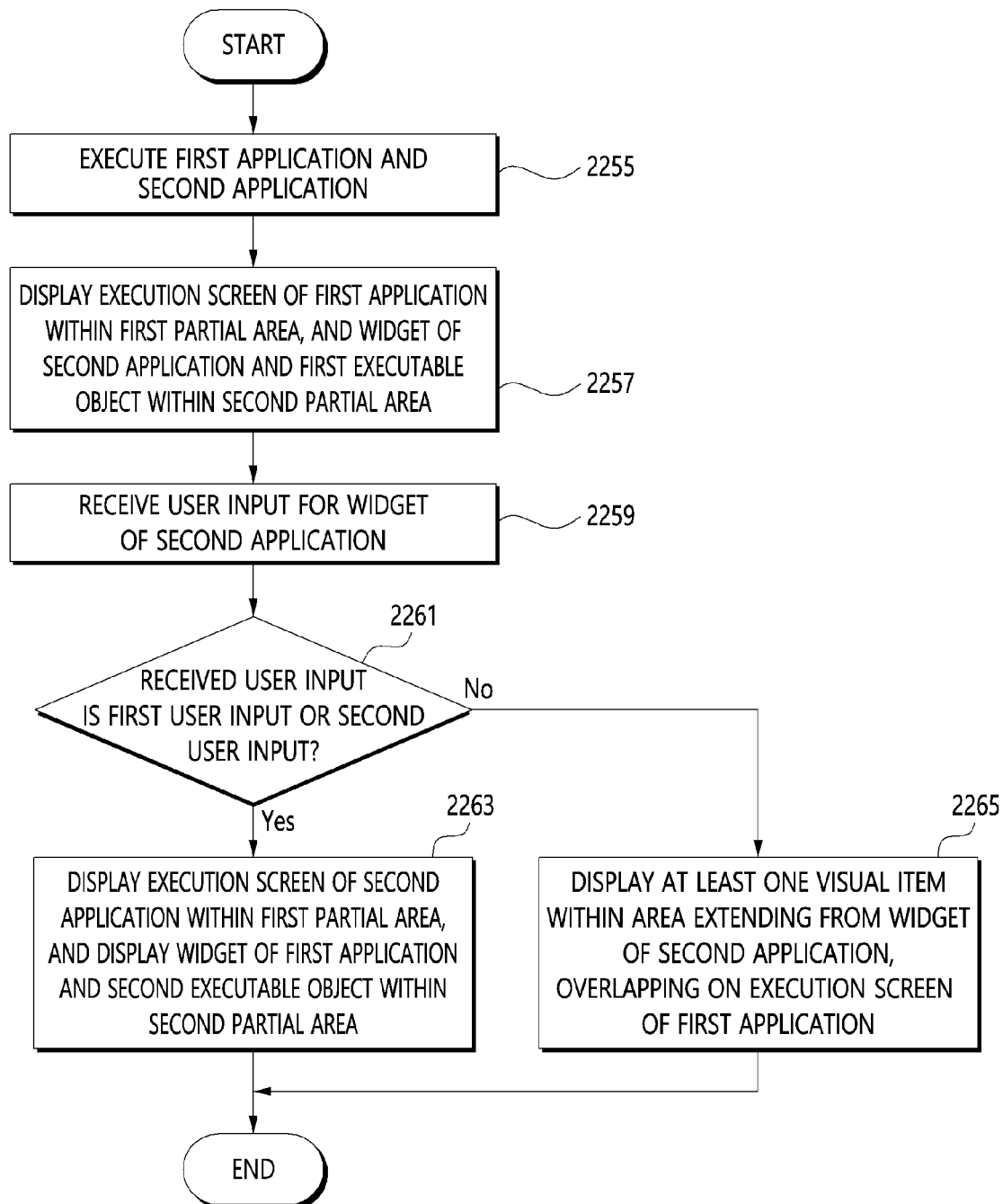
FIG. 22 illustrates a flowchart for an operating method of an electronic device for controlling a screen displayed on a display according to various embodiments.

FIG. 22 illustrate a flowchart for a method of an electronic device for controlling a screen displayed on a display according to various embodiments. This method may be executed by the infotainment apparatus 100, the control device 2100 or the electronic device 2210, or may be alternatively executed by the processor 2230.

Figure 23:
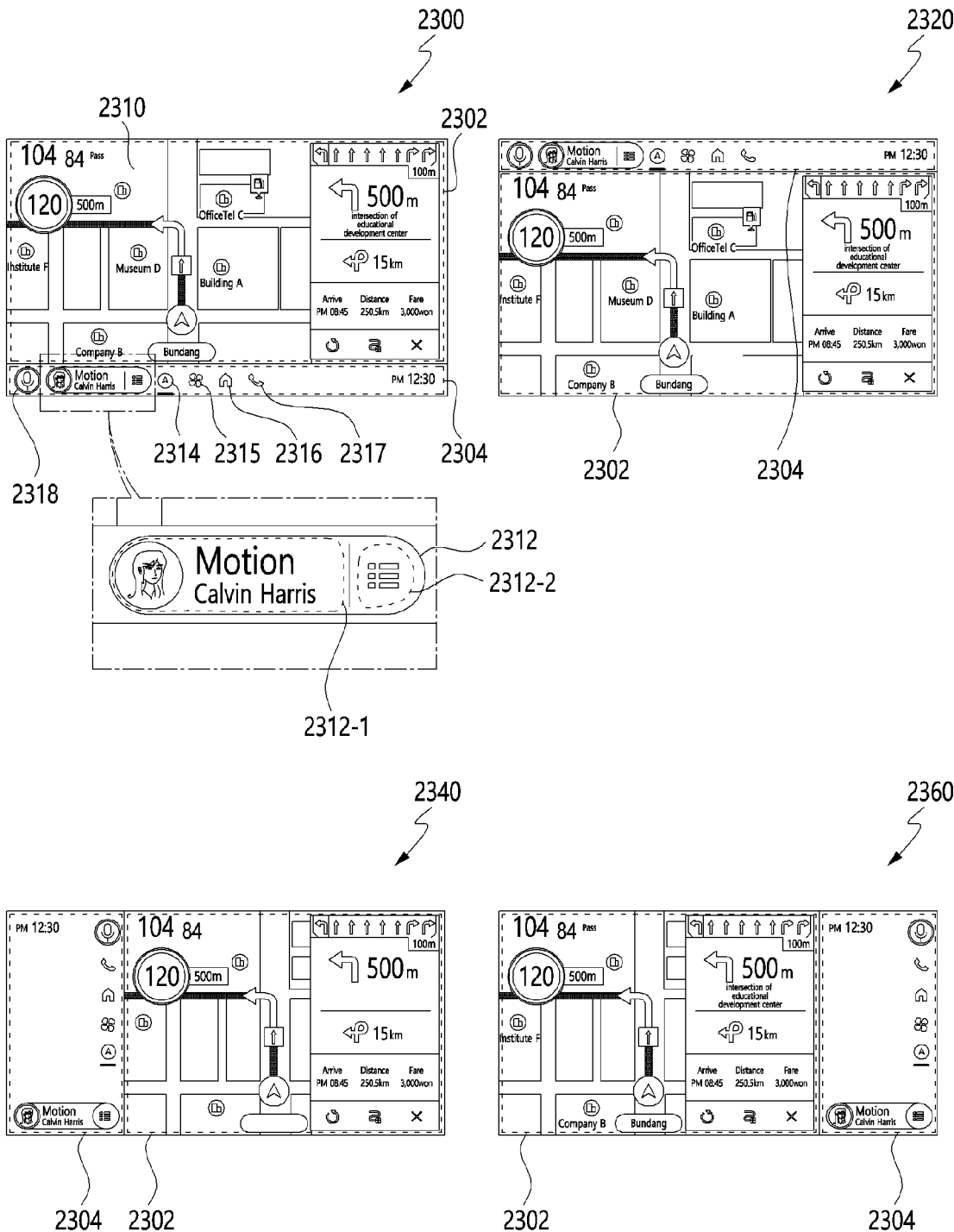
FIG. 23 illustrates examples of a screen displayed on a display of an electronic device according to various embodiments.

FIG. 23 illustrates an example of an exemplary screen displayed on a display of the electronic device according to various embodiments.

Figure 24:
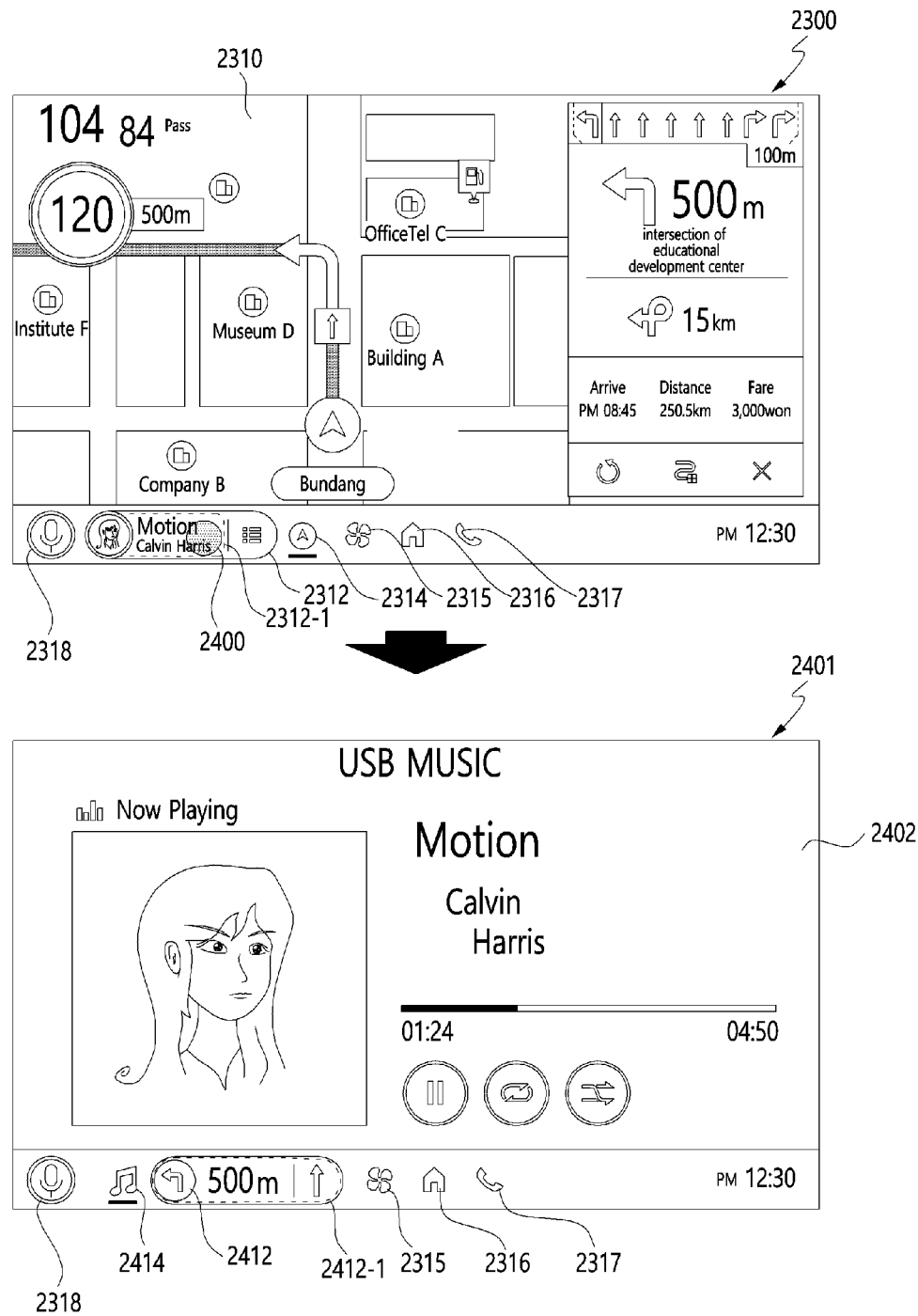
FIG. 24 illustrates an example of switching a screen displayed on a display of an electronic device based on a user input for a widget according to various embodiments.

FIG. 24 illustrates an example of switching a screen displayed on a display of the electronic device based on a user input for a widget according to various embodiments.

Figure 25:
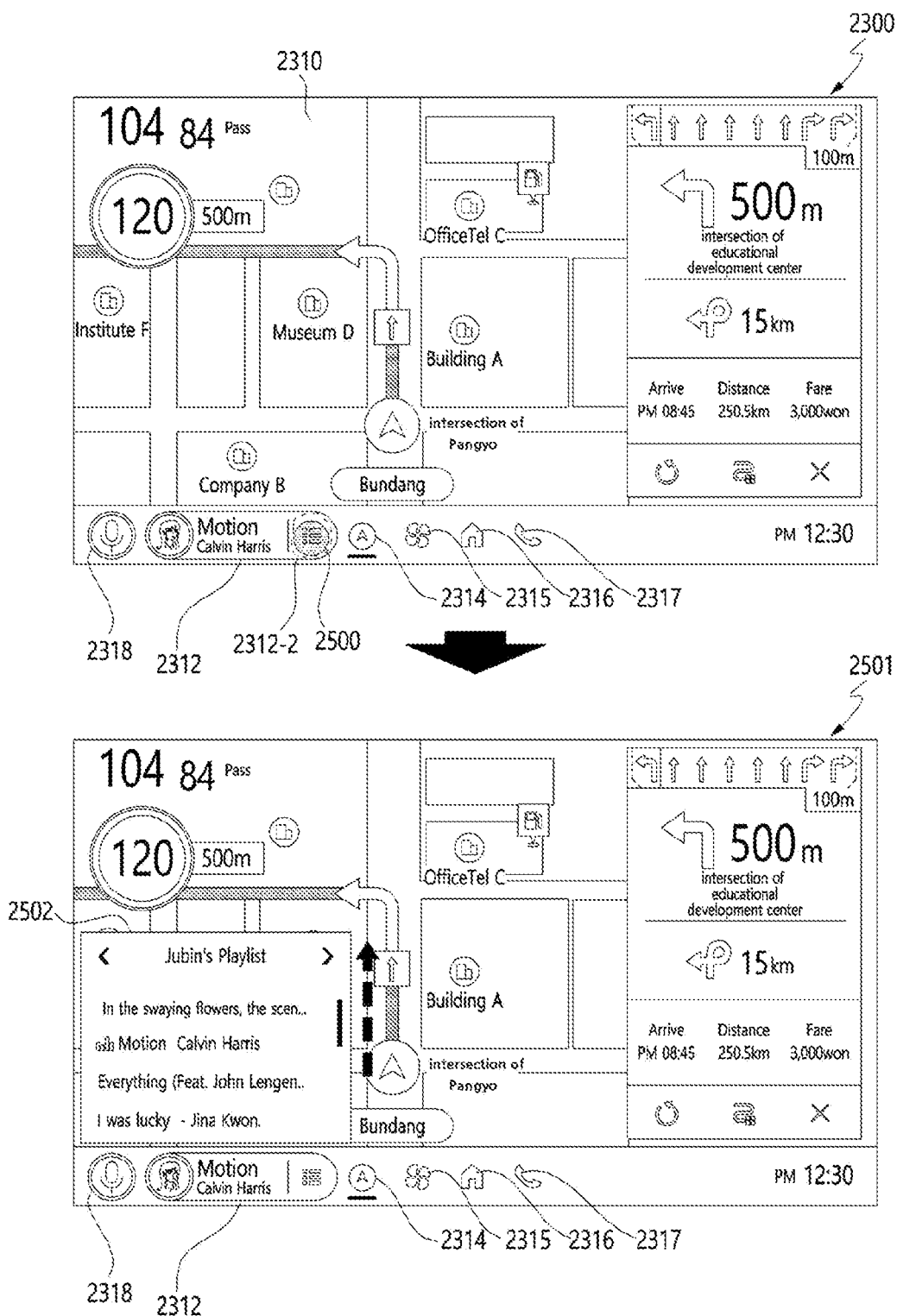
FIG. 25 illustrates an example of switching a screen displayed on a display of an electronic device based on another user input for a widget according to various embodiments.

FIG. 25 illustrates an example of switching a screen displayed on a display of the electronic device based on another user input for a widget according to various embodiments.

Referring first to FIG. 22, in an operation 2255, the processor 2230 may execute a first application and a second application. For example, the first application may be an application installed in the electronic device 2210. As another example, the first application may be an application installed within another electronic device distinct from the electronic device 2210 (for example, the electronic device 2220 or another the electronic device 2220 installed in the vehicle, distinguished from the electronic device 2220), although it is not limited thereto. For example, the second application may be an application installed in the electronic device 2210. As another example, the second application may be an application installed in the other electronic device distinct from the electronic device 2210, although it is not limited thereto.

In an operation 2257, while executing the first application and the second application, the processor 2230 may display the execution screen of the first application within the first partial area and the widget of the second application and the first executable object to indicate the first application, within the second partial area, the first partial area the second partial area forming the display area of the display 2240, wherein the second partial area is located abutting upon the first partial area. For example, the display area of the display 2240 may be formed of only the first and second partial areas. As another example, the display area of the display 2240 may further include another partial area distinct from the first partial area and the second partial area, although it is not limited thereto.

In various embodiments, the relationship of relative position relationship between the first partial area and the second partial area may be defined in different ways. For example, referring to FIG. 23, as in the display state 2300, the first partial area 2302 may be defined directly above the second partial area 2304. For another example, as in the display state 2320, the first partial area 2302 may be defined directly below the second partial area 2304. For another example, as in the display state 2340, the first partial area 2302 may be defined on the right side of the second partial area 2304. As still another example, as in the display state 2360, the first partial area 2302 may be defined on the left side of the second partial area 2304. However, it is not limited thereto.

In various embodiments, the first partial area may be an area to display an execution screen of at least one application among a plurality of applications being executed by the electronic device 2210. In various embodiments, the second partial area may be an area to display a widget or an executable object of at least some of the remaining applications except for at least one application providing its display screen within the first partial area, among a plurality of applications being executed by the electronic device 2210. In various embodiments, the second partial area may be an area for displaying at least one executable object to indicate at least one application not being executed by the electronic device 2210. For example, the second partial area may be an area for displaying at least one executable object to indicate at least one application frequently executed by the electronic device 2210. The identification of the at least one application may be executed by the processor 2230 without any user input. As another example, the second partial area may be an area for displaying at least one executable object to indicate at least one application identified by a user input of the electronic device 2210, but it is not limited thereto.

In various embodiments, the processor 2230 may display only the execution screen of the first application within the first partial area, and display at least one other executable object as well as the first executable object and the widget of the second application within the second partial area. For example, referring again to FIG. 23, as seen in the state 2300, while executing the first application and the second application, the processor 2230 may be configured to display only the execution screen 2310 of the first application within the first partial area 2302, and display, within the second partial area 2304, the widget 2312 of the second application and the first executable object 2314 to indicate the first application, as well as an executable object 2315 (e.g., an object for controlling an air-conditioner in a vehicle), an executable object 2316 (e.g., an object for providing a list of applications that may be executed in the vehicle), an executable object 2317 (e.g., an object for providing a call service), and an executable object 2318 (e.g., an object for providing a voice input-based service), although not limited thereto.

For example, the first executable object 2314 may be highlighted to indicate that the first application is currently in execution, relative to the executable object 2315, the executable object 2316, the executable object 2317, and the executable object 2318. For example, referring to FIG. 23, as seen in the state 2300, the first executable object 2314 may be underlined to indicate that the first application is in its execution state, as distinct from the executable object 2315, the executable object 2316, the executable object 2317, and the executable object 2318, although not limited thereto.

For example, the widget 2312 of the second application may have a size larger dimension than the first executable object 2314, the executable object 2315, the executable object 2316, the executable object 2317, and the executable object 2318. For example, the widget 2312 of the second application may include information on the service provided from the second application currently in execution (e.g., information on a currently played song when the second application is of a music playback application). For example, the widget 2312 of the second application may further include an element for controlling the second application (e.g., a second executable element). For example, the widget 2312 of the second application may include a first executable element 2312-1 to display the execution screen of the second application within the first partial area 2302, and a second executable element 2312-2 to control the second application without displaying the execution screen of the second application within the first partial area 2302, although it is not limited thereto.

In various embodiments, the widget 2312 of the second application may have the shape shown in the state 2300 of FIG. 23, with no user input being received, while displaying the execution screen 2310 of the first application within the first partial area 2302 and displaying the widget 2312 of the second application and the first executable object 2314 within the second partial area 2304. For example, the widget 2312 of the second application may be displayed without a separate user input while displaying the execution screen 2310 of the first application within the entire first partial area 2302 and executing the second application, other than converted from the second executable object 2414 (to be further described below), based on positioning an input means (e.g., a user's finger) on or above the second executable object 2414 to indicate the second application, or positioning on or above the second executable object 2414 a pointer to indicate the position to which the input means points, although it is not limited thereto.

In an operation 2259, the processor 2230 may receive a user input for the widget of the second application, while displaying the execution screen of the first application within the first partial area and displaying the widget of the second application and the first executable object within the second partial area. For example, referring again to FIG. 23, the user input may be a first user input for the first executable element 2312-1 or a second user input for the second executable element 2312-2.

In an operation 2261, the processor 2230 may identify whether the received user input is the first user input or the second user input. For example, the processor 2230 may execute operation 2263 when the received user input is the first user input, and execute operation 2265 when the received user input is the second user input.

In an operation 2263, the processor 2230 may display, based on receiving the first user input, the execution screen of the second application switched from the execution screen of the first application within the first partial area, and display the widget of the first application switched from the first executable object, and the second executable object switched from the widget of the second application to indicate the second application within the second partial area. For example, referring then to FIG. 24, the processor 2230 may switch the state 2300 to the state 2401 in response to receiving a first user input 2400 for the first executable element 2312-1 of the widget 2312 of the second application. For example, in state 2401, the processor 2230 may switch the execution screen 2310 of the first application displayed in the first partial area 2302 to the execution screen 2402 of the second application. For example, in the state 2401, the processor 2230 may switch the widget 2312 of the second application displayed in the second partial area 2304 into the second executable object 2414. Such a switch from the widget 2312 of the second application to the second executable object 2414 may be executed by the switch from the execution screen 2310 of the first application to the execution screen 2402 of the second application. For example, in the state 2401, the processor 2230 may switch the first executable object 2314 displayed in the second partial area 2304 to the widget 2412 of the first application. The switch from the first executable object 2314 to the widget 2412 of the first application may be executed by the switch from the execution screen 2310 of the first application to the execution screen 2402 of the second application.

In various embodiments, the second executable object 2414 switched from the widget 2312 of the second application may be, in the state 2401, highlighted to indicate that the second application is in execution, relative to the executable object 2315, the executable object 2316, the executable object 2317, and the executable object 2318. For example, the second executable object 2414 may be underlined as distinguished from the executable object 2315, the executable object 2316, the executable object 2317 and the executable object 2318, although it is not limited thereto.

In various embodiments, the widget 2412 of the first application switched from the first executable object 2314, in a state 2401, may include at least a part of the information provided through the execution screen 2310 of the first application in the state 2300. For example, the widget 2412 of the first application indicates, in the state 2401, may include information to indicate that the vehicle will have to go forward 500 m and then turn to the left in order to get to the destination of the vehicle equipped with the electronic device 2210.

In various embodiments, the widget 2412 of the first application in the state 2401 may include a first executable element 2412-1. For example, the widget 2412 of the first application in the state 2401 may only include the first executable element 2412-1, as different from the widget 2312 of the second application in the state 2300 including a plurality of executable elements (e.g., the first executable element 2312-1 and the second executable element 2312-2). For example, the first executable element 2412-1 may be used to display the execution screen 2310 of the first application within the first partial area 2302.

In various embodiments, an executable element included in a widget of an application displayed within the second partial area 2304 may be configured differently according to the attribute of the application. For example, if the application is an application that requires interactions between the user and the electronic device 2210 relatively frequently, then the widget of the application may further include an executable element for displaying an execution screen of the application within the first partial area 2302 as well as an executable element for controlling the application without displaying the execution screen of the application. Further, if the application is an application that does not require interactions between the user and the electronic device 2210 relatively frequently, then the widget of the application may only include the executable element for displaying the execution screen of the application in the first partial area 2302. For another example, if the application is an application controlled by a user input with a relatively low complexity, then the widget of the application may further include the executable element for displaying the execution screen of the application within the first partial area 2302 as well as the executable element for controlling the application according to the user input without displaying the execution screen of the application. Further, if the application is an application controlled by a user input with a relatively high complexity, then the widget of the application may only include the executable element for displaying the execution screen of the application in the first partial area 2302. However, it is not limited to the foregoing.

In an operation 2265, the processor 2230 may display, based on receiving the second user input, at least one visual item available through the second executable element within an area extending from the widget of the second application, in an overlapping manner, on the execution screen of the first application displayed in the first partial area. For example, referring then to FIG. 25, the processor 2230 may switch the state 2300 to a state 2501 in response to receiving the second user input 2500 for the second executable element 2312-2 of the widget 2312 of the second application in the state 2300. For example, in the state 2501, the processor 2230 may keep the execution screen 2310 of the first application displayed within the first partial area 2302 in the state 2300 independently of receiving the second user input 2500. For example, in state 2501, the processor 2230 may keep the first executable object 2314 displayed within the second partial area 2304 in the state 2300 independently of receiving the second user input 2500. For example, in the state 2501, the processor 2230 may keep the widget 2312 of the second application displayed in the second partial area 2304 in the state 2300 independently of receiving the second user input 2500. For example, in the state 2501, the processor 2501 may display an area 2502 including the at least one visual item within an area extending from the widget 2312 of the second application, in an overlapping manner, on the execution screen 2310 of the first application. For example, the at least one visual item included in the area 2502 may be used to respectively indicate a plurality of songs including a song (e.g., "Motion" by Calvin Harris) being played through the second application, although not limited thereto. In various embodiments, the at least one visual item may be configured to be executable so that the function corresponding to the at least one visual item is performed in response to an input to the at least one visual item.

FIG. 25 illustrates an example in which the area 2502 including the at least one visual item is extended from the widget 2312 of the second application, but the position of the area 2502 including the at least one visual item may change. For example, if the priority of information included in the partial area of the execution screen 2310 of the first application disposed underneath the area 2502 extending from the widget 2312 of the second application is higher than the priority of information provided through the at least one visual item included in the area 2502, then the area 2502 may be extended from other area of the second partial area 2304 distinguished from the second partial area 2304 displaying the widget 2312 of the second application, although it is not limited thereto.

In various embodiments, the area 2502 may be configured to be formed to be translucent so that a partial area of the execution screen 2310 of the first application disposed underneath the area 2502 can be at least partially visible, although it is not limited thereto.

In various embodiments, the area 2502 may be floated on the execution screen 2310 of the first application so that the area 2502 is movable. For example, the area 2502 may be moved based on a drag input for changing the display position of the area 2502. When the area 2502 is floated on the execution screen 2310 of the first application, the area 2502 may be changed from an opaque state to a translucent state so that the user can visually recognize what information is provided through a part of the execution screen 2310 of the first application arranged underneath the area 2502, while the drag input for changing the display position of the area 2502 is maintained. However, it is not limited thereto.

As described above, while displaying the execution screen of the first application in execution, the electronic device 2210 according to various embodiments may improve the visibility of the execution screen of the first application by displaying the widget of the second application in execution on another area that does not overlap the execution screen of the first application. The electronic device 2210 according to various embodiments may enhance delivery of information on the execution state of the second application by displaying the widget of the second application. The electronic device 2210 according to various embodiments may improve the convenience of controlling the first application and the second application operating in the vehicle by performing switching of the execution screen displayed in the first partial area according to an area in which a user input for the widget of the second application is received, or providing a pop-up window in an overlapping manner on the first partial area.

Figure 26:
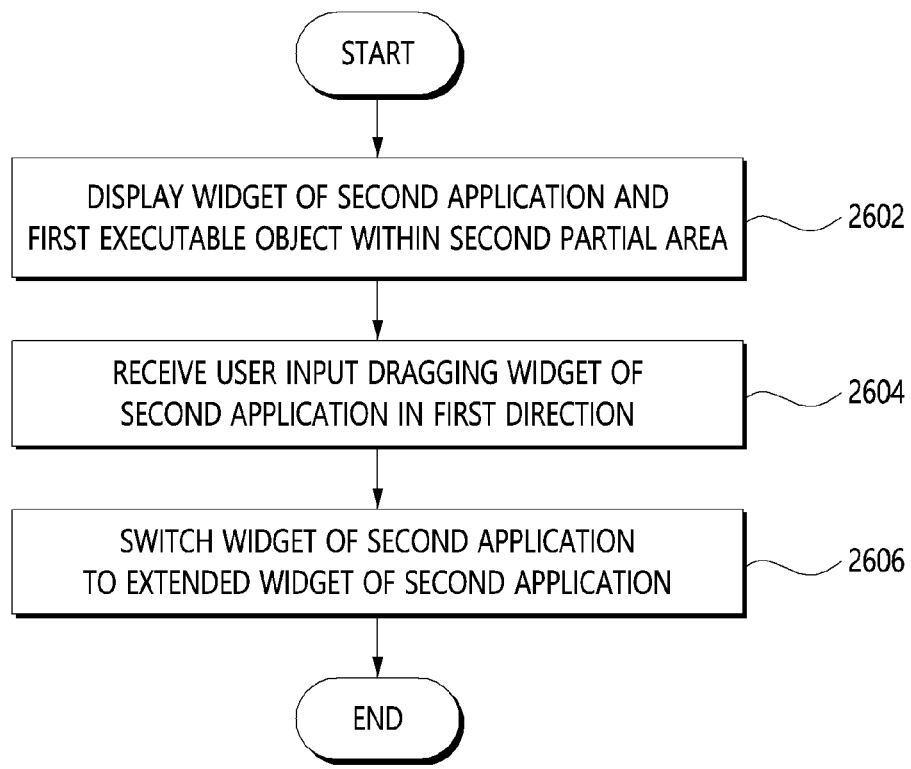
FIG. 26 illustrates a flowchart for an operating method of an electronic device for converting a widget displayed on a display into an extended widget according to various embodiments.

FIG. 26 illustrates a flowchart for an operating method of the electronic device for switching a widget displayed on a display into an extended widget, according to various embodiments. This method may be executed by the infotainment apparatus 100, the control device 2100 or the electronic device 2210, or may be executed by the processor 2230.

Figure 27:
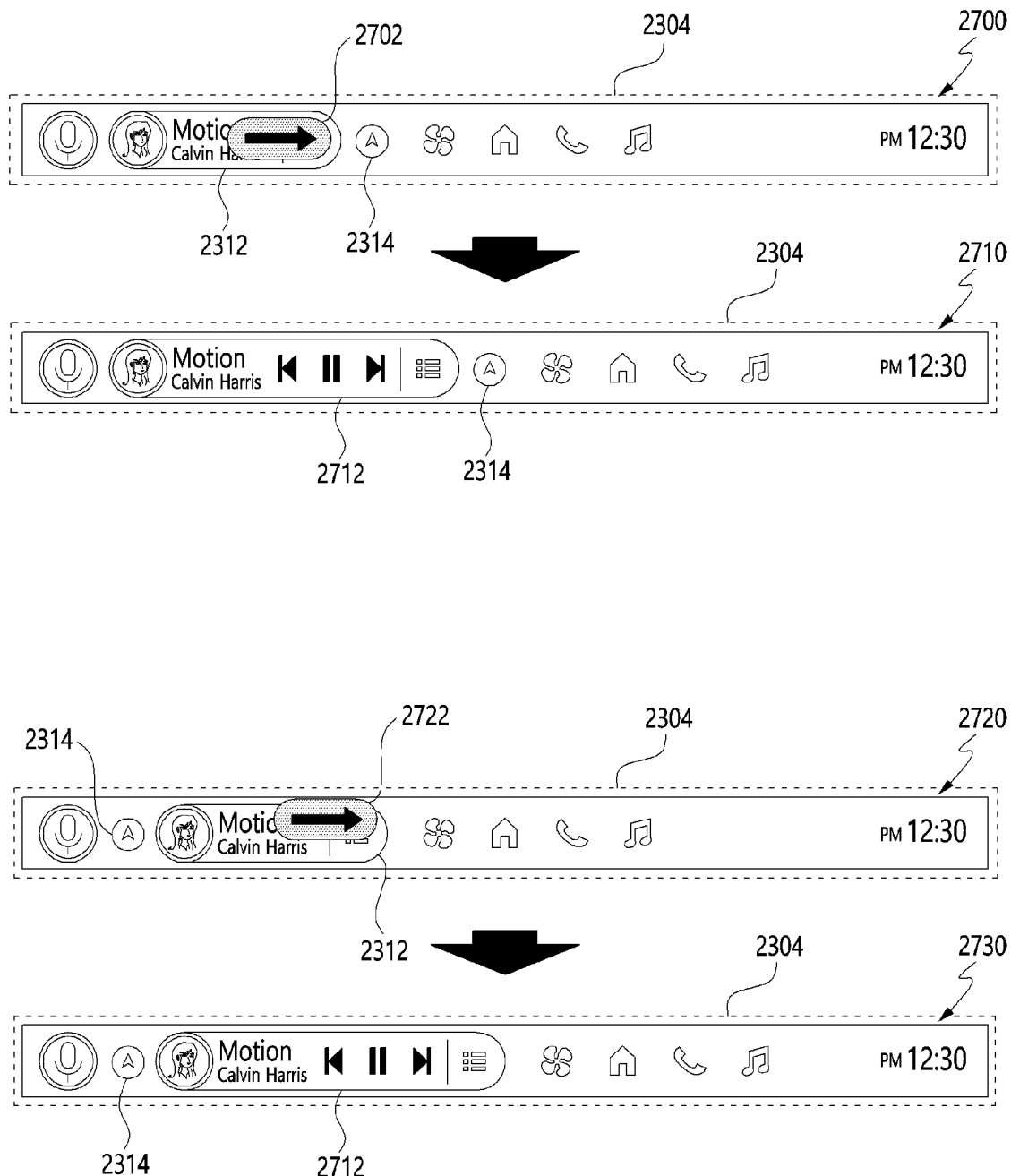
FIG. 27 illustrates an example of converting a widget of an application to an extended widget of the application according to various embodiments.

FIG. 27 illustrates an example of switching a widget of an application to an extended widget of the application according to various embodiments.

Referring now to FIG. 26, in an operation 2602, the processor 2230 may display the widget of the second application and the first executable object within the second partial area.

In various embodiments, the arrangement of the widget of the second application and the first executable object displayed within the second partial area may be set in various ways. For example, the arrangement of the widget of the second application and the first executable object may be set according to a user input. For another example, the arrangement of the widget of the second application and the first executable object may be established according to the frequency of executions of the first application and the frequency of executions of the second application. As another example, the arrangement of the widget of the second application and the first executable object may be established according to which one of the first application and the second application has been most recently executed. As another example, the arrangement of the widget of the second application and the first executable object may be set based on or according to the local time of the area where the electronic device 2210 is located and/or the use history by the user of the electronic device 2210. For another example, the arrangement of the widget of the second application and the first executable object may be set differently depending on where the electronic device 2210 is located. However, it is not limited thereto.

For example, the arrangement of the widget of the second application and the first executable object may be made of a first arrangement in which the direction from the widget of the second application to the first executable object is of a first direction, or a second arrangement in which the direction from the widget of the second application to the first executable object is of a second direction opposite to the first direction.

For example, referring then to FIG. 27, in a state 2700, the arrangement of the widget 2312 of the second application and the first executable object 2314 may be of the first arrangement, of which direction from the widget 2312 of the second application to the first executable object 2314 is the first direction.

For another example, referring again to FIG. 27, in a state 2720, the arrangement of the widget 2312 of the second application and the first executable object 2314 may be of the second arrangement, of which direction from the widget 2312 of the second application to the first executable object 2314 is the second direction.

In an operation 2604, the processor 2230 may receive a user input 2702 dragging the widget of the second application in the first direction while displaying the widget of the second application and the first executable object in the second partial area. For example, referring to FIG. 27, in the state 2700, the processor 2230 may receive the user input 2702 dragging the widget 2312 of the second application in the first direction, while displaying the widget 2312 of the second application and the first executable object 2314 within the second partial area 2304. For example, user input 2702 may be initiated from the first executable element 2312-1 and/or may be initiated from the second executable element 2312-2. As another example, referring again to FIG. 27, in the state 2720, the processor 2230 may receive a user input 2722 dragging the widget 2312 of the second application in the first direction, while displaying the widget 2312 of the second application and the first executable object 2314 within the second partial area 2304. For example, the user input 2722 may be initiated from the first executable element 2312-1 and/or may be initiated from the second executable element 2312-2.

In an operation 2606, the processor 2230 may switch the widget of the second application displayed within the second partial area to an extended widget of the second application, in response to receiving the user input dragging the widget of the second application displayed in the second partial area in the first direction. In various embodiments, the amount of information provided through the extended widget of the second application may be greater than or equal to the amount of information provided through the widget of the second application. In various embodiments, the number of executable elements included in the extended widget of the second application may be greater than or equal to the number of executable elements included in the widget of the second application. In various embodiments, the size of each of the executable elements included in the extended widget of the second application may be larger than or equal to the size of each of the executable elements included in the widget of the second application. However, it is not limited thereto.

For example, referring to FIG. 27, the processor 2230 may switch the state 2700 to a state 2710 in response to receiving the user input 2702. In the state 2710, the processor 2230 may display an extended widget 2712 of the second application that has been switched from the widget 2312 of the second application. The extended widget 2712 of the second application may include a larger number of executable elements than the number of executable elements included in the widget 2312 of the second application. For example, the extended widget 2712 of the second application may include an executable element for replaying a music being played through the second application from the beginning or for playing a previous music of the song being played through the second application, an executable element for pausing the music being played through the second application, and an executable element for playing a next music of the song being played through the second application.

In various embodiments, the length of the extended widget 2712 of the second application may be changed according to the length of the drag path of the user input 2702. For example, when the length of the drag path of the user input 2702 is of a first length, the length of the extended widget 2712 of the second application may have a third length, and the length of the drag path of the user input 2702 is of a second length longer than the first length, the length of the extended widget 2712 of the second application may have a fourth length longer than the third length. The extended widget 2712 of the second application having the fourth length may include either a larger amount of information or a larger number of executable elements than the extended widget 2712 of the second application having the third length, although it is not limited thereto.

On the other hand, the first executable object 2314 disposed on the right side of the widget 2312 of the second application may move according to switching from the widget 2312 of the second application to the extended widget 2712 of the second application. For example, the distance between the first executable object 2314 and a left edge or a left periphery of the second partial area 2304 in the state 2700 may be shorter than the distance between the first executable object 2314 and the left edge of the second partial area 2304 in the state 2710.

As another example, referring again to FIG. 27, the processor 2230 may switch the state 2720 to the state 2730 in response to receiving the user input 2722. In the state 2720, the display position of the first executable object 2314 disposed on the left side of the widget 2312 of the second application may be maintained independently of the switching from the widget 2312 of the second application to the extended widget 2712 of the second application. For example, the distance between the first executable object 2314 and the left edge of the second partial area 2304 in the state 2720 may be the same as the distance between the first executable object 2314 and the left edge of the second partial area 2305 in the state 2730.

As described above, the electronic device 2210 according to various embodiments makes it possible to switch the widget of the application to the extended widget of the application based on the user input for the widget of the application in execution, so as to provide an interface for controlling the application without the need to switch into the execution screen of another application displayed within the first partial area. Therefore, the electronic device 2210 according to various embodiments enables its user to enjoy more enhanced user experience thanks to providing such a convenient interface.

Figure 28:
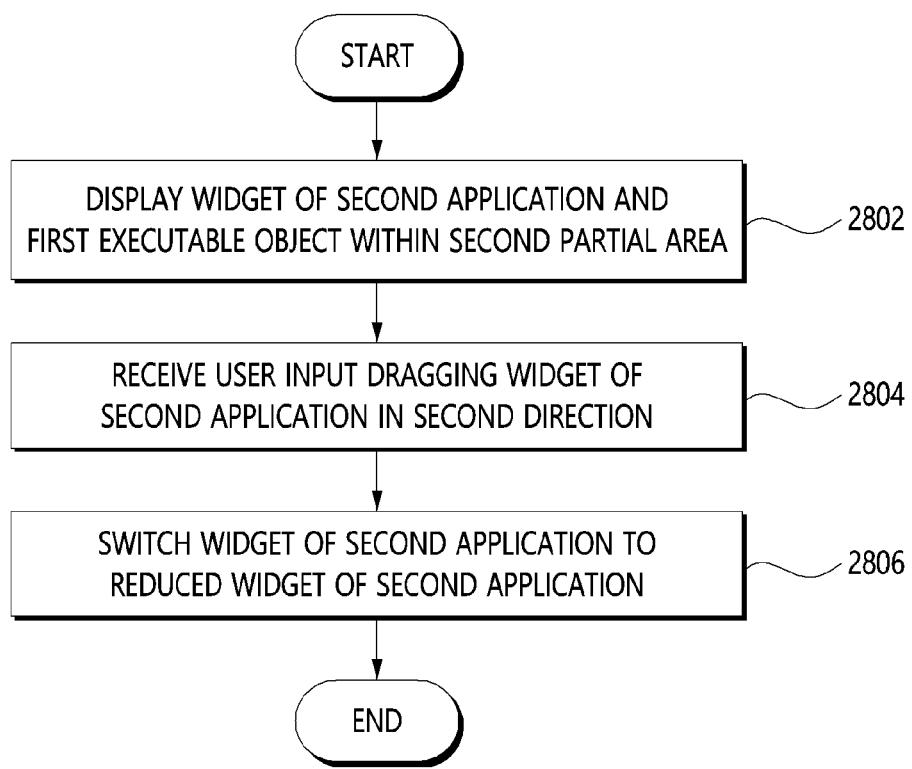
FIG. 28 illustrates a flowchart for an operating method of an electronic device for converting a widget displayed on a display into a reduced widget according to various embodiments.

FIG. 28 illustrate a flowchart for a method of the electronic device switching a widget displayed on a display to its reduced widget, according to various embodiments. This method may be executed in the infotainment apparatus 100, the control device 2100 or the electronic device 2210, or may be executed in the processor 2230.

Figure 29:
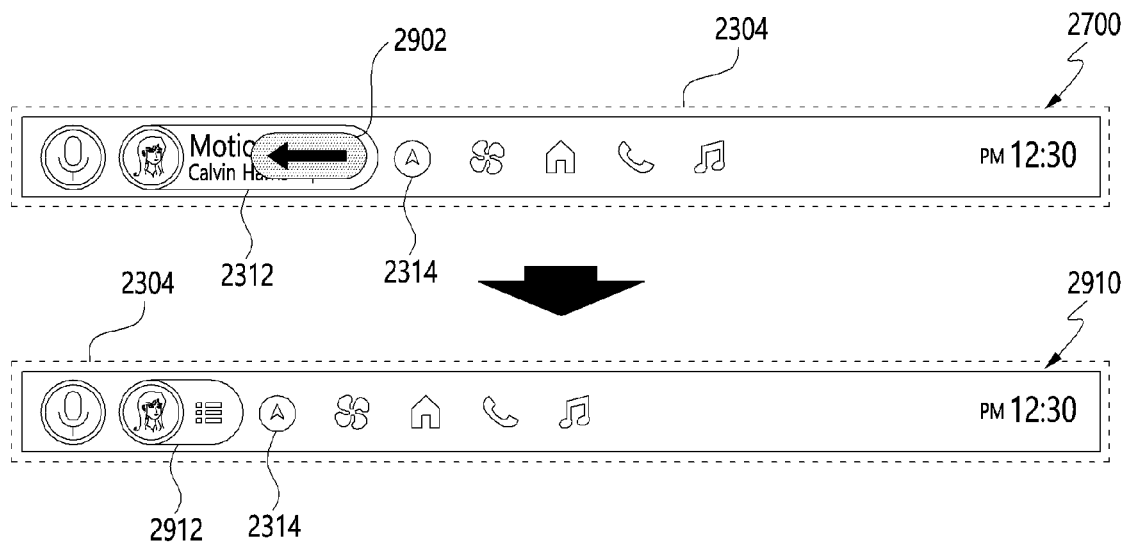
FIG. 29 illustrates an example of converting a widget of an application into a reduced widget of the application according to various embodiments.
Figure 29:
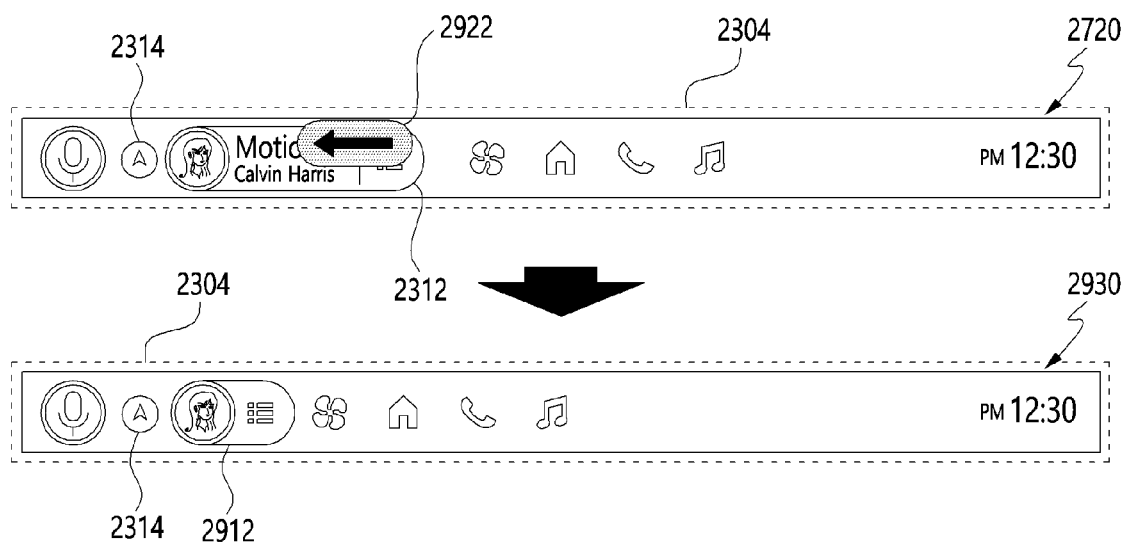

FIG. 29 illustrates an example of switching a widget of an application to a reduced widget of the application according to various embodiments.

Referring first to FIG. 28, in an operation 2802, the processor 2230 may display the widget of the second application and the first executable object within the second partial area.

In various embodiments, the arrangement of the widget of the second application and the first executable object displayed in the second partial area may be set in various ways. For example, the arrangement of the widget of the second application and the first executable object may be determined by various methods as defined through the description of FIG. 26.

For example, the arrangement of the widget of the second application and the first executable object may be made of a first arrangement in which the direction from the widget of the second application to the first executable object is of a first direction, or a second arrangement in which a direction from the widget of the second application to the first executable object is of a second direction opposite to the first direction.

For example, referring then to FIG. 29, as in a state 2700, the arrangement of the widget 2312 of the second application and the first executable object 2314 may be the first arrangement, of which direction from the widget 2312 of the second application to the first executable object 2314 is the first direction.

For another example, referring to FIG. 29, as in a state 2720, the arrangement of the widget 2312 of the second application and the first executable object 2314 may be the second arrangement, of which direction from the widget 2312 of the second application to the first executable object 2314 is the second direction.

In an operation 2804, the processor 2230 may receive a user input dragging the widget of the second application in the second direction, while displaying the widget of the second application and the first executable object within the second partial area. For example, referring to FIG. 29, in the state 2700, the processor 2230 may receive a user input 2902 dragging the widget 2312 of the second application in the second direction, while displaying the widget 2312 of the second application and the first executable object 2314 within the second partial area 2304. For example, the user input 2902 may be initiated from a first executable element 2312-1 and may be initiated from a second executable element 2312-2. As another example, referring to FIG. 29, in a state 2720, the processor 2230 may receive a user input 2922 dragging the widget 2312 of the second application in the second direction, while displaying the widget 2312 of the second application and the first executable object 2314 within the second partial area 2304. For example, the user input 2922 may be initiated from the first executable element 2312-1 and may be initiated from the second executable element 2312-2.

In an operation 2806, the processor 2230 may switch the widget of the second application displayed within the second partial area to the reduced widget of the second application, in response to receiving the user input dragging the widget of the second application displayed in the second partial area in the second direction. In various embodiments, the amount of information provided through the reduced widget of the second application may be less than or equal to the amount of information provided through the widget of the second application. In various embodiments, the number of executable elements included in the reduced widget of the second application may be less than or equal to the number of executable elements included in the widget of the second application. In various embodiments, the size of each of the executable elements included in the reduced widget of the second application may be less than or equal to the size of each of the executable elements included in the widget of the second application, although it is not limited thereto.

In various embodiments, since the reduced widget of the second application has a shorter length than the widget of the second application, the second partial area may provide more additional information than when including the widget of the second application, while including the reduced widget of the second application. Although not shown in FIG. 29, it is note that when the second partial area includes the reduced widget of the second application, the second partial area may further provide information or an executable object not provided when the second partial area includes the widget of the second application, but it is not limited thereto.

For example, referring to FIG. 29, the processor 2230 may switch the state 2700 to a state 2910 in response to receiving the user input 2902. In the state 2910, the processor 2230 may display the reduced widget 2912 of the second application switched from the widget 2312 of the second application. The reduced widget 2912 of the second application may provide a less amount of information than the widget 2312 of the second application. For example, the reduced widget 2912 of the second application may not include information on a song being played, included in the widget 2312 of the second application.

In various embodiments, the length of the reduced widget 2912 of the second application may be changed according to the length of the drag path of the user input 2902. For example, when the length of the drag path of the user input 2902 is a first length, the length of the reduced widget 2912 of the second application has a third length, while when the length of the drag path of the user input 2902 is a second length longer than the first length, the length of the reduced widget 2912 of the second application may have a fourth length shorter than the third length. The reduced widget 2912 of the second application having the fourth length may include less information or a smaller number of executable elements than the reduced widget 2912 of the second application having the third length, although it is not limited thereto. According to embodiments, when the length of the drag path of the user input 2902 becomes shorter than a specified length, the widget 2312 of the second application may switch to the second executable object 2414. When the widget 2312 of the second application switches to the second executable object 2414, the processor 2230 may stop executing the second application. However, it is not limited thereto.

Meanwhile, the first executable object 2314 disposed on the right side of the widget 2312 of the second application may be moved according to the switching from the widget 2312 of the second application to the reduced widget 2912 of the second application. For example, the distance between the first executable object 2314 and the left edge or a left periphery of the second partial area 2304 in state 2700 may be longer than the distance between the first executable object 2314 and the left edge of the second partial area 2304.

For another example, referring again to FIG. 29, the processor 2230 may switch the state 2720 to a state 2930 in response to receiving the user input 2922. In the state 2720, the display position of the first executable object 2314 disposed on the left side of the widget 2312 of the second application may be maintained independently of the switching from the widget 2312 of the second application to the reduced widget 2912 of the second application. For example, the distance between the first executable object 2314 and the left edge of the second partial area 2304 in the state 2720 may be the same as the distance between the first executable object 2314 and the left edge of the second partial area 2304 in the state 2930.

FIGS. 28 and 29 illustrate an example in which the widget of the second application switches to the reduced widget of the second application, but it is noted that this is merely for convenience of description. The method defined through the description of FIGS. 28 and 29 may be used to reduce the extended widget of the second application defined through the description of FIGS. 26 and 27.

As described above, the electronic device 2210 according to various embodiments makes it possible to switch the widget of the application to the reduced widget of the application based on a user input to the widget of the application in execution, so as to provide an interface for providing additional information within the second partial area. The electronic device 2210 according to various embodiments can provide its user with more enhanced user experience, thanks to providing such an interface.

Figure 30:
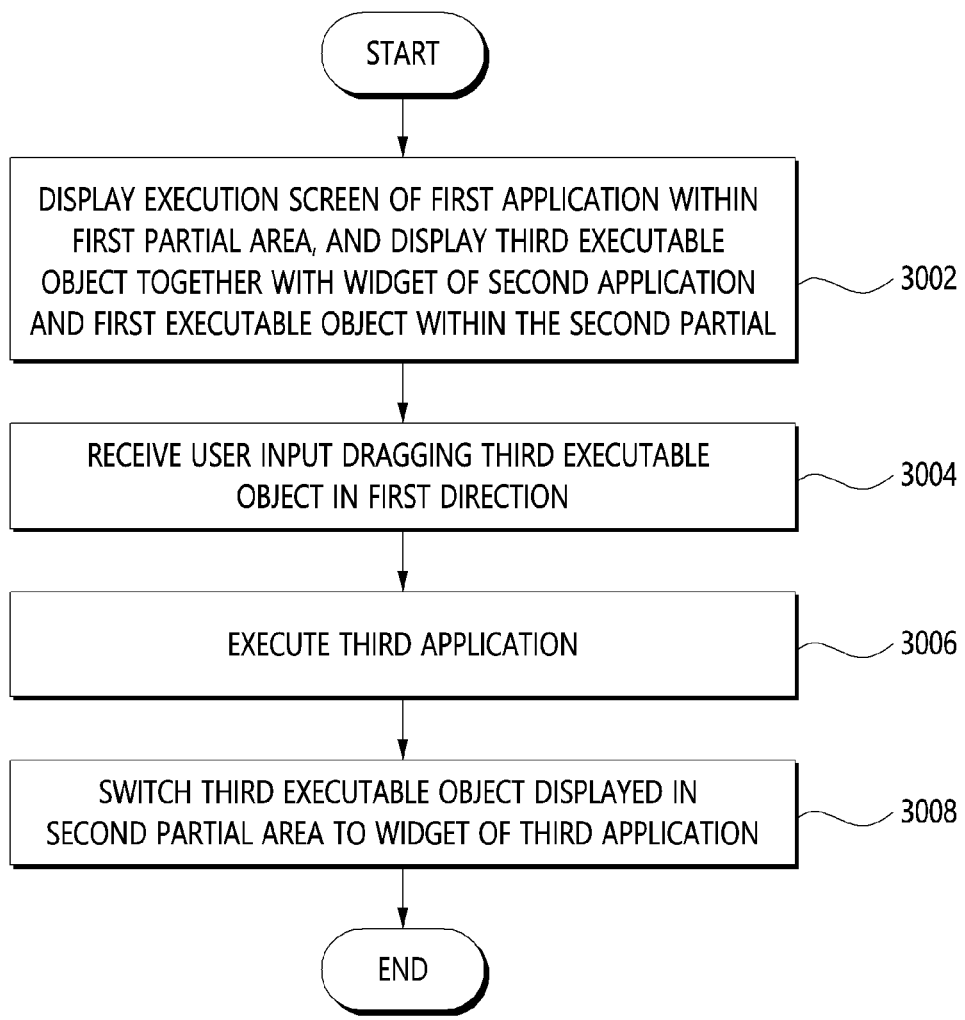
FIG. 30 illustrates a flowchart for an operating method of an electronic device for converting an executable object displayed on a display into a widget of an application, according to various embodiments.

FIG. 30 illustrates a flowchart for a method of the electronic device switching an executable object displayed on a display into a widget, according to various embodiments. This method may be executed by the infotainment device 100, the control device 2100 or the electronic device 2210, or may be executed by the processor 2230.

Figure 31:
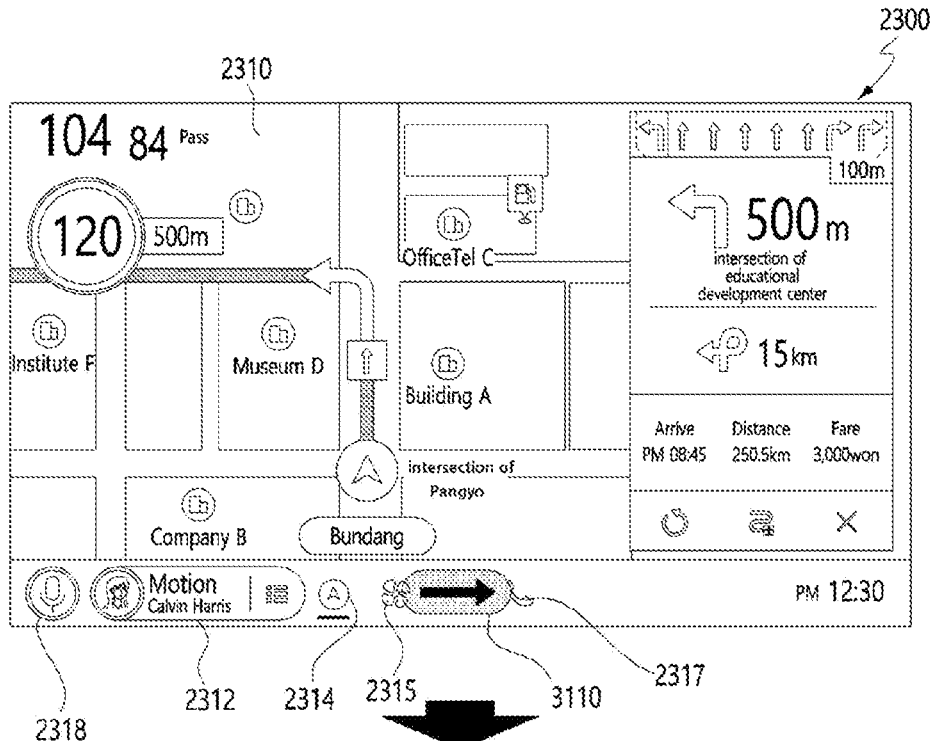
FIG. 31 illustrates an example of converting an executable object into a widget of an application according to various embodiments.
Figure 31:
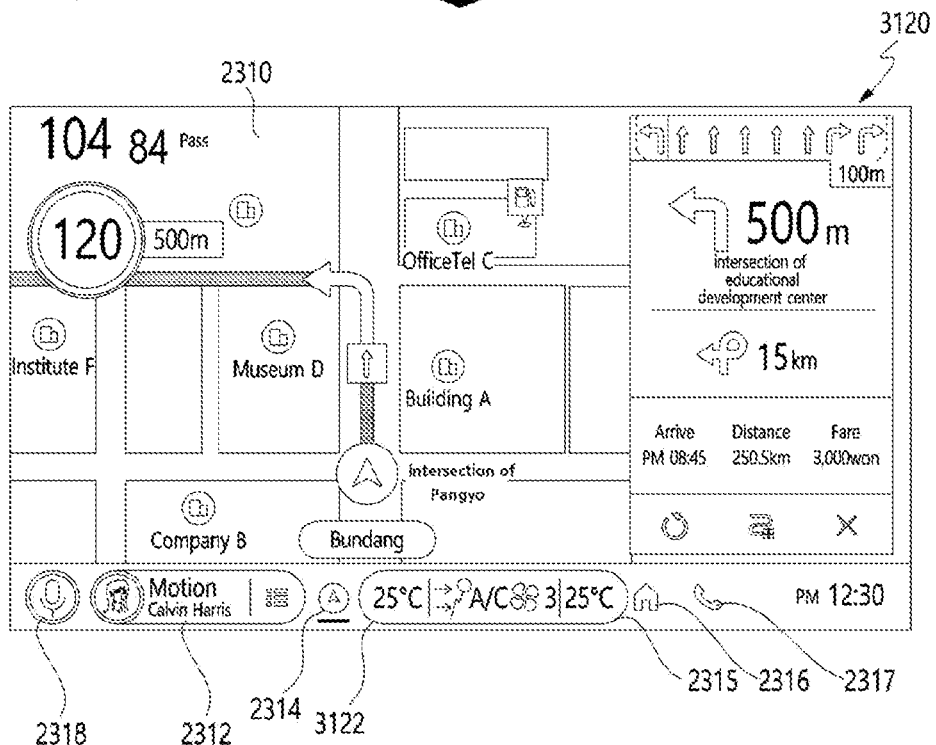

FIG. 31 shows an example of switching an executable object into a widget of an application according to various embodiments.

Referring now to FIG. 30, in an operation 3002, the processor 2230 may display the execution screen of the first application within the first partial area, and display a third executable object to indicate a third application together with the widget of the second application and the first executable object within the second partial area. For example, referring then to FIG. 31, the processor 2230, as seen in the state 2300, may display the execution screen 2310 of the first application in the first partial area 2302 and display the third executable object 2315 together with the widget 2312 of the second application and the first executable object 2314.

In an operation 3004, the processor 2230 may receive a user input 3110 dragging the third executable object in the first direction, while displaying the execution screen of the first application in the first partial area and displaying the third executable object together with the widget of the second application and the first executable object within the second partial area. For example, referring then to FIG. 31, the processor 2230 may receive the user input 3110 in the state 2300.

In an operation 3006, the processor 2230 may execute the third application in response to receiving the user input. For example, the third application may be an application installed in the electronic device 2210. As another example, the third application may be an application installed in another electronic device distinguished from the electronic device 2210 (e.g., the electronic device 2220 or another electronic device located in the vehicle as distinct from the electronic device 2220), although not limited thereto.

In an operation 3008, the processor 2230 may switch the third executable object displayed in the second partial area into the widget of the third application in response to the execution of the third application.

Meanwhile, the processor 2230 may maintain displaying the execution screen of the first application in the first partial area displaying the widget of the second application and the first executable object within the second partial area, independently of receiving of the user input and execution of the third application. For example, the third application may be executed based on the user input received in the operation 3004 as well as another user input to the third executable object. For example, the third application may be executed based on a single tap input to the third executable object. The processor 2230 may execute the third application in response to receiving the single tap input to the third executable object, and switch the execution screen of the first application displayed in the first partial area to the execution screen of the third application in response to the execution of the third application and switch the first executable object displayed in the second partial area to the widget of the first application. In other words, based on the user input in the operation 3004 distinguished from the other user input, the processor 2230 may maintain displaying the execution screen of the first application in the first partial area and displaying the first executable object within the second partial area, instead of switching the execution screen of the first application displayed in the first partial area into the execution screen of the third application and switching the first executable object displayed in the second partial area into the widget of the first application.

For example, referring again to FIG. 31, the processor 2230 may switch the state 2300 to a state 3120, in response to execution of the third application caused by the user input 3110. In the state 3120, the processor 2230 may switch the third executable object 2315 displayed in the second partial area 2304 to the widget 3122 of the third application. In the state 3120, the processor 2230 may maintain displaying the execution screen 2310 of the first application within the first partial area 2302 and maintain displaying the widget 2312 of the second application and the first executable object 2314 within the second partial area 2304, independently of the switching from the state 2300 to the state 3120.

In various embodiments, the widget 3122 of the third application may include a visual object for selecting a target temperature around the driver's seat inside the vehicle, a visual object for selecting an interior wind direction, a visual object to select whether to activate the air conditioning, a visual object for selecting an air-blowing amount, and a visual object for selecting a target temperature around a passenger seat in the vehicle. In various embodiments, in the widget 3122 of the third application, each of the visual object for selecting a target temperature around the driver's seat inside the vehicle, the visual object for selecting an interior wind direction, the visual object to select whether to activate the air conditioning, the visual object for selecting an air-blowing amount, and the visual object for selecting a target temperature around a passenger seat in the vehicle may be formed of an executable object, although it is not limited thereto.

As seen from the foregoing description, the electronic device 2210 according to various embodiments can establish user inputs for executing an application in various types, so that it can selectively provide either one of switching the execution screen displayed in the first partial area, or maintaining the execution screen displayed in the first partial area and switching the executable object displayed in the second partial area to the widget, other than switching the execution screen. Thus, the electronic device 2210 according to various embodiments can provide its user with more enhanced user experience owing to such a selective provision of the switching operation.

Figure 32:
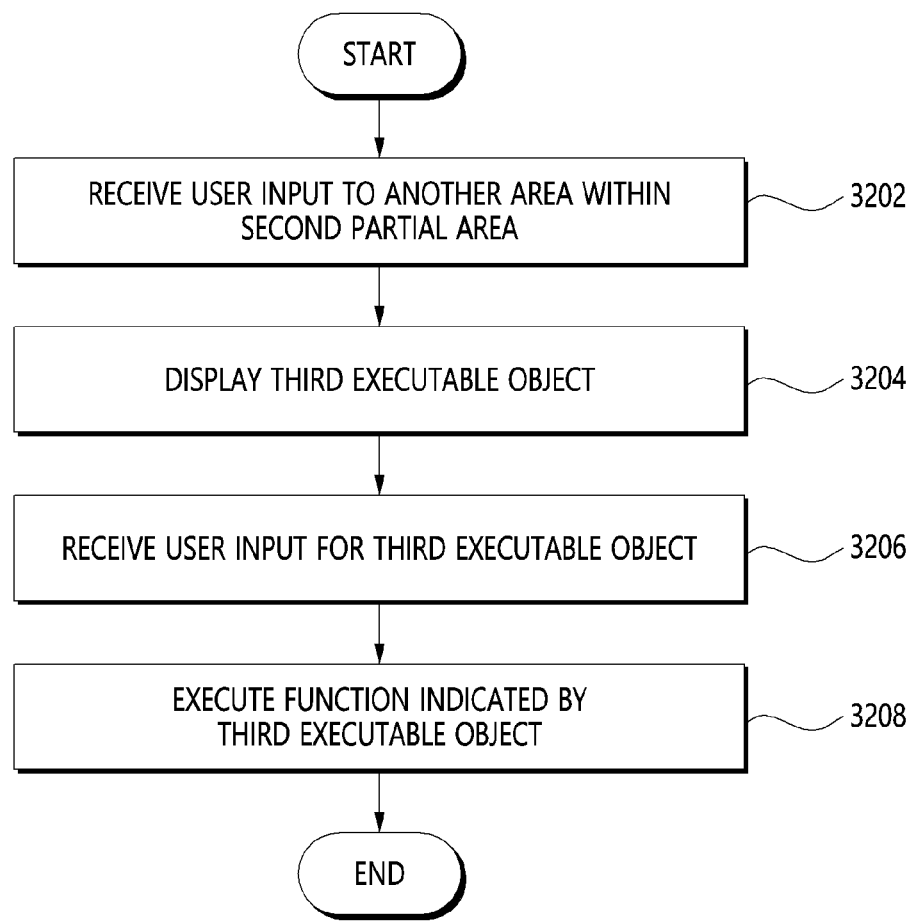
FIG. 32 illustrates a flowchart for an operating method of an electronic device that provides a service based on a user input for an empty space in a second partial area, according to various embodiments.

FIG. 32 illustrates a flowchart for a method of the electronic device for providing a functional service based on a user input to an empty space of the second partial area, according to various embodiments. This method may be executed by the infotainment device 100, the control device 2100 or the electronic device 2210, or may be executed by the processor 2230.

Figure 33:
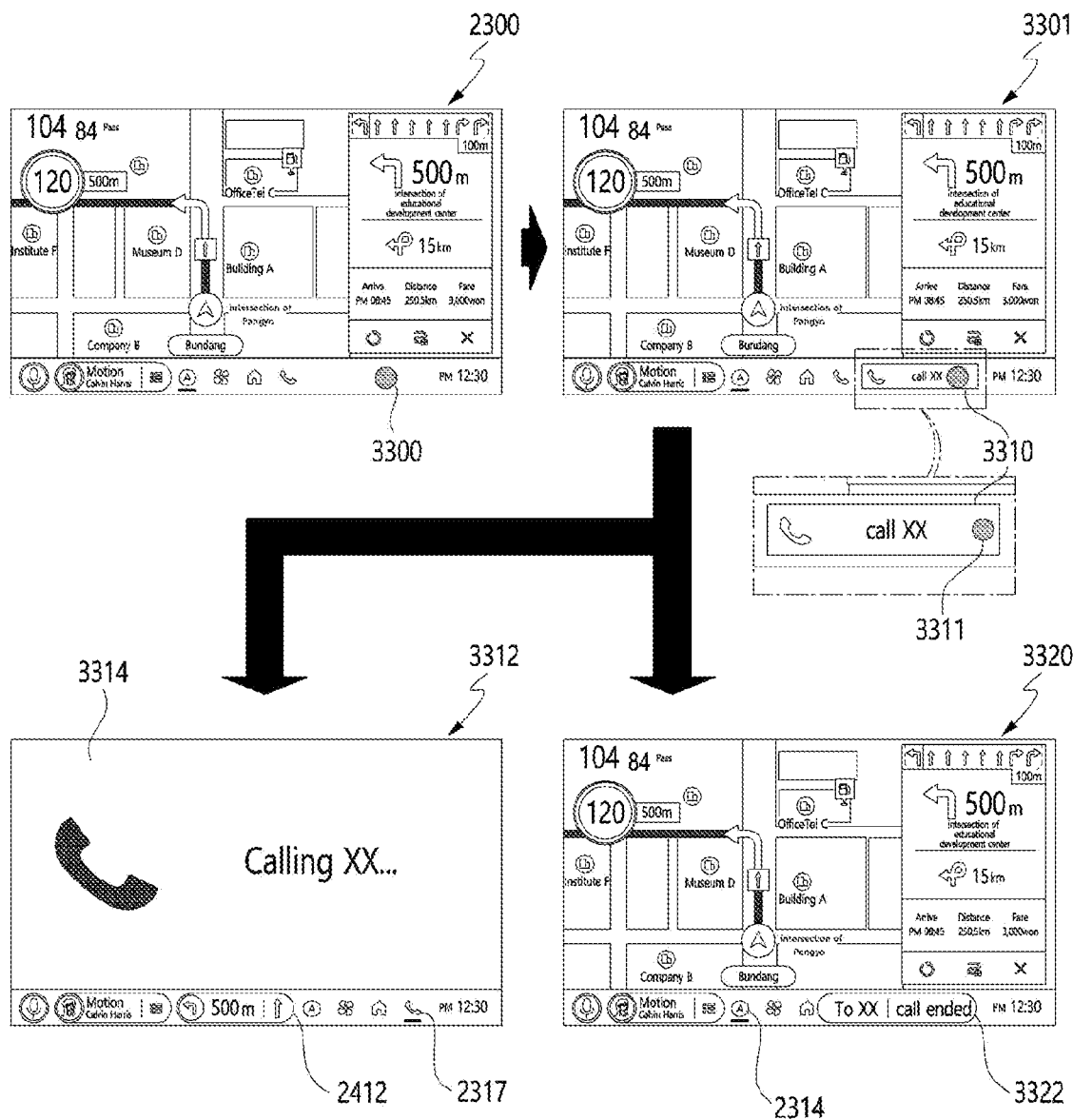
FIG. 33 illustrates an example of displaying an executable object based on a user input for an empty space in a second partial area and executing a function indicated by the executable object, according to various embodiments.

FIG. 33 illustrates an example of displaying an executable object and executing a particular function indicated by the executable object, based on the user input to the empty space of the second partial area according to various embodiments.

Referring now to FIG. 32, in an operation 3202, the processor 2230 may receive a user input to another area within the second partial area that is distinct from the display area of the widget of the second application and the display area of the first executable object. For example, the other area within the second partial area may be an area within the second partial area that is not occupied by the widget of the second application and the first executable object. For example, referring then to FIG. 33, in the state 2300, the processor 2230 may receive an user input 3300 to the empty space of the second partial area 2304 (e.g., another area within the second partial area) displaying the widget of the second application and the first executable object.

In an operation 3204, the processor 2230 may display, in response to receiving the user input, the third executable object to indicate a function distinguished from the functions available through the first application and the second application, together with the widget of the second application and the first executable object within the second partial area. For example, the function indicated by the third executable object may be the function most recently served in the electronic device 2210 among a plurality of functions, which is available through the electronic device 2210 and distinguished from the functions available through the first application and the second application. As another example, the function indicated by the third executable object may be the function most frequently served in the electronic device 2210 among the plurality of functions, which is available through the electronic device 2210 and distinguished from the functions available through the first application and the second application. However, it is not limited thereto.

In various embodiments, the third executable object may be displayed at a location within the second partial area that received the user input in an operation 3202. For example, referring again to FIG. 33, the processor 2230 may switch the state 2300 to a state 3301 in response to receiving a user input 3300. In the state 3301, the processor 2230 may additionally display the third executable object 3310 within the second partial area 2304. For example, the third executable object 3310 may be displayed at a location within the second partial area at which the user input 3300 was received. As another example, the third executable object 3310 may be displayed in an empty space within the second partial area 2304, although it is not limited thereto.

In various embodiments, the third executable object 3310 may include information (e.g., "call XX") for guiding the function executed through the third executable object 3310.

In an operation 3206, the processor 2230 may receive a user input to the third executable object displayed within the second partial area. For example, referring to FIG. 33, the processor 2230 may receive a user input 3311 in the state 3301.

In an operation 3208, in response to receiving the user input in the operation 3206, the processor 2230 may execute the function indicated by the third executable object.

For example, referring again to FIG. 33, in response to receiving the user input 3311 in the state 3301, the processor 2230 may perform a call application to provide the function executed through the third executable object 3310, and switch the state 3301 to a state 3312. In the state 3312, the processor 2230 may display the execution screen 3314 of the third application (e.g., the call application) that has been switched from the execution screen 2310 of the first application within the first partial area 2302. In the state 3312, the processor 2230 may display the widget 2412 of the first application switched from the first executable object 2314 within the second partial area 2304. The switching from the first executable object 2314 to the widget 2412 of the first application may be executed based on the switching from the execution screen 2310 of the first application to the execution screen 3314 of the third application. In the state 3312, the processor 2230 may keep displaying the widget 2312 of the second application within the second partial area 2304. In the state 3312, the processor 2230 may stop displaying the third executable object 3310 within the second partial area 2304.

As another example, referring to FIG. 33, the processor 2230, in response to receiving the user input 3311 in the state 3301, may execute the call application to provide the function executed through the third executable object 3310, and switching the state 3301 to a state 3320. In the state 3320, the processor 2230 may keep displaying the execution screen 2310 of the first application within the first partial area 2302. In the state 3320, the processor 2230 may keep displaying the widget 2312 of the second application in the second partial area 2304. In the state 3320, the processor 2230 may display the widget 3322 of the third application switched from the executable object 2317 for indicating the third application within the second partial area 2304. The switching from the executable object 2317 to the widget 3322 of the third application may be executed based on the execution of the third application. The widget 3322 of the third application switched from the executable object 2317 may include a first executable element for indicating that an outgoing call to XX is being executed and a second executable element for stopping the execution of the outgoing call to XX. In various embodiments, processor 2230 may switch the state 3320 to the state 3312 based on receiving a user input for the first executable element. In various embodiments, the processor 2230 may stop executing the outgoing call to XX, based on receiving a user input to the second executable element. Further, in the state 3320, the processor 2230 may stop displaying the third executable object 3310 within the second partial area 2304.

In various embodiments, the processor 2230 may selectively provide both the switching from the state 3301 to the state 3312 and the switching from the state 3301 to the state 3320, or either one of the switching from the state 3301 to the state 3312 and the switching from the state 3301 to the state 3320. For example, if there is one user input defined in the electronic device 2210 to execute the function indicated by the third executable object 3310, then the processor 2230 may provide any one of the switching from the state 3301 to the state 3312 and the switching from the state 3301 to the state 3320. As another example, when there are two or more user inputs defined in the electronic device 2210 to execute the function indicated by the third executable object 3310, the processor 2230 may provide both the switching from the state 3301 to the state 3312 and the switching from the state 3301 to the state 3320. For example, if the attribute of the user input 3311 is a first attribute, the processor 2230 may execute the switching from the state 3301 to the state 3312, while if the attribute of the user input 3311 is a second distinct from the first attribute, then it may execute the switching from the state 3301 to the state 3320.

As described above, the electronic device 2210 according to various embodiments can, based on receiving a user input to an empty space of the second partial area, display an executable object for executing another function distinct from at least one function available through at least one application being executed, and execute the other function based on receiving a user input to the executable object. The electronic device 2210 according to various embodiments can simplify the user input for executing the other function provided through the executable object, by means of displaying of such an executable object and execution of the other function. In other words, the electronic device 2210 according to various embodiments can provide its user with more enhanced user experience.

Figure 34:
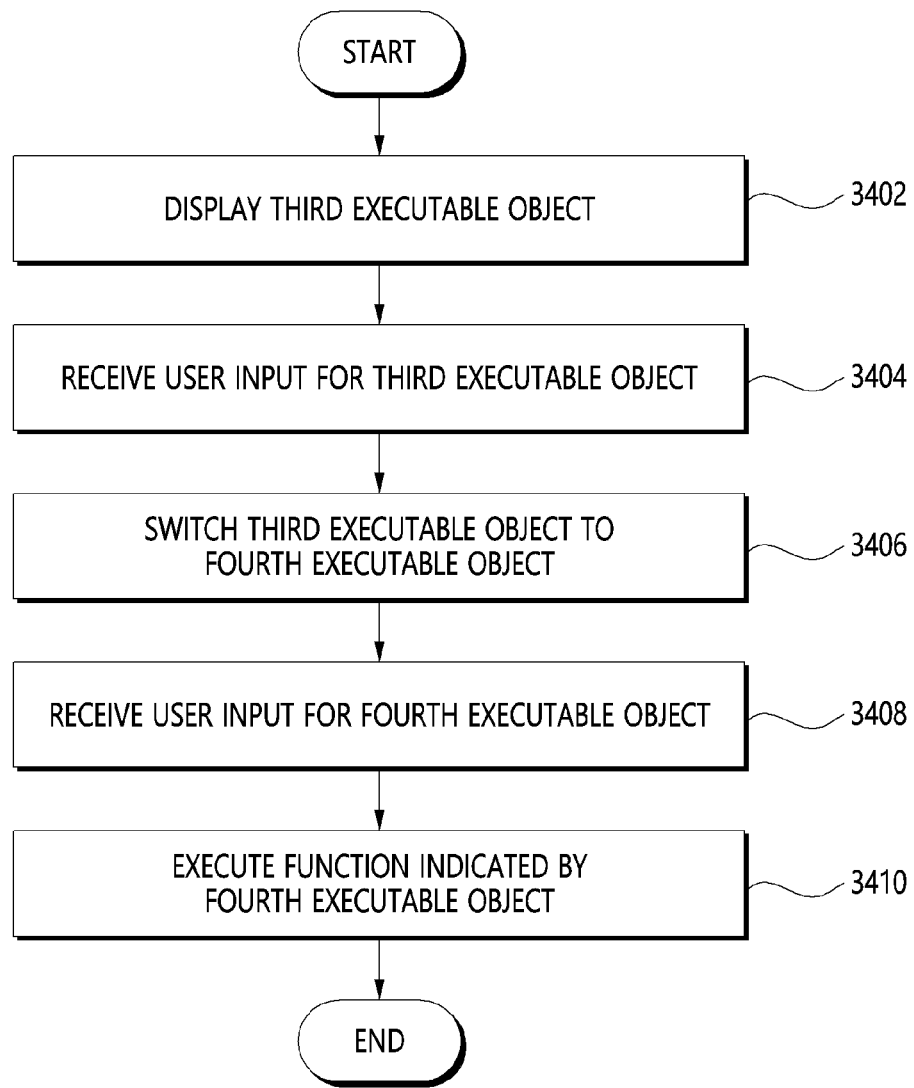
FIG. 34 illustrates a flowchart for an operating method of an electronic device for converting a third executable object defined in the description of FIGS. 32 and 33 into a fourth executable object, according to various embodiments.

FIG. 34 illustrates a flowchart for a method of the electronic device for switching the third executable object defined through the description of FIGS. 32 and 33 into a fourth executable object, according to various embodiments. This method may be executed by the infotainment device 100, the control device 2100 or the electronic device 2210, or may be executed by the processor 2230.

Figure 35:
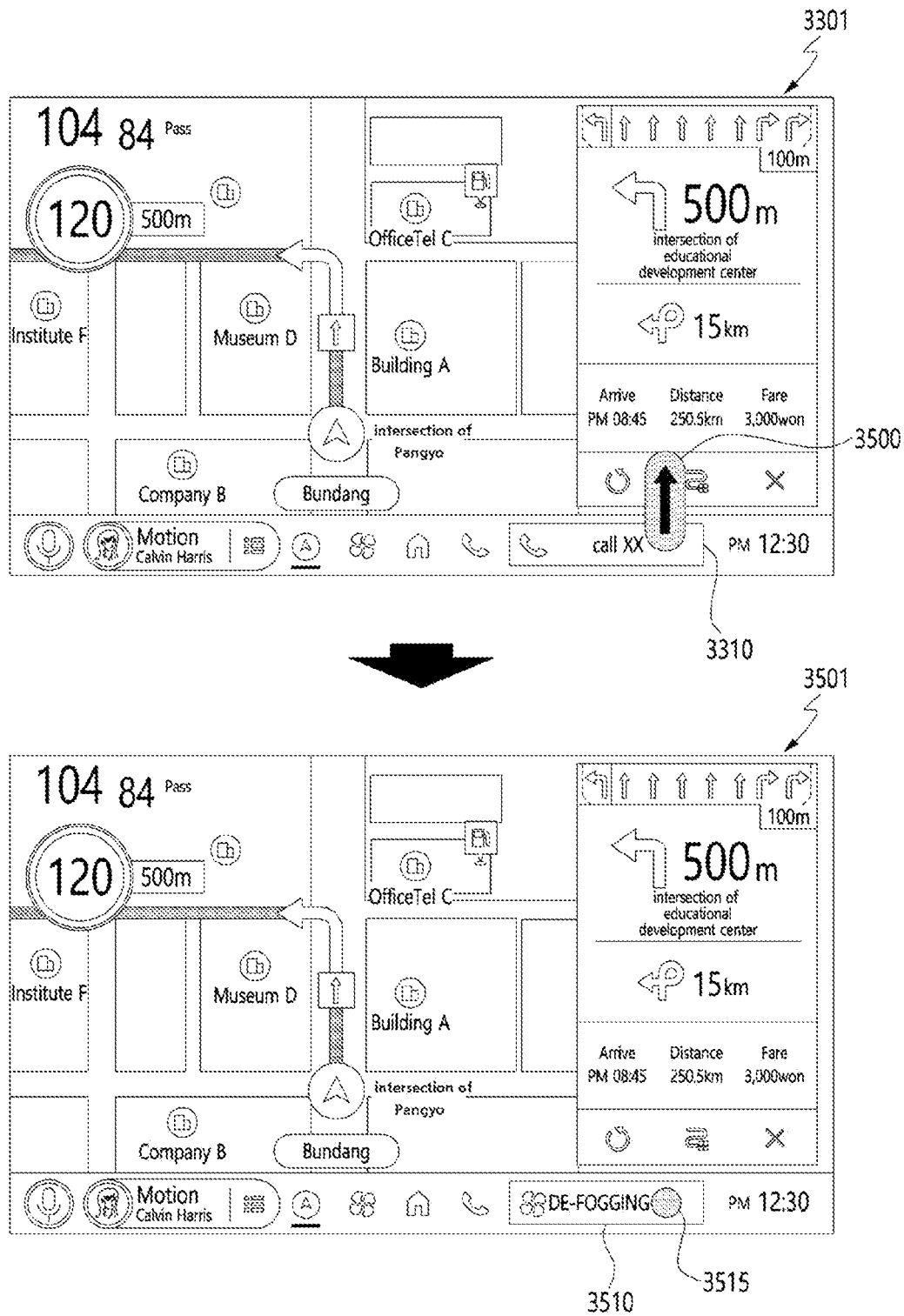
FIG. 35 illustrates an example of converting a third executable object defined in the description of FIGS. 32 and 33 into a fourth executable object according to various embodiments.

FIG. 35 illustrates an example of switching the third executable object defined through the description of FIGS. 32 and 33 into the fourth executable object, according to various embodiments.

Referring now to FIG. 34, in an operation 3402, the processor 2230 may display the third executable object defined through the descriptions of FIGS. 32 and 33 within the second partial area. For example, referring then to FIG. 35, in a state 3301, the processor 2230 may display the execution screen 2310 of the first application within the first partial area 2302 and then display the widget 2312 of the second application, the first executable object 2314, and the third executable object 3310 within the second partial area 2304.

In an operation 3404, the processor 2230 may receive a user input to the third executable object displayed within the second partial area. The user input received in the operation 3404 may be distinguished from the user input received in an operation 3206. For example, the user input received in the operation 3206 may be a single tap input to the third executable object, and the user input received in the operation 3404 may be a drag input to the third executable object. For example, referring to FIG. 35, the processor 2230 may receive a user input 3500 to the third executable object 3310 in a state 3301. In various embodiments, when the user input 3500 is a drag input, a dragging direction of the drag input 3500 may be variously set. For example, the user input 3500 may be a drag input of dragging the third executable object 3310 toward the execution screen 2310 of the first application, as in the state 3301. For another example, unlike the state 3301, a user input 3500 may be an input of dragging the third executable object 3310 to the right, although it is not limited thereto.

In an operation 3406, the processor 2230 may switch the third executable object into a fourth executable object in response to receiving the user input in an operation 3404. In various embodiments, the fourth executable object may be used to indicate a function that is distinguished from the functions available through the first application, the second application and the third executable object. For example, the function indicated by the fourth executable object may be a function most recently provided through the electronic device 2210 among a plurality of functions, which are available through the electronic device 2210 and distinguished form the functions available through the first application, the second application and the third executable object. For another example, the function indicated by the fourth executable object may be a function most frequently provided through the electronic device 2210 among the plurality of functions, which are available through the electronic device 2210 and distinguished form the functions available through the first application, the second application and the third executable object.

In various embodiments, the fourth executable object may be displayed in an area corresponding to the area displaying the third executable object. For example, referring again to FIG. 35, the processor 2230 may switch the state 3301 to a state 3501 in response to receiving the user input 3500. In the state 3501, the processor 2230 may display the fourth executable object 3510 switched from the third executable object 3310 within the second partial area 2304.

In various embodiments, the fourth executable object 3510 may include information for guiding the function executed through the fourth executable object 3510 (e.g., removing window-fogging in the vehicle).

In an operation 3408, the processor 2230 may receive the user input to the fourth executable object displayed in the second partial area. For example, referring to FIG. 35, the processor 2230 may receive a user input 3515 in the state 3501.

In an operation 3410, the processor 2230 may execute the function indicated by the fourth executable object in response to receiving the user input in the operation 3408. For example, referring to FIG. 35, the processor 2230 may use an air conditioning device to perform the function to remove window-fogging within the vehicle, in response to receiving the user input 3515 to the fourth executable object 3510.

Although not shown in FIG. 35, in some embodiments, the processor 2230 may, in response to receiving the user input 3515 to the fourth executable object 3510, switch the execution screen 2310 of the first application displayed within the first partial area 2302 to the execution screen of the application for de-fogging a window in the vehicle, and stop displaying the fourth executable object 3510 within the second partial area 2304. Although not shown in FIG. 35, in some other embodiments, the processor 2230 may, in response to receiving the user input 3515 to the fourth executable object 3510, switch the executable object 2315 displayed within the second partial area 2304 to a widget of the application for defogging, and stop displaying the fourth executable object 3510 within the second partial area 2304. However, it is not limited thereto.

As described above, the electronic device 2210 according to various embodiments can provide a service for converting the third executable object defined through the description of FIGS. 32 and 33 into the fourth executable object. The electronic device 2210 according to various embodiments can simplify a user input for a user to execute a function provided through the fourth executable object through provision of such a service. In other words, the electronic device 2210 according to various embodiments can provide its user with more enhanced user experience through provision of such a service.

Figure 36:
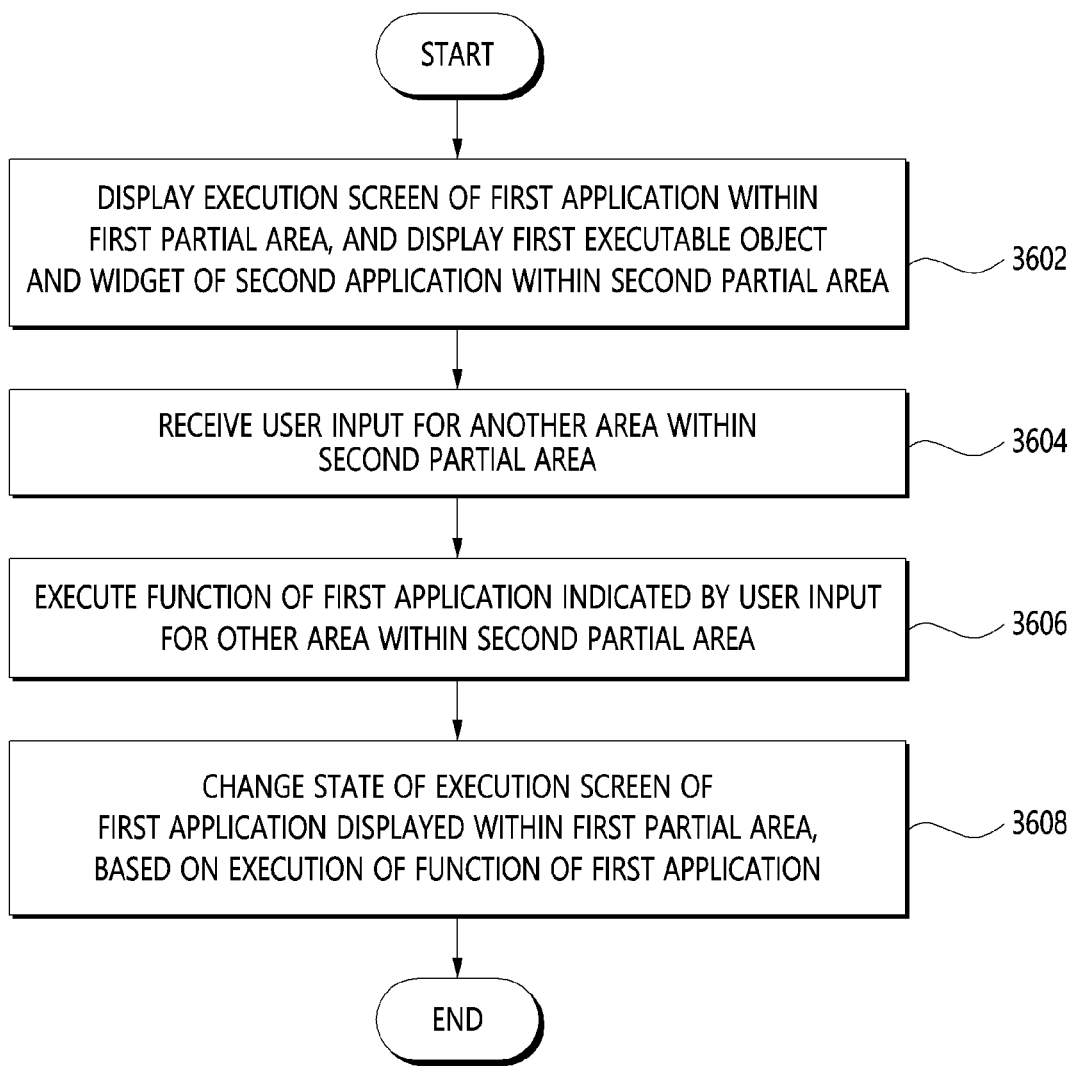
FIG. 36 illustrates a flowchart for an operating method of an electronic device that executes a function of an application providing an execution screen based on a user input for an empty space in a second partial area, according to various embodiments.

FIG. 36 illustrates a flowchart for a method of the electronic device for executing a function of an application that provides an execution screen based on a user input for an empty space in the second partial area, according to various embodiments. This method may be executed by the infotainment device 100, the control device 2100 or the electronic device 2210, or may be executed by the processor 2230.

Figure 37:
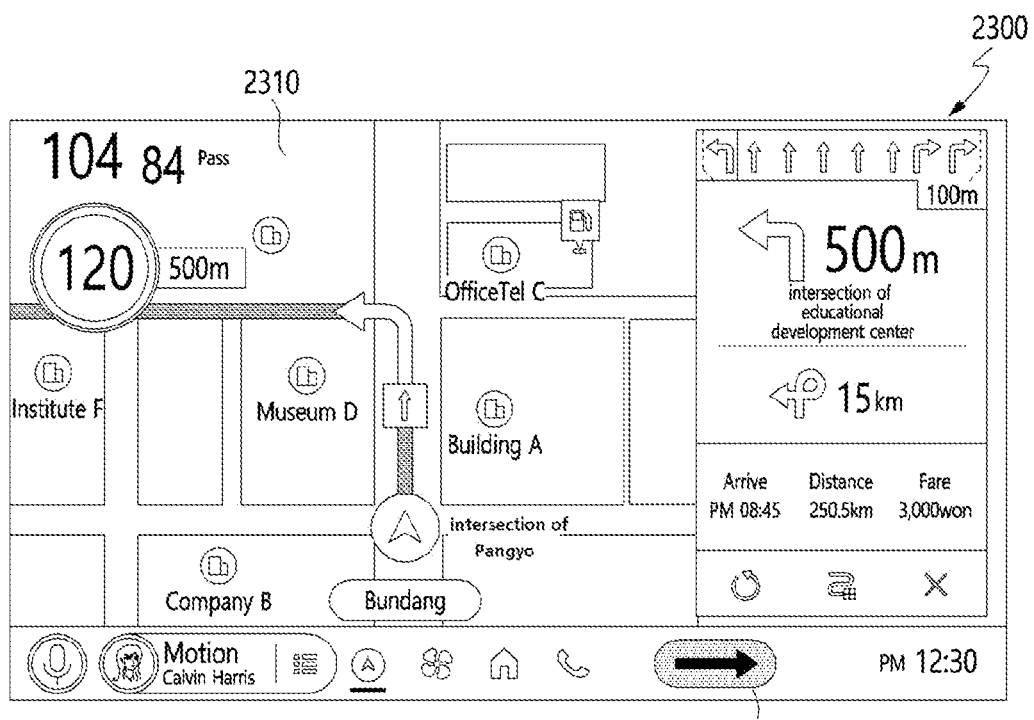
FIG. 37 illustrates an example of changing a state of an execution screen displayed within a first partial area based on a user input to an empty space in a second partial area, according to various embodiments.

FIG. 37 illustrates an example of changing a state of an execution screen displayed in the first partial area based on a user input to an empty space of the second partial area according to various embodiments.

Referring now to FIG. 36, in an operation 3602, the processor 2230 may display the execution screen of the first application within the first partial area, and display the widget of the second application and the first executable object within the second partial area. For example, referring then to FIG. 37, the processor 2230 may display the execution screen 2310 of the first application within the first partial area 2302, as in the state 2300, and display the widget 2312 of the second application and the first executable object 2314 within the second partial area 2304.

In an operation 3604, the processor 2230 may receive a user input to another area within the second partial area, which is distinct from the display area of the widget of the second application and the display area of the first executable object. For example, the other area within the second partial area may be an area that is not occupied by the widget of the second application and the first executable object within the second partial area.

For example, the user input received in the operation 3604 may be distinguished from the user input received in the operation 3202 and the user input received in an operation 3404, although it is not limited thereto.

For example, referring again to FIG. 37, the processor 2230, in the state 2300, may receive an user input 3700 to a blank space within the second partial area 2304 (e.g., other area within the second partial area) displaying the widget of the second application and the first executable object.

In an operation 3606, the processor 2230 may execute the function of the first application indicated by the user input to the other area within the second partial area, in response to receiving the user input. In various embodiments, the function of the first application indicated by the user input received in an operation the 3604 may be variously configured. For example, the function of the first application indicated by the user input received in the operation 3604 may be a function that is distinguished from functions available through the execution screen of the first application. For another example, the function of the first application indicated by the user input received in the operation 3604 may be a function most frequently provided among the functions available through the first application. For another example, the function of the first application indicated by the user input received in the operation 3604 may be a function associated with the service being provided through the first application (e.g. the function to change a route to the destination to another route). For another example, the function of the first application indicated by the user input received in the operation 3604 may be a function most recently provided among those functions available through the first application. However, it is not limited thereto.

In an operation 3608, the processor 2230 may change the state of the execution screen of the first application displayed within the first partial area, based on the execution of the function of the first application in the operation 3606. For example, referring to FIG. 37, the processor 2230 may execute the function of the first application indicated by the user input 3700, in response to receiving the user input 3700, and switch the state 2300 into a state 3701 in response to the execution of the function of the first application. In the state 3701, the processor 2230 may change a route provided in the state 2300 to another route, and then change the state of the execution screen 2310 of the first application to guide the changed other routing path. For example, in the state 3701, the processor 2230 may change the route guided within the execution screen 2310 of the first application provided in the state 2300 to the other route.

As described above, the electronic device 2210 according to various embodiments can control the application to provide the execution screen displayed within the first partial area, based on a user input to an empty space within the second partial area. The electronic device 2210 according to various embodiments enables providing such an easy control to make a user input required for the control more convenient. In other words, the electronic device 2210 according to various embodiments can provide its user with more enhanced user experience through more simplified user input.

Figure 38:
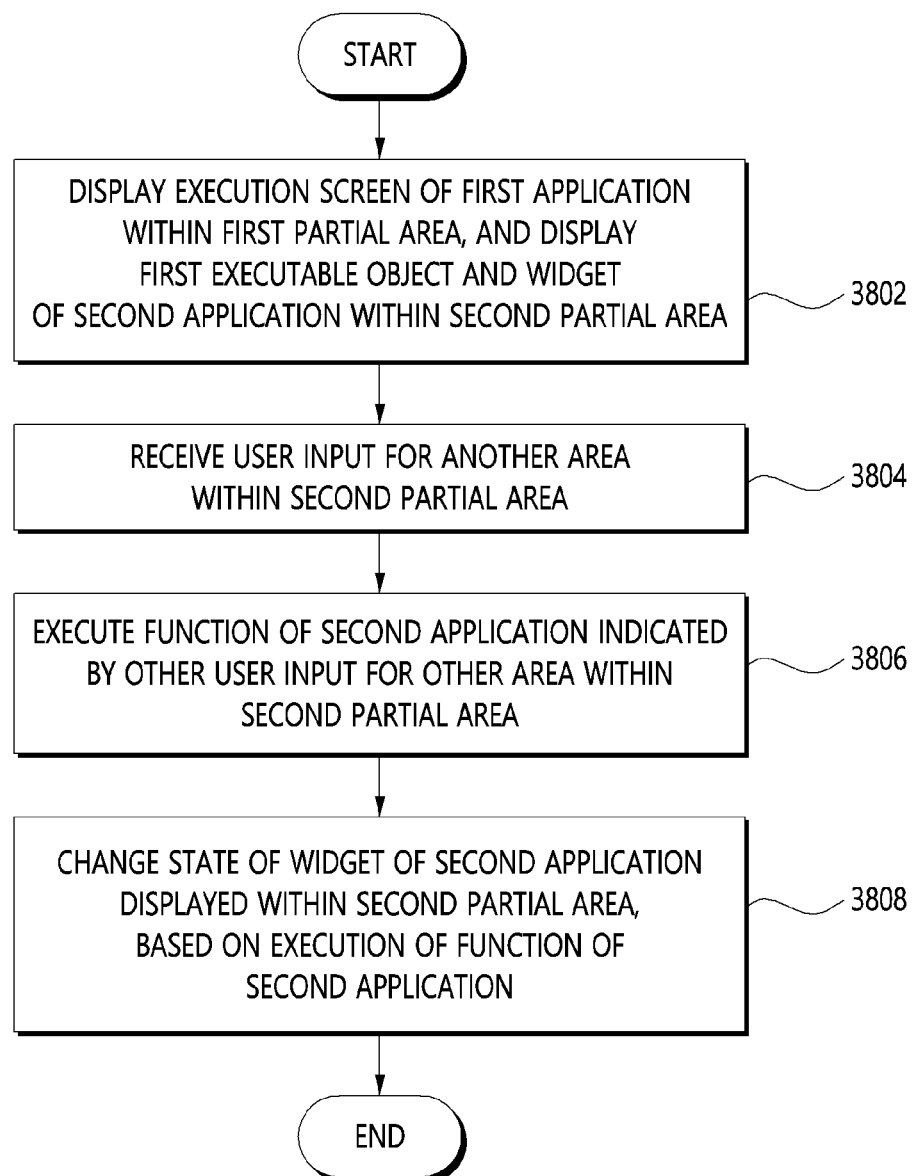
FIG. 38 illustrates a flowchart for an operating method of an electronic device that executes a function of an application providing a widget based on a user input for an empty space in a second partial area, according to various embodiments.

FIG. 38 illustrates a flowchart for a method of the electronic device executing a function of an application providing a widget, based on a user input to an empty space of the second partial area, according to various embodiments. This method may be executed by the infotainment device 100, the control device 2100 or the electronic device 2210, or may be executed by the processor 2230.

Figure 39:
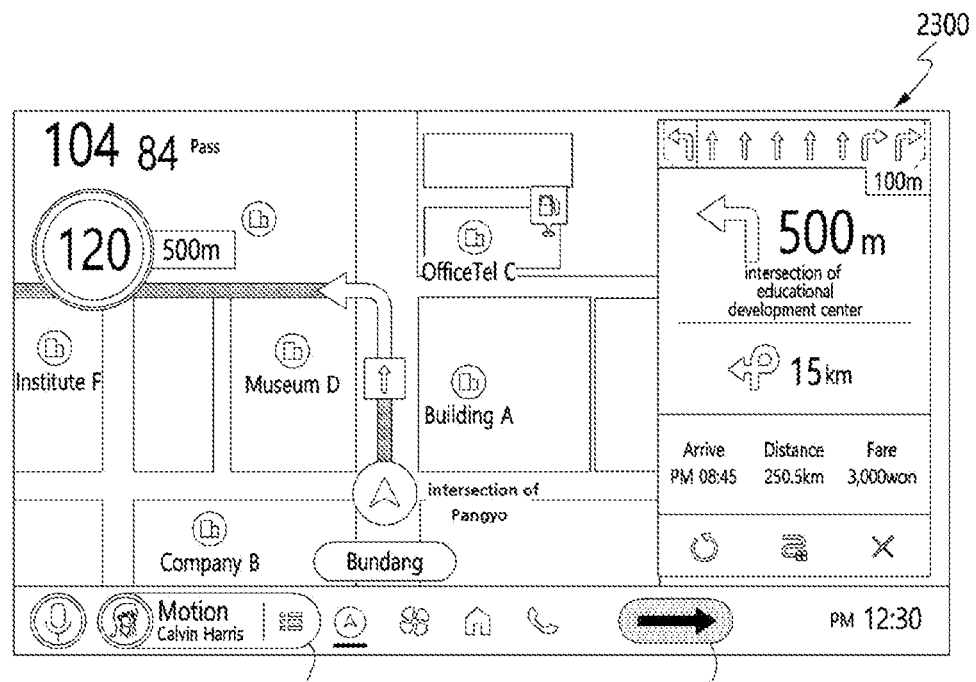
FIG. 39 illustrates an example of changing a state of a widget of an application displayed in a second partial area based on a user input to an empty space in the second partial area, according to various embodiments.
Figure 39:
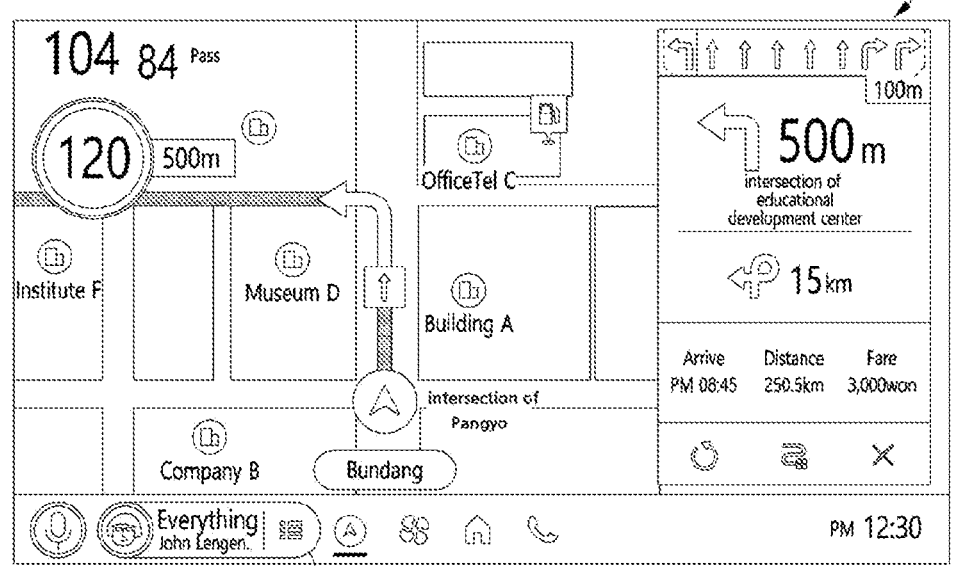

FIG. 39 illustrates an example of changing a state of a widget of an application displayed within the second partial area, based on a user input to the empty space of the second partial area, according to various embodiments.

Referring now to FIG. 38, in an operation 3802, the processor 2230 may display the execution screen of the first application within the first partial area and display the widget of the second application and the first executable object within the second partial area. For example, referring then to FIG. 39, the processor 2230, as seen in the state 2300, may display the execution screen 2310 of the first application within the first partial area 2302 and display the widget 2312 of the second application and the first executable object 2314 within the second partial area 2304.

In an operation 3804, the processor 2230 may receive a user input to other area within the second partial area, which area is distinguished from the display area of the widget of the second application and the display area of the first executable object. For example, the other area within the second partial area may be an area that is not occupied by the widget of the second application and the first executable object within the second partial area.

For example, the user input received in the operation 3804 may be distinguished from the user input received in the operation 3202 and the user input received in the operation 3404. According to various embodiments, the user input received in the operation 3804 may be distinguished from the user input received in the operation 3604, although it is not limited thereto.

For example, referring again to FIG. 39, in the state 2300, the processor 2230 may receive a user input 3900 for an empty space within the second partial area (e.g., the other area within the second partial area) displaying the widget of the second application and the first executable object.

In an operation 3806, the processor 2230 may execute, in response to receiving the user input, the function of the second application indicated by the user input to the other area within the second partial area. In various embodiments, the function of the second application indicated by the user input received in an operation the 3804 may be configured in various ways. For example, the function of the second application indicated by the user input received in the operation 3804 may be a function that is distinguished from those functions available through the widget of the second application. For another example, the function of the second application indicated by the user input received in the operation 3804 may be a function most frequently provided among the functions available through the second application. For another example, the function of the second application indicated by the user input received in the operation 3804 is a function associated with the service being provided through the second application (e.g., a function to play a next song of the song being currently playing). For another example, the function of the second application indicated by the user input received in the operation 3804 may be a function most recently provided among those functions available through the second application. However, it is not limited thereto.

In an operation 3808, the processor 2230 may change the state of the widget of the second application displayed in the second partial area, based on the execution of the function of the second application in an operation 3806. For example, referring again to FIG. 39, the processor 2230 may execute the function of the second application indicated a user input 3900 in response to receiving the user input 3900, and switch the state 2300 to a state 3901 in response to the execution of the function of the second application. In the state 3901, the processor 2230 may change the song (e.g., "Motion") currently played in the state 2300 to a next song (e.g., "Everything") and then change the state of the widget 2312 of the second application to guide that the next song is now being played. For example, in the state 3901, the processor 2230 may change the currently playing song guided in the widget 2312 of the second application provided in the state 2300 to the next song.

FIG. 39 illustrates an example in which the dragging direction of the user input 3900 is made in the same way as the dragging direction of the user input 3700 of FIG. 37, but the user input 3700 and the user input 3900 may be defined in different ways within the electronic device 2210, in case where the electronic device 2210 is configured to perform both of the method defined through the description of FIGS. 36 and 37 and the method defined through the description of FIGS. 38 and 39. In other words, it should be noted that the user input received in the operation 3804 may be distinguished from the user input received in the operation 3604, when the electronic device 2210 is configured to perform both the method defined through the description of FIGS. 36 and 37 and the method defined through the description of FIGS. 38 and 39.

As described above, the electronic device 2210 according to various embodiments can control an application to provide a widget displayed within the second partial area, based on a user input to an empty space within the second partial area. The electronic device 2210 according to various embodiments may simplify a user input required for the control thanks to providing such a convenient control. In other words, the electronic device 2210 according to various embodiments can provide its user with more enhanced user experience through a simplified user input.

Figure 40:
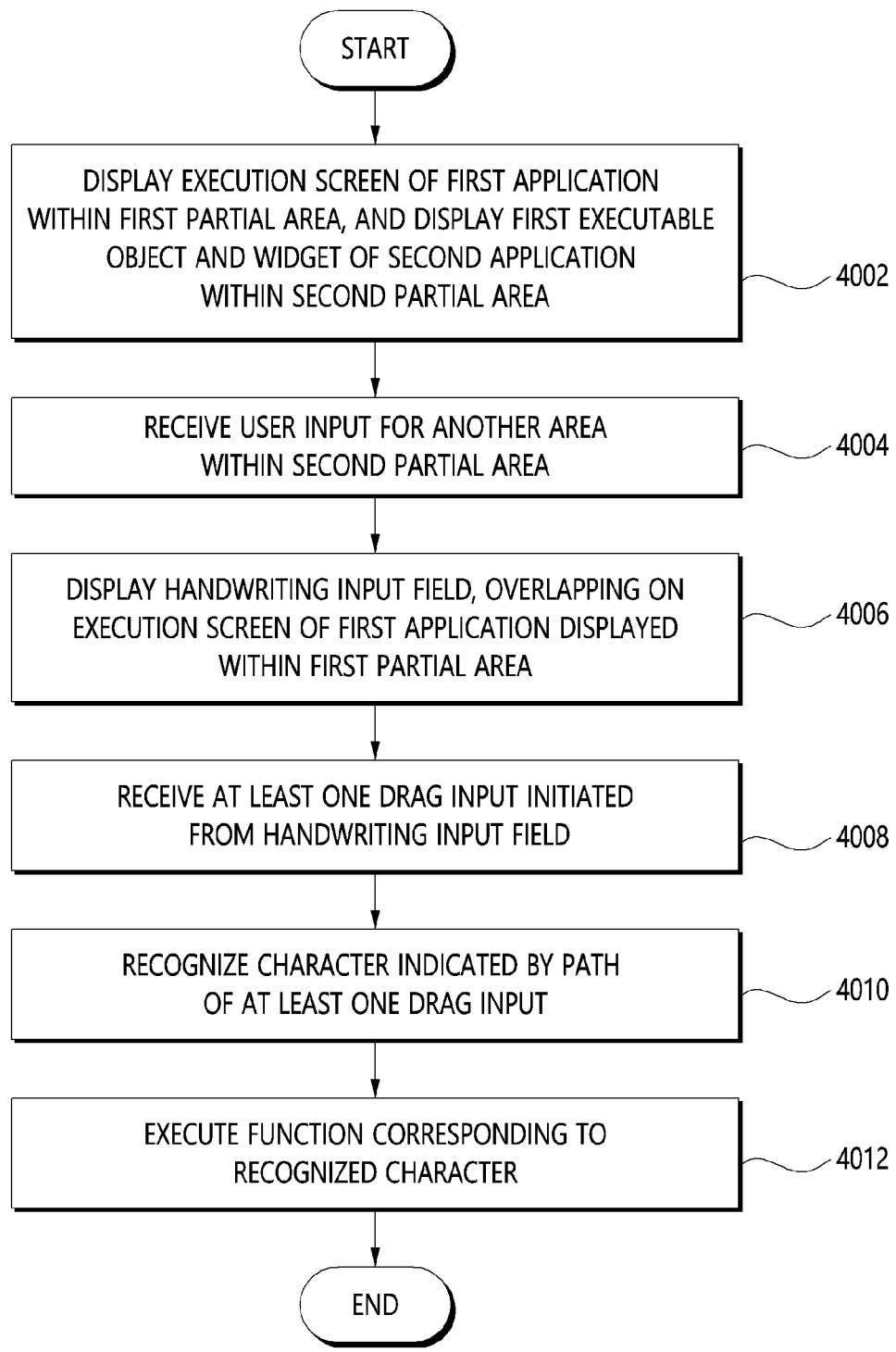
FIG. 40 illustrates a flowchart for an operating method of an electronic device for displaying a handwriting input field based on a user input for an empty space in a second partial area, according to various embodiments.

FIG. 40 illustrates a flowchart for a method of the electronic device for displaying a handwriting input field based on a user input to an empty space in the second partial area, according to various embodiments. This method may be executed by the infotainment device 100, the control device 2100 or the electronic device 2210, or may be executed by the processor 2230.

Figure 41:
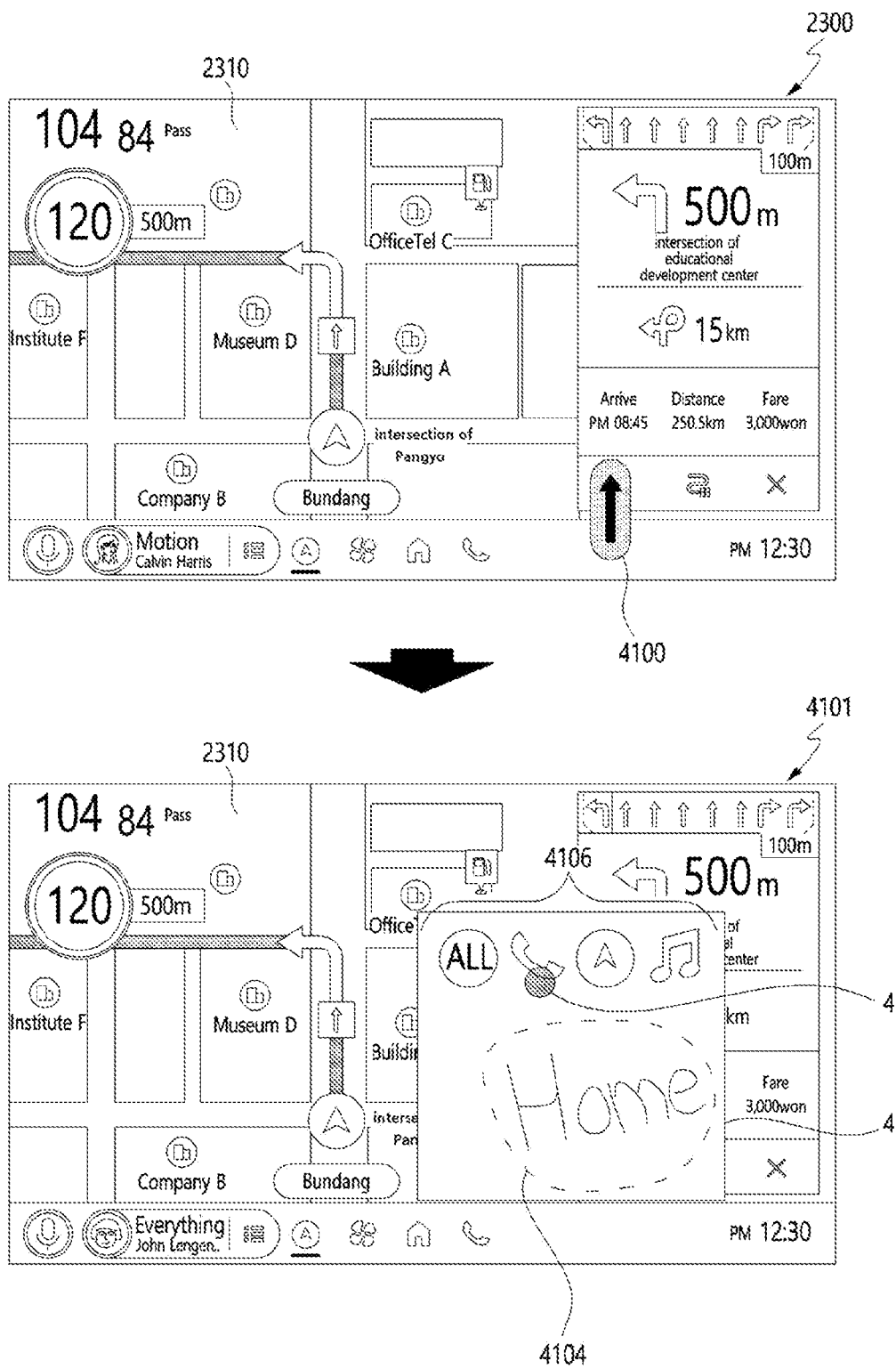
FIG. 41 illustrates an example of a handwriting input field displayed according to a user input for an empty space in a second partial area according to various embodiments.

FIG. 41 illustrates an example of the handwriting input field displayed according to the user input for the empty space within the second partial area according to various embodiments.

Referring now to FIG. 40, in an operation 4002, the processor 2230 may display the execution screen of the first application within the first partial area and display the widget of the second application and the first executable object within the second partial area and. For example, referring then to FIG. 41, the processor 2230, as in the state 2300, may display the execution screen 2310 of the first application within the first partial area 2302 and the widget 2312 of the second application and the first executable object 2314 within the second partial area.

In an operation 4004, the processor 2230 may receive a user input to other area within the second partial area, which is distinguished from the display area of the widget of the second application and the display area of the first executable object. For example, the other area within the second partial area may be an area within the second partial area that is not occupied by the widget of the second application and the first executable object.

For example, the user input received in the operation 4004 may be distinguished from the user input received in the operation 3202. For example, the user input received in the operation 4004 may be distinguished from the user input received in an operation 3404. For example, the user input received in an operation the 4004 may be distinguished from at least one of the user input received in the operation 3604 or the user input received in the operation 3804. However, it is not limited thereto.

For example, referring again to FIG. 41, in the state 2300, the processor 2230 may display a user input 4100 for an empty space within the second partial area 2304 (e.g., other area within the second partial area) displaying the widget of the second application and the first executable object.

In an operation 4006, in response to receiving the user input, the processor 2230 may display the handwriting input field in an overlapping manner on the execution screen of the first application displayed within the first partial area. In various embodiments, the handwriting input field may be extended from at least a part of the second partial area. In some embodiments, the handwriting input field may be configured to be translucent so that a part of the execution screen of the first application disposed underneath the handwriting input field can be visually recognized.

For example, referring to FIG. 41, the processor 2230 may switch the state 2300 to a state 4101 in response to receiving a user input 4100 in the state 2300. In the state 4101, the processor 2230 may display the handwriting input field 4102 in an overlapping manner on the execution screen 2310 of the first application. In various embodiments, the handwriting input field 4102 may provide a space for receiving a handwritten input and displaying the received handwritten input.

In an operation 4008, the processor 2230 may receive at least one drag input initiated from the handwriting input field. In various embodiments, the processor 2230 may identify, based on identifying a first drag input that is received first after displaying the handwriting input field, identify whether or not a second drag input following the first drag input is received for a specified time period from the timing point of receiving the first drag input. For example, the processor 2230 may recognize the first drag input and the second drag input as the handwritten input, based on identifying that the second drag input is received for the specified time period from the timing point at which the first drag input was received. For another example, the processor 2230 may recognize only the first drag input as the handwritten input, based on identifying that the second drag input is not received for the specified time period from the timing point at which the first drag input is received. However, it is not limited thereto.

For example, referring again to FIG. 41, the processor 2230 may receive at least one drag input 4104 initiated from the handwriting input field 4102, in a state 4101.

In an operation 4010, the processor 2230 may recognize a character indicated by the path of the at least one drag input. For example, the processor 2230 may recognize a character indicated by a first drag input path and a second drag input path, based on identifying that a third drag input is not received for the specified time period from the timing point at which the second drag input following the first drag input was received. For example, referring to FIG. 41, the processor 2230 may recognize a character (e.g., "Home" in Korean language) indicated by a path of at least one drag input 4104 received in a state 4101.

In an operation 4012, the processor 2230 may execute a function corresponding to the recognized character. For example, referring again to FIG. 41, the processor 2230 may recognize a character (e.g., "home") based on the path of at least one drag input 4104 received in the state 4101 and execute a function corresponding to the recognized character, such as, e.g., a function to execute an outgoing call to the user's home using a call application, a function to set the destination of the vehicle for the driver's home using a navigation application, a function to retrieve and play a song entitled "Home" using a music application, or the like.

In some embodiments, the handwriting input field 4102 may further display a plurality of executable objects 4106 to indicate each of the plurality of applications within the handwriting input field 4102, so as to further specify the function corresponding to the recognized character. When the handwriting input field 4102 further comprises a plurality of executable objects 4106 and receives a user input 4108 to select one executable object of the plurality of executable objects 4106, the processor 2230 may execute an application indicated by the executable object selected by the user input 4108 and the function corresponding to the recognized character (e.g., executing an outgoing call to the user's home using the call application).

As described above, the electronic device 2210 according to various embodiments can execute the function corresponding to the path, by displaying the handwriting input field based on a user input to the empty space of the second partial area and recognizing the path of at least one drag input received through the handwriting input field. The electronic device 2210 according to various embodiments can simplify a user input required to execute the corresponding function through the handwriting input field. In other words, the electronic device 2210 according to various embodiments makes it possible to render more enhanced user experience through such a simplified user input.

Figure 42:
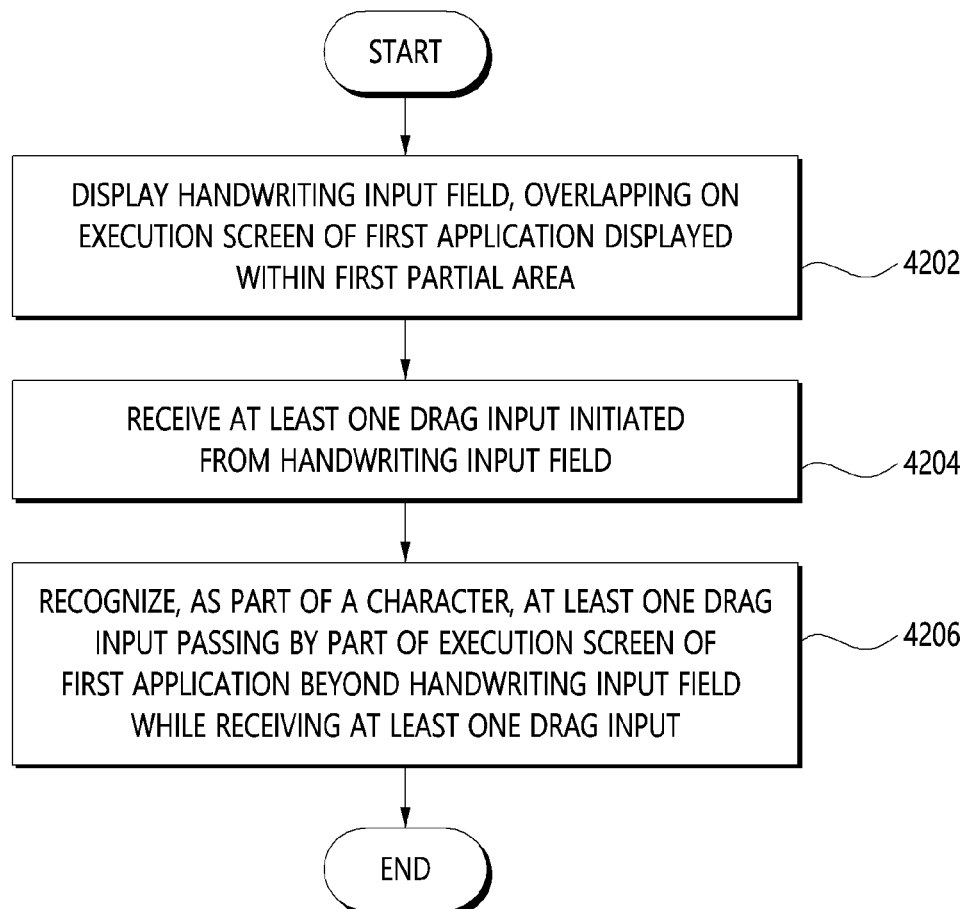
FIG. 42 illustrates a flowchart for an operating method of an electronic device for processing a drag input initiated from a handwriting input field displayed, according to various embodiments.

FIG. 42 illustrates a flowchart for a method of the electronic device for processing a drag input initiated from the handwriting input field displayed according to various embodiments. This method may be executed by the infotainment device 100, the control device 2100 or the electronic device 2210, or may be executed by the processor 2230.

Figure 43:
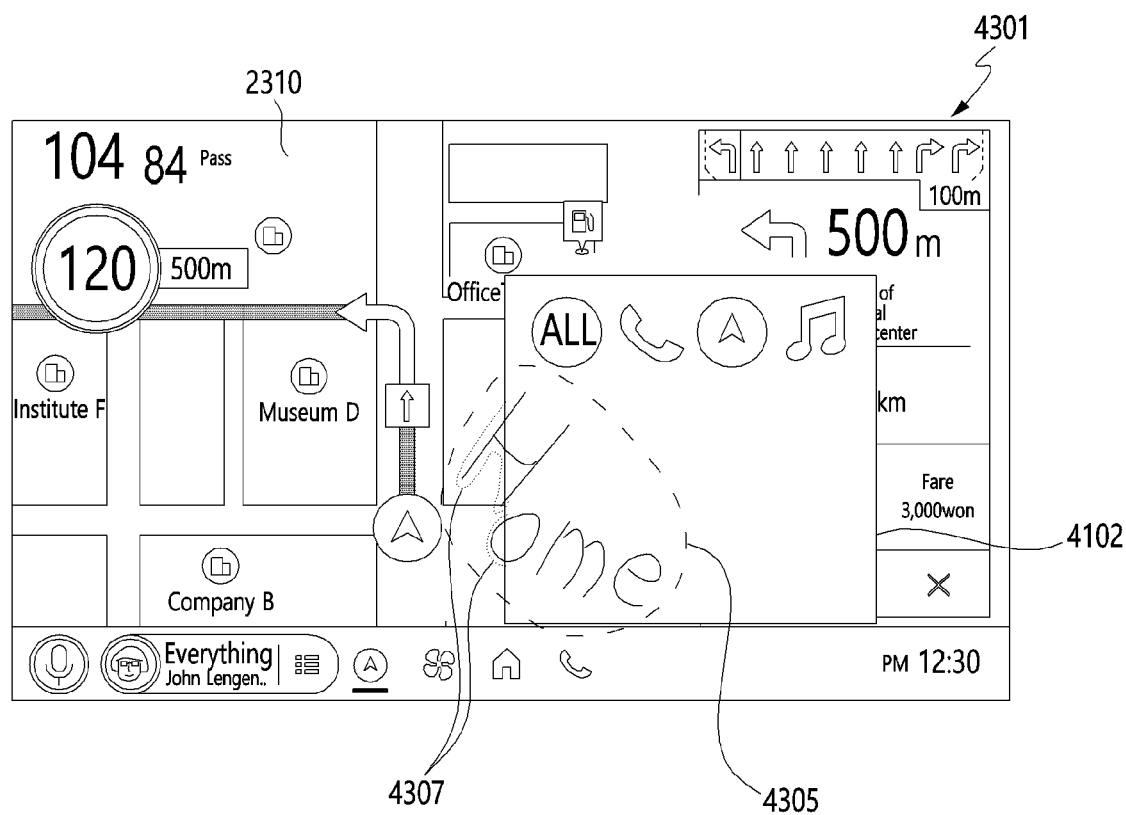
FIG. 43 illustrates an example of processing a drag input initiated from a handwriting input field and passing a portion of a first partial area beyond the handwriting input field, according to various embodiments.

FIG. 43 illustrates an example of processing a drag input passing from a handwriting input field to a part of the first partial area beyond the handwriting input field according to various embodiments.

Referring now to FIG. 42, in an operation 4202, the processor 2230 may display the handwriting input field in an overlapping manner on the execution screen of the first application displayed in the first partial area. For example, the operation 4202 may correspond to the operation 4006.

In an operation 4204, the processor 2230 may receive at least one drag input initiated from the handwriting input field. For example, referring then to FIG. 43, the processor 2230 may receive at least one drag input 4305 initiated from the handwriting input field 4102 in a state 4301.

In an operation 4206, the processor 2230 may recognize, as part of a character, the at least one drag input passing by part of the execution screen of the first application beyond the handwriting input field while receiving the at least one drag input. For example, referring again to FIG. 43, the processor 2230 may receive at least one drag input 4305 initiated from the handwriting input field 4102 in the state 4301. The processor 2230, while receiving the at least one drag input 4305, may recognize the path 4307 of the at least one drag input 4305 passing by part of the execution screen 2310 of the first application within the first partial area 2302, as part of the character instead of a user input to the execution screen 2310 of the first application. In various embodiments, the processor 2230 may display part of the path of the at least one drag input (e.g., the path 4307) on the execution screen 2310 of the first application displayed within the first partial area.

As described above, the electronic device 2210 according to various embodiments can recognize, in response to identifying that a drag input is initiated from the handwriting input field, a path of a drag input passing by part of the execution screen of the first application within the first partial area beyond the handwriting input field, as part of the handwriting input, and identify a character, based on the recognition. For example, the electronic device 2210 according to various embodiments can maintain, in response to identifying that such a drag input is initiated from the handwriting input field, displaying of the execution screen of the first application in the first partial area and deactivate recognition of a touch input on the execution screen of the first application in the first partial area, so that it is possible to recognize the path of the drag input passing by the execution screen of the first application within the first partial area beyond the handwriting input field, as part of the handwriting input, and identify a character based on the recognition. The electronic device 2230 according to various embodiments makes it possible to enhance the user's convenience thanks to the execution of such a recognition.

Figure 44:
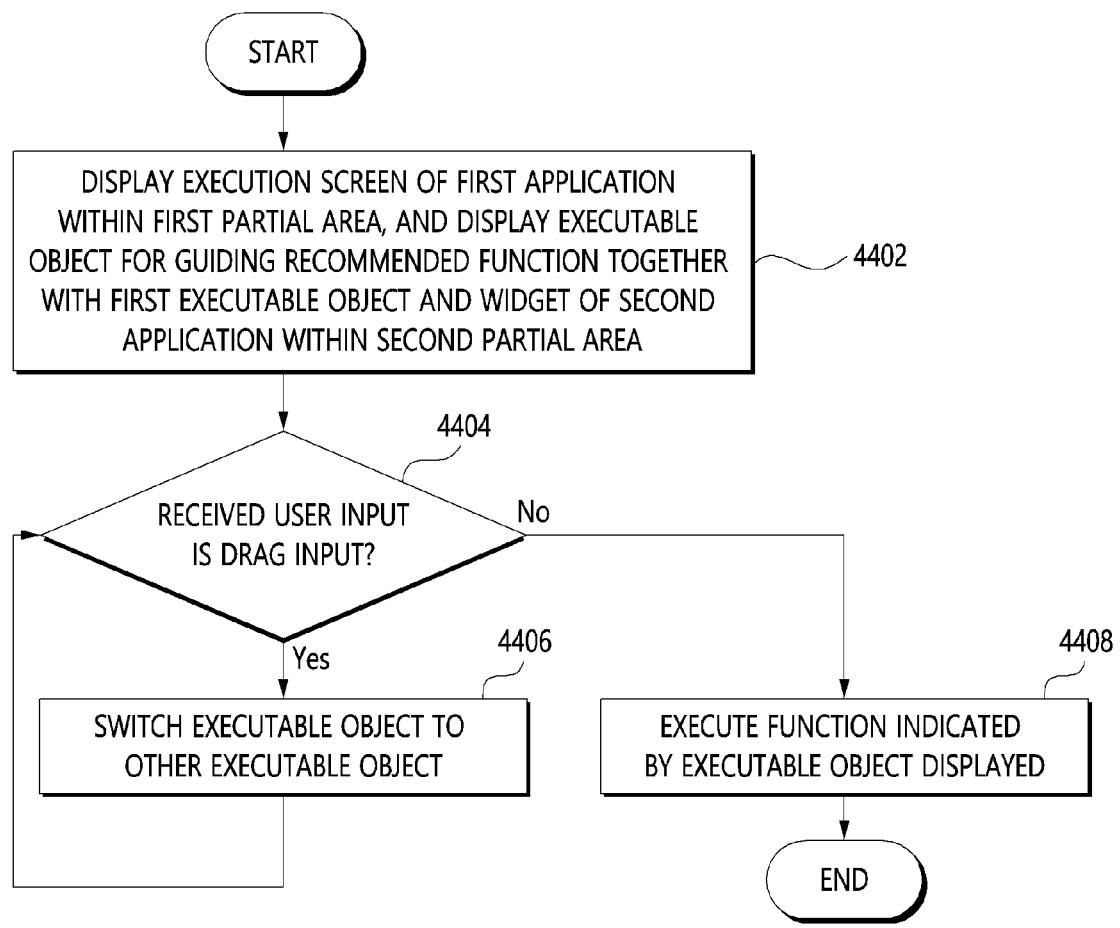
FIG. 44 illustrates a flowchart for an operating method of an electronic device to display an executable object for guiding a recommended function within a part of a second partial area, according to various embodiments.

FIG. 44 illustrates a flowchart for a method of the electronic device of displaying an executable object for guiding a recommended function within a portion of the second partial area, according to various embodiments. This method may be executed by the infotainment device 100, the control device 2100 or the electronic device 2210, or may be executed by the processor 2230.

Figure 45:
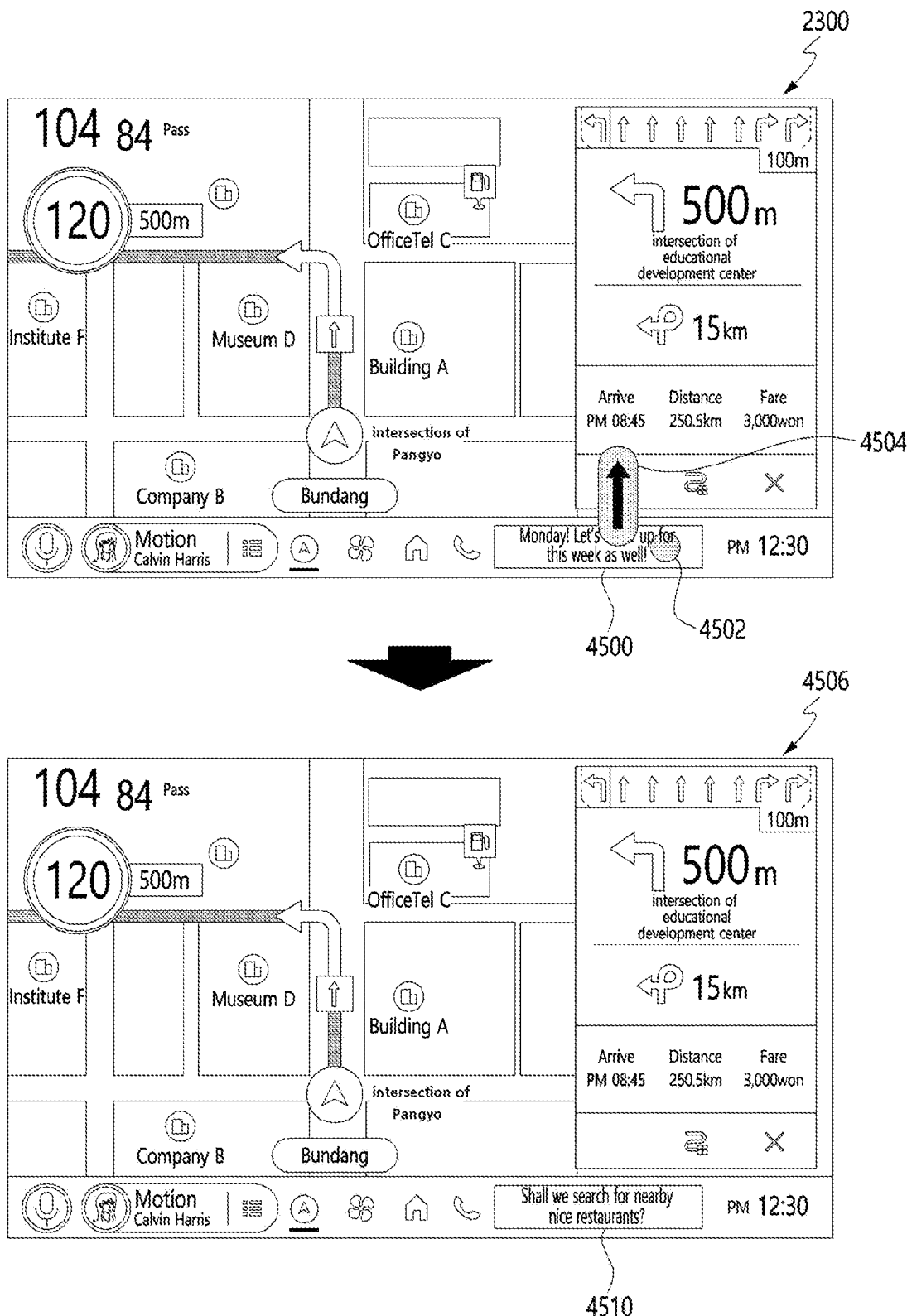
FIG. 45 illustrates an example of an executable object for guiding a recommended function displayed within a part of the second partial area according to various embodiments.

FIG. 45 illustrates an example of the executable object for guiding the recommended function displayed within a portion of the second partial area according to various embodiments.

Referring first to FIG. 44, in an operation 4402, the processor 2230 may display the execution screen of the first application within the first partial area and display an executable object for guiding the recommended function together with the first executable object and the widget of the second application within the second partial area. In various embodiments, the recommended function may be identified from a model, in association with the electronic device 2210, configured to predict a future executable pattern of the electronic device 2210 based on past execution heuristics including the past execution history of the electronic device 2210. For example, the model may be disposed either inside the electronic device 2210 or outside the electronic device

2210. For example, when the model is disposed outside the electronic device 2210, the model may be stored within a server located out of the electronic device 2210 and connected by the electronic device 2210, although it is not limited thereto. The model may be a model configured to receive information on executions caused by the electronic device 2210 to be trained based on the received information.

In various embodiments, the executable object for guiding the recommended function may be displayed in any other area within the second partial area, which is distinguished from the area displaying the first executable object and the widget of the second application. For example, referring then to FIG. 45, in the state 2300, the processor 2230 may display an executable object 4500 for guiding the recommended function within the other area of the second partial area 2304 that is distinguished from the area displaying the widget 2312 of the second application and the first executable object 2314. For example, the executable object 4500 may include a text to guide the recommended function (such as, e.g., "Monday! Let's cheer up for this week as well!").

In an operation 4404, the processor 2230 may identify whether the user input received for the executable object is a drag input. For example, the user input received for the executable object may include a user input for executing the recommended function guided by the executable object and a user input for switching the executable object into another executable object for guiding other recommended function distinct for the recommended function. The processor 2230 may identify whether or not the user input received for the executable object is the drag input, in order to identify whether the user input received for the executable object is a user input to execute the recommended function guided by the executable object or a user input to switch the executable object to the other executable object for guiding the other recommended function. For example, if the user input received for the executable object is the drag input, then the processor 2230 may execute the operation 4406, or otherwise, execute the operation 4408.

In the operation 4406, the processor 2230 may switch the executable object to the other executable object in response to identifying that the user input received for the executable object is the drag input. For example, the other recommended function guided by the other executable object may be a function with a priority immediately next to the priority of the recommended function, among a plurality of recommended functions identified by the model. For example, referring again to FIG. 45, in response to receiving a user input 4504 for the executable object 4500 in the state 2300, the processor 2230 may switch the state 2300 to a state 4506. In the state 4506, the processor 2230 may display the other executable object 4510 switched from the executable object 4500 within the second partial area 2304. For example, the other executable object 4510 may include a text (such as, e.g., "Shall we search for nearby nice restaurants?") to guide the other recommended function. In various embodiments, the processor 2230 may execute the operation 4404 again after completing execution of the operation 4406.

In an operation 4408, in response to identifying that the user input received for the executable object is not the drag input, or that the user input received for the executable object is distinguished from the drag input, the processor 2230 may execute the function indicated by the executable object (e.g., the recommended function). For example, referring again to FIG. 45, the processor 2230 may execute, in response to receiving a user input 4502 for the executable object 4500 in the state 2300, the recommended function guided by the executable object 4500 (e.g., executing a route guidance to the driver's workplace using the navigation application). However, it is not limited thereto.

As described above, the electronic device 2210 according to various embodiments makes it possible to display an executable object to execute a recommended function from such a trained model within a portion of the second partial area, in order to provide a service better suited to the electronic device 2210 or the user's situation of the electronic device 2210. The electronic device 2210 according to various embodiments can provide its user with more enhanced convenience, owing to displaying of the executable object.

Figure 46:
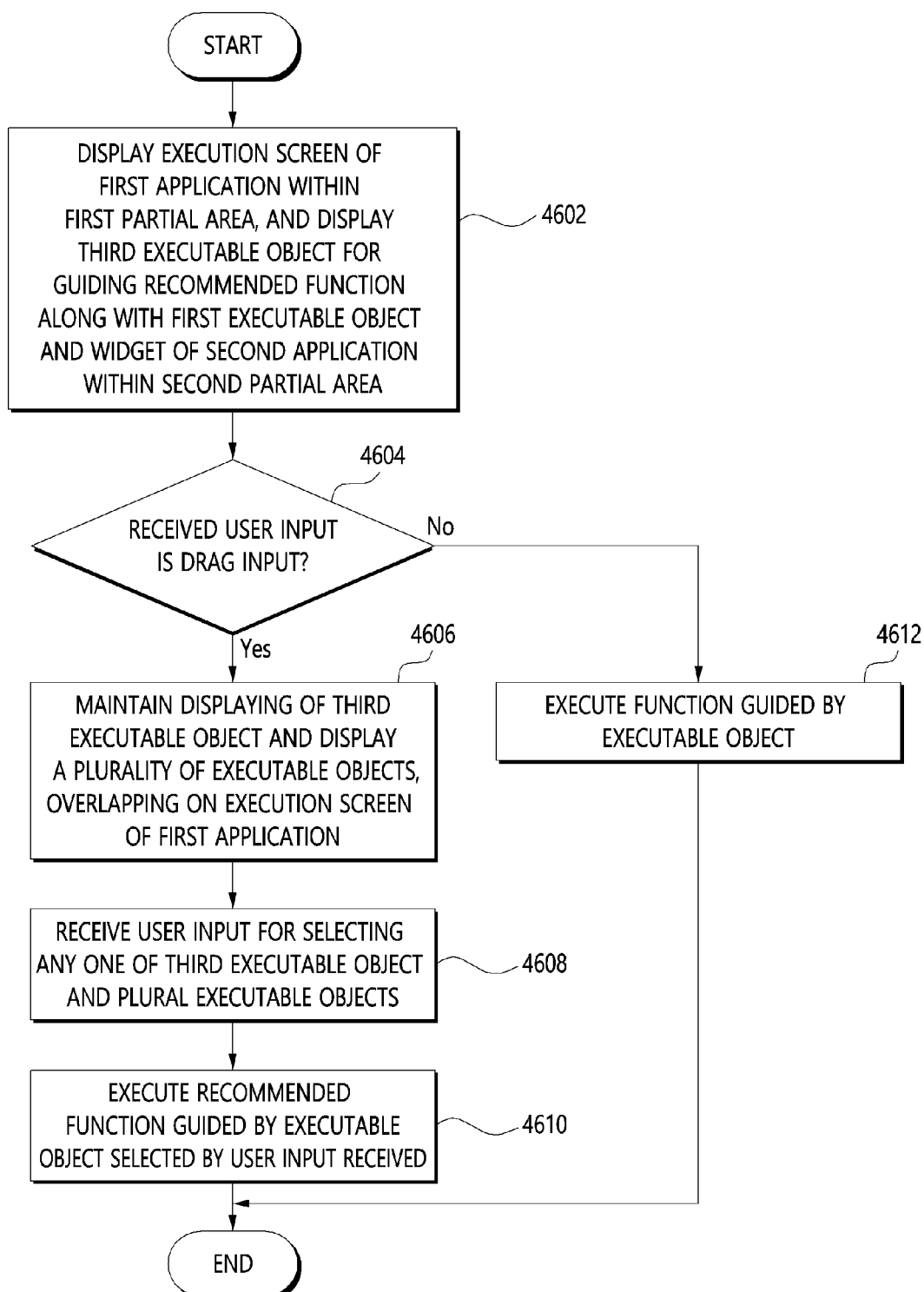
FIG. 46 illustrates a flowchart for an operating method of an electronic device to display a plurality of executable objects extending from a part of a second partial area, according to various embodiments.

FIG. 46 illustrates a flowchart illustrating a method of the electronic device for displaying a plurality of executable objects extending from a portion of the second partial area according to various embodiments. This method may be executed by the infotainment device 100, the control device 2100 or the electronic device 2210, or may be executed by the processor 2230.

Figure 47:
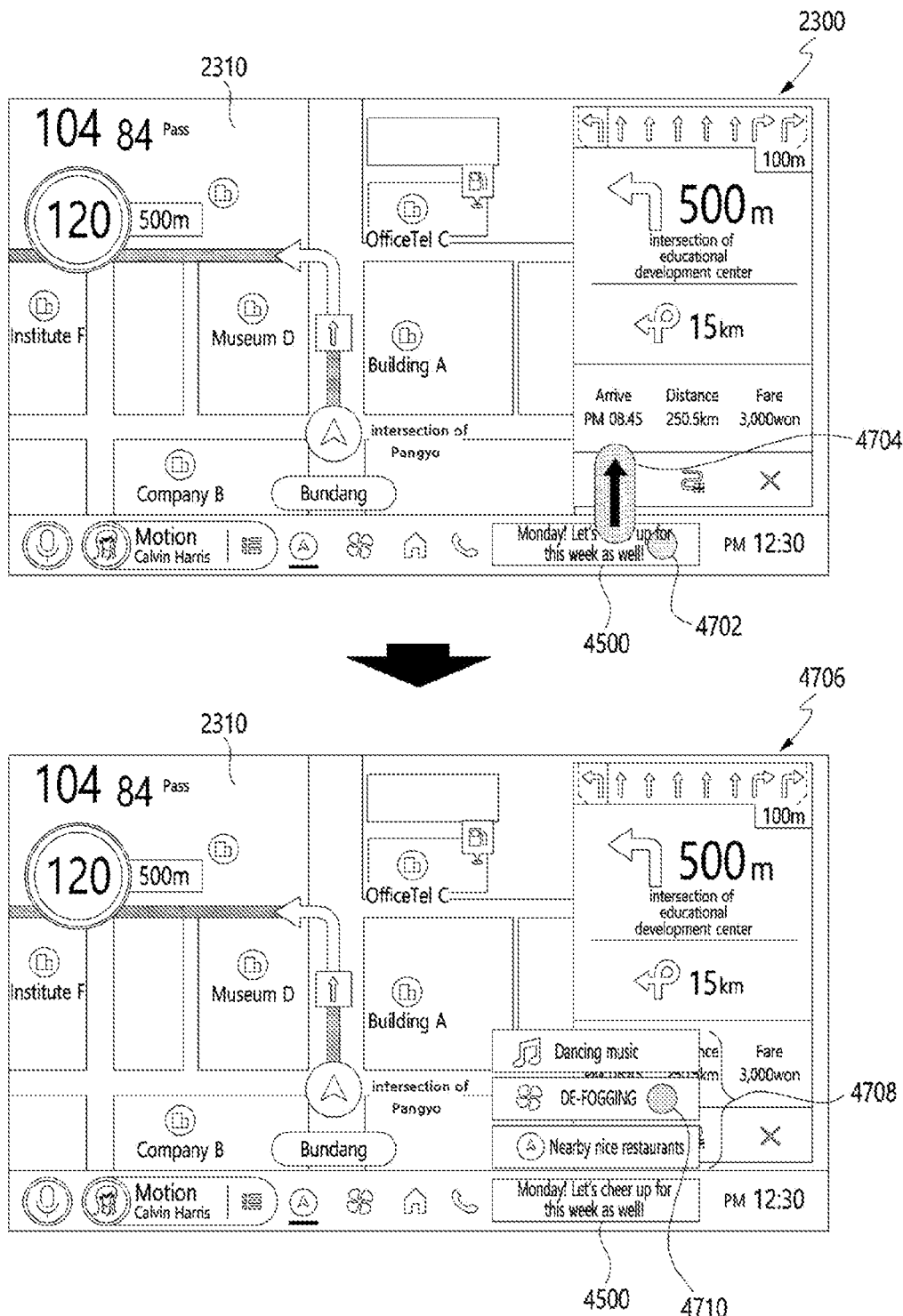
FIG. 47 illustrates an example of a plurality of executable objects extending from a part of the second partial area according to various embodiments.

FIG. 47 illustrates an example of a plurality of executable objects extending from a portion of the second partial area according to various embodiments.

Referring now to FIG. 46, in an operation 4602, the processor 2230 may display the execution screen of the first application within the first partial area and display an executable object for guiding a recommended function along with the first executable object and the widget of the second application within the second partial area. For example, the operation 4602 may correspond to the operation 4402. For example, referring then to FIG. 47, in the state 2300, the processor 2230 may display an executable object 4500 for guiding the recommended function within other area of the second partial area 2304, which is distinguished from an area displaying the widget 2312 of the second application and the first executable object 2314. For example, the executable object 4500 may include a text to guide the recommended function (such as, e.g., "Monday! Let's cheer up for this week as well!").

In an operation 4604, the processor 2230 may identify whether the user input received for the executable object is a drag input. For example, the user input received for the executable object may include a user input for executing the recommended function guided by the executable object, and a user input for maintaining to display the executable object and for displaying a plurality of executable objects for respectively guiding a plurality of recommended functions distinguished from the recommended function, in an overlapping manner, on the execution screen of the first application displayed within the first partial area. The processor 2230 may identify whether or not the user input received for the executable object is the drag input, in order to identify whether the user input received for the executable object is the user input for executing the recommended function guided by the executable object, or whether it is a user input for displaying a plurality of executable objects for respectively guiding a plurality of recommended functions distinguished from the recommended function, in an overlapping manner, on the execution screen of the first application displayed in the first partial area. For example, when the user input received with respect to the executable object is the drag input, the processor 2230 may execute the operation 4606, or otherwise, execute the operation 4612.

In the operation 4606, the processor 2230 may, in response to identifying that the user input received for the executable object is the drag input, maintain displaying of the executable object and display the plurality of executable objects in an overlapping manner on the execution screen of the first application within the first partial area. For example, the plurality of executable objects may be extended from the executable object. For example, the plurality of recommended functions each guided by the plurality of executable objects may be functions that are identified from the model and have the priority lower than that of the recommended function. For example, referring now to FIG. 47, the processor 2230 may, in response to receiving a user input 4704 for the executable object 4500 in the state 2300, switch the state 2300 to a state 4706. In the state 4706, the processor 2230 may maintain displaying of the executable object 4500. In the state 4706, the processor 2230 may display a plurality of executable objects 4708 within an area overlapping the execution screen of the first application in the first partial area 2302 and extending from the executable object 4500.

In an operation 4608, the processor 2230 may receive a user input for selecting any one from among the executable object and the plurality of executable objects. For example, referring again to FIG. 47, in a state 4706, the processor 2230 may receive the user input 4710 for selecting any one from among the executable object 4500 and the plurality of executable objects 4708.

In an operation 4610, the processor 2230 may execute a recommended function guided by the executable object selected by the user input, in response to the user input received in the operation 4608. For example, referring again to FIG. 47, in state 4706, the processor 2230 may perform, in response to receiving the user input 4710, a window defogging function, which is a function guided by the executable object selected by user input 4710.

In an operation 4612, the processor 2230 may, in response to identifying that the user input received for the executable object is the drag input or identifying that the user input received for the executable object is distinguished from the drag input, execute the function indicated by the executable object. For example, referring to FIG. 47, the processor 2230 may execute, in response to receiving the user input 4502 for the executable object 4500 in the state 2300, the recommended function guided by the executable object 4500 (e.g., executing a route guidance to the driver's workplace using the navigation application). However, it is not limited thereto.

As described above, the electronic device 2210 according to various embodiments makes it possible to display a plurality of executable objects for guiding each of a plurality of recommended functions, thereby extending the range of selection for the services better suited to the situation around the electronic device 2210 or its user. Therefore, the electronic device 2210 according to various embodiments can provide its users with more enhanced convenience owing to displaying of such a plurality of executable objects.

Figure 48:
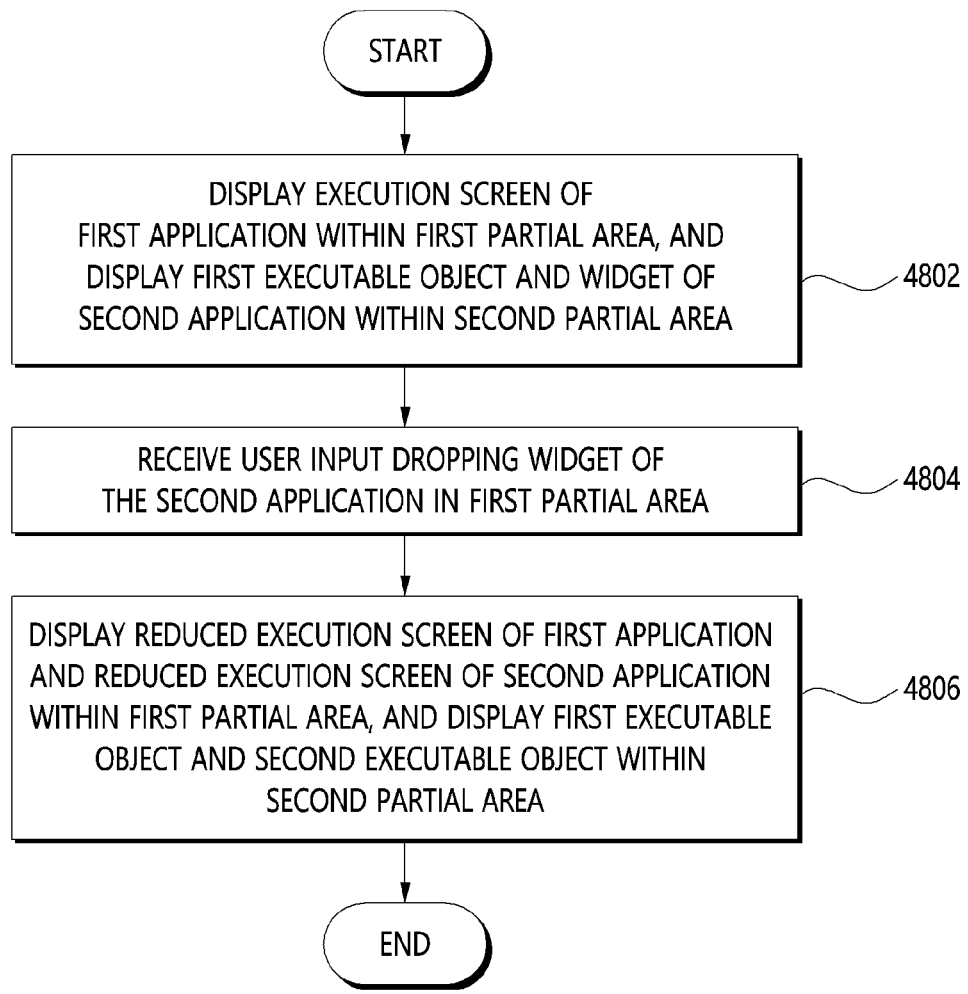
FIG. 48 illustrates a flowchart for an operating method of an electronic device that displays a split screen within a first partial area by dropping a widget of an application displayed within a second partial area, in the first partial area, according to various embodiments.

FIG. 48 illustrates a flowchart for a method of the electronic device for displaying a split screen within a first partial area, by dropping a widget of an application displayed in a second partial area in the first partial area, according to various embodiments. This method may be executed by the infotainment device 100, the control device 2100 or the electronic device 2210, or may be executed by the processor 2230.

Figure 49:
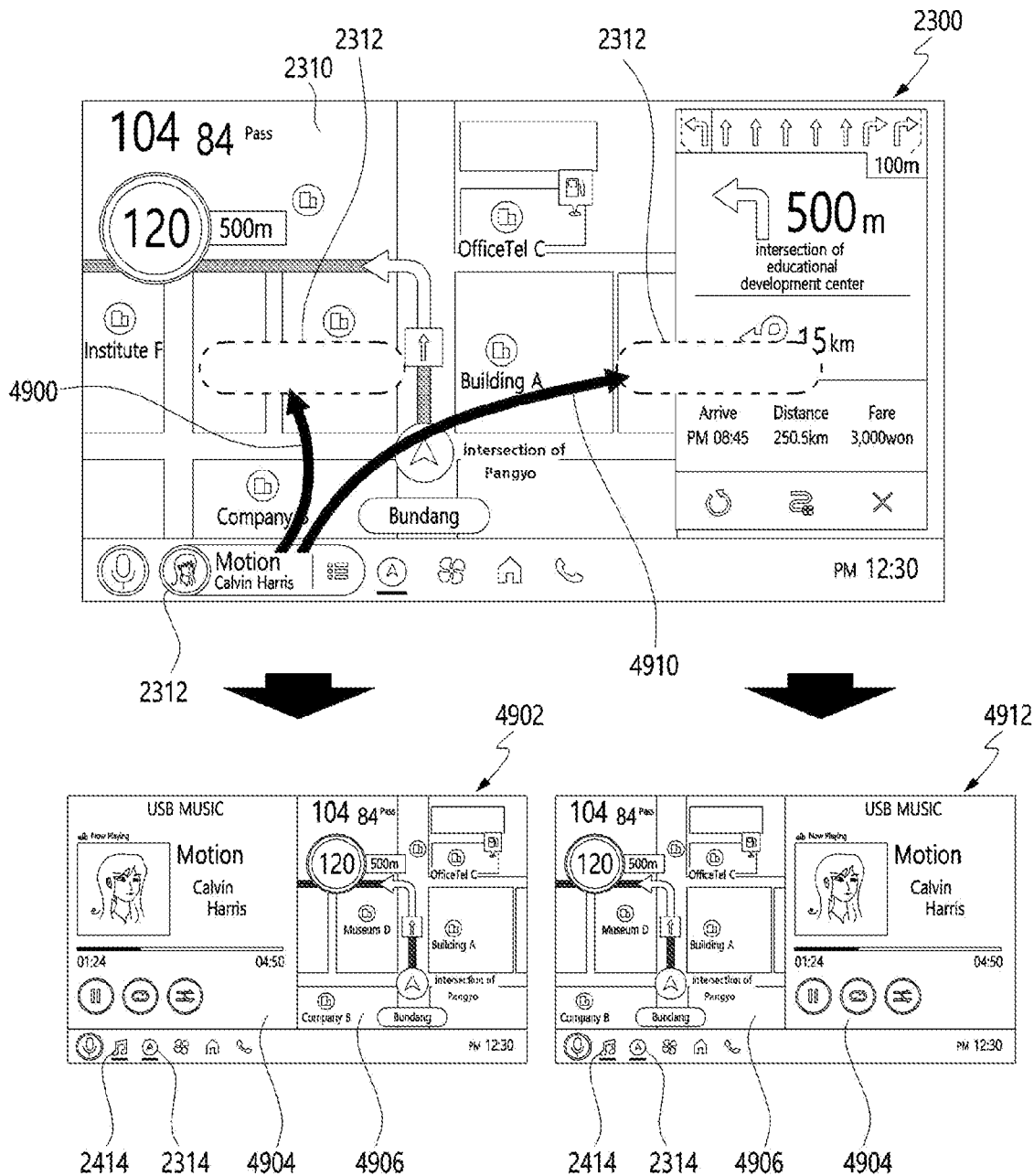
FIG. 49 illustrates an example of a split screen in a first partial area displayed by dropping a widget of an application displayed within a second partial area, in the first partial area, according to various embodiments.

FIG. 49 illustrates an example of such a split screen within the first partial area displayed by dropping a widget of an application displayed in the second partial area in the first partial area, according to various embodiments.

Referring now to FIG. 48, in an operation 4802, the processor 2230 may display the execution screen of the first application within the first partial area and display the first executable object and the first executable object and the widget of the second application within the second partial area. For example, referring then to FIG. 49, in the state 2300, the processor 2230 may display the execution screen 2310 of the first application within the first partial area 2302 and display the widget 2312 of the second application and the first executable object 2314 within the second partial area 2304.

In an operation 4804, the processor 2230 may receive a user input dropped in the first partial area after dragging the widget of the second application. For example, referring to FIG. 49, in the state 2300, the processor 2230 may receive a user input 4900 or a user input 4910 dropping in the first partial area 2302 after dragging the widget 2312 of the second application. Although not illustrated in FIG. 49, in some embodiments, the processor 2230 may display a shadow image of the widget 2312 of the second application in order to compensate the widget 2312 of the second application for at least partially being covered by the user's finger causing the user input 4900 or 4910, while the user input 4900 or 4910 is maintained. In an embodiment, the shadow image may be configured to be translucent in order to enhance visibility of a part of the execution screen 2310 of the first application within the first partial area 2302 located underneath the shadow image.

In an operation 4806, the processor 2230 may, in response to receiving the user input in the operation 4804, display a reduced execution screen of the first application switched from the execution screen of the first application and a reduced execution screen of the second application within the first partial area, and display the first executable object and the second executable object of the second application that is switched from the widget of the second application within the second partial area.

For example, referring then to FIG. 49, the processor 2230 may switch the state 2300 to a state 4902 in response to receiving a user input 4900 in the state 2300. In the state 4902, the processor 2230 may display a reduced execution screen 4906 of the first application switched from the execution screen 2310 of the first application and a reduced execution screen 4904 of the second application within the first partial area 2302. In the state 4902, the processor 2230 may display the first executable object 2314 and the second executable object 2414 switched from the widget 2312 of the second application within the second partial area 2304. In various embodiments, the reduced execution screen 4906 of the first application may have a smaller size than the execution screen 2310 of the first application. In various embodiments, the reduced execution screen 4906 of the first application may include visual objects with a reduced size compared to the execution screen 2310 of the first application. In various embodiments, the reduced execution screen 4906 of the first application may display a less amount of information than the execution screen 2310 of the first application. In various embodiments, the reduced execution screen 4906 of the first application may display a smaller amount of executable elements than the execution screen 2310 of the first application. In various embodiments, the arrangement of visual objects and executable elements within the reduced execution screen 4906 of the first application may be distinguished from the arrangement of those visual objects and executable elements within the execution screen 2310 of the first application. However, it is not limited thereto.

Although the execution screen 2402 of the second application is not shown in FIG. 49, in various embodiments, the reduced execution screen 4904 of the second application may have a reduced size compared to the execution screen 2402 of the second application. In various embodiments, the reduced execution screen 4904 of the second application may include visual objects with a smaller size than the execution screen 2402 of the second application. In various embodiments, the reduced execution screen 4904 of the second application may display a less amount of information than the execution screen 2402 of the second application. In various embodiments, the reduced execution screen 4904 of the second application may display a smaller amount of executable elements than the execution screen 2402 of the second application. In various embodiments, the arrangement of visual objects and executable elements within the reduced execution screen 4904 of the second application may be distinguished from the arrangement of those visual objects and executable elements in the execution screen 2402 of the second application, although it is not limited thereto.

For another example, referring again to FIG. 49, the processor 2230 may switch the state 2300 to another state 4912 in response to receiving a user input 4910 in the state 2300. In the state 4912, the processor 2230 may display a reduced execution screen 4906 of the first application switched from the execution screen 2310 of the first application and a reduced execution screen 4904 of the second application within the first partial area 2302. In the state 4912, the processor 2230 may display the first executable object 2314 and the second executable object 2414 switched from the widget 2312 of the second application within the second partial area 2304.

In various embodiments, the processor 2230 may configure in a different way the arrangement of the reduced execution screen of the first application and the reduced execution screen of the second application displayed within the first partial area, depending on a position where the widget of the second application is dropped by the user input received in the operation 4804. For example, referring to FIG. 49, the processor 2230 may switch the state 2300 to the state 4902, in response to receiving the user input 4900 dropping the widget 2312 of the second application in an area located on the left side about the center line through the first partial area 2302 in the vertical direction from the state 2300. Depending on the dropped position of the widget 2312 of the second application, the arrangement of the reduced execution screen 4906 of the first application and the reduced execution screen 4904 of the second application in the state 4902 may be made so that the reduced execution screen 4904 of the second application is disposed to the left side of the reduced execution screen 4906 of the first application. For another example, referring to FIG. 49, the processor 2230 may switch the state 2300 to the state 4912, in response to receiving the user input 4910 dropping the widget 2312 of the second application in an area located on the right side about the center line through the first partial area 2302 in the vertical direction from the state 2300. Further, depending on the dropped position of the widget 2312 of the second application, the arrangement of the reduced execution screen 4906 of the first application and the reduced execution screen 4904 of the second application in the state 4912 may be made so that the reduced execution screen 4904 of the second application is disposed to the right side of the reduced execution screen 4906 of the first application.

As described above, the electronic device 2210 according to various embodiments can display, in response to receiving a user input dropping a widget of an application displayed within the second partial area onto an execution screen of another application displayed in the first partial area, a split screen configured of a reduced execution screen of the application and a reduced execution screen of the other application within the first partial area. The electronic device 2210 according to various embodiments can provide its user with more enhanced user experience, owing to providing such a split screen through an intuitive user input like the aforementioned user input.

Figure 50:
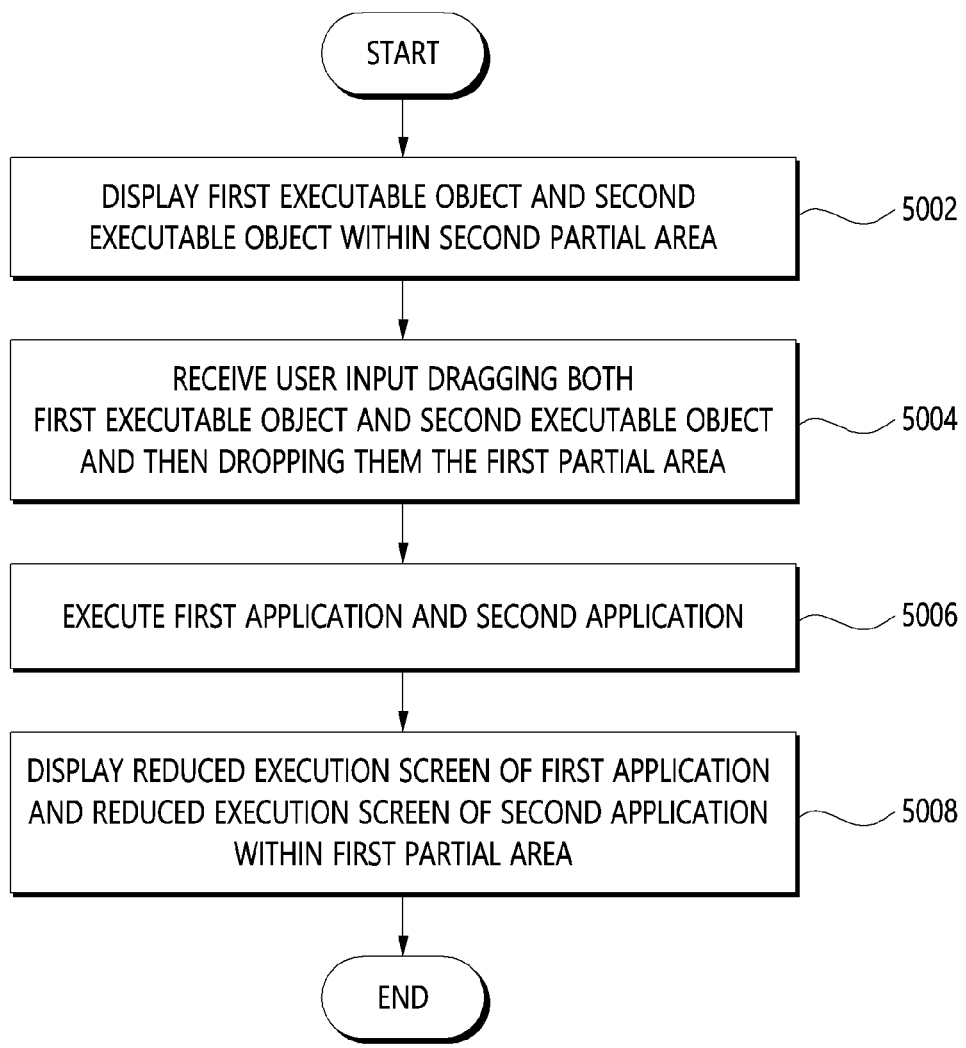
FIG. 50 illustrates a flowchart for an operating method of an electronic device that displays a split screen within a first partial area by dropping a plurality of executable objects displayed within a second partial area, in the first partial area, according to various embodiments.

FIG. 50 illustrates a flowchart for a method of an electronic device for displaying a split screen within the first partial area by dropping onto the first partial area a plurality of executable objects displayed within the second partial area, according to various embodiments. This method may be executed by the infotainment device 100, the control device 2100 or the electronic device 2210, or may be executed by the processor 2230.

Figure 51:
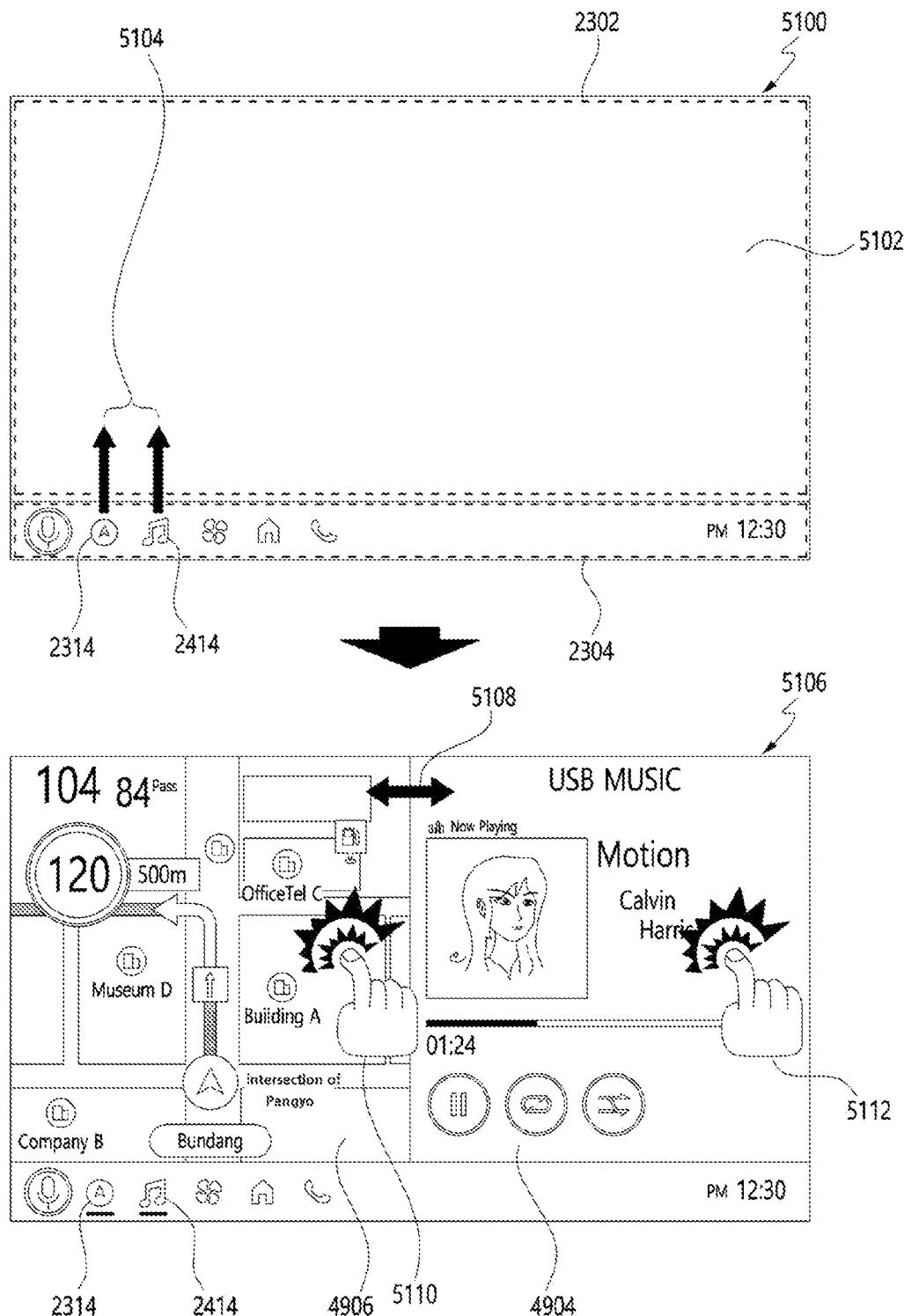
FIG. 51 illustrates an example of a split screen displayed within a first partial area by dropping a plurality of executable objects displayed within a second partial area, in the first partial area, according to various embodiments.

FIG. 51 illustrates an example of a split screen displayed within the first partial area by dropping onto the first partial area a plurality of executable objects displayed within the second partial area, according to various embodiments.

Figure 52:
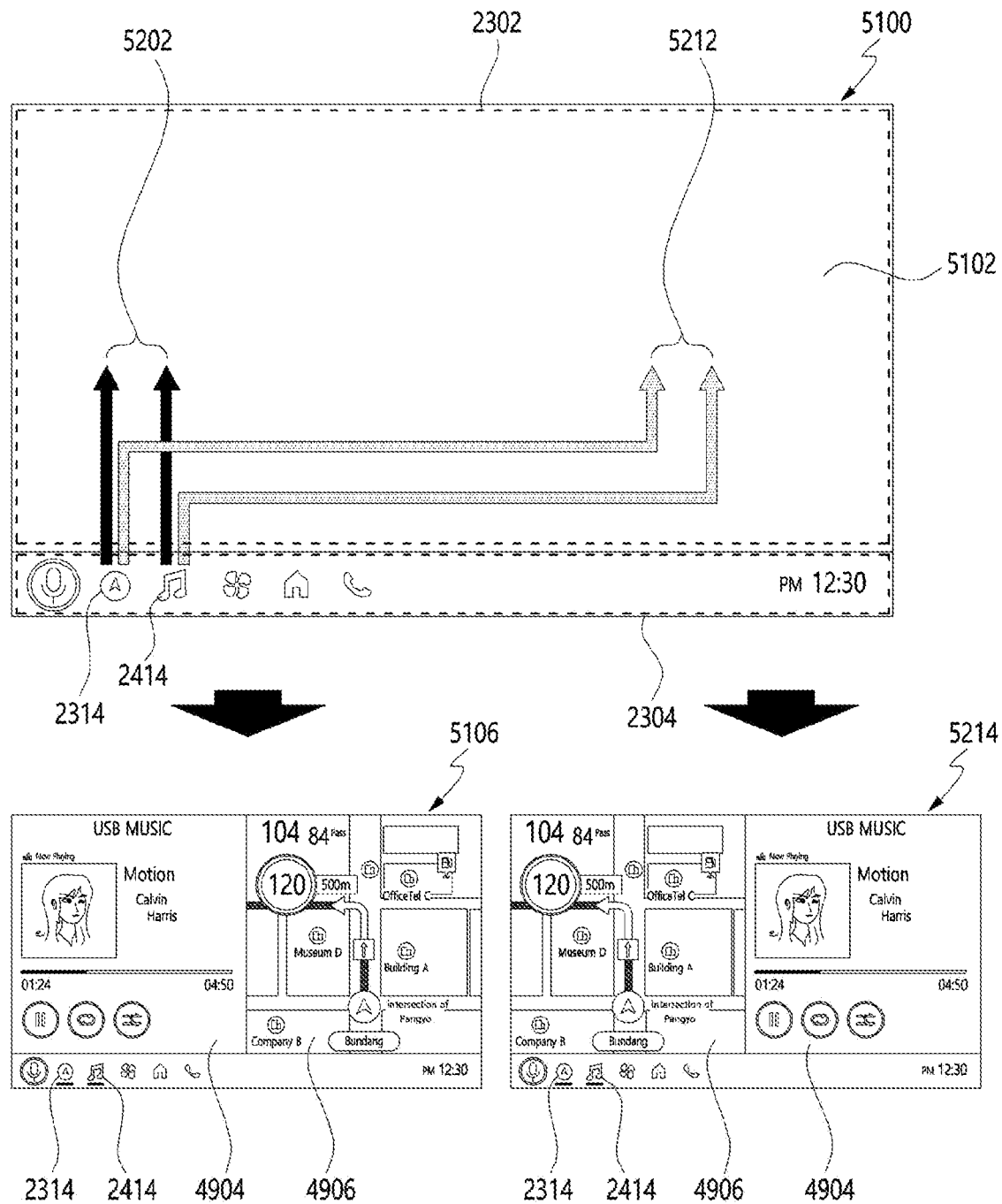
FIG. 52 illustrates an example of a split screen with an arrangement changed according to a position in a first partial area dropping a plurality of executable objects displayed within a second partial area, according to various embodiments.

FIG. 52 illustrates an example of a split screen with an arrangement changed according to a position within the first partial area dropping a plurality of executable objects displayed within the second partial area, according to various embodiments.

Referring now to FIG. 50, in an operation 5002, the processor 2230 may display the first executable object and the second executable object within the second partial area. Further, in various embodiments, the processor 2230 may not display any execution screen within the first partial area, while displaying the first executable object and the second executable object within the second partial area. For example, when an application executed in relation to the electronic device 2210 is only a system application, the processor 2230 may display no execution screen within the first partial area, while displaying the first executable object and the second executable object within the second partial area. For example, referring then to FIG. 51, in a state 5100, the processor 2230 may display a blank screen 5102 within the first partial area 2302 and display the first executable object 2314 and the second executable object 2414 within the second partial area 2304.

In an operation 5004, the processor 2230 may receive a user input dragging both the first executable object and the second executable object and then dropping them in the first partial area, while displaying the first executable object and the second executable object within the second partial area without displaying any execution screen in the first partial area. For example, referring then to FIG. 51, in the state 5100, the processor 2230 may receive a user input to drag both the first executable object 2314 and the second executable object 2414, and then drop them into the first partial area 2302 including a blank screen.

In an operation 5006, the processor 2230 may execute the first application and the second application in response to receiving the user input in an operation 5004. In various embodiments, when executing a plurality of applications concurrently or when a time interval between timings of executing each of a plurality of applications is less than or equal to a specified time, the processor 2230 may prefetch at least a part of instructions composing the first application and at least a part of instructions composing the second application into the memory 2235, in response to the initiation of the user input received in the operation 5004, so that the user can quickly feel the executing speed of the plurality of applications. For example, as soon as both the first executable object and the executable object are dragged by the user input in the operation 5004, the processor 2230 may prefetch at least a portion of the instructions for executing the first application and at least a portion of the instructions for executing the second application into the memory 2235. The processor 2230 can quickly execute the first application and the second application, by providing the memory 2235 with the remaining instructions of the instructions for executing the first application and providing the memory 2235 with the remaining instructions of the instructions for executing the second application, in response to identifying that the first executable object and the second executable object are dropped within the first partial area by a user input in the operation 5004 after executing the prefetch. However, it is not limited thereto.

In an operation 5008, the processor 2230 may display, in response to executing the first application and the second application, the reduced execution screen of the first application and the reduced execution screen of the second application within the first partial area. For example, referring again to FIG. 51, the processor 2230 may execute the first application and the second application in response to receiving a user input 5104 in a state 5100, and switch the state 5100 to a state 5106 in response to completing the executions of the first application and the second application. In the state 5106, the processor 2230 may display the reduced execution screen 4906 of the first application and the reduced execution screen 4904 of the second application within the first partial area 2302. For example, in the state 5106 switched from the state 5100, a blank screen 5102 included within the first partial area 2302 may be switched to a reduced execution screen 4906 of the first application and a reduced execution screen 4904 of the second application. On the other hand, in the state 5106, the first executable object 2314 and the second executable object 2414 may be highlighted relative to other executable objects within the second partial area 2304.

In the state 5106, the processor 2230 may receive a user input 5108 for moving the boundary between the reduced execution screen 4906 of the first application and the reduced execution screen 4904 of the second application. The processor 2230 may change the size of the reduced execution screen 4906 of the first application and the size of the reduced execution screen 4904 of the second application in response to receiving the user input 5108. For example, when receiving the user input 5108 configured with a drag input in the first direction, the processor 2230 may extend the reduced execution screen 4906 of the first application and further reduce the reduced execution screen 4904 of the second application. For another example, when receiving the user input 5108 configured with a drag input in the second direction opposite to the first direction, the processor 2230 may reduce the reduced execution screen 4906 of the first application and extend the reduced execution screen 4904 of the second application.

In the state 5106, the processor 2230 may receive a user input 5110 to the reduced execution screen 4906 of the first application. In various embodiments, the user input 5110 may have a property that is distinguished from user inputs for executable elements within the reduced execution screen 4906 of the first application. This may be to distinguish the user input 5110 from the executable elements within the reduced execution screen 4906 of the first application, even if the user input 5110 is caused in an area where the executable elements within the reduced execution screen 4906 of the first application are located. For example, the user input 5110 may consist of an input double-tapping the reduced screen 4906 of the first application, while the user inputs for the executable elements within the reduced execution screen 4906 of the first application may consist of inputs single-tapping the executable elements. The processor 2230 may switch, in response to receiving the user input 5110, the reduced execution screen 4906 of the first application displayed and the reduced execution screen 4904 of the second application, displayed within the first partial area 2302, to the execution screen of the first application. Further, in response to receiving the user input 5110, the processor 2230 may switch the second executable object 2414 displayed within the second partial area 2304 to the widget 2312 of the second application.

In the state 5106, the processor 2230 may receive a user input 5112 for the reduced execution screen 4904 of the second application. In various embodiments, the user input 5112 may have a property that is distinguished from user inputs for executable elements within the reduced execution screen 4904 of the second application. This may be to distinguish the user input 5112 from the executable elements within the reduced execution screen 4904 of the second application, even if the user input 5112 is caused in an area where the executable elements within the reduced execution screen 4904 of the second application are located. For example, the user input 5112 may consist of an input double-tapping the reduced screen 4904 of the second application, and the user inputs for executable elements in the reduced execution screen 4904 of the second application Inputs may consist of inputs single-tapping the executable elements. The processor 2230 may switch, in response to receiving the user input 5112, the reduced execution screen 4906 of the first application and the reduced execution screen 4904 of the second application, displayed in the first partial area 2302, to the execution screen 2402 of the second application. In response to receiving the user input 5112, the processor 2230 may switch the first executable object 2314 displayed within the second partial area 2304 to the widget 2412 of the first application.

In various embodiments, the processor 2230 may configure the arrangement of the reduced execution screen of the first application and the reduced execution screen of the second application displayed within the first partial area, in a different way, depending on a position where the first executable object and the second executable object are dropped by the user input received in the operation 5004. For example, referring to FIG. 52, the processor 2230 may switch the state 5100 to the state 5214, in response to receiving the user input 5202 dropping the first executable object 2314 and the second executable object 2414 in an area formed on the left side about the center line through the first partial area 2302 in the vertical direction from the state 5100. Depending on the dropped position of the first executable object 2314 and the second executable object 2414, the arrangement of the reduced execution screen 4906 of the first application and the reduced execution screen 4904 of the second application in the state 5214 may be made so that the reduced execution screen 4904 of the second application is disposed to the right side of the reduced execution screen 4906 of the first application, which is of the same arrangement as that of the first executable object 2314 and the second executable object 2414. For another example, referring again to FIG. 52, the processor 2230 may switch the state 5100 to the state 5106, in response to receiving the user input 4910 dropping the first executable object 2314 and the second executable object 2414 into an area formed to the right side about the center line through the first partial area 2302 in the vertical direction from the state 5100. Further, according to the dropped position of the first executable object 2314 and the second executable object 2414, the arrangement of the reduced execution screen 4906 of the first application and the reduced execution screen 4904 of the second application in the state 5106 may be made so that the reduced execution screen 4904 of the second application is disposed to the left side of the reduced execution screen 4906 of the first application, which is of a different arrangement as that of the first executable object 2314 and the second executable object 2414.

As described above, the electronic device 2210 according to various embodiments can display, in response to receiving a user input dropping a plurality of executable objects displayed within the second partial area into the first partial area, execution screens of a plurality of applications indicated by the plurality of executable objects as a split screen. The electronic device 2210 according to various embodiments can provide its user with more enhanced user experience, thanks to providing such a split screen using an intuitive user input like the above user input.

Figure 53:
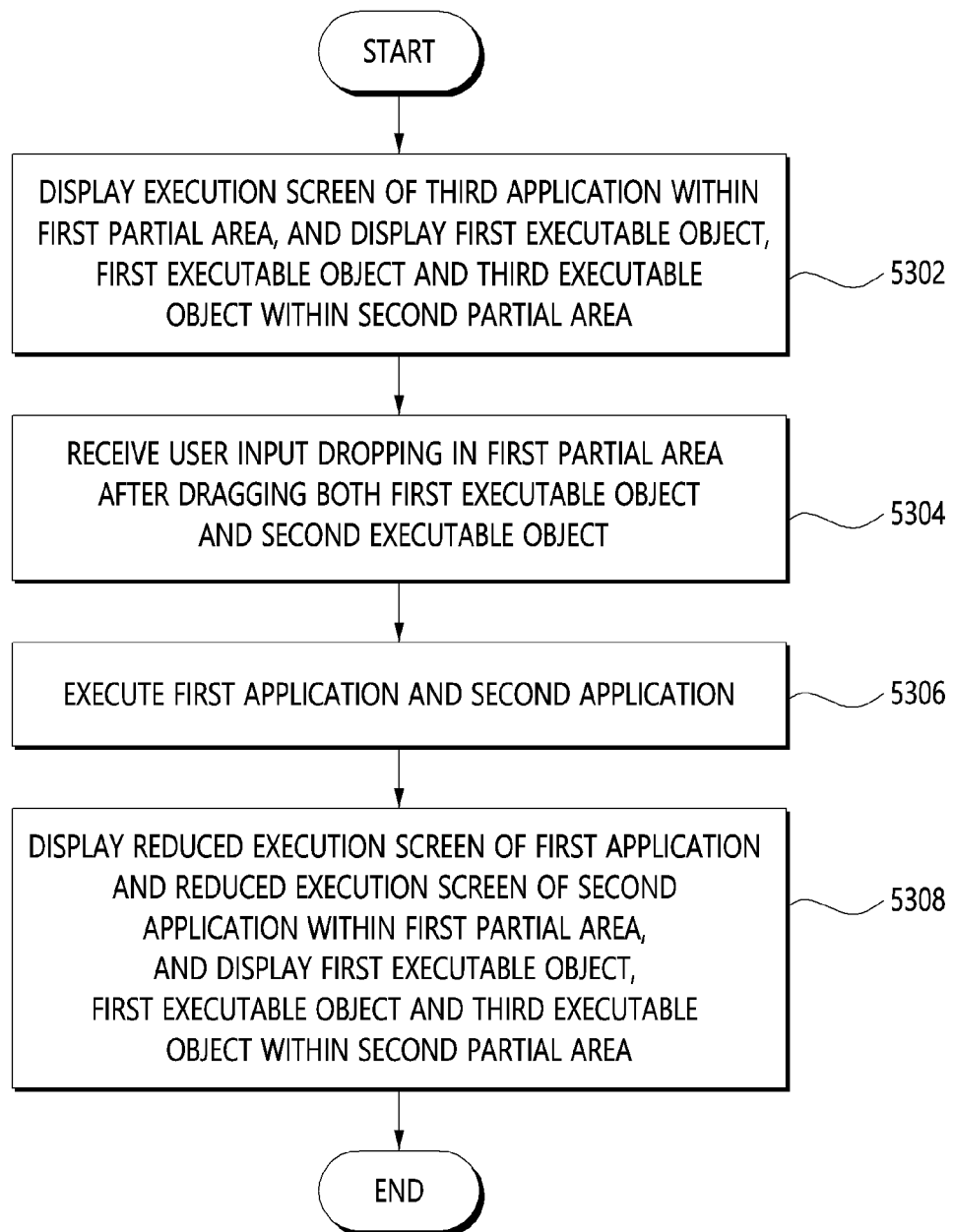
FIG. 53 illustrates a flowchart for an operating method of an electronic device to display a split screen within a first partial area by dropping a plurality of executable objects displayed within a second partial area, in the first partial area including an execution screen of an application, according to various embodiments.

FIG. 53 illustrates a flowchart for an operation method of the electronic device displaying a split screen within the first partial area, by dropping a plurality of executable objects displayed within the second partial area into the first partial area including an execution screen of an application, according to various embodiments. This method may be executed by the infotainment device 100, the control device 2100 or the electronic device 2210, or may be executed by the processor 2230.

Figure 54:
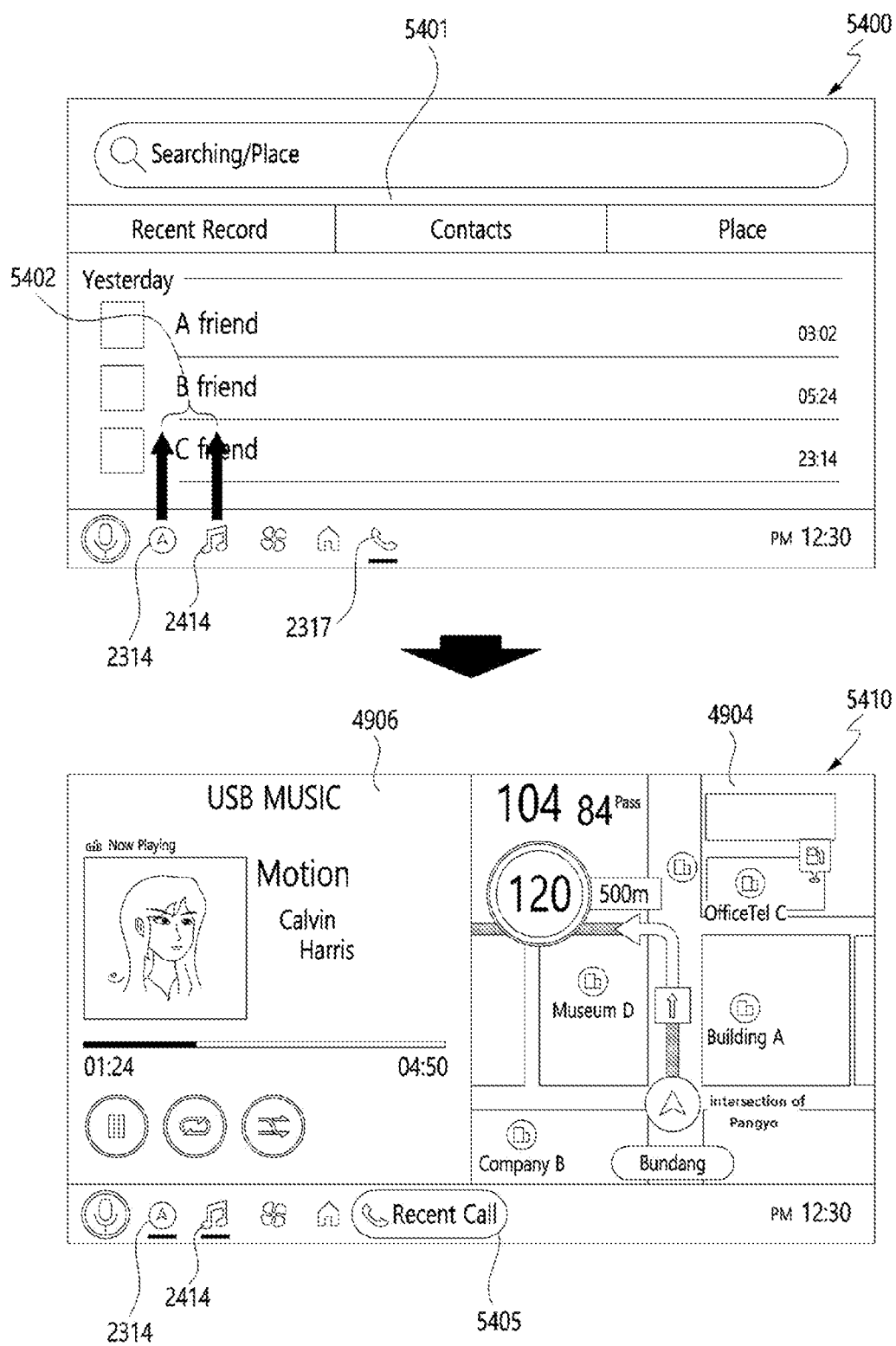
FIG. 54 illustrates an example of a split screen displayed within a first partial area by dropping a plurality of executable objects displayed within a second partial area, in the first partial area including an execution screen of an application, according to various embodiments.

FIG. 54 illustrates an example of such a split screen displayed in the first partial area by dropping a plurality of executable objects displayed in the second partial area into the first partial area including an execution screen of an application, according to various embodiments.

Referring now to FIG. 53, in an operation 5302, the processor 2230 may display an execution screen of the third application within the first partial area, and display a first executable object, a first executable object and a third executable object within the second partial area. For example, referring then to FIG. 54, in a state 5400, the processor 2230 may display the execution screen 5401 of the third application within the first partial area 2302, and display the first executable object 2314, the second executable object 2414, and the third executable object 2317 within the second partial area 2304. The third executable object 2317 may be highlighted relative to the first executable object 2314 and the second executable object 2414 to indicate that the third application is being executed.

In an operation 5304, the processor 2230 may receive a user input that is dropped in the first partial area after dragging both the first executable object and the second executable object displayed within the second partial area. For example, referring to FIG. 54, in the state 5400, the processor 2230 may receive a user input 5402 dropped in the first partial area 2302 including the execution screen 5401 of the third application after dragging both the first executable object 2314 and the second executable object 2414.

In an operation 5306, the processor 2230 may execute the first application and the second application in response to receiving the user input in an operation 5304. In various embodiments, when executing a plurality of applications concurrently or when a time interval between timings of executing each of a plurality of applications is less than or equal to a specified time, the processor 2230 may prefetch at least a part of instructions composing the first application and at least a part of instructions composing the second application into the memory 2235, in response to the initiation of the user input received in the operation 5304, so that the user can quickly feel the executing speed of the plurality of applications. For example, as soon as both the first executable object and the executable object are dragged by the user input in the operation 5304, the processor 2230 may prefetch at least some of the instructions for executing the first application and at least some of the instructions for executing the second application into the memory 2235. The processor 2230 can quickly execute the first application and the second application, by providing the memory 2235 with the remaining instructions of the instructions for executing the first application and also providing the memory 2235 with the remaining instructions of the instructions for executing the second application, in response to identifying that the first executable object and the second executable object are dropped within the first partial area by the user input in the operation 5304 after executing the prefetch. However, it is not limited thereto.

In an operation 5308, the processor 2230, in response to executing the first application and the second application, may display a reduced execution screen of the first application and a reduced execution screen of the second application within the first partial area, and a widget of the third application switched from the third executable object within the second partial area. For example, the execution screen of the third application displayed in the first partial area may be switched, in response to executing the first application and the second application, to the reduced execution screen of the first application and the reduced execution screen of the second application within the first partial area. For example, the execution screen of the third application displayed within the first partial area may be switched to the widget of the third application displayed within the second partial area. For example, referring again to FIG. 54, in response to receiving the user input 5402 in the state 5400, the processor 2230 may execute the first application and the second application, and in response to completing the executions of the first application and the second application, the processor may switch the state 5400 to the state 5410. The processor 2230 may, in the state 5410, display the reduced execution screen 4906 of the first application and the reduced execution screen 4904 of the second application within the first partial area 2302. For example, in the state 5410 switched from the state 5400, the execution screen 5401 of the third application included within the first partial area 2302 may be switched to the reduced execution screen 4906 of the first application and the reduced execution screen 4904 of the second application. For example, in the state 5410 switched from the state 5400, the execution screen 5401 of the third application included within the first partial area 2302 may be switched to the widget 5405 of the third application within the second partial area 5410.

Although not shown in FIG. 54, the processor 2230 may determine the arrangement of the reduced execution screen 4906 of the first application and the reduced execution screen 4904 of the second application, depending on the location of the first executable object 2314 and the second executable object 2414 dropped by the user input 5402 received in the state 5400.

As described above, the electronic device 2210 according to various embodiments can display, in response to receiving a user input dropping a plurality of executable objects displayed within the second partial area onto the first partial area including an execution screen of an application, execution screens of a plurality of applications indicated by the plurality of executable objects within the first partial area, as a split screen, and display an widget of the application within the second partial area. The electronic device 2210 according to various embodiments can provide its user with more enhanced user experience thanks to providing such a split screen and a widget through an intuitive user input as in the above user input.

Figure 55:
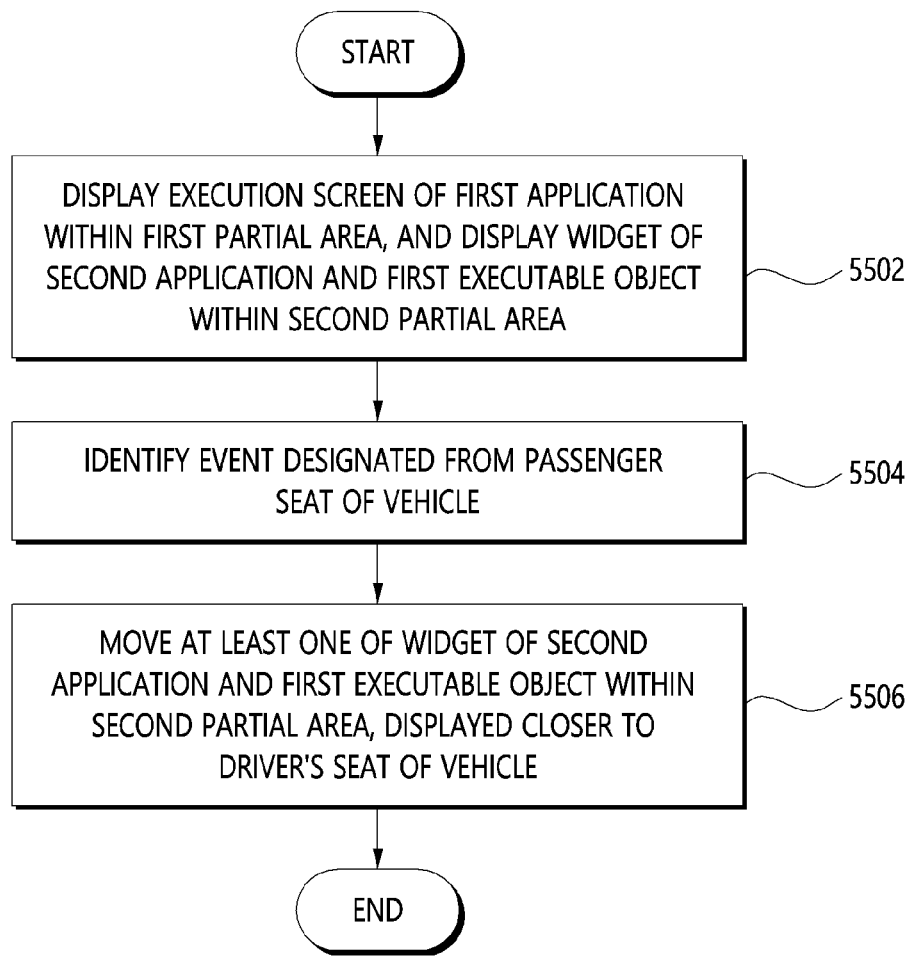
FIG. 55 illustrates a flowchart for an operating method of an electronic device to move a widget or executable object within a second partial area based on identifying a designated event from a passenger seat, according to various embodiments.

FIG. 55 illustrates a flowchart for an operation method of the electronic device for moving a widget or an executable object within a second partial area based on identifying a designated event from a passenger seat of the vehicle according to various embodiments. This method may be executed by the infotainment device 100, the control device 2100 or the electronic device 2210, or may be executed by the processor 2230.

Figure 56:
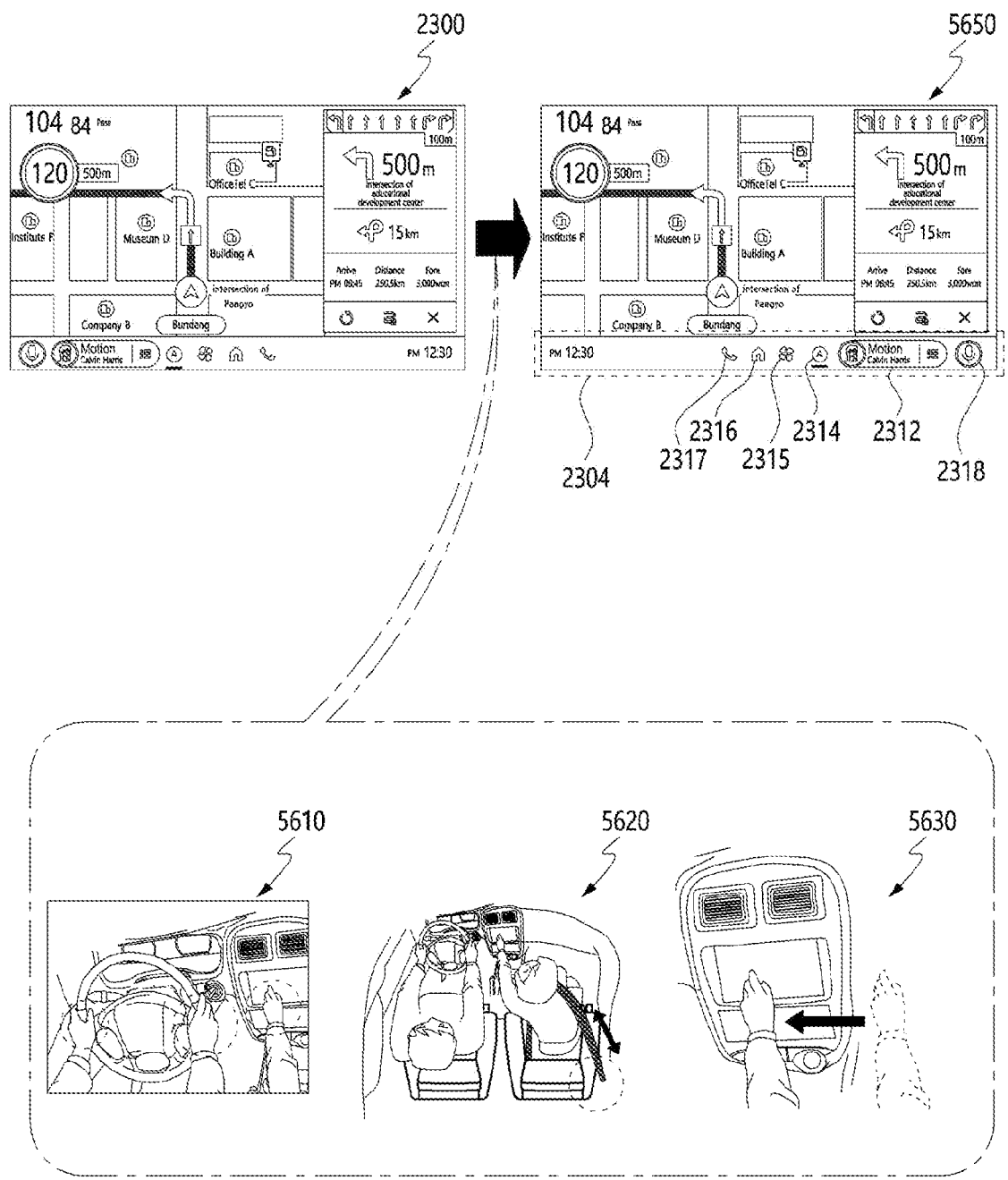
FIG. 56 shows an example of a widget or an executable object within a second partial area that is moved based on identifying a designated event from the passenger seat, according to various embodiments.

FIG. 56 illustrates an example of a widget or an executable object within the second partial area that may be moved based on identifying an event designated from the passenger seat according to various embodiments.

Referring first to FIG. 55, in an operation 5502, the processor 2230 may display the execution screen of the first application within the first partial area, and display the widget of the second application and the first executable object within the second partial area. For example, referring then to FIG. 56, in a state 2300, the processor 2230 may display the execution screen 2310 of the first application within the first partial area 2302 and then display the widget 2312 of the second application and the first executable object 2314 within the second partial area 2304.

In an operation 5504, the processor 2230 may identify an event designated from the passenger seat of the vehicle, while displaying the execution screen of the first application within the first partial area and displaying the widget of the second application and the first executable object within the second partial area. The identification of the designated event may be set in various ways. For example, the identification of the designated event may be executed by identifying a hovering input or a gesture input on the display area configured of the first partial area and the second partial area while identifying that both hands of the driver are in contact with a steering wheel of the vehicle. For example, the identification of the designated event may be performed by identifying at least one of a change in weight of a user sitting in the passenger seat of the vehicle or a change in tension of a seat belt worn by the user sitting in the passenger seat of the vehicle. For example, the identification of the designated event may be performed by identifying that the position where the user's hand has entered the display area is located closer to the passenger seat of the vehicle than to the driver's seat of the vehicle.

For example, referring again to FIG. 56, the processor 2230 may identify a designated event 5610 in the state 2300. For example, the identification of the designated event 5610 may be performed by identifying a hovering input, a gesture input or a touch input on or over the display area configured of the first partial area and the second partial area, while identifying that both hands are in contact with the steering wheel of the vehicle. For example, the hovering input, the gesture input or the touch input may be identified with at least one touch sensor in the display 2240. For another example, the hovering input, the gesture input or the touch input may be identified with a camera 2247. However, it is not limited thereto.

For another example, referring again to FIG. 56, the processor 2230 may identify the designated event 5620 in the state 2300. For example, the identification of the designated event 5620 may be performed by identifying at least one of a change in weight of the user sitting in the passenger seat of the vehicle or a change in tension of the seat belt worn by the user sitting in the passenger seat of the vehicle.

For example, the change in weight may be identified by means of a sensor 2249 mounted in conjunction with the passenger seat. For example, the change in tension may be identified by means of the sensor 2249 mounted in conjunction with the seat belt of the passenger seat. However, it is not limited thereto.

As another example, referring to FIG. 56, the processor 2230 may identify the designated event 5630 in the state 2300. For example, the identification of the designated event 5630 may be performed by identifying that the position where the user's hand has entered the display area is closer to the passenger seat of the vehicle than to the driver's seat of the vehicle. For example, the identifying that the position where the user's hand has entered the display area is closer to the passenger seat of the vehicle than to the driver's seat of the vehicle may be executed by means of at least one touch sensor in the display 2240, although not limited thereto.

In an operation 5506, the processor 2230 may move, in response to identifying the designated event in an operation 5504, at least one of the widget of the second application and the first executable object within the second partial area, displayed closer to the driver's seat of the vehicle than to the passenger seat of the vehicle. For example, if the widget of the second application of the widget of the second application and the first executable object within the second partial area is located closer to the driver's seat of the vehicle than to the passenger seat of the vehicle, then the processor 2230 may move only the widget of the second application of the widget of the second application and the first executable object. The moved widget of the second application may be displayed within the second partial area closer to the passenger seat of the vehicle than to the driver's seat of the vehicle. For another example, if the first executable object of the widget of the second application and the first executable object within the second partial area is located closer to the driver's seat of the vehicle than to the passenger seat of the vehicle, then the processor may move only the first executable object of the widget of the second application and the first executable object. The moved first executable object may be displayed within the second partial area closer to the passenger seat of the vehicle than to the driver's seat of the vehicle. For another example, if both the widget of the second application and the first executable object in the second partial area are located closer to the driver's seat of the vehicle than to the passenger seat of the vehicle, then the processor 2230 may move both the widget of the second application and the first executable object. The moved widget of the second application and the moved first executable object may be displayed within the second partial area closer to the passenger seat of the vehicle than to the driver's seat of the vehicle.

For example, referring now to FIG. 56, the processor 2230 may switch the state 2300 to the state 5650, in response to identifying at least one of a designated event 5610, a designated event 5620, or a designated event 5630 in the state 2300. In the state 5650, the processor 2230 may display the widget 2312 of the second application, the first executable object 2314, the executable object 2315, the executable object 2316, and the executable object 2317, at a position within the second partial area 2304 moved to the right relative to the state 2300. In the state 5650, the processor 2230 may display information receiving no user input (such as e.g., time information) at a position moved to the left, as different from the widget 2312 of the second application, the first executable object 2314 and the executable object 2315, the executable object 2316, and the executable object 2317.

In the meantime, although not shown in FIGS. 55 and 56, the processor 2230 may move, in response to identifying the designated event in the operation 5504, at least one executable element in the execution screen of the first application within the first partial area displayed closer to the driver's seat of the vehicle than to the passenger seat of the vehicle. For example, the moved at least executable element may be displayed within the first partial area, closer to the passenger seat of the vehicle than to the driver's seat of the vehicle.

As described above, the electronic device 2210 according to various embodiments makes it possible to identify a designated event from the passenger seat, and in response to and in response to the identification, move at least one of at least one executable object, at least one executable element, or at least one widget, so as for the driver sitting in the passenger seat to more conveniently control at least one of the at least one executable object, the at least one executable element, or the at least one widget, included within the first partial area or the second partial area. The electronic device 2210 according to various embodiments can provide its user with more enhanced user experience owing to such movement of at least one of the at least one executable object, the at least one executable element, or the at least one widget.

Figure 57:
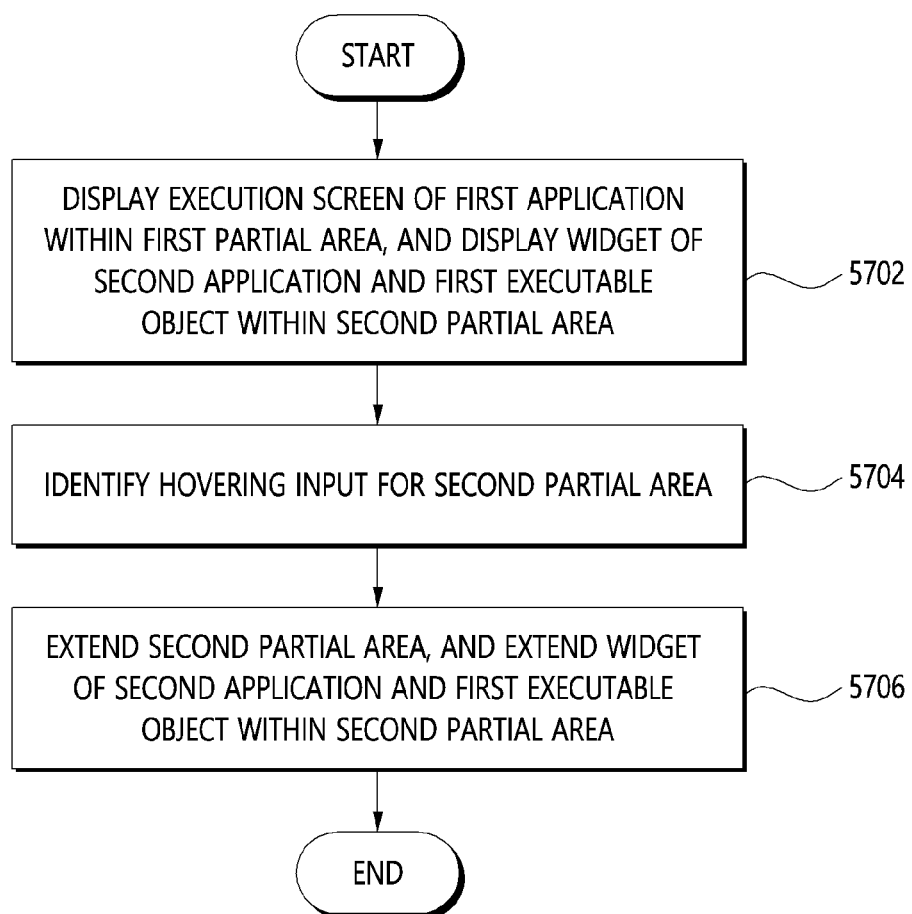
FIG. 57 illustrates a flowchart for an operating method of an electronic device to extend a second partial area based on a hovering input according to various embodiments.

FIG. 57 illustrates a flowchart for a method of the electronic device for extending the second partial area based on a hovering input, according to various embodiments. This method may be executed by the infotainment device 100, the control device 2100 or the electronic device 2210, or may be executed by the processor 2230.

Figure 58:
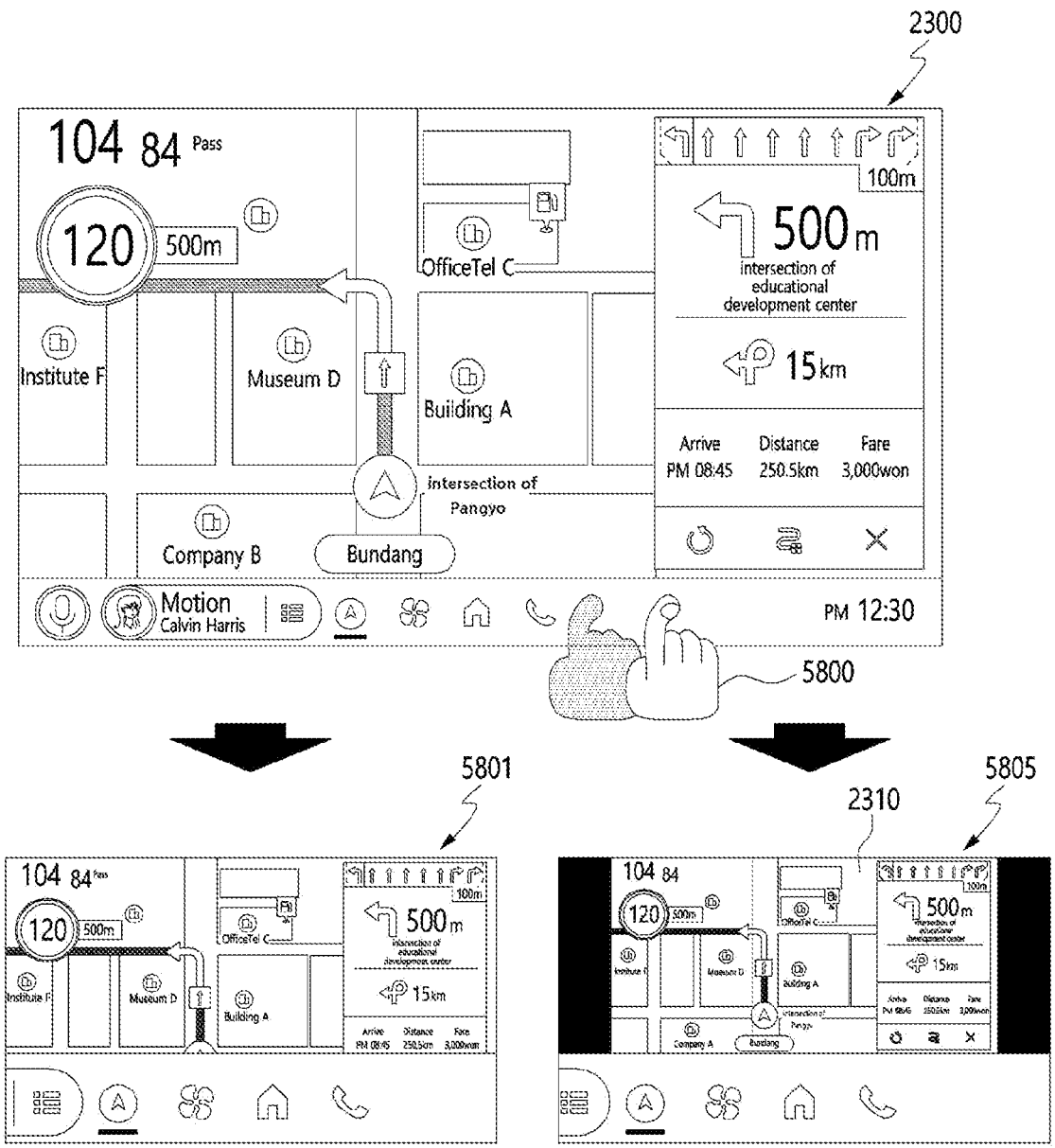
FIG. 58 illustrates an example of a second partial area that extends based on a hovering input according to various embodiments.

FIG. 58 illustrates an example of the second partial area extended based on a hovering input according to various embodiments.

Referring now to FIG. 57, in an operation 5702, the processor 2230 may display an execution screen of the first application within the first partial area and display a widget of the second application and the first executable object within the second partial area, while the vehicle equipped with the electronic device 2210 is moving. For example, referring then to FIG. 58, in the state 2300, the processor 2230 may display the execution screen 2310 of the first application within the first partial area 2302 and display the widget 2312 of the second application and the first executable object 2314 within the second partial area 2304.

In an operation 5704, the processor 2230 may identify a hovering input for the second partial area, while displaying the execution screen of the first application within the first partial area and the widget of the second application and the first executable object within the second partial area, while the vehicle equipped with the electronic device 2210 is moving. For example, the hovering input may be a hovering input caused by a user's hand spaced apart from the second partial area and positioned above the second partial area. For example, referring to FIG. 58, in the state 2300, the processor 2230 may identify the hovering input 5800 for the second partial area 2304.

In an operation 5706, the processor 2230 may extend, in response to identifying the hovering input in the operation 5704, the second partial area and then extend the widget of the second application and the first executable object within the second partial area.

In some embodiments, the size of the first partial area may be maintained independently from the extension of the second partial area. When the size of the first partial area is maintained independently of the extension of the second partial area, a part of the extended second partial area may be overlapped with at least a part of the first partial area on which the execution screen of the first application is displayed. For example, referring to FIG. 58, the processor 2230 may switch the state 2300 to the state 5801 in response to receiving the hovering input 5800 in the state 2300. In the state 5801, the processor 2230 may extend the second partial area 2304. In the state 5801, the processor 2230 may maintain the size of the first partial area 2302 independently of the extension of the second partial area 2304. Due to the maintaining of the size of the first partial area 2302, a part of the extended second partial area 2304 may be overlapped on a part of the first partial area 2302. For example, a part of the execution screen 2310 of the first application in the first partial area 2302 may be covered by a part of the extended second partial area 2304. In some other embodiments, the size of the first partial area may be reduced by the extension of the second partial area. When the size of the first partial area is reduced, the extended second partial area may be adjacent to the reduced first partial area or may be separated from the reduced first partial area. In other words, when the size of the first partial area is reduced, the extended second partial area may not overlap the reduced first partial area. Meanwhile, the execution screen of the first application may be reduced by the reduction of the first partial area. Due to the reduction of the execution screen of the first application, a part of the reduced first partial area may be displayed as a black screen. For example, referring to FIG. 58, the processor 2230 may switch the state 2300 to the state 5805 in response to receiving the hovering input 5800 in the state 2300. In state 5805, the processor 2230 may extend the second partial area 2304. In the state 5805, the processor 2230 may reduce the size of the first partial area 2302 according to the extension of the second partial area 2304. The reduction in the size of the first partial area 2302 may cause the execution screen 2310 of the first application in the first partial area 2302 to be reduced. Meanwhile, at least a portion of the first partial area 2302 may be configured as a black screen according to the reduction of the execution screen 2310 of the first application.

In some embodiments, the second partial area may be extended to a size corresponding to the moving speed of the vehicle based on identifying the hovering input. In some embodiments, each of the widget of the second application and the first executable object may be extended to a size corresponding to the moving speed of the vehicle, based on the identification of the hovering input. In some embodiments, each of the first executable element and the second executable element may be extended to a size corresponding to the moving speed of the vehicle based on identifying the hovering input.

As understood from the foregoing description, the electronic device 2210 according to various embodiments makes it possible to improve, relative to a hovering input for the second partial area, the accuracy of any user inputs for the second partial area to be received after receiving the hovering input, owing to the extended second partial area. Thus, the electronic device 2210 according to various embodiments can provide its users with more enhanced user experience thanks to its improved manipulating accuracy.

Figure 59:
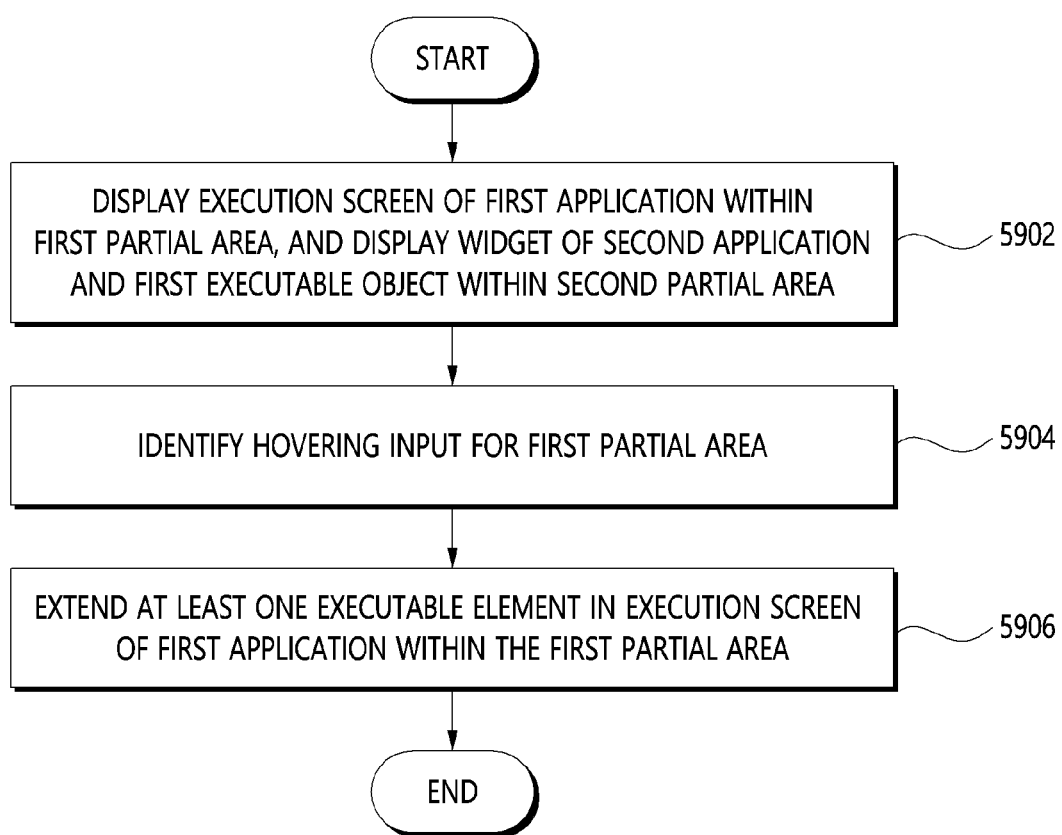
FIG. 59 illustrates a flowchart for an operating method of an electronic device to extend at least one executable element in an execution screen of an application within a first partial area based on a hovering input, according to various embodiments.

FIG. 59 illustrates a flowchart for a method of the electronic device for extending at least one executable element in an execution screen of an application within the first partial area based on a hovering input, according to various embodiments. This method may be executed by the infotainment device 100, the control device 2100 or the electronic device 2210, or may be executed by the processor 2230.

Figure 60:
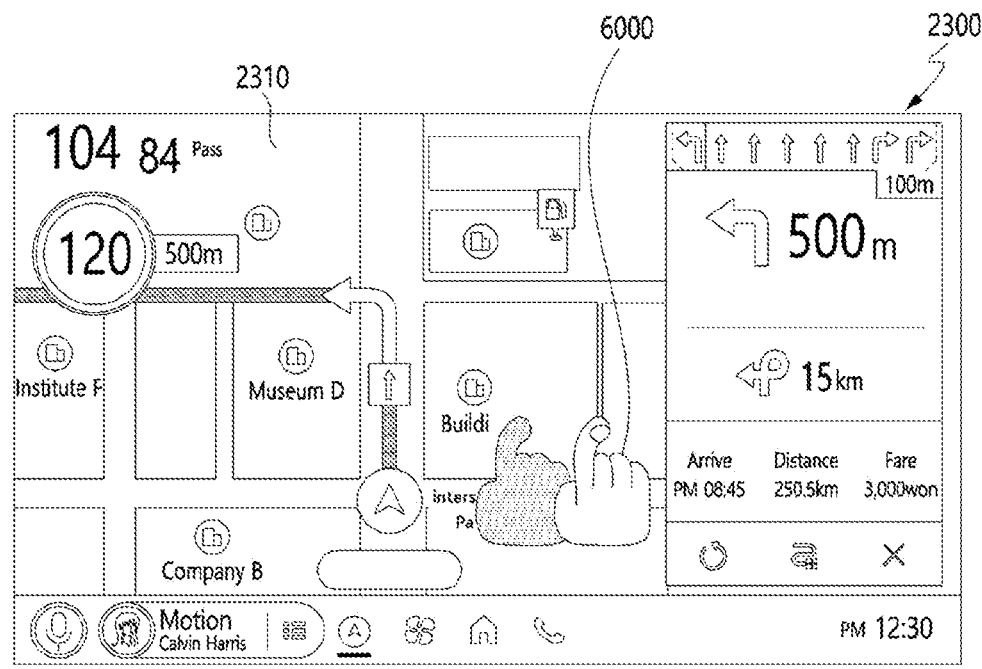
FIG. 60 illustrates an example of at least one executable element in an execution screen of an application within a first partial area that extends based on a hovering input according to various embodiments.
Figure 60:
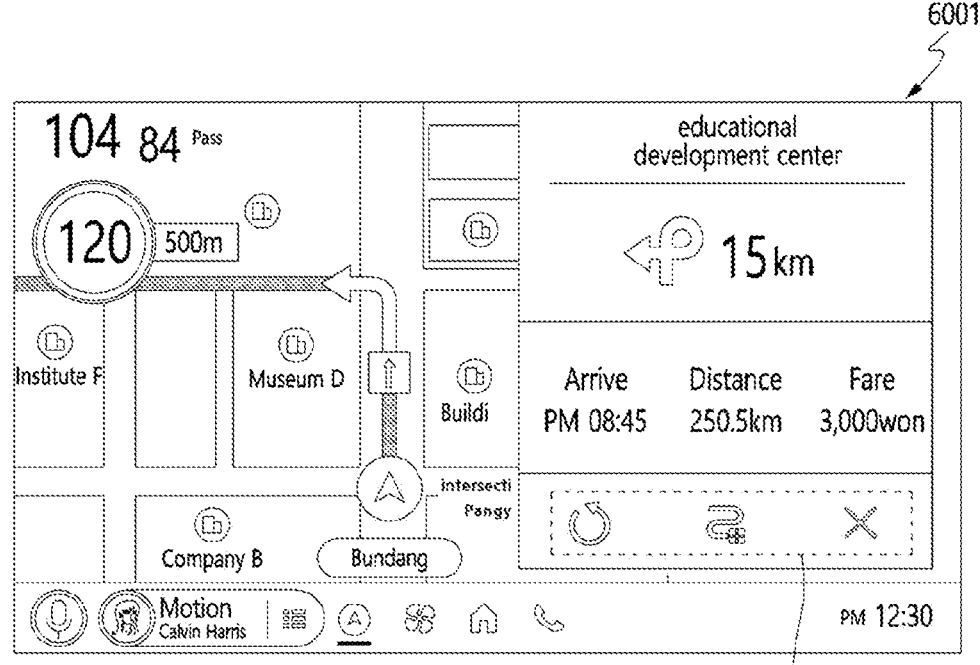

FIG. 60 illustrates an example of at least one executable element in an execution screen of an application within the first partial area that is extended based on a hovering input according to various embodiments.

Referring now to FIG. 59, in an operation 5902, the processor 2230 may display the execution screen of the first application within the first partial area and display the widget of the second application and the first executable object within the second partial area, while the vehicle including the electronic device 2210 is moving. For example, referring to FIG. 60, in the state 2300, the processor 2230 may display the execution screen 2310 of the first application within the first partial area 2302 and then display the widget 2312 of the second application and the first executable object 2314 within the second partial area 2304.

In an operation 5904, the processor 2230 may identify a hovering input for the first partial area, while displaying the execution screen of the first application within the first partial area and displaying the widget of the second application and the first executable object within the second partial area, with the vehicle equipped with the electronic device 2210 moving. For example, the hovering input may be a hovering input caused by the user's hand spaced apart from the first partial area and positioned above the first partial area. For example, referring again to FIG. 60, in the state 2300, the processor 2230 may identify a hovering input 6000 for the first partial area 2302.

In an operation 5906, the processor 2230 may extend, in response to identifying the hovering input in an operation 5904, at least one executable element in the execution screen of the first application within the first partial area. In various embodiments, the size of the first partial area may be maintained independently of the extension of the at least one executable element. In various embodiments, the size of the second partial area may be maintained independently of the extension of the at least one executable element. In some embodiments, the size of at least one visual object within the execution screen of the first application in the first partial area, which is distinct from the at least one executable element, may be maintained independently of the extension of the at least one executable element. For example, referring again to FIG. 60, the processor 2230 may switch the state 2300 to the state 6001 in response to receiving a hovering input 6000 in the state 2300. In the state 6001, the processor 2230 may extend at least one executable element 6003 within the execution screen 2310 of the first application in the first partial area 2302. In the state 6001, the size of first partial area 2302 may be maintained independently of the extension of the at least one executable element 6003. In the state 6001, the size of second partial area 2304 may be maintained independently of the extension of the at least one executable element 6003. In some embodiments, the size of at least one visual object (for example, at least one visual object configuring an electronic map) within the execution screen 2310 of the first application in the first partial area 2302, which is distinct from at least one executable element, may be maintained independently of the extension of the at least one executable element 6003. However, it is not limited thereto.

As described above, the electronic device 2210 according to various embodiments makes it possible to improve, based on a hovering input for the first partial area, the accuracy of a user input for at least one executable element to be received after receiving the hovering input, by extending the at least one executable element of an execution screen of an application within the first partial area. The electronic device 2210 according to various embodiments can provide its user with more enhanced user experience thanks to providing the improved accuracy in user inputs.

Figure 61:
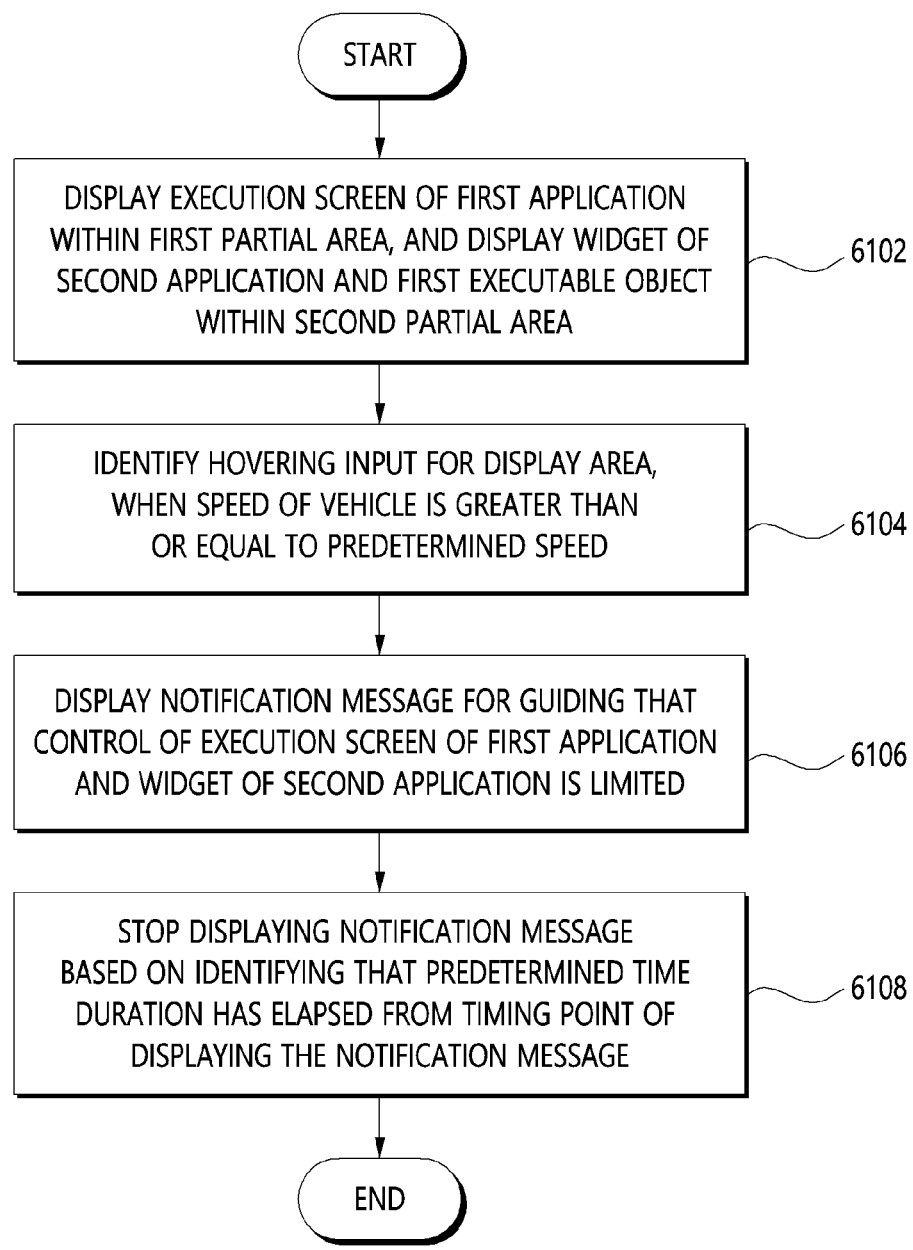
FIG. 61 illustrates a flowchart for an operating method of an electronic device for displaying a notification message based on a hovering input according to various embodiments.

FIG. 61 shows a flowchart for a method of the electronic device for displaying a notification message based on a hovering input according to various embodiments. This method may be executed by the infotainment device 100, the control device 2100 or the electronic device 2210, or may be executed by the processor 2230.

Figure 62:
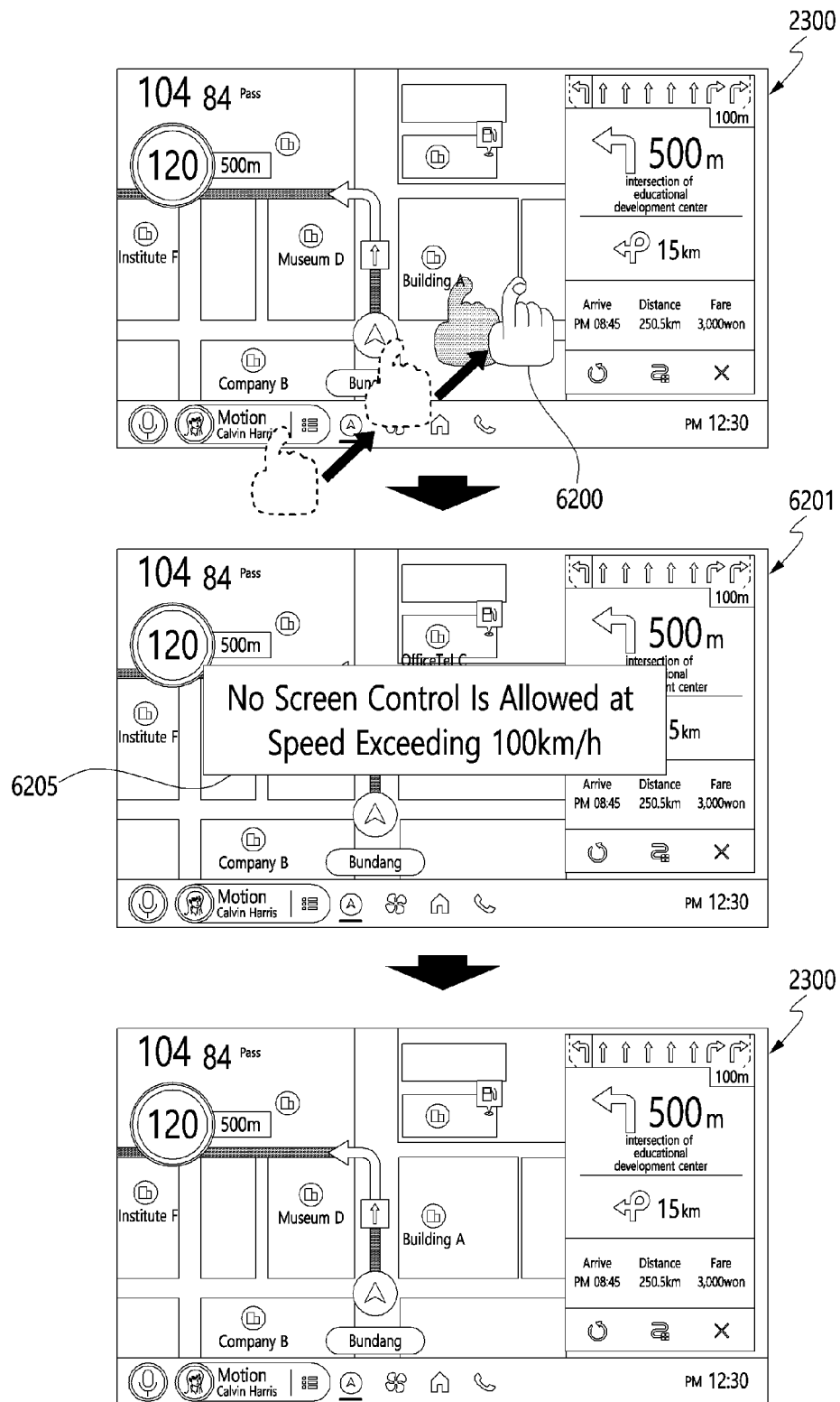
FIG. 62 illustrates an example of a notification message displayed based on a hovering input according to various embodiments.

FIG. 62 shows an example of a notification message displayed based on a hovering input according to various embodiments.

Referring now to FIG. 61, in an operation 6102, the processor 2230 may display an execution screen of the first application within the first partial area and display a widget of the second application and the first executable object within the second partial area, while the vehicle equipped with the electronic device 2210 is travelling. For example, referring then to FIG. 62, in the state 2300, the processor 2230 may display the execution screen 2310 of the first application within the first partial area 2302 and then display the widget 2312 of the second application and the first executable object 2314 within the second partial area 2304.

In an operation 6104, the processor 2230 may identify a hovering input for the display area including the first partial area and the second partial area, in case where the speed of the vehicle in travelling is greater than or equal to a predetermined speed. For example, the predetermined speed may be a kind of parameter to be set in order to prevent a traffic accident from occurring due to requiring a user input for an execution screen, an executable object, or a widget displayed in the display area, in case where the vehicle is moving at a speed exceeding the predetermined speed limit, the specified speed. In various embodiments, the predetermined speed may be configured by means of either a system setting or a user setting. Further, the hovering input may be a hovering input caused by the user's hand spaced apart from the display area and positioned over the display area. For example, referring to FIG. 62, in the state 2300, the processor 2230 may identify a hovering input 6200 for the display area. Although FIG. 62 illustrates an example in which the hovering input 6200 is identified within the first partial area 2302, but it is to be noted that this is only for convenience of the description. In various embodiments, the hovering input 6200 may be identified within the second partial area 2304.

In an operation 6106, the processor 2230 may display, in response to identifying the hovering input in an operation 6104, a notification message for guiding that a limited control of the execution screen of the first application and the widget of the second application is made. In various embodiments, the notification message may be displayed in an overlapping manner on the execution screen of the first application within the first partial area. In various embodiments, the processor 2230 may deactivate all those executable elements within the execution screen of the first application and the widget of the second application, while displaying the notification message. In some embodiments, displaying of all the executable elements within the execution screen of the first application and the widget of the second application may be maintained independently of the deactivation. In some other embodiments, the displaying of all the executable elements within the execution screen of the first application and the widget of the second application may be changed to indicate such a deactivation. For example, the displaying of all the executable elements within the execution screen of the first application and the widget of the second application may be blurred to indicate the deactivation, although it is not limited thereto.

For example, referring to FIG. 62, the processor 2230 may switch the state 2300 to the state 6201 in response to receiving the hovering input 6200 in the state 2300. In the state 6201, the processor 2230 may further display a notification message 6205. In various embodiments, the notification message 6205 may include a text for guiding the predetermined speed limit and/or another text for guiding that the limited control of the execution screen 2310 of the first application and the widget 2312 of the second application is made. In various embodiments, the notification message 6205 may be displayed overlapping on the execution screen 2310 of the first application.

In an operation 6108, the processor 2230 may stop displaying the notification message based on identifying that a predetermined time duration has elapsed from the timing at which the notification message was displayed. For example, referring to FIG. 62, the processor 2230 may identify whether the predetermined time duration elapses from the timing of displaying the notification message 6205 in the state 6201, and based on identifying that the predetermined time duration has elapsed from the timing, may switch or restore the state 6201 to the state 2300. In the state 2300, the processor 2300 may stop displaying the notification message 6205.

Further, the processor 2230 may identify whether another hovering input distinguished from the hovering input identified in the operation 6104 is identified, while identifying whether the predetermined time duration has elapsed from the timing of displaying the notification message. When the other hovering input is identified. The processor 2230 may maintain displaying of the notification message, unlike the operation 6108, although it is not limited thereto.

As understood from the foregoing description, the electronic device 2210 according to various embodiments makes it possible to interrupt receipt of any user inputs onto a part of the display area of the display 2240 capable of receiving the user input, and display the notification or warning message, thereby preventing a possible traffic accident caused by the user inputs.

Figure 63:
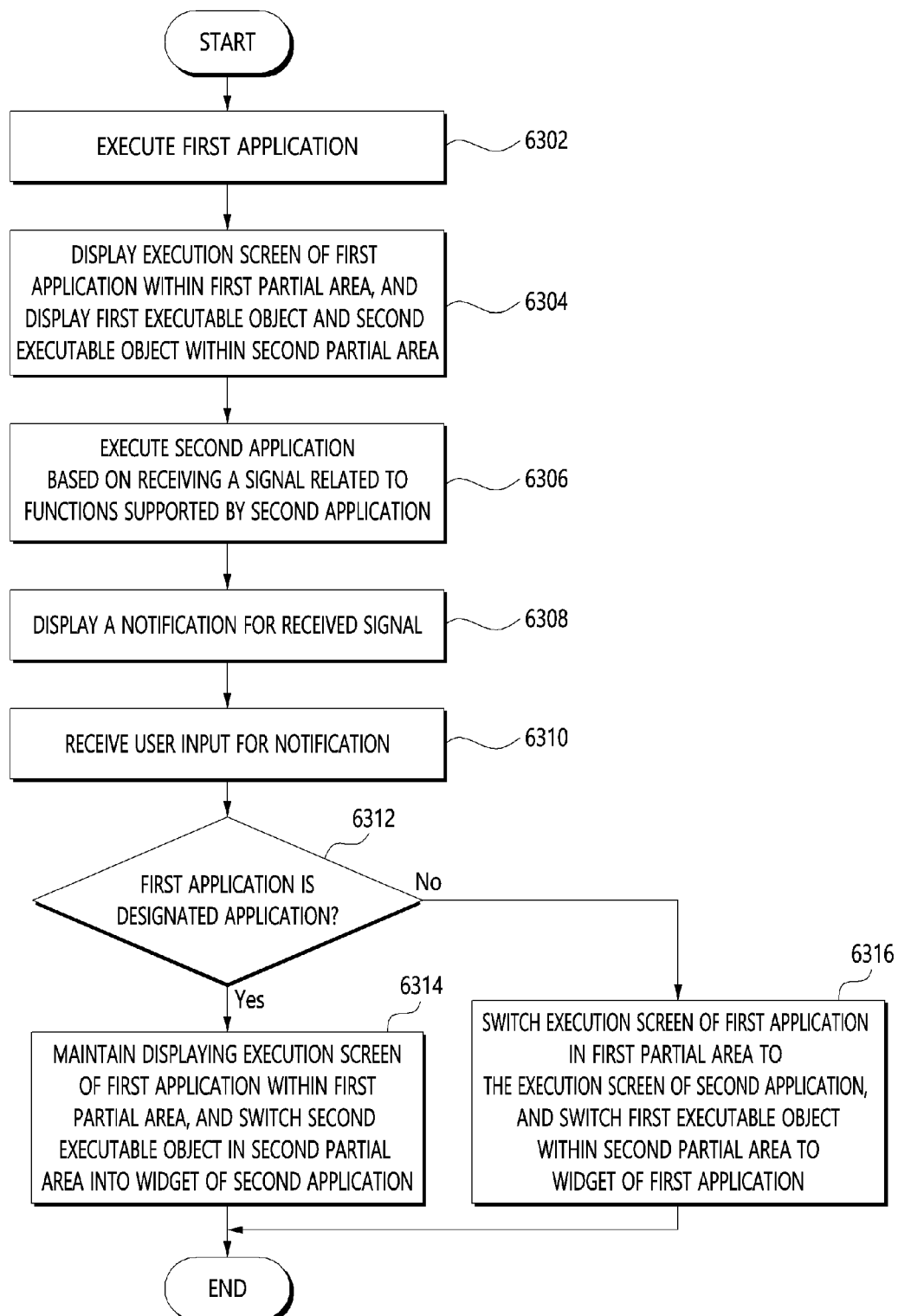
FIG. 63 illustrates a flowchart for an operating method of an electronic device for processing a notification related to another application that is made while displaying an execution screen of an application according to various embodiments.

FIG. 63 illustrates a flowchart for a method of the electronic device for processing any notification related to another application, which may be caused while displaying an execution screen of an application, according to various embodiments. This method may be executed by the infotainment device 100, the control device 2100 or the electronic device 2210, or may be executed by the processor 2230.

Figure 64:
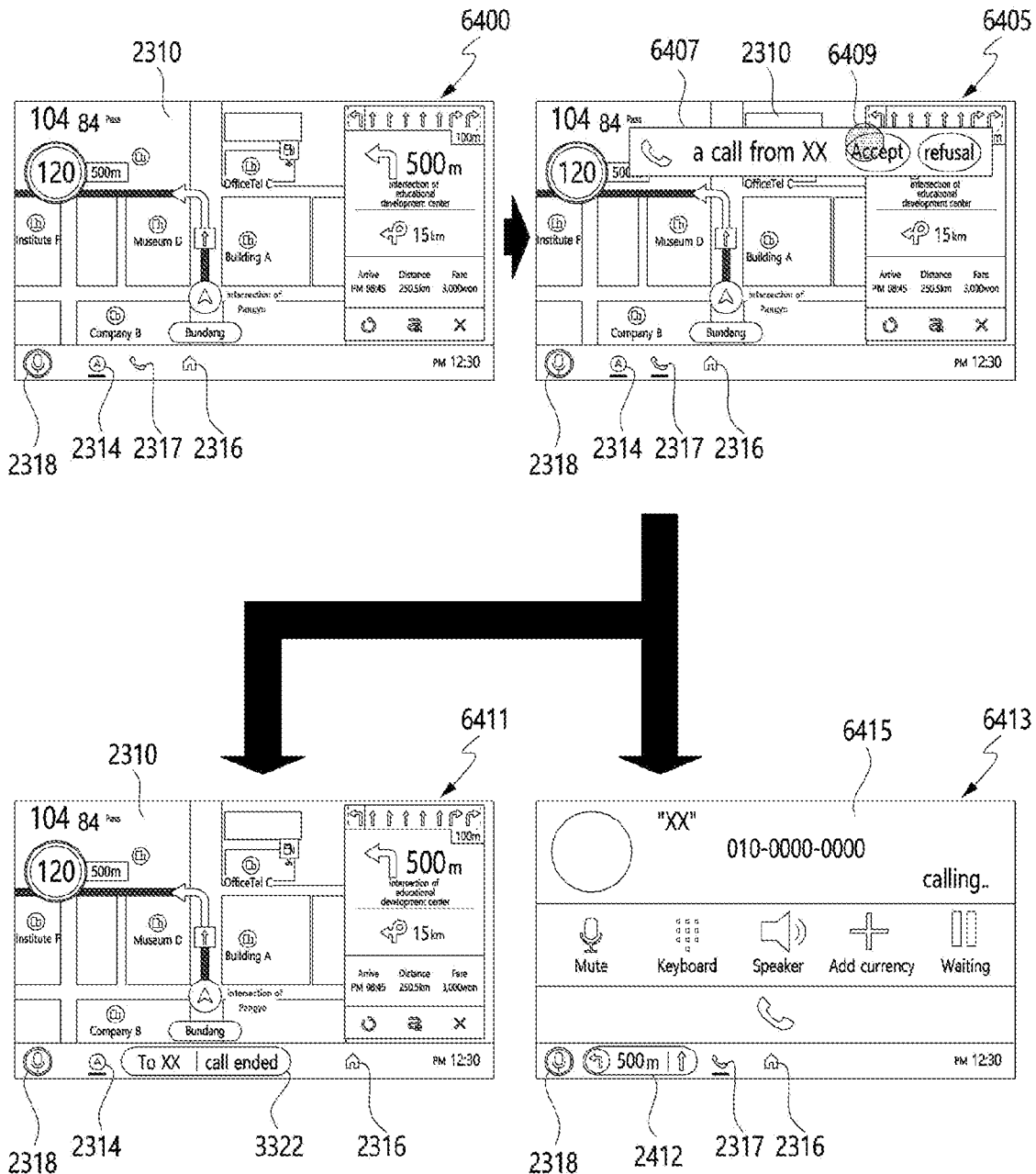
FIG. 64 illustrates an example of a screen that is switched based on processing of a notification according to various embodiments.

FIG. 64 illustrates an example of a screen switched based on processing of the notification according to various embodiments.

Referring now to FIG. 63, in an operation 6302, the processor 2230 may execute the first application. For example, the first application may be an application for providing the navigation service.

In an operation 6304, the processor 2230 may, in response to executing the first application, display an execution screen of the first application within the first partial area, and display the first executable object and the second executable object within the second partial area. For example, referring to FIG. 64, in a state 6400, the processor 2230 may display the execution screen 2310 of the first application within the first partial area 2302, and display the first executable object 2314 and the second executable object 2317 within the second partial area 2304. For example, the second executable object 2317 may be an executable object for indicating a second application. Throughout the description of FIGS. 63 and 64, the second application may be an application for a call service. In various embodiments, the second application indicated by the executable object 2317 may be in a state in which it is not executed, as opposed to the first application.

In an operation 6306, in response to executing the first application, while displaying the execution screen of the first application within the first partial area, and displaying the first executable object and the second executable object within the second partial area, the processor 2230 may execute the second application, based on receiving a signal that is distinguished from the functions supported by the first application and related to the functions supported by the second application.

In an operation 6308, the processor 2230 may display, in response to executing the second application, a notification for the received signal using the executed second application, in an overlapping manner, on the execution screen of the first application. For example, referring to FIG. 64, the processor 2230 may receive the signal in a state 6400, execute the second application in response to receiving the signal, and switch the state 6400 to a state 6405 in response to the execution of the second application. In the state 6405, the processor 2230 may display a notification 6407 in an overlapping manner on the execution screen 2310 of the first application displayed within the first partial area 2302. In state 6405, the processor 2230 may switch a state of the second executable object 2317 within the second partial area 2304 from a non-executed state to an executed state. For example, the second executable object 2317 in the state 6405 may be highlighted.

In an operation 6310, the processor 2230 may receive a user input for the displayed notification. For example, referring to FIG. 64, the processor 2230 may receive a user input 6409 for a notification 6407 in the state 6405.

In an operation 6312, in response to receiving the user input in an operation 6310, the processor 2230 may identify whether the first application providing an execution screen within the first partial area is a designated application. In various embodiments, the designated application may be a parameter defined to determine whether to switch an execution screen of an application displayed within the first partial area into an execution screen of another application. For example, if the execution screen of the application displayed within the first partial area is an execution screen of an application related to the movement of the vehicle equipped with the electronic device 2210, then the application related to the movement of the vehicle is the designated application. As another example, if the execution screen of the application displayed with the first partial area is an execution screen of an application that is not related to the movement of the vehicle equipped with the electronic device 2210, then the application not related to the movement of the vehicle may not be the designated application. In various embodiments, the designated application may be registered by setting in the processor 2230 without any user input, or set by registration according to a user input.

If the first application is the designated application, the processor 2230 may execute an operation 6314, or otherwise, it may execute an operation 6316.

In the operation 6314, the processor 2230 may maintain, in response to identifying that the first application is the designated application, displaying the execution screen of the first application within the first partial area, and switch the second executable object in the second partial area into a widget of the second application. For example, referring to FIG. 64, the processor 2230 may switch the state 6405 to the state 6411 in response to receiving a user input 6409 in the state 6405. In the state 6411, the processor 2230 may stop displaying the notification 6407 within the first partial area 2302. In the state 6411, the processor 2230 may display the widget 3322 of the second application switched from the second executable object 2317 within the second partial area 2304.

In an operation 6316, the processor 2230 may, in response to identifying that the first application is not the designated application or identifying that the first application is distinct from the designated application, switch the execution screen of the first application in the first partial area to the execution screen of the second application, and then switch the first executable object within the second partial area to the widget of the first application. For example, referring to FIG. 64, the processor 2230 may switch the state 6405 to the state 6413 in response to receiving the user input 6409 in the state 6405. In the state 6413, the processor 2230 may stop displaying the notification 6507 within the first partial area 2302. In the state 6413, the processor 2230 may display an execution screen 6415 of the second application switched from the execution screen 2310 of the first application within the first partial area 2302. In the state 6413, the processor 2230 may display the widget 2412 of the first application switched from the first executable object 2314 within the second partial area 2304. In various embodiments, the execution screen 6415 of the second application may include a content related to the notification 6407.

FIG. 63 illustrates an example of displaying a notification for a signal related to functions supported by the second application and receiving a user input for the notification, but this is only for convenience of the description. For example, when the signal does not request displaying of the notification or the second application is an application that does not support displaying of the notification, the execution of the operation 6308 and/or the execution of the operation 6310 may be omitted or skipped, in which case the processor 2230 may execute the operation 6306 and thereafter, directly execute the operation 6312 without executing the operations 6308 and 6310.

Further, although FIG. 63 illustrates an example of executing either the operation 6314 or the operation 6316 depending on whether the first application is the designated application, this is only for convenience of the description. For example, in the operation 6312, the processor 2230 may compare the priority of the first application and the priority of the second application, instead of identifying whether the first application is the designated application, and if the priority of the first application is higher than the priority of the second application, then it may execute the operation 6314, and otherwise, execute the operation 6316. In various embodiments, the priority of the first application and the priority of the second application may be determined by the processor 2230 without a user input therefor, or may be determined based on user settings.

As described above, the electronic device 2210 according to various embodiments makes it possible to make an adaptive switching of an execution screen of an application according to a signal related to another application received while displaying the execution screen of the application within the first partial area, on basis of the type of the application. The electronic device 2210 according to various embodiments can provide its user with more enhanced user experience through such a switching operation.

Figure 65:
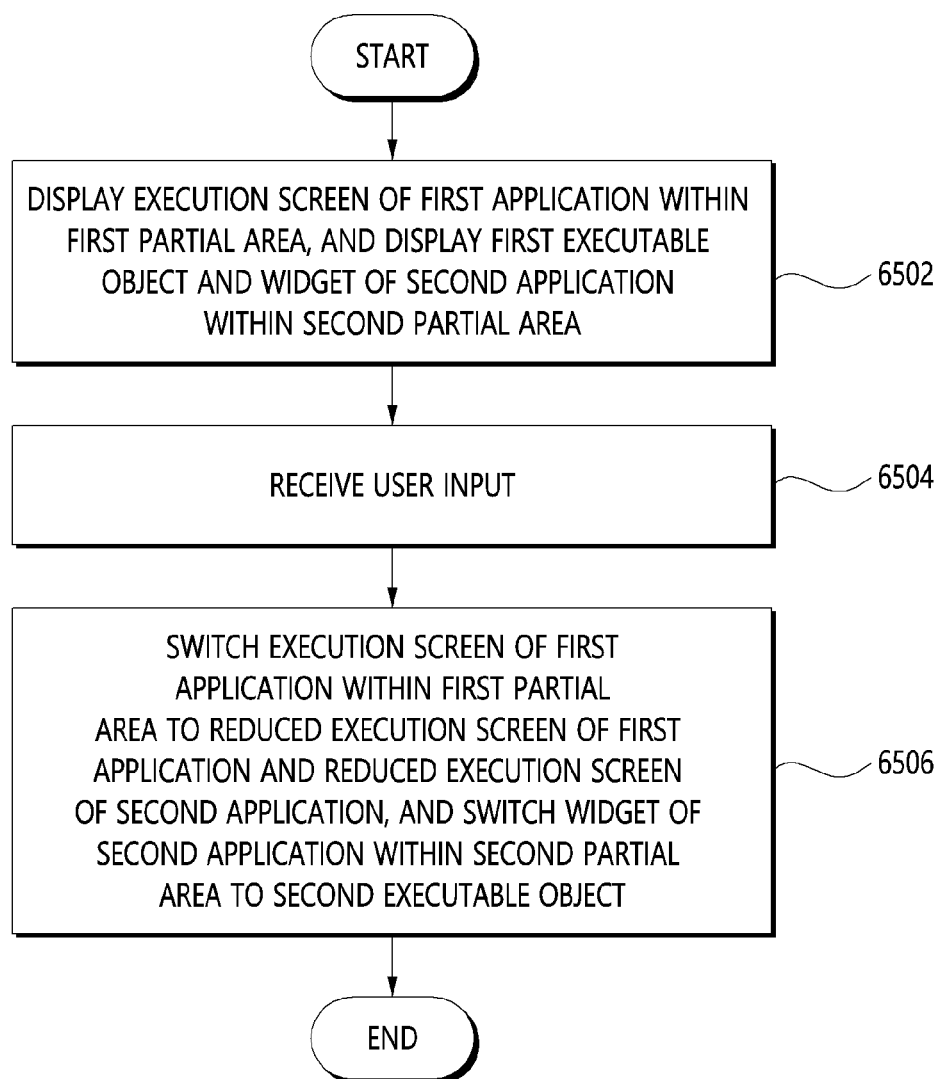
FIG. 65 illustrates a flowchart for an operating method of an electronic device for displaying a split screen based on a user input according to various embodiments.

FIG. 65 illustrates a flowchart for a method of the electronic device for displaying a split screen based on a user input according to various embodiments. This method may be executed by the infotainment device 100, the control device 2100 or the electronic device 2210, or may be executed by the processor 2230.

Figure 66:
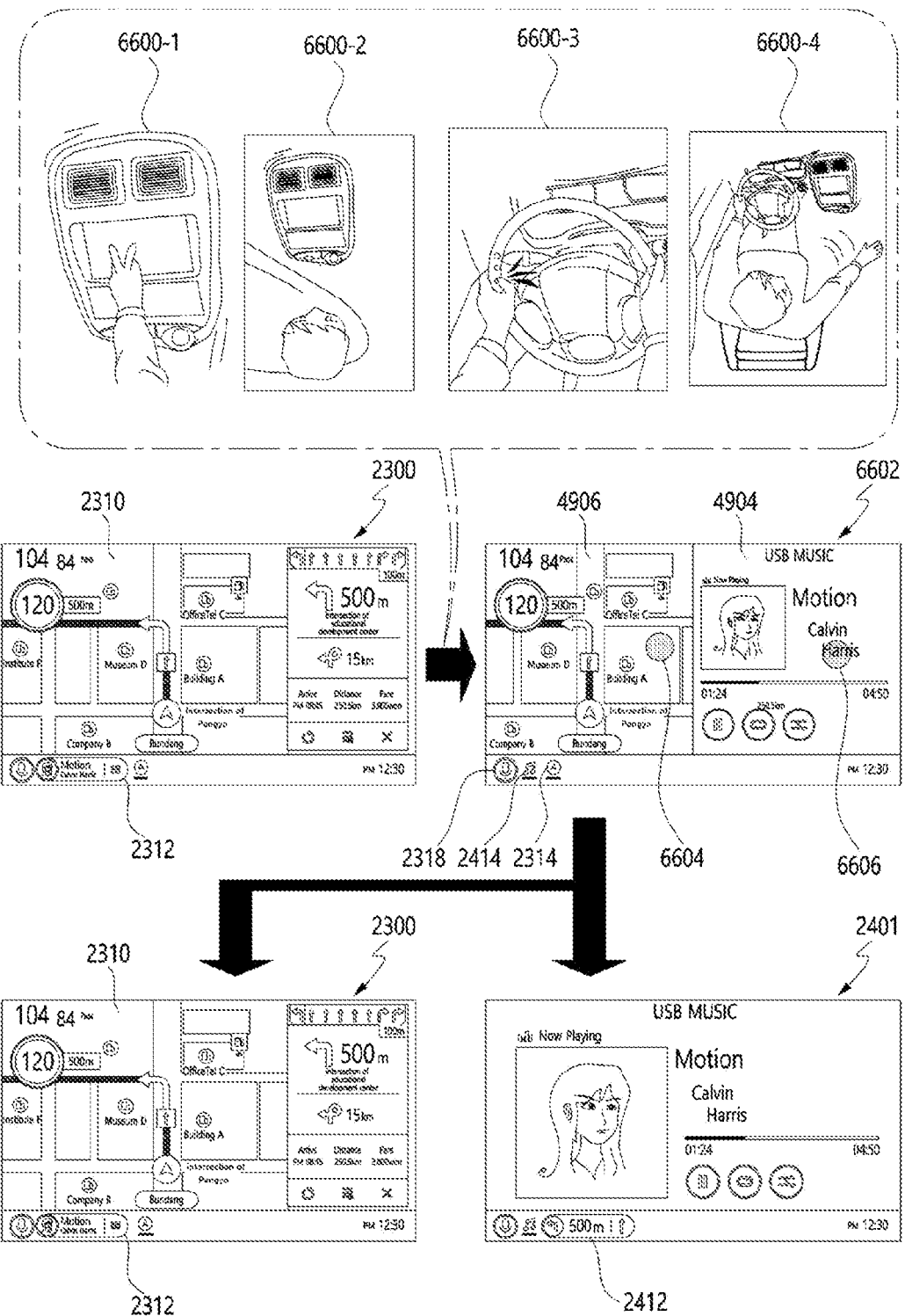
FIG. 66 illustrates an example of a split screen displayed based on a user input according to various embodiments.

FIG. 66 illustrates an example of such a split screen displayed based on a user input according to various embodiments.

Referring now to FIG. 65, in an operation 6502, the processor 2230 may display an execution screen of the first application within the first partial area, and display the first executable object and a widget of the second application within the second partial area. For example, referring then to FIG. 66, in the state 2300, the processor 2230 may display an execution screen 2310 of the first application within the first partial area 2302, and display a widget 2312 of the second application and the first executable object 2314 within the second partial area.

In an operation 6504, the processor 2230 may receive a user input while displaying an execution screen of the first application within the first partial area, and displaying the first executable object and a widget of the second application within the second partial area. For example, referring then to FIG. 66, the processor 2230, in the state 2300, may receive at least one of a user input 6600-1, a user input 6600-2, a user input 6600-3 and a user input 6600-4. For example, the user input 6601-1 may be a hovering input having a designated pattern generated from a user's hand spaced apart from the display area of the display 2240 and positioned over the display area. The hovering input may be obtained through a touch sensor related to the display 2240. As another example, the user input 6600-2 may be an eye gaze input caused by viewing the display area for a specified time period. The eye gaze input may be identified based on an image captured through the camera 2247. As another example, the user input 6600-3 may be an input to a physical input means equipped with a steering wheel of the vehicle including the electronic device 2210. The physical input means may include at least one of a rotatable structure or a physical button. As another example, the user input 6600-4 may be a gesture input having a designated pattern generated from a user sitting in a driver's seat of the vehicle or another user sitting in a passenger seat of the vehicle. The gesture input may be identified based on an image captured through the camera 2247.

In an operation 6506, in response to receiving the user input in the operation 6504, the processor 2230 may switch the execution screen of the first application in the first partial area to a reduced execution screen of the first application and a reduced execution screen of the second application, and switch a widget of the second application in the second partial area to the second executable object. For example, referring to FIG. 66, in the state 2300, the processor 2230 may switch the state 2300 to a state 6602 in response to at least one of the user input 6600-1, the user input 6600-2, the user input 6600-3, and the user input 6600-4. In the state 6602, the processor 2230 may display a reduced execution screen 4906 of the first application switched from the execution screen 2310 of the first application and a reduced execution screen 4904 of the second application within the first partial area 2302. In the state 6602, the processor 2230 may display the second executable object 2414 switched from the widget 2312 of the second application within the second partial area 2304.

In some embodiments, the reduced execution screen 4906 of the first application and the reduced execution screen 4904 of the second application displayed in the state 6602 may be in a state that cannot receive a user input for controlling the first application and the second application. The reduced execution screen 4906 of the first application and the reduced execution screen 4904 of the second application displayed in the state 6602 may be in a state that can only receive a user input of selecting either one of the reduced execution screen 4906 of the first application and the reduced execution screens 4904 of the second application. For example, the state 6602 may be of an intermediate state for switching into any one of the state 2300 and the state 2401. For example, in the state 6602, the processor 2230 may receive a user input 6604 for selecting the reduced execution screen of the first application of the reduced execution screen 4906 of the first application and the reduced execution screen 4904 of the second application. The processor 2230 may switch the state 6602 to the state 2300 in response to receiving the user input 6604 in the state 6602. For another example, in the state 6602, the processor 2230 may receive a user input 6606 to select (4904) the reduced execution screen 4904 of the second application of the reduced execution screen 4906 of the first application and the reduced execution screen 4904 of the second application. The processor 2230 may switch the state 6602 to the state 2401 in response to receiving the user input 6606 in the state 6602. However, it is not limited thereto.

In some embodiments, the user input 6604 and the user input 6606 may also be configured as an eye gaze input, when the user input received in the state 2300 is the user input 6600-2. For example, the user input 6604 may be configured of an eye gaze input viewing the reduced execution screen 4906 of the first application for a specified time duration, and the user input 6606 may be configured of an eye input viewing the reduced execution screen 4904 of the second application for a specified time duration. However, it is not limited thereto.

As described above, the electronic device 2230 according to various embodiments makes it possible to display a split screen based on a user input distinct from a touch input in order to make simpler the user input to change the arrangement of the display area provided through the display 2240. The electronic device 2230 according to various embodiments can provide its user with more enhanced user experience owing to the simplification of such a user input.

Figure 67:
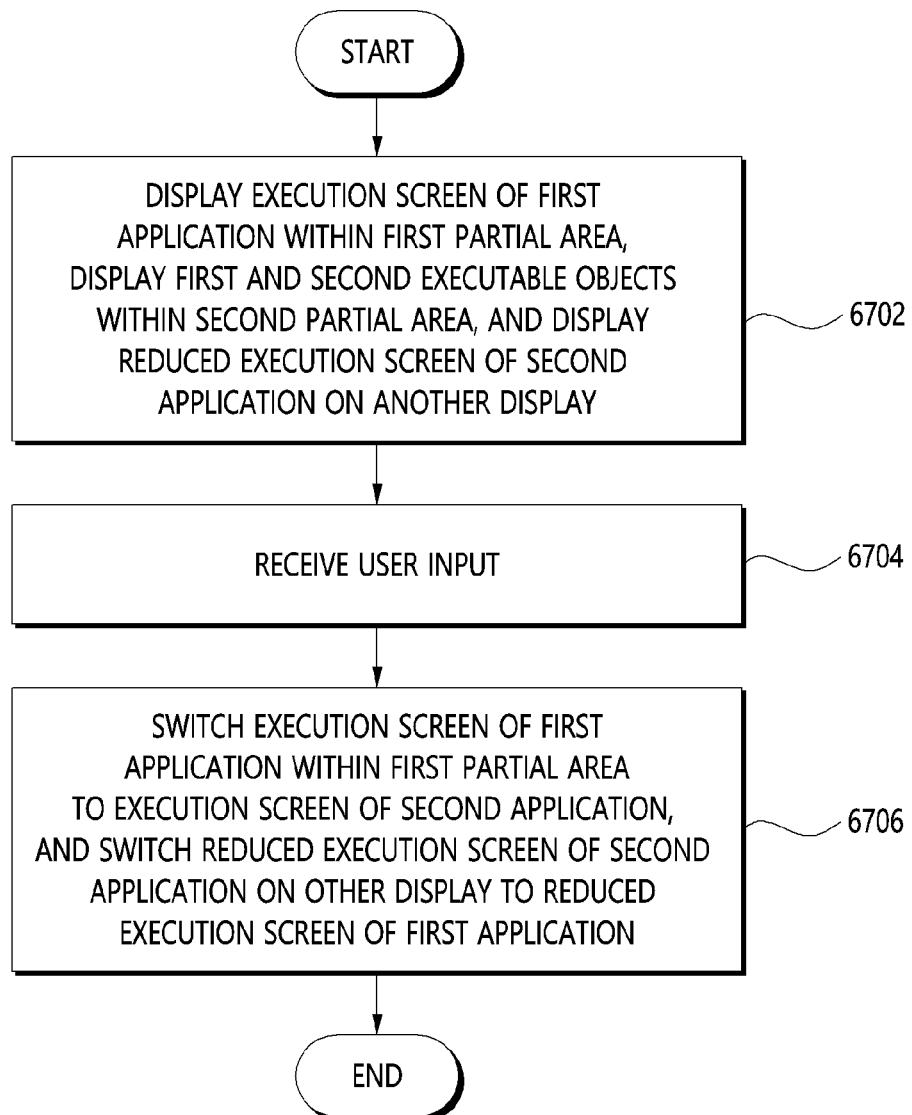
FIG. 67 illustrates a flowchart for an operating method of an electronic device for switching an execution screen of an application within a display area of a display to an execution screen of another application with a reduced execution screen within a display area of another display, according to various embodiments.

FIG. 67 illustrates a flowchart for a method of the electronic device for switching an execution screen of an application within a display area of a display to an execution screen of another application providing a reduced execution screen within a display area of another display, according to various embodiments. This method may be executed by the infotainment device 100, the control device 2100 or the electronic device 2210, or may be executed by the processor 2230.

Figure 68:
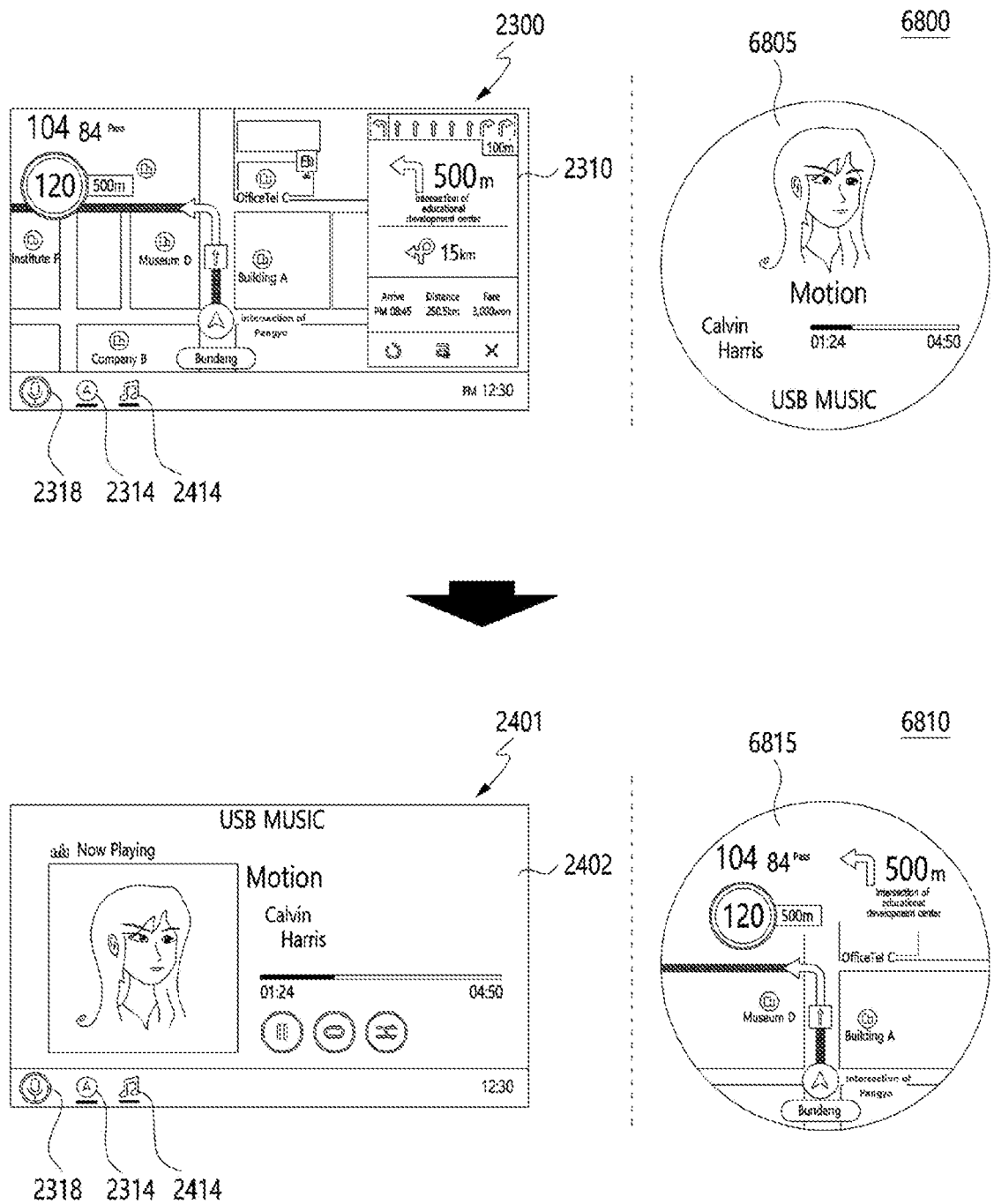
FIG. 68 illustrates an example of exchanging a screen displayed on a display and another screen displayed on another display with each other according to various embodiments.

FIG. 68 illustrates an example of exchanging a screen displayed on a display with a screen displayed on another display according to various embodiments.

Referring now to FIG. 67, in an operation 6702, the processor 2230 may display an execution screen of the first application within the first partial area, display the first executable object and the second executable object within the second partial area, and display a reduced execution screen of the second application on another display. In various embodiments, the other display may be a display that is distinguished from the display having the display area inclusive of the first and second partial areas. For example, the other display may be a cluster display configured with a display within the vehicle to indicate a moving speed of a vehicle including the electronic device 2210. For another example, the other display may be a head up display (HUD) within the vehicle including the electronic device 2210. However, it is not limited thereto. For example, referring then to FIG. 68, in a state 6800, the processor 2230 may provide the state 2300 on the display and then provide a state 6805 on another display (e.g., the cluster display) distinct from the display. For example, the display providing the state 2300 may display an execution screen 2310 of the first application within the first partial area 2302, and the other display providing the state 6805 may display a reduced execution screen of the second application.

In an operation 6704, the processor 2230 may receive a user input, while displaying the execution screen of the first application within the first partial area, and the first executable object and the second executable object within the second partial area, and displaying the reduced screen of the second application on another display. For example, the user input may be an input to a physical input means equipped within the steering wheel of the vehicle including the electronic device 2210. The physical input means may include at least one of a rotatable structure or a physical button, although it is not limited thereto.

In an operation 6706, the processor 2230, in response to receiving the user input in the operation 6704, may switch the execution screen of the first application within the first partial area to the execution screen of the second application, and switch the reduced execution screen of the second application on the other display to the reduced execution screen of the first application. For example, referring to FIG. 68, the processor 2230 may switch the state 6800 to the state 6810 in response to receiving a user input in the state 6800. For example, in the state 6810, the processor 2230 may provide the state 2401 switched from the state 2300 on the display and provide a state 6815 switched from the state 6805 on the other display. For example, the display providing the state 2401 may display the execution screen 2401 of the second application switched from the execution screen 2310 of the first application within the first partial area 2302, and the other display providing the state 6815 may display the execution screen of the first application switched from the reduced execution screen of the second application.

Figure 69:
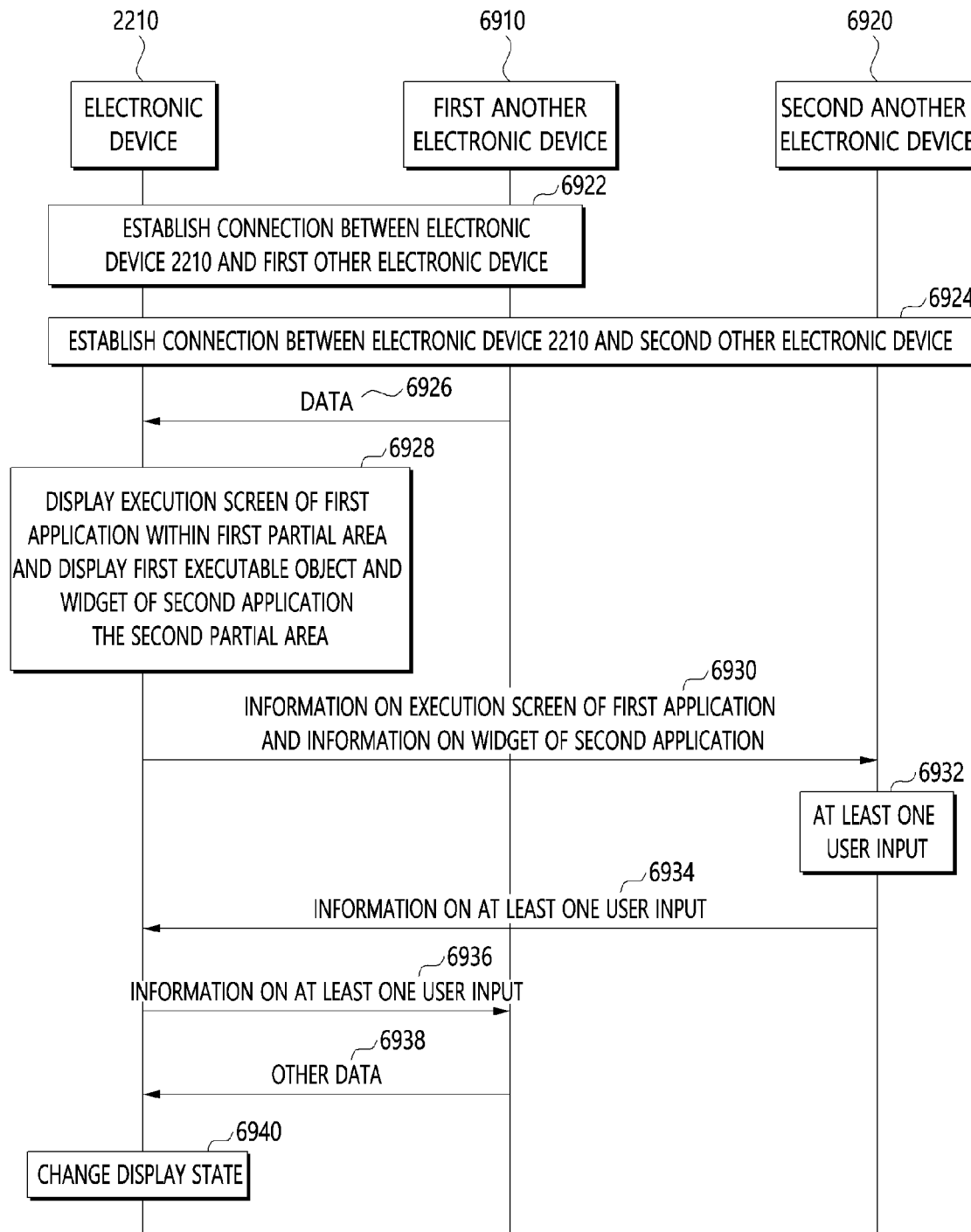
FIG. 69 illustrates a signal flow of controlling an electronic device through a second other electronic device, among a first other electronic device and the second other electronic device included within a vehicle, according to various embodiments.

FIG. 69 illustrates a signal flow diagram of controlling the electronic device through a second other electronic device of first and second other electronic devices included in a vehicle, according to various embodiments. This signal flow may be executed by the infotainment device 100, the control device 2100 or the electronic device 2210, or may be caused to operate by the processor 2230, and may be caused to operate by the first other electronic device (e.g., the electronic device 2220) and/or the second other electronic device within the vehicle.

Figure 70:
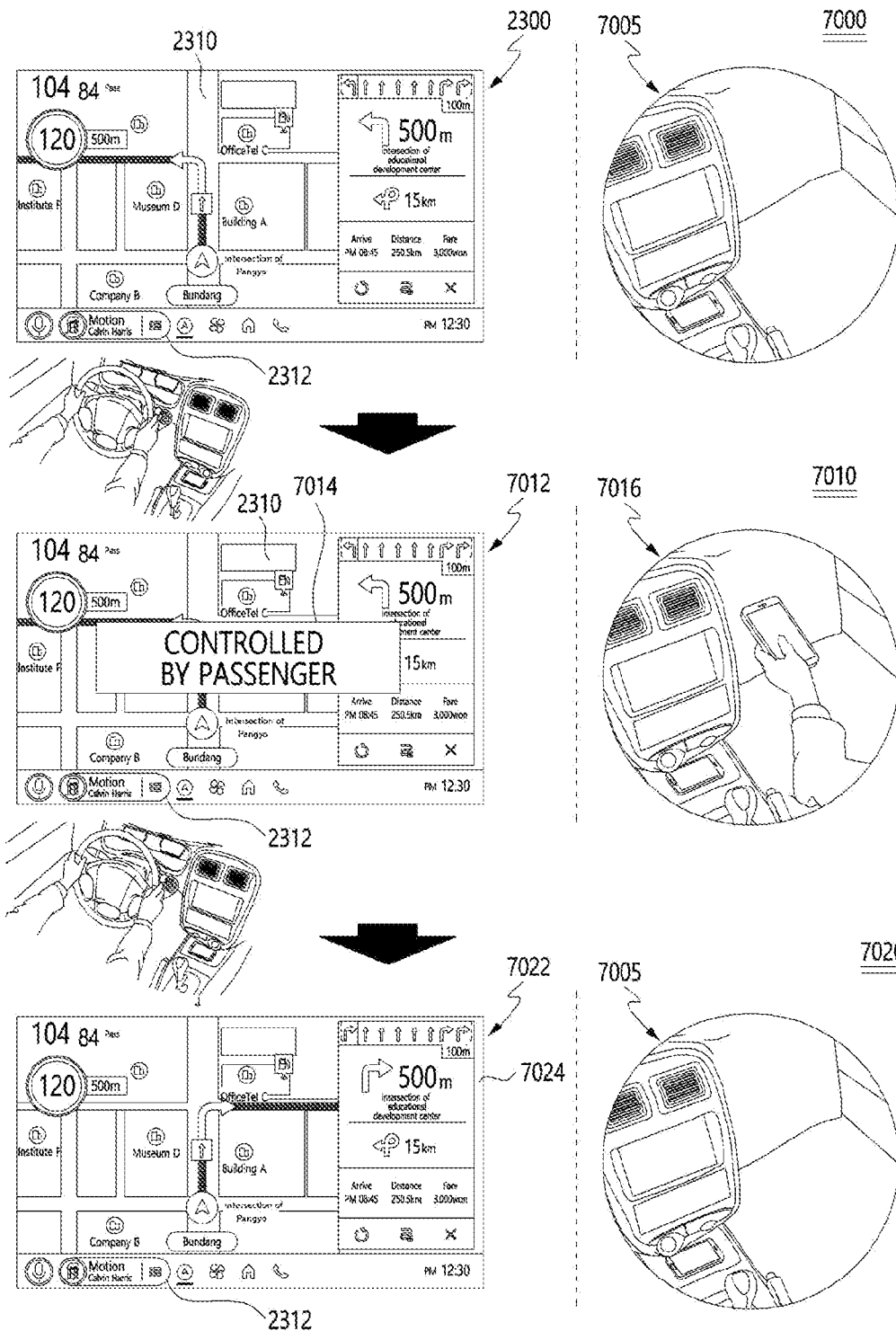
FIG. 70 illustrates an example of a screen of an electronic device controlled by a second other second electronic device according to various embodiments.

FIG. 70 illustrates an example of a display screen of the electronic device controlled by the second other electronic device according to various embodiments.

Referring first to FIG. 69, in an operation 6922, the electronic device 2210 may establish a connection between the electronic device 2210 and a first other electronic device 6910. In various embodiments, the first other electronic device 6910 may be an electronic device located within the vehicle. In various embodiments, the first other electronic device 6910 may be an electronic device for a user sitting in a driver's seat of the vehicle including the electronic device 2210.

In an operation 6924, the electronic device 2210 may establish a connection between the electronic device 2210 and a second other electronic device 6920. In various embodiments, the second other electronic device 6920 may be an electronic device included in a vehicle. In various embodiments, the second other electronic device 6920 may be an electronic device for a user sitting in a passenger seat of the vehicle with the electronic device 2210.

In an operation 6926, the electronic device 2210 may receive data from the first other electronic device 6910. In various embodiments, the data may include information for displaying an execution screen of the first application within the first partial area using the display 2240 of the electronic device 2210 and displaying the first executable object and a widget of the second application within the second partial area.

In an operation 6928, the electronic device 2210 may display the execution screen of the first application within the first partial area and the first executable object and the widget of the second application within the second partial area, based on the data received in the operation 6926. For example, referring to FIG. 70, the electronic device 2210 and the second other electronic device 6920 may be arranged within a state 7000. The state 7000 may include the state 2300 of the electronic device 2210 and a state 7005 of the second other electronic device 6920. In the state 2300, the electronic device 2210 may display, based on the data received from the first other electronic device 6910, the execution screen 2310 of the first application within the first partial area 2302 and display the widget 2312 of the second application within the second partial area 2304. In the state 7005, the second other electronic device 6920 may be in a state in which no user input is caused in relation to the electronic device 2210.

In an operation 6930, the electronic device 2210 may transmit information on the execution screen of the first application and information on the widget of the second application to the second other electronic device 6920. In various embodiments, the information in an operation 6930 may be transmitted to the second other electronic device 6920 to control the execution screen of the first application displayed within the first partial area by the second other electronic device 6920 or control the widget of the second application displayed within the second partial by the second other electronic device 6920. In various embodiments, the information transmitted in an operation 6930 may be configured to display an execution screen corresponding to the execution screen of the first application and a widget corresponding to the widget of the second application on the display of the second other electronic device 6920, for the above control.

Further, the second other electronic device 6920 may receive the information from the electronic device 2210. In response to receiving the information, the second other electronic device 6920 may display a screen on the display of the second other electronic device 6920 based on the information. The screen may include a screen corresponding to the execution screen of the first application and a screen corresponding to the widget of the second application, in order to control the execution screen of the first application displayed within the first partial area by the second other electronic device 6920 or control the widget of the second application displayed within the second partial area by the second other electronic device 6920.

In an operation 6932, the second other electronic device 6920 may receive at least one user input for the screen displayed in an operation 6930. For example, referring to FIG. 70, the state 7000 may be switched to a state 7010 by the at least one user input in an operation 6932. The state 7010 may include a state 7012 of the electronic device 2210 and a state 7016 of the second other electronic device 6920. In the state 7012, the electronic device 2210 may display information 7014 to notify that at least one of the execution screen 2310 of the first application displayed within the first partial area 2302 or the widgets 2312 of the second application displayed within the second partial area 2304 is being controlled by a passenger of the vehicle. Although not shown in FIG. 69, the information 6914 may be displayed in an overlapping manner on the execution screen 2310 of the first application within the first partial area 2302, based on a signal transmitted to the electronic device 2210 while receiving the at least one user input by the second other electronic device 6920. However, it is not limited thereto. Further, in the state 7016, the second other electronic device 6920 may receive the at least one input for the screen displayed in an operation 6930.

In an operation 6934, the second other electronic device 6920 may transmit information on the at least one user input to the electronic device 2210. In various embodiments, the information in the operation 6934 may be transmitted to control at least one of the execution screen of the first application displayed within the first partial area or the widget of the second application displayed within the second partial area. Further, the electronic device 2210 may receive the information from the second other electronic device 6920.

In an operation 6936, the electronic device 2210 may transmit information on the at least one user input to the first other electronic device 6910. For example, the electronic device 2210 may transmit the information to the first other electronic device 6910 to control the execution screen of the first application displayed within the first partial area or control the widget of the second application displayed within the first partial area, according to the at least one user input caused by a user of the second other electronic device 6920. Further, the first other electronic device 6910 may receive the information from the electronic device 2210. Based on the received information, the first other electronic device 6910 may acquire or generate other data for either a display state of the execution screen of the first application within the first partial area to be changed according to the at least one user input or a display state of the widget of the second application within the second partial area to be changed according to the at least one user input.

In an operation 6938, the first other electronic device 6910 may transmit the other data acquired based on the information to the electronic device 2210. Further, the first other electronic device 6910 may receive the other data from the electronic device 2210.

In an operation 6940, the electronic device 2210 may change the display state of the execution screen of the first application within the first partial area or change the display state of the widget of the second application within the second partial area, based on the other data. For example, referring to FIG. 70, the state 7010 may be switched to the state 7020 by the changing of the display state in an operation 6940. The state 7020 may include a state 7022 of the electronic device 2210 and a state 7005 of the second other electronic device 6920. In the state 7022, the electronic device 2210 may display the execution screen 7024 of the first application switched from the execution screen 2310 of the first application within the first partial area 2302. For example, the execution screen 7024 of the first application may be an execution screen in which the execution screen 2310 of the first application in the state 7012 is changed based on the at least one user input. For example, in the state 7005, the second other electronic device 6920 may be in a state in which no user input is caused in relation to the electronic device 2210.

As described above, the electronic device 2210 according to various embodiments makes it possible to change information displayed on the display 2240 of the electronic device 2210 under the control of the second other electronic device 6920, thereby preventing the driver of the vehicle with the electronic device 2210 from making any user input for controlling the displayed information while driving. In other words, the electronic device 2210 according to various embodiments can reduce the possibility of any unexpected traffic accident while driving the vehicle with the electronic device 2210.

Figure 71:
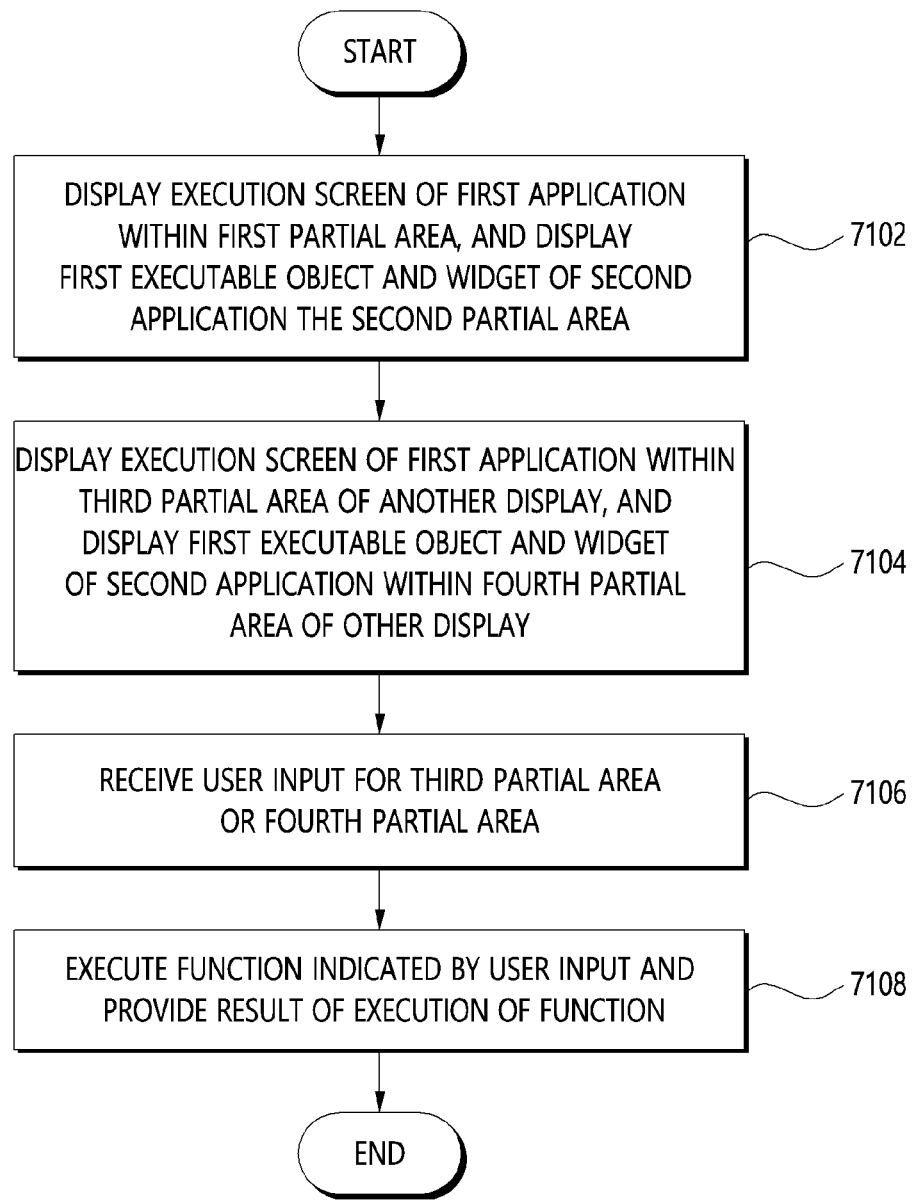
FIG. 71 illustrates a flowchart for an operating method of an electronic device for controlling a screen displayed on a display based on a user input received via another display, according to various embodiments.

FIG. 71 illustrates a flowchart for a method of the electronic device for controlling a display screen displayed on a display, based on a user input received through another display according to various embodiments. This method may be executed by the infotainment device 100, the control device 2100 or the electronic device 2210, or may be executed by the processor 2230.

Figure 72:
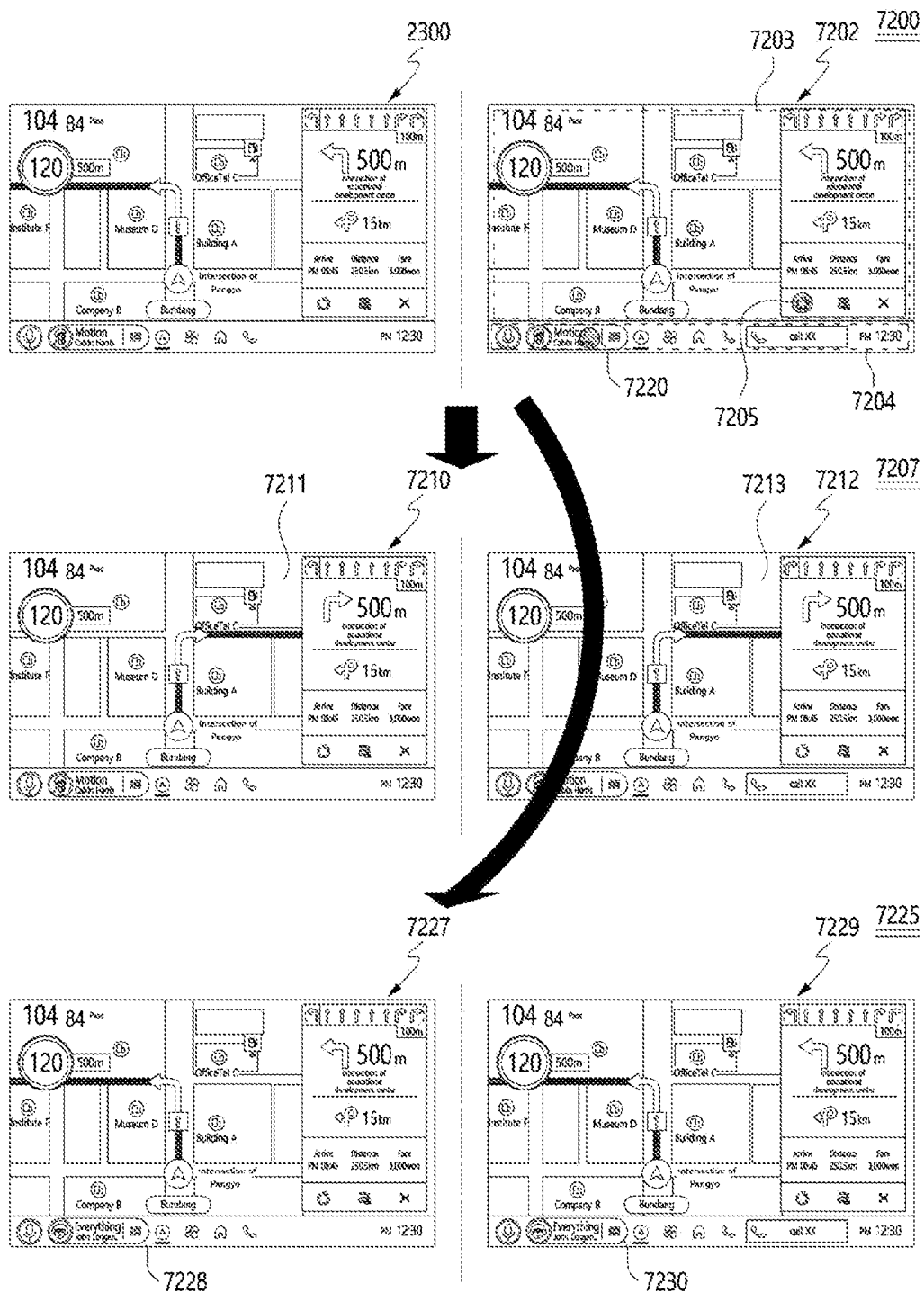
FIG. 72 illustrates an example of a screen on a display that changes a display state, based on a user input received through another display according to various embodiments.

FIG. 72 illustrates an example of a screen on a display for changing its display state, based on a user input received through another display according to various embodiments.

Referring now to FIG. 71, in an operation 7102, the processor 2230 may display an execution screen of the first application within the first partial area of the display, and display the first executable object and a widget of the second application within the second partial area of the display.

In an operation 7104, the processor 2230 may display the execution screen of the first application within a third partial area of another display that is distinct from the display, and display the first executable object and the widget of the second application within a fourth partial area of the other display, while displaying the execution screen of the first application within the first partial area of the display and displaying the first executable object and the widget of the second application within the second partial area of the display. In various embodiments, the other display may be another display arranged for rear seats in the vehicle, which display is distinct from the display arranged in a dashboard of the vehicle. In various embodiments, the size of the other display in the rear seats may be corresponding to or different from the size of the display in the dashboard. In various embodiments, the aspect ratio of the other display in the rear seats may be corresponding to or different from that of the display in the dashboard.

In various embodiments, the display area of the other display may be configured with a third partial area and a fourth partial area adjacent to the third partial area. In various embodiments, the arrangement of the third and fourth partial areas may be corresponding to the arrangement of the first partial area and the second partial area, or different from the arrangement of the first partial area and second partial area.

For example, referring to FIG. 72, the display and the other display may be in a state 7200. For example, the state 7200 may include a state 2300 of the display and a state 7202 of the other display. In the state 2300, the display may display the execution screen 2310 of the first application within the first partial area 2302 and display the widget 2312 of the second application within the second partial area 2304. In the state 7202, the other display may display an execution screen corresponding to the execution screen 2310 of the first application within the third partial area 7203 and a widget corresponding to the widget 2312 of the second application within the fourth partial area 7204.

In an operation 7106, the processor 2230 may receive a user input for the third partial area or the fourth partial area while executing the operation 7104. For example, referring to FIG. 72, the electronic device 2210 may receive a user input 7205 or a user input 7220 in the state 7200.

In an operation 7108, the processor 2230 may, in response to receiving the user input in the operation 7106, execute a function indicated by the user input and provide a result of execution of the function. For example, when the user input is related to the execution screen displayed within the third partial area, the processor 2230 may provide the result of execution of the above function by changing the execution screen of the first application within the first partial area and the display state of the execution screen within the third partial area. For example, referring to FIG. 72, the state 7200 may be switched to a state 7207 by a user input 7205. The state 7207 may include a state 7210 of the display and a state 7212 of the other display. In the state 7210, the display may display an execution screen 7211 of the first application within the first partial area 2302 changed according to the user input 7205. In the state 7212, the other display may display an execution screen 7213 within the third partial area 7203 changed according to the user input 7205. For another example, when the user input is related to an execution screen displayed within the fourth partial area, the processor 2230 may provide a result of the execution of the function by changing the widget of the second application within the second partial area and the display state of the widget within the fourth partial area. For example, referring to FIG. 72, the state 7200 may be switched to a state 7225 by a user input 7220. The state 7225 may include a state 7227 of the display and a state 7229 of the other display. In the state 7227, the display may display a widget 7228 of the second application within the second partial area 2304 changed according to the user input 7220. In the state 7229, the other display may display a widget 7230 within the fourth partial area 7204 changed according to the user input 7220.

As described above, the electronic device 2210 according to various embodiments makes it possible to change the display state of the display, based on a user input to another display distinct from a display arranged closer to the driver's seat, so as to prevent a driver of the vehicle with the electronic device 2210 from making a user input to control the displayed information while driving. In other words, the electronic device 2210 according to various embodiments can prevent a possible traffic accident in driving the vehicle including the electronic device 2210.

Figure 73:
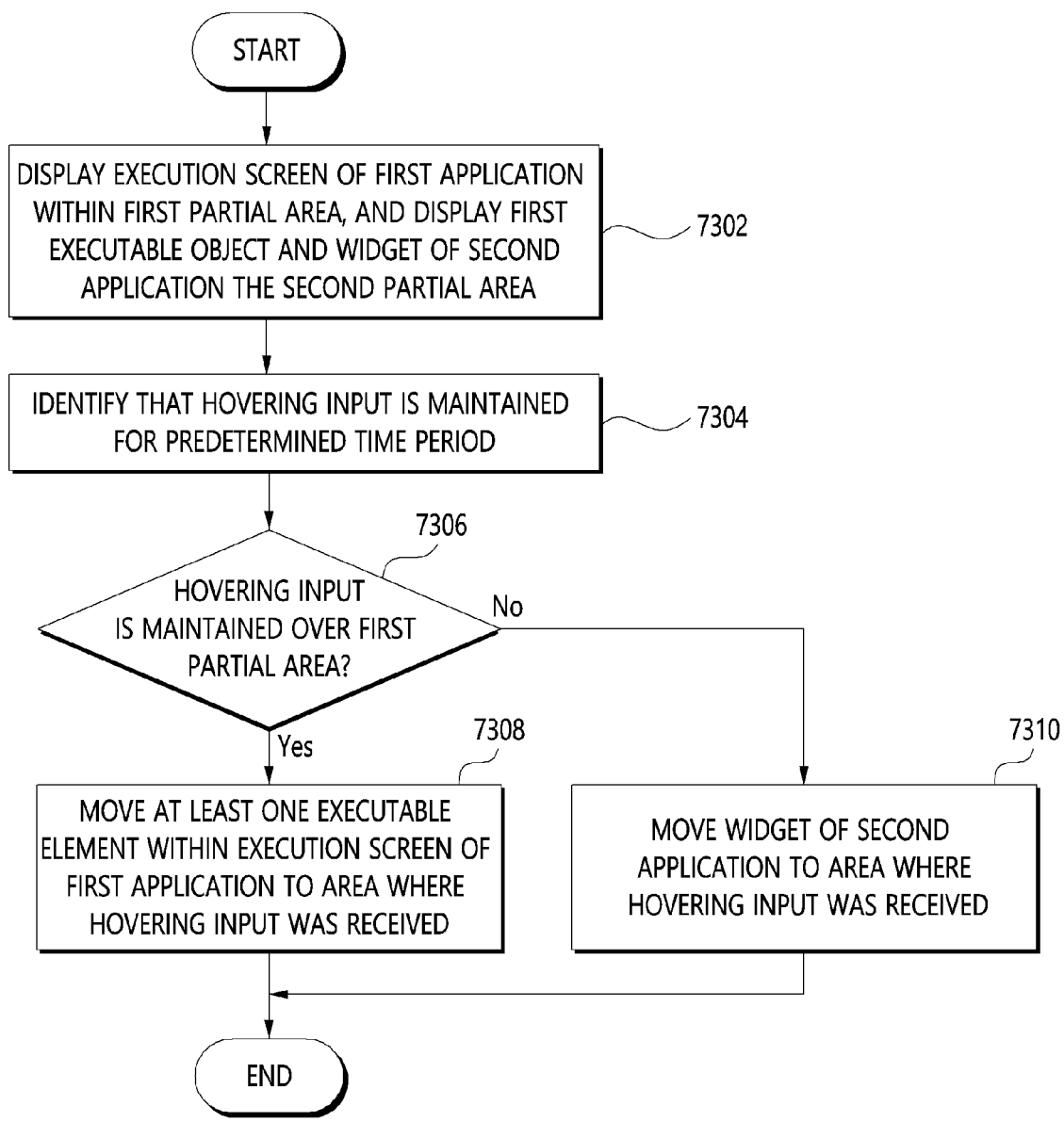
FIG. 73 illustrates a flowchart for an operating method of an electronic device for moving at least one executable element on an execution screen of a first application within a first partial area or a widget of a second application within a second partial area based on a hovering input, according to various embodiments.

FIG. 73 illustrates a flowchart for a method of the electronic device for moving at least one executable element in an execution screen of a first application within a first partial area or a widget of a second application within a second partial area, based on a hovering input according to various embodiments. This method may be executed by the infotainment device 100, the control device 2100 or the electronic device 2210, or may be executed by the processor 2230.

Figure 74:
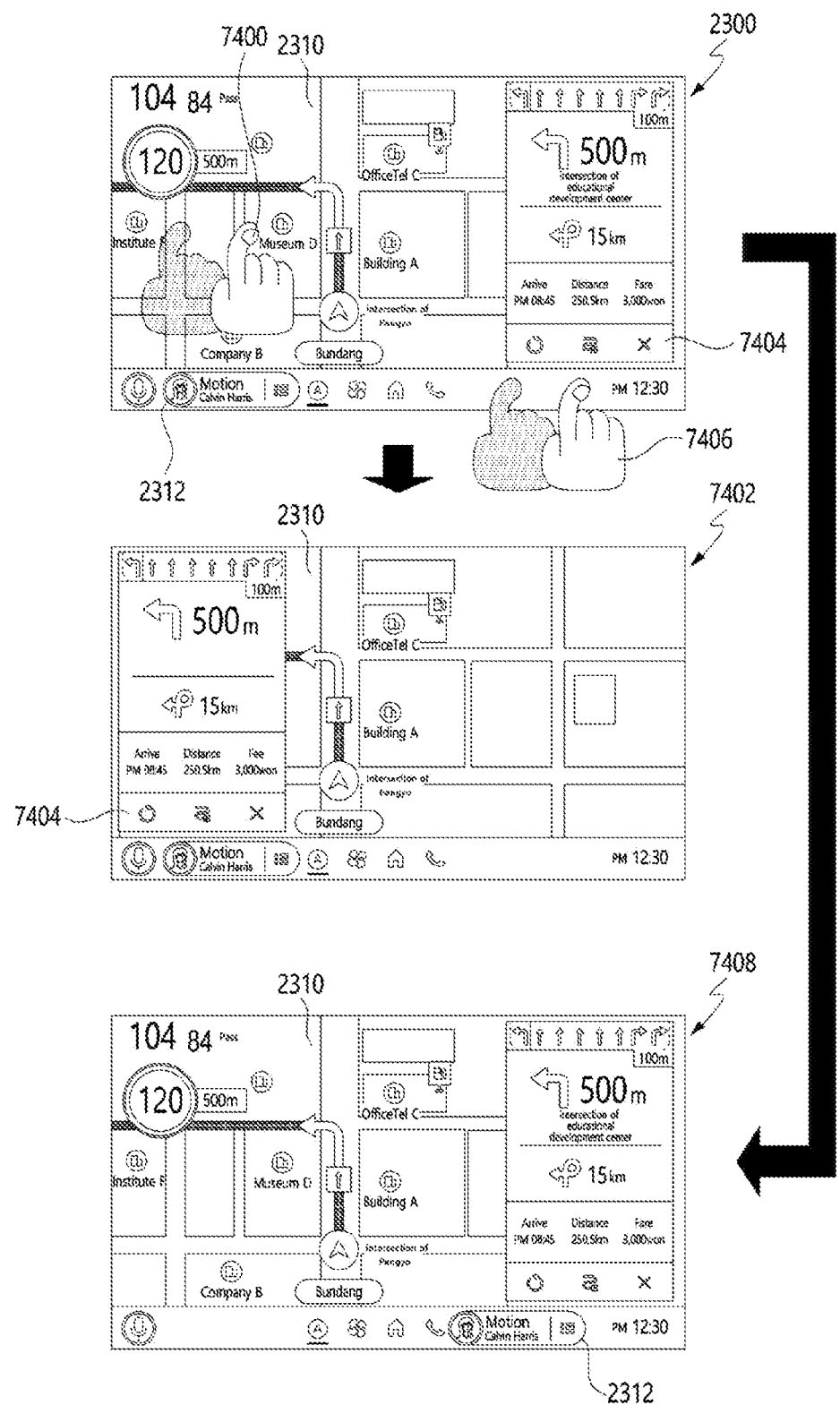
FIG. 74 illustrates an example of at least one executable element on an execution screen of a first application within a first partial area or a widget of a second application within a second partial area based on a hovering input, according to various embodiments.

FIG. 74 illustrates an example of at least one executable element in an execution screen of a first application within a first partial area or a widget of a second application within a second partial area, as being moved according to a hovering input, according to various embodiments.

Referring to FIG. 73, in an operation 7302, the processor 2230 may display the execution screen of the first application within the first partial area, and display the first executable object and the widget of the second application within the second partial area. For example, referring to FIG. 74, in the state 2300, the processor 2230 may display the execution screen 2310 of the first application within the first partial area 2302 and display the widget 2312 of the second application within the second partial area 2304.

In an operation 7304, the processor 2230 may identify that a hovering input for the display area composed of the first partial area and the second partial area is maintained for a predetermined time period. In various embodiments, the hovering input may be a hovering input caused by the user's hand spaced apart from the display area and positioned over the display area. In various embodiments, the predetermined time period may be of a parameter defined to identify whether the hovering input is an input for moving at least one executable element in the execution screen of the first application within the first partial area or a widget of the second application within the second partial area. A length of the predetermined time period may be set by the processor 2230 without any user input or may be set by a user setting.

In an operation 7306, the processor 2230 may identify whether the hovering input is maintained over either the first partial area or the second partial area. For example, the hovering input may be maintained for the predetermined time period over either the first partial area or the second partial area. When the hovering input is maintained over the first partial area, the processor 2230 may execute an operation 7308, and otherwise, execute an operation 7310.

In the operation 7308, the processor 2230 may move, in response to identifying that the hovering input is maintained over the first partial area for the predetermined time period, the at least one executable element within the execution screen of the first application to an area in which the hovering input was received. For example, referring to FIG. 74, in response to receiving the hovering input 7400 for the first partial area 2302 in the state 2300, the processor 2230 may switch the state 2300 to a state 7402. In the state 7402, the processor 2230 may move at least one executable element 7404 in the execution screen 2310 of the first application within the first partial area 2302 to the area in which the hovering input 7400 was received. Due to the movement, the user can easily control the execution screen 2310 of the first application through a user input (e.g., a touch input) following the hovering input 7400.

In an operation 7310, in response to identifying that the hovering input is maintained for the predetermined time period over the second partial area, the processor 2230 may move the widget of the second application to the area in which the hovering input was received. For example, referring to FIG. 74, the processor 2230, in response to receiving the hovering input 7406 for the second partial area 2304 in the state 2300, may switch the state 2300 to a state 7408. In the state 7408, the processor 2230 may move the widget 2312 of the second application within the second partial area 2304 to the area where the hovering input 7406 was received. Due to the movement, the user can make an easy control of the widget 2312 of the second application through a user input (e.g., a touch input) following the hovering input 7406.

As described above, the electronic device 2210 according to various embodiments makes it possible to move an executable element or a widget to a position where a hovering input was received, so that the user can easily control the execution screen or the widget displayed on the display 2240 at a desired position. Therefore, the electronic device 2210 according to various embodiments can provide its user with more enhanced user experience through such a movement.

Figure 75:
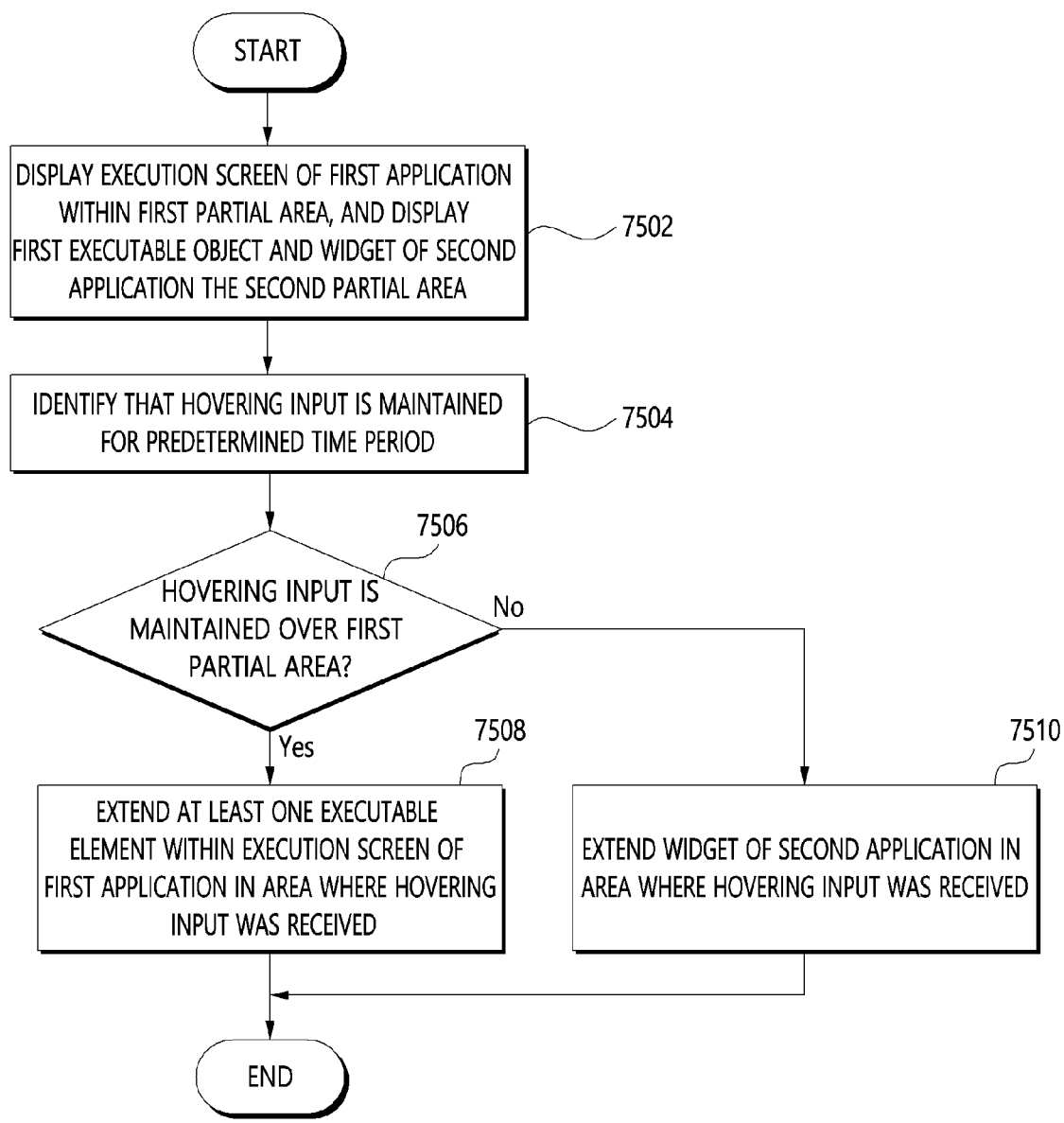
FIG. 75 illustrates a flowchart for an operating method of an electronic device for extending at least one executable element on an execution screen of a first application within a first partial area or a widget of a second application in a second partial area based on a hovering input, according to various embodiments.

FIG. 75 shows a flowchart for a method of the electronic device for extending at least one executable element in an execution screen of a first application within a first partial area or a widget of a second application within a second partial area, based on a hovering input according to various embodiments. This method may be executed by the infotainment device 100, the control device 2100 or the electronic device 2210, or may be executed by the processor 2230.

Figure 76:
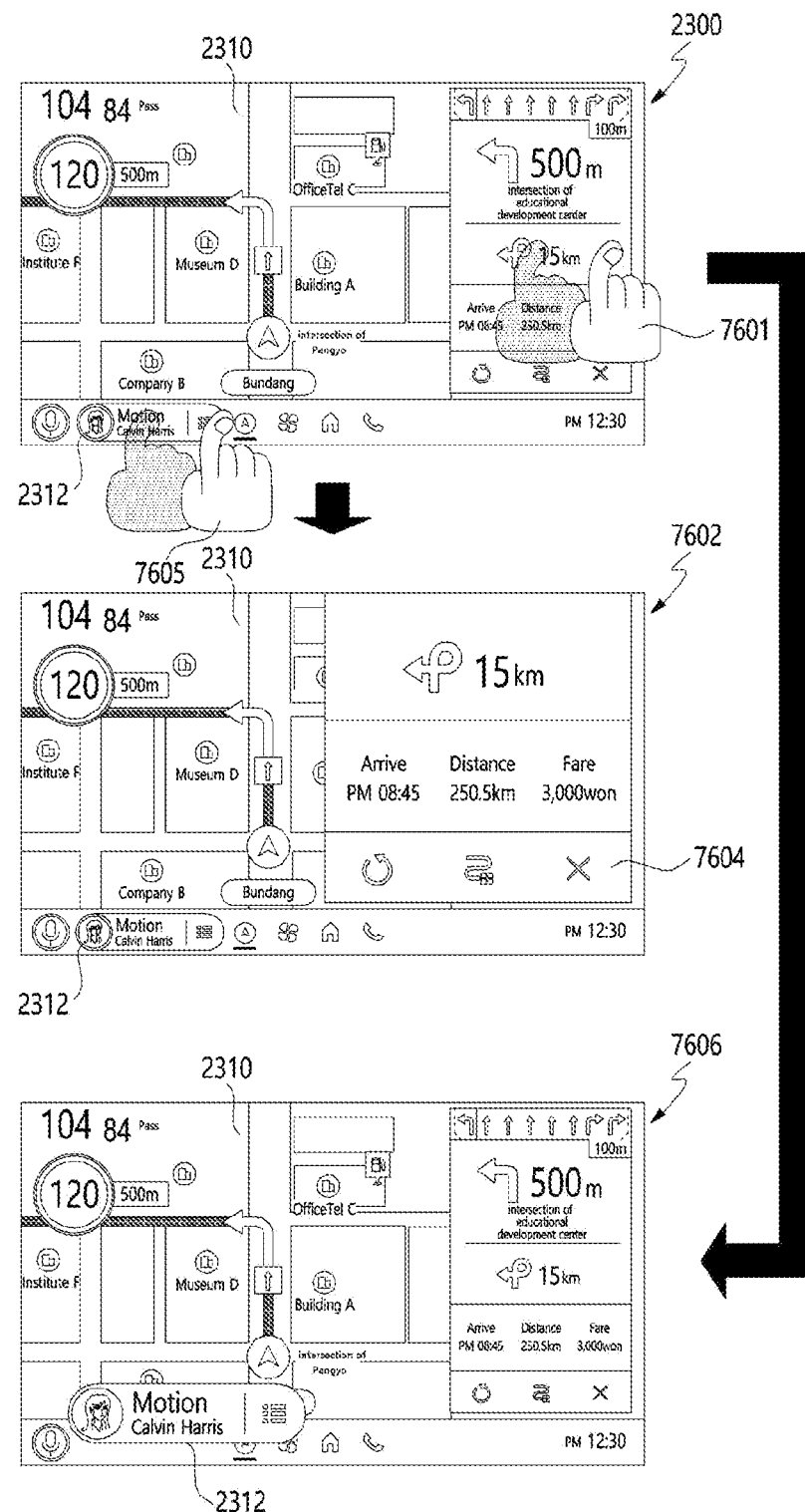
FIG. 76 illustrates an example of at least one executable element in an execution screen of a first application within a first partial area or a widget of a second application within a second partial area, which extends according to a hovering input, according to various embodiments.

FIG. 76 illustrates an example of at least one executable element in an execution screen of a first application in a first partial area or a widget of a second application within a second partial area, capable of being extended according to a hovering input, according to various embodiments.

Referring first to FIG. 75, in an operation 7502, the processor 2230 may display an execution screen of the first application within the first partial area, and display the first executable object and a widget of the second application within the second partial area. For example, referring to FIG. 76, in the state 2300, the processor 2230 may display the execution screen 2310 of the first application within the first partial area 2302 and display the widget 2312 of the second application within the second partial area 2304.

In an operation 7504, the processor 2230 may identify that a hovering input for the display area configured of the first and second partial areas is maintained for a predetermined time period. In various embodiments, the hovering input may be a hovering input caused by the user's hand spaced apart from the display area and positioned over the display area. In various embodiments, the predetermined time period may be a parameter defined to identify whether the hovering input is an input for extending at least one executable element in the execution screen of the first application within the first partial area or an input for extending the widget of the second application within the second partial area. The predetermined time period may be set by the processor 2230 without any user input or may be set by a user setting.

In an operation 7506, the processor 2230 may identify whether the hovering input is maintained over the first partial area or over the second partial area. For example, the hovering input may be maintained for the predetermined time period over the first partial area or maintained for the predetermined time period over the second partial area. The processor 2230 may execute an operation 7508 when the hovering input is maintained over the first partial area, and otherwise, execute an operation 7510.

In an operation 7508, the processor 2230 may, in response to identifying that the hovering input is maintained over the first partial area for the predetermined time period, extend the at least one executable element within the execution screen of the first application. For example, referring to FIG. 76, in response to receiving a hovering input 7601 for the first partial area 2302 in the state 2300, the processor 2230 switch the state 2300 to a state 7602. In the state 7602, the processor 2230 may extend at least one executable element 7604 in the execution screen 2310 of the first application within the first partial area 2302, in an area in which the hovering input 7601 was received. Owing to such an extension, the user can easily control the execution screen 2310 of the first application through a user input (e.g., a touch input) following the hovering input 7400.

In an operation 7510, in response to identifying that the hovering input is maintained over the second partial area for the predetermined time period, the processor 2230 may extend the widget of the second application. For example, referring to FIG. 75, the processor 2230, in response to receiving a hovering input 7605 for the second partial area 2304 in the state 2300, may switch the state 2300 to a state 7606. In the state 7606, the processor 2230 may extend the widget 2312 of the second application within the second partial area 2304 in the area in which the hovering input 7605 was received. In various embodiments, an extended widget 2312 of the second application may be at least partially overlapped on the execution screen 2310 of the first application. Thanks to such a movement, the user can easily control the widget 2312 of the second application through a user input (e.g., a touch input) following the hovering input 7605.

As described above, the electronic device 2210 according to various embodiments can extend an executable element or a widget associated with an area where a hovering input has been received, so that the user can make an easy control of an execution screen or a widget displayed on the display 2240 at a desired location. Therefore, the electronic device 2210 according to various embodiments can provide its users with more enhanced user experience through such an extension of the executable element or the widget.

Figure 77:
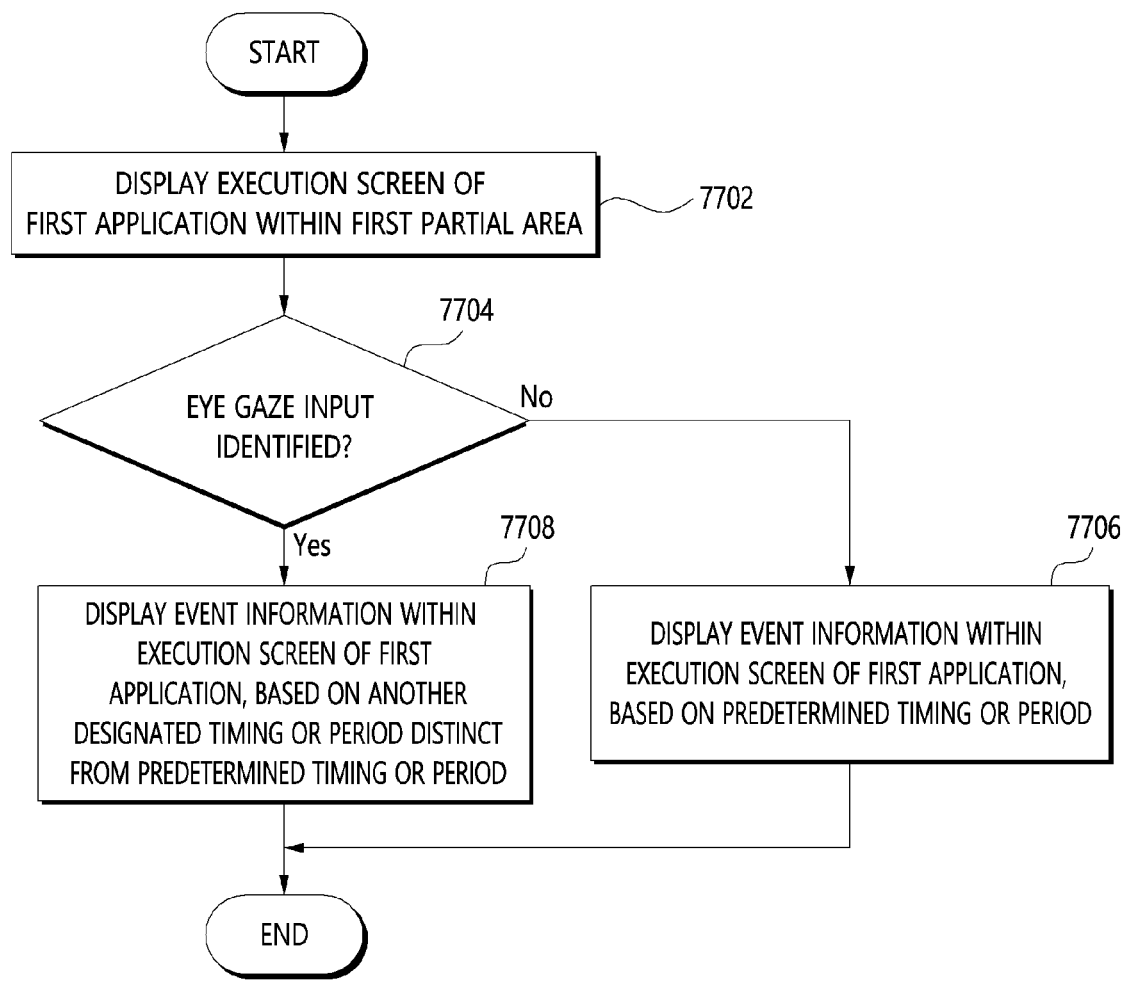
FIG. 77 illustrates a flowchart for an operating method of an electronic device for adaptively controlling event information to be displayed on an execution screen of a first application displayed within a first partial area, based on an eye-gaze input, according to various embodiments.

FIG. 77 illustrates a flowchart for a method of the electronic device for adaptively controlling event information to be displayed in an execution screen of a first application displayed within a first partial area, based on an eye gaze input, according to various embodiments. This method may be executed by the infotainment device 100, the control device 2100 or the electronic device 2210, or may be executed by the processor 2230.

Figure 78:
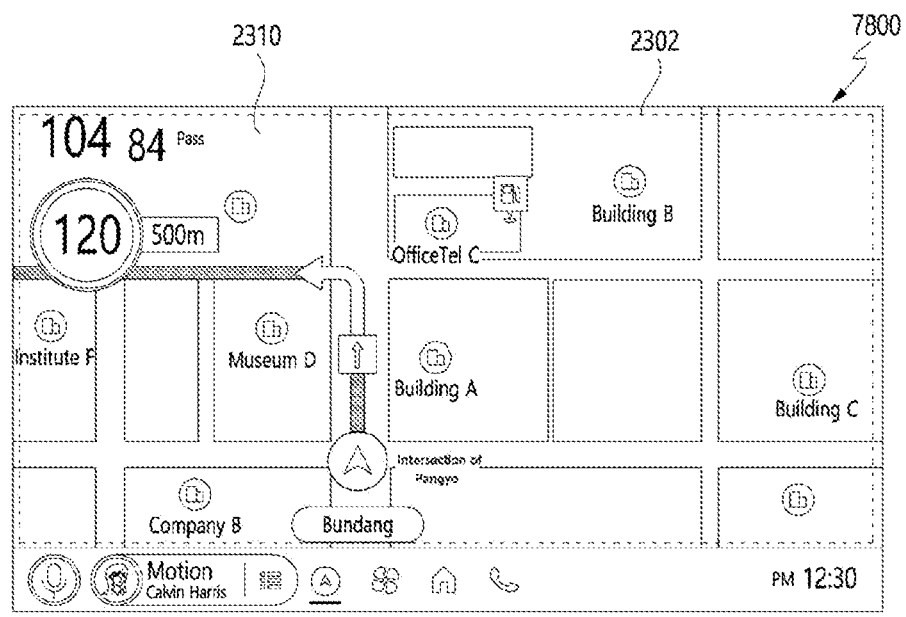
FIG. 78 illustrates an example of event information on an execution screen of a first application within a first partial area, adaptively displayed based on an eye-gaze input, according to various embodiments.
Figure 78:
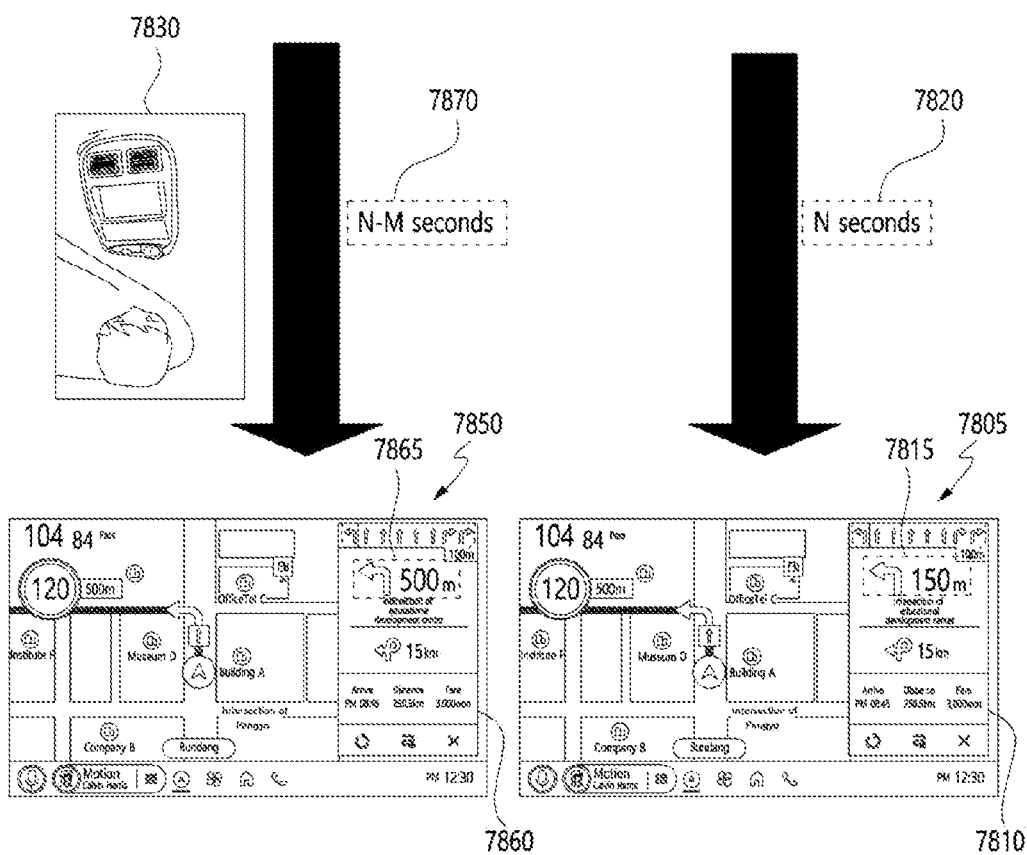

FIG. 78 illustrates an example of event information in an execution screen of a first application within a first partial area that is adaptively displayed, based on an eye gaze input, according to various embodiments.

Referring now to FIG. 77, in an operation 7702, the processor 2230 may display an execution screen of the first application within the first partial area. For example, referring then to FIG. 78, in a state 7800, the processor 2230 may display an execution screen 2310 of the first application within the first partial area 2302. In various embodiments, the processor 2230 may display a widget of the second application within the second partial area, while displaying the execution screen of the first application within the first partial area.

In an operation 7704, the processor 2230 may monitor or identify whether it is identified the eye gaze input looking at the display area or an execution screen of the first application within the first partial area for a predetermined time period displays, while displaying the execution screen of the first application within the first partial area. In various embodiments, the eye gaze input may be identified based on an image captured through the camera 2247. For example, referring to FIG. 78, in a state 7800, the processor 2230 may monitor or identify whether it is identified the eye gaze input caused by a state 7830, while displaying the execution screen 2310 of the first application within the first partial area 2302. In various embodiments, while displaying the execution screen of the first application within the first partial area, the processor 2230 may execute an operation 7708 based on monitoring the identification of the eye gaze input, and otherwise, execute an operation 7706.

Although FIGS. 77 and 78 illustrate an example of monitoring whether the processor 2230 identifies the eye gaze input while displaying the execution screen of the first application within the first partial area, it is only for convenience of the description and the eye gaze input may be replaced with another user input. For example, the other user input may be made up with a certain user action caused by the user paying attention to the execution screen of the first application. For example, the user action may be at least one of a change in weight of a driver's seat of the vehicle caused by the user paying attention to the execution screen of the first application or a change in tension of a seat belt worn by the user sitting in the driver's seat, although it is not limited thereto. For example, when the eye gaze input is replaced with the other user input, the processor 2230 may then execute, based on monitoring identifying the other user input, an operation 7708, and otherwise, execute an operation 7706.

Although FIGS. 77 and 78 illustrate an example of monitoring whether or not the processor 2230 identifies the eye gaze input while displaying the execution screen of the first application within the first partial area, it is only for convenience of the explanation. The monitoring whether to identify the eye gaze input may be replaced with monitoring whether the frequency at which the eye gaze inputs occur is greater than or equal to a reference number. For example, the frequency at which the eye gaze inputs occur may mean the number of occurrences of the eye gaze inputs for a given unit time. Then, based on monitoring that the frequency of the eye gaze inputs is equal to or greater than the reference number, the processor 2230 may execute the operation 7708, and otherwise, execute the operation 7706.

In an operation 7706, the processor 2230 may display event information within the execution screen of the first application on basis of a predetermined timing or period, based on monitoring that the eye gaze input is not identified while displaying the execution screen of the first application within the first partial area. In various embodiments, the event information may be displayed to provide new information or provide other information that is distinct from the information currently being provided. For example, if the first application is an application for providing a navigation service, then the event information may include information on a routing direction of the vehicle displayed in the execution screen of the first application before the vehicle including the electronic device 2210 enters an area located within a predetermined distance from a junction or intersection. For another example, if the first application is an application for providing the navigation service, then the event information may further include information on the lane to change in order for the driver to drive the vehicle according to the route guided by the first application. For another example, if the first application is an application for providing the navigation service, then the event information may further include route guidance information to be displayed before the vehicle enters an underground lane. However, it is not limited thereto.

In various embodiments, the predetermined timing may be a timing to display the event information, when the eye gaze input is not identified in the operation 7704. For example, the predetermined timing may be a timing when the distance from the vehicle including the electronic device 2210 to a place associated with the event information reaches a predetermined distance. For example, if the event information is information on a direction to drive the vehicle at a junction and the predetermined distance is 100 m, then the processor 2230 may display the event information on the execution screen of the first application, based on identifying that the distance between the vehicle and the junction is at 100 m. For another example, the predetermined timing may be a timing in advance of a predetermined time interval from a timing point when the vehicle is expected to enter a place related to the event information. For example, if the event information is of route guidance information displayed before the vehicle enters an underground lane, the time when the vehicle is expected to enter the underground lane is 1 minute after the current time, and the predetermined time internal is 10 seconds, then the processor 2230 may display the event information within the execution screen of the first application, 50 seconds after the current time. However, it is not limited thereto.

For example, referring then to FIG. 78, the processor 2230 may switch, in response to monitoring in state 7800 that it is not identified the eye gaze input caused by the state 7830, the state 7800 to a state 7805. In the state 7805, the processor 2230 may display event information 7810 on the execution screen 2310 of the first application within the first partial area 2302, based on the predetermined timing. For example, in the state 7805, the predetermined timing may be a timing point 7815 to identify that the distance between the electronic device 2210 and the place (e.g., a junction) related to the event information 7810 is 150 m. As another example, in the state 7805, the predetermined timing may be a timing point 7820 at which N seconds has elapsed from the state 7800, wherein N is a real number exceeding zero. However, it is not limited thereto.

In various embodiments, the predetermined period may be a period in which the event information is displayed when the eye gaze input is not identified in the operation 7704. For example, if the predetermined period is 10 seconds, the processor 2230 may display the event information every 10 seconds in response to monitoring that it is not identified the eye gaze input in an operation 7704. However, it is not limited thereto.

In an operation 7708, the processor 2230 may display the event information within the execution screen of the first application on the basis of another predetermined timing distinguished from the predetermined timing or another predetermined period distinguished from the predetermined period, based on monitoring that the eye gaze input is identified while displaying the execution screen of the first application within the first partial area.

In various embodiments, the other predetermined timing may be set to be faster than the predetermined timing. For example, the other predetermined timing may be a timing point at which the distance from the vehicle including and the electronic device 2210 to the place related to the event information gets to another predetermined distance distinguished from the predetermined distance in the operation 7706. For example, if the event information is of information on a routing direction of the vehicle at an approaching junction and the predetermined distance is 100 m, then the other predetermined distance may be 300 m. For example, as opposed to the operation 7706, the processor 2230 may display the event information within the execution screen of the first application, based on identifying that the distance from the vehicle and the junction is 300 m. For another example, the predetermined timing point may be a timing point prior to a predetermined time, which is distinguished from a timing point at which the vehicle is expected to enter the place related to the event information. For example, if the event information is information for route guidance displayed before the vehicle enters the underground lane, the time at which the vehicle is expected to enter the underground lane is 1 minute after the current time, and the predetermined time is 10 seconds, then the other predetermined time may be 20 seconds. For example, the processor 2230 may display the event information in the execution screen of the first application 40 seconds after the current time. However, it is not limited thereto.

For example, referring to FIG. 78, in response to monitoring identifying the eye gaze input caused by the state 7830, in the state 7800, the processor 2230 may switch the state 7800 to a state 7850. In the state 7850, the processor 2230 may display, based on the other predetermined timing, the event information 7860 in the execution screen 2310 of the first application within the first partial area 2302. For example, in the state 7850, the other predetermined timing may be a timing point 7865 of identifying that the distance from the electronic device 2210 to the place (e.g., a junction) associated with the event information 7860 is 500 m. For another example, in the state 7850, the other predetermined timing is a timing point at which N-M seconds has elapsed from the state 7800, wherein M is a real number exceeding zero and less than and equal to N, although it is not limited thereto.

In various embodiments, the other predetermined period may be a period in which the event information is displayed when the eye gaze input is identified in the operation 7704. The other predetermined period may be set shorter than the predetermined period. For example, the other predetermined period may be 5 seconds shorter than 10 seconds of the predetermined period. For example, if the other predetermined period is 5 seconds, the processor 2230 may display the event information every 5 seconds in response to monitoring that the eye gaze input is identified in the operation 7704, although it is not limited thereto.

In various embodiments, at least one of the other predetermined timing or the other predetermined period may be set by a user input or by the processor 2230 without any user input.

FIGS. 77 and 78 illustrate an example of displaying the event information through the display 2240 of the electronic device 2210, but the event information may be provided in various formats in relation to the electronic device 2210. For example, the event information may be provided through an audio signal, although not limited thereto.

Further, in various embodiments, the processor 2230 may further execute not only the operation 7708 but also other operations, while identifying the eye gaze input. For example, the processor may increase the operating frequency of the sensor 2249 of the electronic device 2210, independently of executing the operation 7708, while identifying the eye gaze input or receiving the eye gaze input. For example, such an operation of causing the user of the electronic device 2210 to make an eye gaze input may imply that the user is not looking ahead while driving the vehicle with the electronic device 2210. In order to prevent a traffic accident against the vehicle with the electronic device 2210 from occurring due to causing the driver to make the eye gaze input, the processor 2230 may increase the operating frequency of the sensor 2249 while identifying the eye gaze input. Through such an increase in the operating frequency of the sensor 2249, the processor 2230 can more accurately identify the condition of the environment around the vehicle including the electronic device 2210, while identifying the eye gaze input. Further, the processor 2230 can restore the original operating frequency of the sensor 2249 based on identifying the completion of the eye gaze input.

As described above, the electronic device 2210 according to various embodiments makes it possible to adaptively control the timing or period of providing the event information according to whether the eye gaze input is identified, thereby leading to more enhanced user experience.

Figure 79:
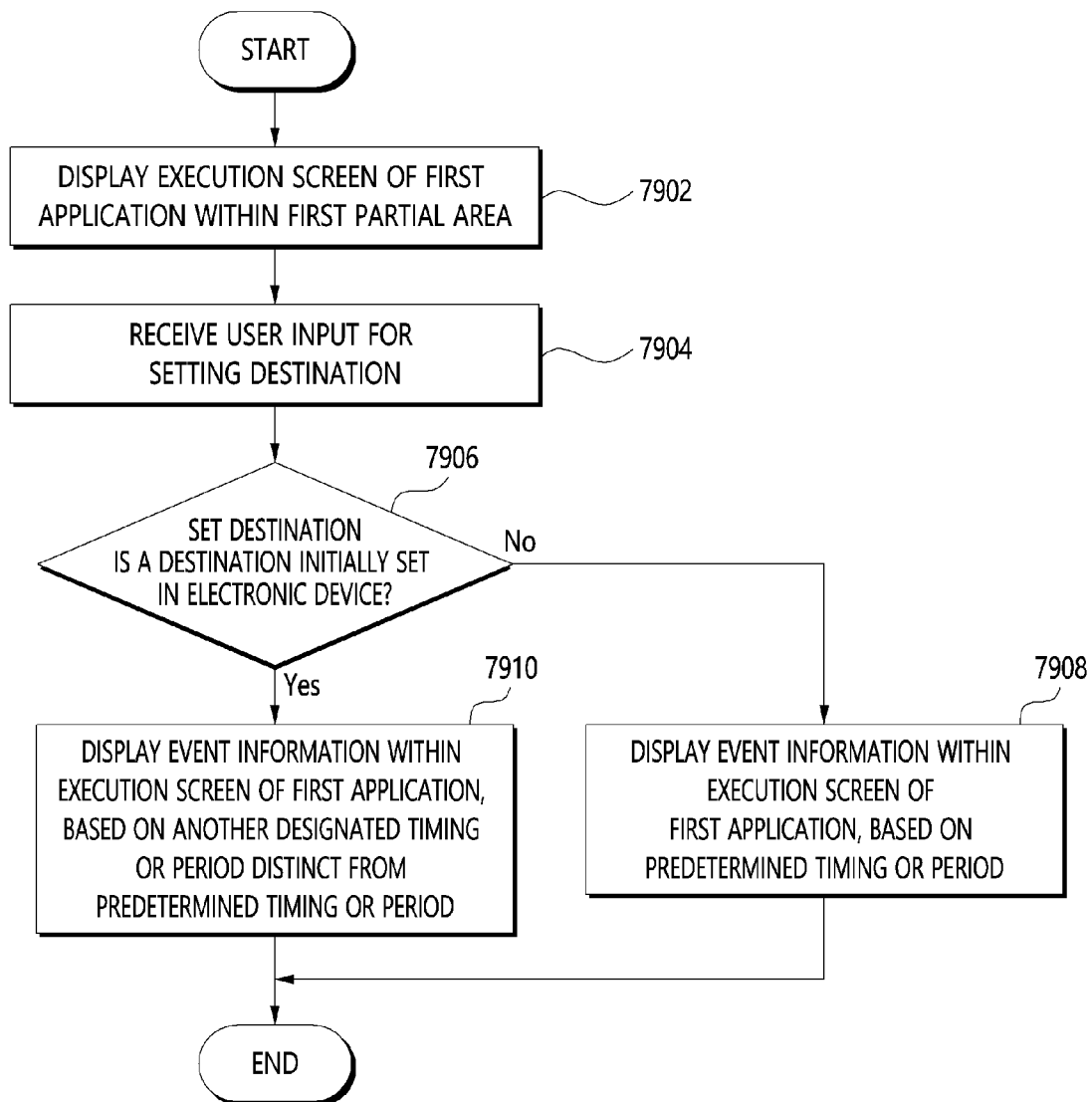
FIG. 79 illustrates a flowchart for an operating method of an electronic device for controlling event information to be displayed on an execution screen of an application within a first partial area, depending on whether a destination has been initially set, according to various embodiments.

FIG. 79 illustrates a flowchart for an operating method of the electronic device for controlling event information to be displayed in an execution screen of an application within a first partial area, depending on whether a destination for route guidance was initially set, according to various embodiments. This method may be executed by the infotainment device 100, the control device 2100 or the electronic device 2210, or may be executed by the processor 2230.

Referring to FIG. 79, in an operation 7902, the processor 2230 may display an execution screen of the first application within the first partial area. For example, the operation 7902 may correspond to the operation 7702.

In an operation 7904, the processor 2230 may receive a user input for setting a destination, while displaying the execution screen of the first application within the first partial area. In various embodiments, if the first application is an application for providing a navigation service, the destination may indicate a place where the vehicle with the electronic device 2210 is to travel to. In various embodiments, the user input may be received through at least one executable element in the execution screen of the first application within the first partial area. In various embodiments, the user input may be received through an audio signal. However, it is not limited thereto.

In an operation 7906, in response to receiving the user input in an operation 7904, the processor 2230 may identify whether the set destination is a destination initially set in the electronic device 2210. For example, the processor 2230 may store history information of destinations input to the electronic device 2210 for the route guidance of the vehicle. The processor 2230 may identify whether the destination set by the user input in the operation 7904 is the first destination, based on the history information. If the set destination is the destination initially set, the processor 2230 may execute the operation 7708, and otherwise, execute the operation 7706.

In an operation 7908, the processor 2230 may display, in response to identifying that the set destination is not the first set destination, the event information in the execution screen of the first application, based on a predetermined timing or period. For example, the event information may be event information defined through the description of FIGS. 77 and 78. For example, the predetermined timing may be a predetermined timing defined through the description of FIGS. 77 and 78. For example, the predetermined period may be a predetermined period defined through the description of FIGS. 77 and 78.

In an operation 7910, the processor 2230 may display, in response to identifying that the set destination is the first set destination, the event information in the execution screen of the first application, based on either another predetermined timing distinguished from the predetermined timing or another predetermined period distinguished from the predetermined period. For example, the event information may be event information defined through the description of FIGS. 77 and 78. For example, the other predetermined timing may be another predetermined timing defined through the description of FIGS. 77 and 78. For example, the other predetermined period may be another predetermined period defined through the description of FIGS. 77 and 78.

Although not shown in FIG. 79, the processor 2230 may change the timing or period to display the event information, according to the frequency of setting the destination for the route guidance. For example, if the destination is a first destination A where the user inputs at least once a day, then the processor 2230 may set the length of a frequency period to display the event information to X, and if the destination is a second destination B where the user inputs at least once a month, then the processor 2230 may set the length of a frequency period to display the event information to Y, which is shorter than the length X. However, it is not limited thereto.

As described above, the electronic device 2210 according to various embodiments makes it possible to adaptively change the timing of providing the event information or the frequency period of providing the event information, according to whether such an initially set destination is input, thereby providing its user with more enhanced user experience.

The device or apparatus described above may be implemented as a hardware component, a software component, and/or a combination of a hardware component and a software component. For example, the devices and components described in the various embodiments may be implemented using one or more general-purpose or specific-purpose computers, such as for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications executed on the basis of the operating system. Further, the processing device may access, store, manipulate, process, and generate data in response to the execution of the software. For the convenience of understanding, although it is described in various embodiments that a single processing device is used, an expert skilled in the art will appreciate that such a processing device may be of a plurality of processing elements and/or multiple types of processing elements. For example, the processing device may include a plurality of processors or one processor and one controller. Further, it would be possible to use other processing configurations such as e.g., a parallel processor.

The software may include at least one computer program, code, instruction, or a combination of one or more of them, and configure the processing unit to operate as required, or independently or collectively instruct the processing unit. Software and/or data may be embodied in any type of machine, component, physical device, computer storage medium or device to be interpreted by the processing unit or to provide instructions or data to the processing unit. The software may be distributed over networked computer systems and stored or executed in a distributed manner. The software and data may be stored into one or more computer-readable recording media.

The method according to the various embodiments may be implemented in a form of program instructions that can be executed through various computer means, and recorded in a computer-readable medium. Further, the medium may be one that continuously stores a program executable by a computer, or temporarily stores a program for execution or download. Further, the medium may be a variety of recording means or storage means in a form combined of a single or multiple pieces of hardware, but it is not limited to a medium directly connected to a computer system and may exist distributed over networks. Examples of media may include magnetic media such as e.g., hard disks, floppy disks, and magnetic tapes; optical recording media such as e.g., CD-ROMs and DVDs; magneto-optical media such as e.g., floptical disks; ROM, RAM, flash memory, and any other recording media configured to store program instructions. Further, examples of other media may include an app store distributing applications, a website supplying or distributing various software, and a recording medium or a storage medium managed by a server.

As described above, the embodiments have been described by means of those exemplary embodiments and drawings, but an expert skilled in the art could make various modifications and variations from the above description. For example, the described techniques may be performed in a different order from that of the described method, and/or those elements of the described system, structure, device, circuit, or the like may be coupled or combined in a form that is different from the described method, or may be substituted by other components or their equivalents, so as to achieve the substantially same result.

Therefore, other implementations, other embodiments and their equivalents will also fall within the scope of the claims to be described later.

What is claimed is:

1. A non-transitory computer readable storage medium storing at least one program, the at least one program comprising instructions to, when executed by at least one processor of an electronic device included within a vehicle and including a display, cause the electronic device to:

while executing a first application and a second application, display an execution screen of the first application within a first partial area, and display a widget of the second application including a first executable element and a second executable element, and a first executable object to indicate the first application, within a second partial area located adjacent to the first partial area, the first partial area and the second partial area forming a display area of the display;

based on receiving a first user input for the first executable element of the widget of the second application while displaying the execution screen of the first application within the first partial area and displaying the widget of the second application and the first executable object within the second partial area, display an execution screen of the second application switched from the execution screen of the first application within the first partial area and display within the second partial area a widget of the first application switched from the first executable object and the second executable element to indicate the second application, being switched from the widget of the second application; and based on receiving a second user input for the second executable element of the widget of the second application while displaying the execution screen of the first application within the first partial area and displaying the widget of the second application and the first executable object within the second partial area, display at least one visual item available through the second executable element within an area extending from the widget of the second application, in an overlapping manner, on the execution screen of the first application displayed within the first partial area.

2. The non-transitory computer readable storage medium according to claim 1, wherein the at least one program comprises instructions to, when executed by the at least one processor of the electronic device, cause the electronic device to:

display the execution screen of the first application within the first partial area and display the widget of the second application and the first executable object within the second partial area, with no user input being received, while executing the first application and the second application.

3. The non-transitory computer readable storage medium according to claim 1, wherein:

the first user input is a single tap input for the first executable element;

the second user input is a single tap input for the second executable element; and the at least one program comprises instructions to, when executed by the at least one processor of the electronic device, further cause the electronic device to:

based on receiving a third user input dragging the widget of the second application in a first direction, while displaying the execution screen of the first application within the first partial area and displaying the widget of the second application and the first executable object within the second partial area, display an extended widget of the second application switched from the widget of the second application within the second partial area; and based on receiving a fourth user input dragging the widget of the first application in the first direction, while displaying the execution screen of the second application within the first partial area and displaying the widget of the first application and the second executable object within the second partial area, display an extended widget of the first application switched from the widget of the first application within the second partial area;

wherein the display position of the first executable object is moved in the first direction according to switching from the widget of the second application to the extended widget of the second application, when the widget of the second application is switched to the extended widget of the second application through the third user input, while the direction from the widget of the second application to the first executable object is the first direction, and the display position of the first executable object is maintained independently of switching from the widget of the second application to the extended widget of the second application, when the widget of the second application is switched to the extended widget of the second application through the third user input, while the direction from the widget of the second application to the first executable object is a second direction opposite to the first direction;

wherein the display position of the second executable object is moved in the first direction according to switching from the widget of the first application to the extended widget of the first application, when the widget of the first application is switched to the extended widget of the first application through the fourth user input, while the direction from the widget of the first application to the second executable object is the first direction, and the display position of the second executable object is maintained independently of switching from the widget of the first application to the extended widget of the first application, when the widget of the first application is switched to the extended widget of the first application through the fourth user input, while the direction from the widget of the first application to the second executable object is the second direction.

4. The non-transitory computer readable storage medium according to claim 1, wherein:

the widget of the second application and the first executable object are displayed within the second partial area together with a third executable object to indicate a third application; and the at least one program comprises instructions to, when executed by the at least one processor of the electronic device, further cause the electronic device to:

based on receiving a third user input dragging the third executable object in the first direction, while displaying the execution screen of the first application within the first partial area and displaying the widget of the second application and the first executable object together with the third executable object within the second partial area, maintain displaying of the execution screen of the first application within the first partial area, execute the third application; and display a widget of the third application switched from the third executable object together with the widget of the second application and the first executable object within the second partial area.

5. The non-transitory computer readable storage medium according to claim 1, wherein the at least one program comprises instructions to, when executed by the at least one processor of the electronic device, further cause the electronic device to:

based on receiving a third user input for another area within the second partial area distinguished from the display area of the widget of the second application and the display area of the first executable object, display a third executable object to indicate a function distinguished from the functions available through the first application and the second application within the second partial area, together with the widget of the second application and the first executable object; and based on receiving a fourth user input for the third executable object, execute the function indicated by the third executable object.

6. The non-transitory computer readable storage medium according to claim 5, wherein the at least one program comprises instructions to, when executed by the at least one processor of the electronic device, further cause the electronic device to switch the execution screen of the first application displayed within the first partial area to the execution screen of the function, in response to execution of the function indicated by the third executable object.

7. The non-transitory computer readable storage medium according to claim 5, wherein the at least one program comprises instructions to, when executed by the at least one processor of the electronic device, further cause the electronic device to switch the third executable object displayed within the second partial area to a widget for indicating an execution state of the function, in response to execution of the function indicated by the third executable object.

8. The non-transitory computer readable storage medium according to claim 5, wherein the function is a function that has been most recently provided through the electronic device among a plurality of functions that are available with the electronic device and distinguished from the functions available through the first application and the second application.

9. The non-transitory computer readable storage medium according to claim 5, wherein the function is a function that has been most frequently provided through the electronic device among a plurality of functions that are available with the electronic device and distinguished from the functions available through the first application and the second application.

10. The non-transitory computer readable storage medium according to claim 5, wherein the at least one program comprises instructions to, when executed by the at least one processor of the electronic device, further cause the electronic device to:

switch the third executable object to a fourth executable object to indicate another function distinct from the functions available through the first application and the second application, based on receiving a fifth user input for the third executable object; and execute the other function indicated by the fourth executable object, based on receiving a sixth user input for the fourth executable object;

wherein the fourth user input is a single tap input to the third executable object, and the fifth user input is an input to drag the third executable object in a designated direction.

11. The non-transitory computer readable storage medium according to claim 5, wherein the at least one program comprises instructions to, when executed by the at least one processor of the electronic device, further cause the electronic device to:

execute the function of the first application indicated by a fifth user input, based on receiving the fifth user input for the other area within the second partial area distinguished from the display area of the widget of the second application and the display area of the first executable object; and change the state of the execution screen of the first application displayed within the first partial area, based on the execution of the function of the first application;

wherein the attribute of the fifth user input is distinguished from the attribute of the third user input.

12. The non-transitory computer readable storage medium according to claim 5, wherein the at least one program comprises instructions to, when executed by the at least one processor of the electronic device, further cause the electronic device to:

execute the function of the second application indicated by a fifth user input, based on receiving the fifth user input for the other area within the second partial area distinguished from the display area of the widget of the second application and the display area of the first executable object; and change the state of the widget of the second application displayed within the second partial area, based on the execution of the function of the second application.

13. The non-transitory computer readable storage medium according to claim 5, wherein the at least one program comprises instructions to, when executed by the at least one processor of the electronic device, further cause the electronic device to:

display a handwriting input field in an overlapping manner, on the execution screen of the first application displayed within the first partial area, based on receiving a fifth user input for the other area within the second partial area distinguished from the display area of the widget of the second application and the display area of the first executable object; and recognize a character indicated by a path of at least one drag input, based on receiving the at least one drag input initiated from the handwriting input field;

wherein the attribute of the fifth user input is distinct from the attribute of the third user input.

14. The non-transitory computer readable storage medium according to claim 13, wherein the handwriting input field is extended from at least a part of the other area within the second partial area, and a part of the execution screen of the first application disposed underneath the handwriting input field is translucent so that it is visible.

15. The non-transitory computer readable storage medium according to claim 13, wherein the at least one program comprises instructions to, when executed by the at least one processor of the electronic device, further cause the electronic device to:

based on the fifth user input, display a plurality of executable objects for respectively indicating a plurality of applications including the first application and the second application, in an overlapping manner on the execution screen of the first application displayed within the first partial area, together with the handwriting input field;

recognize the character indicated by the path of the at least one drag input, based on receiving the at least one drag input initiated from the handwriting input field after receiving a sixth user input to select an executable object among the plurality of executable objects; and execute an application indicated by the executable object selected by the sixth user input and a function corresponding to the recognized character.

16. The non-transitory computer readable storage medium according to claim 13, wherein the at least one program comprises instructions to, when executed by the at least one processor of the electronic device, further cause the electronic device to recognize the path of the at least one drag input passing by a part of the execution screen of the first application beyond the handwriting input field, as a part of the character instead of the user input for the first application, while the at least one drag input initiated from the handwriting input field is received.

17. The non-transitory computer readable storage medium according to claim 16, wherein the at least one program comprises instructions to, when executed by the at least one processor of the electronic device, further cause the electronic device to display a part of the path of the at least one drag input on the execution screen of the first application displayed within the first partial area.

18. The non-transitory computer readable storage medium according to claim 1, wherein the at least one program comprises instructions to, when executed by the at least one processor of the electronic device, further cause the electronic device to:

display a third executable object for guiding a recommended function within another area of the second partial area distinguished from the display area of the widget of the second application and the display area of the first executable object, while displaying the execution screen of the first application within the first partial area and displaying the widget of the second application and the first execution within the second partial area; and execute the recommended function, based on receiving a third user input for the third executable object, while displaying the execution screen of the first application within the first partial area and displaying the third executable object together with the widget of the second application and the first executable object within the second partial area;

wherein the recommended function is identified from a model that is related to the electronic device and configured to predict a future execution pattern of the electronic device, based on past execution heuristics including a past execution history of the electronic device.

19. An electronic device included within a vehicle, the electronic device comprising:

a display;

a memory configured to store instructions; and at least one processor, the at least one processor, when executing the instructions, being configured to:

while executing a first application and a second application, display an execution screen of the first application within a first partial area, and display a widget of the second application including a first executable element and a second executable element, and a first executable object to indicate the first application, within a second partial area located adjacent to the first partial area, the first partial area and the second partial area forming a display area of the display;

based on receiving a first user input for the first executable element of the widget of the second application while displaying the execution screen of the first application within the first partial area and displaying the widget of the second application and the first executable object within the second partial area, display an execution screen of the second application switched from the execution screen of the first application within the first partial area, and display within the second partial area a widget of the first application switched from the first executable object and the second executable element to indicate the second application, being switched from the widget of the second application; and based on receiving a second user input for the second executable element of the widget of the second application while displaying the execution screen of the first application within the first partial area and displaying the widget of the second application and the first executable object within the second partial area, display at least one visual item available through the second executable element within an area extending from the widget of the second application, in an overlapping manner, on the execution screen of the first application displayed within the first partial area.

20. A method for operating an electronic device included within a vehicle and having a display, the method comprising:

while executing a first application and a second application, displaying an execution screen of the first application within a first partial area, and displaying a widget of the second application including a first executable element and a second executable element, and a first executable object to indicate the first application, within a second partial area located adjacent to the first partial area, the first partial area and the second partial area forming a display area of the display;

based on receiving a first user input for the first executable element of the widget of the second application while displaying the execution screen of the first application within the first partial area and displaying the widget of the second application and the first executable object within the second partial area, displaying an execution screen of the second application switched from the execution screen of the first application within the first partial area and displaying within the second partial area a widget of the first application switched from the first executable object and the second executable element to indicate the second application, being switched from the widget of the second application; and based on receiving a second user input for the second executable element of the widget of the second application while displaying the execution screen of the first application within the first partial area and displaying the widget of the second application and the first executable object within the second partial area, displaying at least one visual item available through the second executable element within an area extending from the widget of the second application, in an overlapping manner, on the execution screen of the first application displayed within the first partial area.

* * * * *